United States Patent
van Rensburg et al.

(10) Patent No.: US 11,924,154 B2
(45) Date of Patent: Mar. 5, 2024

(54) SYSTEM AND METHOD FOR DEEP MESSAGE EDITING IN A CHAT COMMUNICATION ENVIRONMENT

(71) Applicant: RingCentral, Inc., Belmont, CA (US)

(72) Inventors: Christopher van Rensburg, Portland, OR (US); Martin Arastafar, Redwood City, CA (US); Alexander Pantyukhin, Saint-Petersburg (RU)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 17/838,748

(22) Filed: Jun. 13, 2022

(65) Prior Publication Data
US 2023/0216820 A1 Jul. 6, 2023

(51) Int. Cl.
*H04L 51/216* (2022.01)
*H04L 51/04* (2022.01)
*H04L 51/063* (2022.01)
*H04L 51/224* (2022.01)

(52) U.S. Cl.
CPC ........... *H04L 51/216* (2022.05); *H04L 51/04* (2013.01); *H04L 51/063* (2013.01); *H04L 51/224* (2022.05)

(58) Field of Classification Search
None
See application file for complete search history.

(56) References Cited

U.S. PATENT DOCUMENTS

| | | | | |
|---|---|---|---|---|
| 6,247,045 B1* | 6/2001 | Shaw | ..... | H04L 51/063 709/240 |
| 7,305,627 B2* | 12/2007 | Tannenbaum | ....... | G06Q 10/107 715/751 |
| 7,337,239 B2* | 2/2008 | Miller | ...... | H04L 67/535 709/248 |
| 7,949,717 B2* | 5/2011 | Pastorelli | ..... | H04L 51/48 709/219 |
| 8,996,355 B2* | 3/2015 | Orsini | ..... | G06F 40/58 704/8 |
| 9,298,703 B2* | 3/2016 | Leydon | ..... | G06Q 30/0217 |
| 9,324,058 B2* | 4/2016 | Eren | ..... | G06Q 10/107 |
| 9,503,404 B2* | 11/2016 | Chan | ..... | G06F 40/274 |
| 9,742,713 B2* | 8/2017 | Spiegel | ..... | H04L 51/216 |
| 10,147,161 B2* | 12/2018 | Zhang | ..... | G09G 5/00 |
| 10,462,093 B2* | 10/2019 | Tung | ..... | H04L 51/52 |
| 10,484,314 B2* | 11/2019 | Mikhailov | ..... | H04L 67/306 |
| 10,489,506 B2* | 11/2019 | Cietwierkowski | ..... | G06F 3/0482 |
| 10,904,717 B2* | 1/2021 | Christmas | ..... | H04W 4/14 |
| 10,931,812 B2* | 2/2021 | Seidman | ..... | H04L 51/52 |
| 11,088,987 B2* | 8/2021 | Allen | ..... | G06Q 10/10 |
| 2009/0150803 A1* | 6/2009 | Ross | ..... | G06Q 10/107 715/758 |
| 2009/0245500 A1* | 10/2009 | Wampler | ..... | H04M 7/006 379/265.09 |

(Continued)

*Primary Examiner* — Backhean Tiv

(57) ABSTRACT

A method includes detecting a modification to one chat message that forms a modified one chat message. Subsequent chat messages that are posted after the one chat message has been posted are processed. The method includes automatically identifying a chat message from the subsequent chat messages that has a dependency on the one chat message. The method also includes automatically determining whether a content of the chat message from the subsequent chat messages is impacted by the modified one chat message.

30 Claims, 99 Drawing Sheets

(56) References Cited

U.S. PATENT DOCUMENTS

| | | | | |
|---|---|---|---|---|
| 2015/0281148 A1* | 10/2015 | Masterson | ............ | G06F 3/0482 |
| | | | | 715/752 |
| 2017/0337176 A1* | 11/2017 | Cietwierkowski | ... | G06Q 10/107 |
| 2018/0316636 A1* | 11/2018 | Kamat | .................. | H04L 51/046 |
| 2021/0303775 A1* | 9/2021 | Deleuze | ................ | G06F 40/166 |
| 2022/0210109 A1* | 6/2022 | van Rensburg | ....... | H04L 67/535 |
| 2023/0031018 A1* | 2/2023 | Kim | ...................... | H04L 51/224 |
| 2023/0216820 A1* | 7/2023 | van Rensburg | ....... | H04L 51/046 |
| | | | | 709/204 |

* cited by examiner

3300

Team type                                    Private  — 3403

— 3405

Glip needs access to Contacts to display address book contacts.

You can enable access in Privacy Settings.

— 3409

3800

3805

3803 alexander.zajac@finnegan.com (me) — 3801

Hey  8:22 AM

3900

3905

3903

Test Team — 3901
You: Hey  8:22 AM

Home  Tasks  Contacts  Calendar

4000

Add Members ~ 4005 alexander.zajac@finnegan.com (me)
alexander.zajac@finnegan.com ~ 4003 james.masters@finnegan.com
james.masters@finnegan.com ~ 4001

4100

4200

4203

4201

4300

— 4301a

— 4303

— 4301b

4400 alexander.zajac@finnegan.com    8:22 AM
Hey                                             — 4401a alexander.zajac@finnegan.com    8:54 AM
Team meeting

Date & Time: today at 9:00 AM – 10:00 AM
Location: Room 206                          — 4403 alexander.zajac@finnegan.com    9:12 AM
www.ringcentral.com                             — 4401b
👍 1 like Message

4600

4601

4700

4701

4800

Events (1)

Add Event ~~~ 4803

Today Tue, 5/9/17

Team meeting
9:00 AM - 10:00 AM ~~~ 4801

4900

Notes (0)

Add Note ~~~ 4901

5000

5001

5100

5200

5300

5400

— 5415

Write patent application ⁓ 5401

Start Date　　　　　　　　　　　　5/9/17 ⁓ 5403

Due Date　　　　　　　　　　　　5/31/17 ⁓ 5405

Clear　Done

February　28　2014
March　　　29　2015
April　　　　30　2016　　⁓ 5407
May　　　　31　2017
June　　　　1　2018
July　　　　2　2019
August　　　3　2020

Due Time　　　　　　　　　　　　　⁓ 5409

Repeat　　　　　　　　　　Never > ⁓ 5411

Complete When　　　　　Checked > ⁓ 5413

5500

| | |
|---|---|
| Start Date | 5/9/17 — 5501 |
| Due Date | 5/31/17 — 5503 |
| Due Time | 9:52 AM — 5505 |
| Repeat | Never > — 5507 |
| Complete When | Checked > — 5509 |

Color  — 5511

Section — 5513

Add a description... — 5515

5700

5800

— 5801

6000

6100 alexander.zajac@finnegan.com    8:22 AM
Hey    — 6101 alexander.zajac@finnegan.com    8:52 AM
☐ Write patent application

Assignee:
alexander.zajac@finnegan.com — 6103
Due: Tue, 5/9/17 – Wed, 5/31/17 at 9:52 AM Message

6200 alexander.zajac@finnegan.com  8:22 AM
Hey — 6201 alexander.zajac@finnegan.com  8:52 AM
☐ Write patent application

Assignee:
alexander.zajac@finnegan.com — 6203
Due: Tue, 5/9/17 – Wed, 5/31/17 at 9:52 AM alexander.zajac@finnegan.com  8:56 AM
📋 Grocery list
Eggs Bread — 6205 alexander.zajac@finnegan.com  9:19 AM

— 6207

Message

6300

6400

6500

— 6501

6600

6603                                                                6601

6700 alexander.zajac@finnegan.com (me)
Hey        8:22 AM

Test Team       6701
You: Hey   8:22 AM    6703a

6703b

Home    Tasks    Contacts    Calendar

6800 alexander.zajac@finnegan.com (me)
Hey                                    8:22 AM 6803   Test Team
                           You: Hey                    ~ 6801

Home        Tasks         Contacts       Calendar

6900

6901  exander.zajac@finnegan.com (me)　　　　　　　　6903
ey　　　　　　　　　　　　　　　　8:22 AM

Test Team
You: Hey　　　　　　　　　　　　　8:22 AM

Home　 Tasks　 Contacts　 Calendar

7000 alexander.zajac@finnegan.com (me) — 7003
Hey                          8:22 AM

Home    Tasks    Contacts    Calendar

7100

7101

7103

7200

7201

7203

7300

7301

7303

7400

— 7403

Due Wed, 5/31/17

Write patent application  — 7401

7500

7600

SYSTEM AND METHOD FOR DEEP MESSAGE EDITING IN A CHAT COMMUNICATION ENVIRONMENT

RELATED APPLICATIONS

The present application is a Non-Provisional U.S. patent application and claims the benefit and priority to the PCT Application PCT/RU2021/000634 that was filed on Dec. 30, 2021, which is incorporated herein by reference in its entirety.

TECHNICAL FIELD

The present disclosure relates generally to the field of computer supported chat communication environment. More specifically, and without limitation, this disclosure relates to systems and methods for automatically identifying dependencies of subsequent messages or references to a prior chat message that has been modified and further determining whether a deep edit on subsequent messages is needed and performing a deep edit as needed.

BACKGROUND

Use of digital collaborative environments, and particularly chat communication environments, has become a prevalent aspect of modern-day life, especially in light of the pandemic and the work-from-home environment. It is not unheard of for the chat communication environment and online chat messages (hereinafter chat messages) to contain typographical errors, grammatical errors, inaccuracies, incorrect information, unsuitable language, etc. (hereinafter referred to as errors). Either the individual that has posted the message or one of the participants of the chat communication environment may realize that a posted chat message may contain an error that needs to be corrected and the error is then corrected. Subsequent chat messages may depend on the prior message that has been edited (modified), e.g., reference the chat message by quoting it before it is modified, reference the context of the chat message before it is modified, sharing the chat message before it is modified, etc., and referencing the chat message may occur within the same chat communication environment or a different chat communication environment (e.g., different chat communication platform). Unfortunately, the dependency of subsequent chat messages on prior message(s) that may have been modified (whether shared, quoted, referenced, copied, etc.) poses a problem because modifying the prior chat message may create a situation in which the modified chat message contradicts the quotes of the original unmodified prior chat message in subsequent chat messages or sharing of the original unmodified prior chat message, uncorrected version of the prior message, etc., thereby resulting in the subsequent chat messages or context becoming unclear or nonsensical. Moreover, modifying a prior chat message does nothing to correct any subsequent chat messages that depend on the prior chat message that contains errors unless those subsequent chat messages are also manually modified to reflect the changes to the prior chat message.

SUMMARY

Accordingly, a need has arisen to identify dependencies between a subsequent chat message and a prior chat message that has been modified. Moreover, a need has arisen to determine whether changes to the prior chat message can safely be made in light of dependencies of subsequent chat messages and further to determine whether subsequent chat messages need to be modified (i.e., whether modification to a prior chat message can and should be propagated to subsequent chat messages). Additionally, a need has arisen to notify one or more participants of a chat communication environment that a prior chat message has been modified that may impact subsequent messages that have one or more dependencies on the prior message. Furthermore, a need has arisen to delete subsequent chat messages (hereinafter referred to as deep delete) that depend on a prior chat message, if desired.

In some embodiments, a method includes detecting a modification to one chat message that forms a modified one chat message. It is appreciated that the method may also include processing subsequent chat messages that are posted after the one chat message has been posted. In some embodiments, the method automatically identifies a chat message from the subsequent chat messages that has a dependency on the one chat message. In one nonlimiting example, the method also automatically determines whether a content of the chat message from the subsequent chat messages is impacted by the modified one chat message.

The method may further include determining whether changes to the chat message from the subsequent chat messages can be made based on the modification to the one chat message while maintaining the chat message from the subsequent chat messages sensical and accurate. In some embodiments, in response to determining that changes to the chat message from the subsequent chat messages can be made based on the modification to the one chat message while maintaining the chat message from the subsequent chat messages sensical and accurate, the chat message from the subsequent chat messages is modified based on the modification to the one chat message. In one nonlimiting example, an icon associated with the modification to the chat message from the subsequent chat messages is displayed, wherein the icon notifies a participant that the chat message from the subsequent chat messages has been modified based on the modification to the one chat message. According to some embodiments, the modifying the chat message from the subsequent chat messages is deleting a portion of the chat message.

The dependency may be determined based on at least one of the one chat message being shared, referenced, copied, or quoted. In some nonlimiting examples, the dependency is determined based on an originator of the one chat message being referenced in the chat message from the subsequent chat messages.

In some embodiments, the method further includes outputting notification that the one chat message has been modified. According to some embodiments, a notification that the chat message from the subsequent chat messages is impacted by modification to the one chat message is outputted. In some embodiments, an icon associated with the modification to the one chat message may be displayed.

It is appreciated that the processing, the automatically identifying and the automatically determining may be in response to a user selection, via a graphical user interface (GUI), to perform deep edit. The method may also include deleting the chat message from the subsequent chat messages in response to a user selection to perform a deep delete operation. It is appreciated that in some nonlimiting examples at least a subset of the subsequent chat messages is posted in another messaging platform that is different from the messaging platform for the one chat message.

These and other features and aspects of the concepts described herein may be better understood with reference to the following drawings, description, and appended claims.

DETAILED DESCRIPTION

Figure 1A:
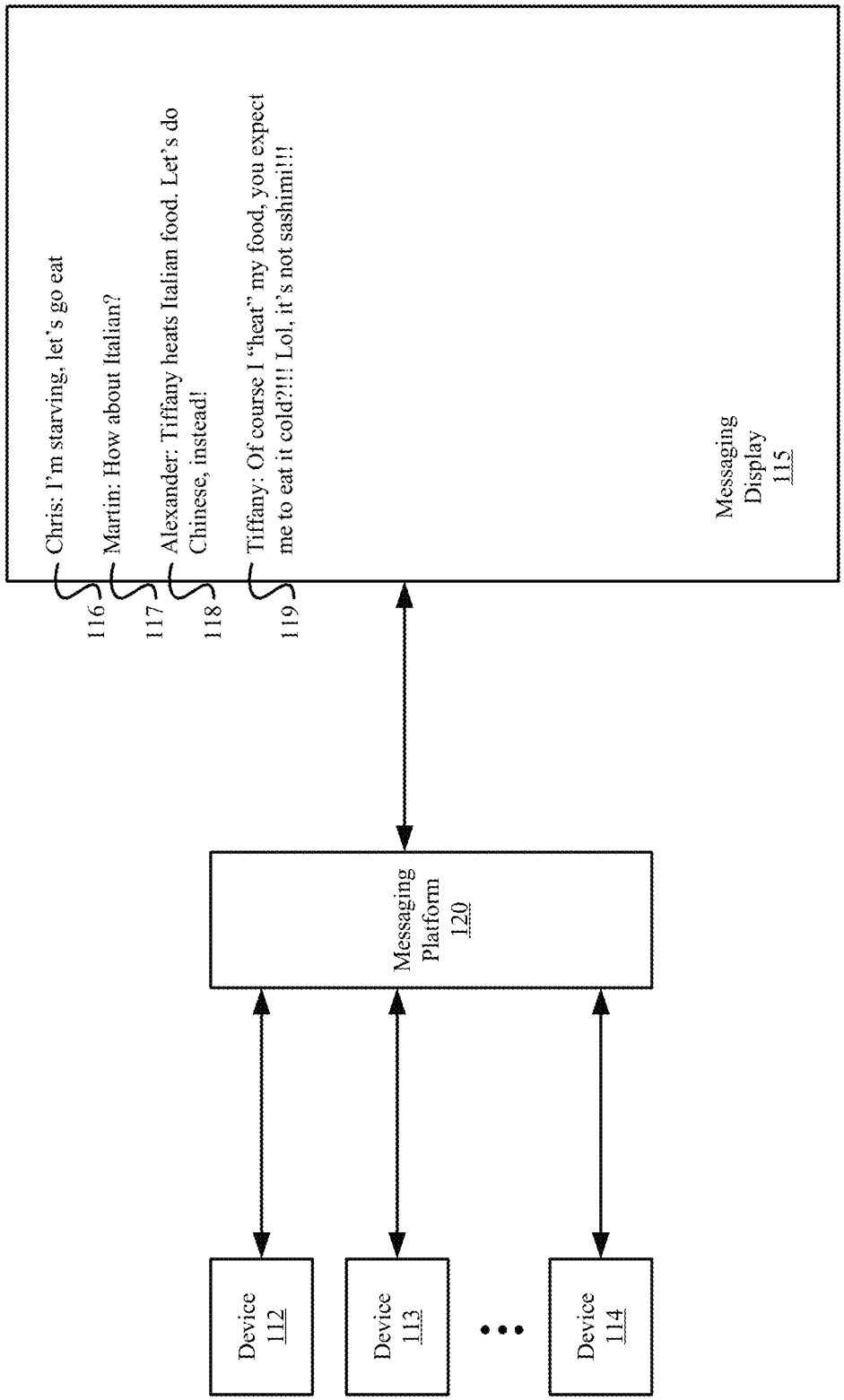
FIGS. 1A-1G is a diagram of an example system and a graphical user interface (GUI) for a chat communication environment according to some embodiments.

The example embodiments described herein are directed to a communication system and, more particularly, to a chat communication environment (hereinafter chat environment). The chat environment is configured to facilitate chat communication between online users, e.g., chat messages (instant messaging being one example), and to exchange data, e.g., file, emoji, audio, picture, video, event, task, note, link, reaction, status of a chat message or other data, contact list, reminder, etc. When a prior chat message is modified, dependencies of subsequent chat messages on the prior chat message are identified, e.g., prior chat message being quoted, prior chat message being shared, prior chat message being referenced, prior chat message being copied, etc. It is appreciated that dependency may also be based on referencing the originator of the chat message that is subsequently modified. It is appreciated that subsequent messages refer to chat messages that are posted after the prior chat message (i.e., timewise). Once the dependency of one or more subsequent chat messages on the prior chat message that has been modified is determined, the system may determine whether the changes to the prior chat message can be safely propagated to subsequent chat messages and/or whether the changes to the prior chat messages renders subsequent chat messages that have some form of dependency on the prior chat message being modified nonsensical and/or inaccurate.

In some embodiments, the changes to the prior chat message may be propagated automatically if the system determines that the changes can safely be propagated. However, if the changes are not propagated, then a notification may be displayed or sent to participants of the chat environment or multiple chat environments (e.g., when a subsequent chat message references a prior chat message in a chat platform that is different from the modified prior chat message) that a prior chat message has been modified that may render subsequent chat messages nonsensical or to notify one or more participants that changes to subsequent chat messages may be desired based on changes to the prior chat message.

It is appreciated that the term "user(s)" generally refers to participants of a communication session whether as host or invitee(s) or team member(s). It is also appreciated that the term "user" is used interchangeably with "member" or "participant" throughout the application.

In some embodiments, Artificial Intelligence (AI) and Machine Learning (ML) techniques can be used to identify a dependency of a subsequent chat message on a prior chat message being modified. It is appreciated that AI and ML techniques can further be used to determine whether changes to a prior chat message can safely be propagated to subsequent chat messages or whether changes to a prior chat message will render subsequent chat messages nonsensical and/or inaccurate. The AI and ML techniques may then be used in determining whether to notify the users of the chat environment that a change to a prior chat message has been made, that a change to one or more subsequent chat messages have been made, that a change to a prior chat message may have rendered subsequent chat message nonsensical or inaccurate, etc.

ML techniques can be used to receive as input past chat messages where a chat message has been modified, and types of dependencies of subsequent chat messages on a prior chat message, and where the ML techniques receive as their output an indication of whether the subsequent chat messages are nonsensical or inaccurate in light of the input, in order to generate a model to make a prediction. The generated model may later be used and receive chat messages (both prior message and/or subsequent messages) as its input and determine their dependencies and finally based on the model determine whether one or more subsequent chat messages are nonsensical or inaccurate. In some embodiments, ML techniques are used for sentiment analysis to evaluate not just the meaning of chat messages, but the context within which they were created. For example, whether a misspelling was intentional may be determined by evaluating the sentiments of the originator or other participants and concluding that the misspelling was an intentional joke. Similarly, the generated model may be used to determine whether a change to a prior chat message can safely be made to subsequent chat messages. Additionally, the generated model may be used to determine whether a notification should be displayed to the participants of the chat environment, e.g., informing that a prior chat message has been modified that may have rendered subsequent chat messages nonsensical or inaccurate, informing that subsequent chat messages may need to be modified in light of the changes to the prior chat message, informing that subsequent chat messages have been modified or deleted in light of the change to the prior chat message, etc.

It is appreciated that various clustering or pattern recognition algorithms for ML can be used to generate the model and further to determine whether changes to a prior chat message can safely be propagated, whether a notification to participants should be sent, whether subsequent chat messages should be modified automatically and/or notification regarding the changes sent, etc. It is appreciated that the ML algorithm may be supervised or unsupervised.

It is appreciated that a neural network may use an input layer, one or more hidden layers, and an output layer to train the ML algorithm to identify dependency between one or more subsequent chat messages and a prior chat message being modified. In some nonlimiting examples, supervised learning may be used for circumstances where the subsequent chat messages are identified and confirmed to have dependency on a prior chat message being modified and that the subsequent chat messages are nonsensical or inaccurate in light of the prior chat message being modified. For supervised learning, known input data may be used to gradually adjust the model to more accurately compute the already known output. Once the model is trained, field data is applied as input to the model and a predicted output is generated.

In other embodiments, unstructured learning may be used when supervised learning is unavailable. Training of the neural network using one or more training input matrices, a weight matrix, and one or more known outputs is initiated by one or more computers associated with the online chat system. In an embodiment, a server may run known input data through a deep neural network in an attempt to compute a particular known output. For example, a server uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server computer then re-computes another output from the deep neural network with the input training matrix and the adjusted weight matrix. This process continues until the computer output matches the corresponding known output. The server computer then repeats this process for each training input dataset until a fully trained model is generated.

In some embodiments, the input layer includes a plurality of training datasets that are stored as a plurality of training input matrices in a database associated with the communication system. The training input data includes, chat messages and factors that create dependency between a prior chat message and subsequent messages (e.g., prior chat message being shared, prior chat message being quoted, context of the prior chat message being referenced, prior chat message being copied, etc.). Any type of input data can be used to train the model.

It is appreciated that the hidden layers represent various computational nodes that represent weighted relationships based on the weight matrix. It is appreciated that the weight of each line may be adjusted overtime as the model is trained. It is appreciated that any number of hidden layers may be used. The output layer may be the identification of subsequent chat messages that depend from a prior chat message that is being modified and that it is nonsensical or inaccurate, where the output layer is known. In some embodiments, the output layer may be the identification of subsequent chat messages that depend from a prior chat message that is being modified and that can be safely propagated or it may be identification of individuals that need to be notified that a change was made to a prior chat message and/or a change has been made to a subsequent chat message and/or that a change to a subsequent chat message may be needed, etc. When the model successfully outputs the appropriate output, then the model has been trained and may be used to process live or field data.

Once the neural network is trained, the trained model will accept field data at the input layer. In some embodiments, the field data is live data that is accumulated in real time. In other embodiments, the field data may be current data that has been saved in an associated database. The trained model is applied to the field data in order to generate one or more appropriate output.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying," "rendering," "utilizing," "launching," "calling," "starting," "accessing," "sending," "conferencing," "triggering," "ending," "suspending," "terminating," "monitoring," "displaying," "removing", "detecting", "modifying," "outputting," "deleting," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

FIGS. 1A-1G is a diagram of an example system and a graphical user interface (GUI) for a chat communication environment according to some embodiments. Referring to FIG. 1A, a messaging platform 120 is shown to facilitate exchange of chat messages between the participants (e.g., participants within the same team or group). For example, the messaging platform 120 may be a messaging chat environment that enables participants to post their respective chat messages. The messaging platform 120 may be a part of a larger platform, e.g., digital collaborative environment that can facilitate video/audio conferencing, etc., or it may be a standalone chat messaging platform. In some nonlimiting examples, the messaging platform 120 may be WhatsApp Messenger, Messenger by Facebook, WeChat, Viber, Telegram Messenger, etc.

In this example, participants are associated with their respective device 112, device 113, . . . , device 114. The device that facilitates the participant to post a chat message may be a smartphone, a desktop computer, a laptop computer, a tablet, or the like. In this example, a messaging display 115 of a device associated with one user may display the chat messages that are exchanged between the participants. For example, element 116 may render the chat message posted by Chris stating "I'm starving, let's go eat" while element 117 may render the chat message posted by Martin stating "How about Italian?" while element 118 may render the chat message posted by Alexander stating that "Tiffany heats Italian food. Let's do Chinese, instead!" and while element 119 may render the chat message posted by Tiffany stating "Of course I "heat" my food, you expect me to eat it cold?!!! Lol, it's not sashimi!!!". As illustrated, the messaging display 115 may be associated with a device of any of the participants, e.g., Chris, Martin, Alexander, Tiffany, or a participant that has not posted a chat message yet. The chat messages that have been posted may be referred to as prior chat messages.

Figure 1B:
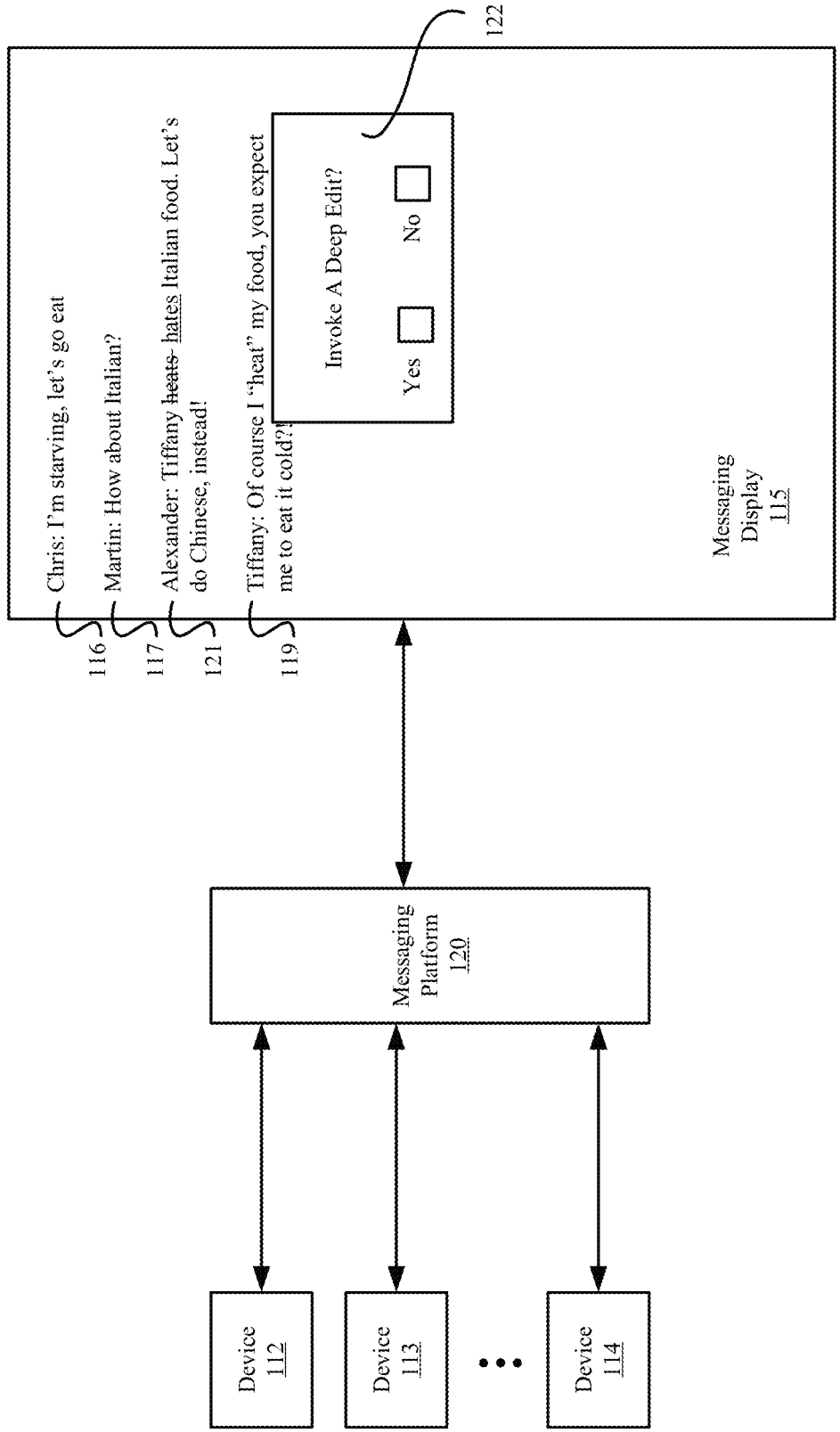

Referring now to FIG. 1B, one of the participants, e.g., Alexander, Martin, etc., may realize that Alexander's original chat message (also referred to as prior chat message) has misspelled the word "hates" as "heats" either due to user error or autocorrect. As such, any of the participants may seek to address and correct the prior chat message 118 by Alexander. For example, Martin may choose to edit the chat message 118 to strikeout "heats" and to replace it with "hates". It is appreciated that the strikethrough for what is being deleted and the underlining for what is being inserted are shown for illustrative purposes and should not be construed as limiting the scope of the embodiments. For example, the edit may simply replace the word without showing the strikethrough or underlining. In some nonlimiting examples, an icon may be displayed in close proximity to the chat message that is modified to visually illustrate that a change has occurred. In some nonlimiting examples, color may be used to illustrate changes to the chat message, e.g., letters and/or words that are deleted may be grayed out while inserted letters and/or words may be designated with color blue.

In FIG. 1B, a participant may modify the chat message 118 (prior chat message) to replace "heats" with "hates". However, as illustrated, a subsequent chat message 119 references a prior message that is being modified 121 because in chat message 119 Tiffany quotes the misspelling "heats" and makes a joke about the misspelling within the content of the chat message 119 by stating that "Of course I "heat" my food, you expect me to eat it cold?!!! Lol, it's not sashimi!!!". Therefore, as illustrated, modifying the word "heats" to "hates" results in the chat message 119 becoming nonsensical, leaving the reader wondering why is "heat" being quoted and what does that joke even mean because the word "heats" has been changed in the prior chat message. In other words, dependencies between subsequent message on a prior message by being referenced, quoted, shared, copied, etc., may result in the subsequent chat message being nonsensical or containing inaccuracies if the prior chat message is modified without regard to its relation to subsequent chat messages. It is appreciated that in some embodiments the dependency may be established based on the originator of the prior chat message being referenced or mentioned in subsequent chat message(s). The messaging platform 120 processes the posted chat messages as well as modification to any prior chat message(s) and is configured to recognize the dependencies between a prior chat message that is modified (e.g., chat message 121 in this example) and a subsequent chat message 119.

It is appreciated that in some embodiments, the dependencies between a prior chat message being modified and a subsequent chat message is determined based on various factors. For example, a processor (not shown) within the messaging platform 120 may determine dependency between two chat messages if a prior chat message is being referenced, shared, quoted, copied, etc. The messaging platform 120, in response to determining dependency between the subsequent chat message (in this example chat message 119) and a prior chat message that is being modified (in this example chat message 121), causes the messaging display 115 to render a graphical user interface (GUI) 122 to the participant that is editing or has edited the prior chat message. The GUI 122 may ask the participant making edits or who has made edits whether to invoke a deep edit in order to identify subsequent chat messages that may be impacted due to modification to the chat message 121. It is appreciated that in some embodiments, the GUI 122 may be displayed to any of the participants and not necessarily the participant that is modifying the prior chat message 121.

Figure 1C:
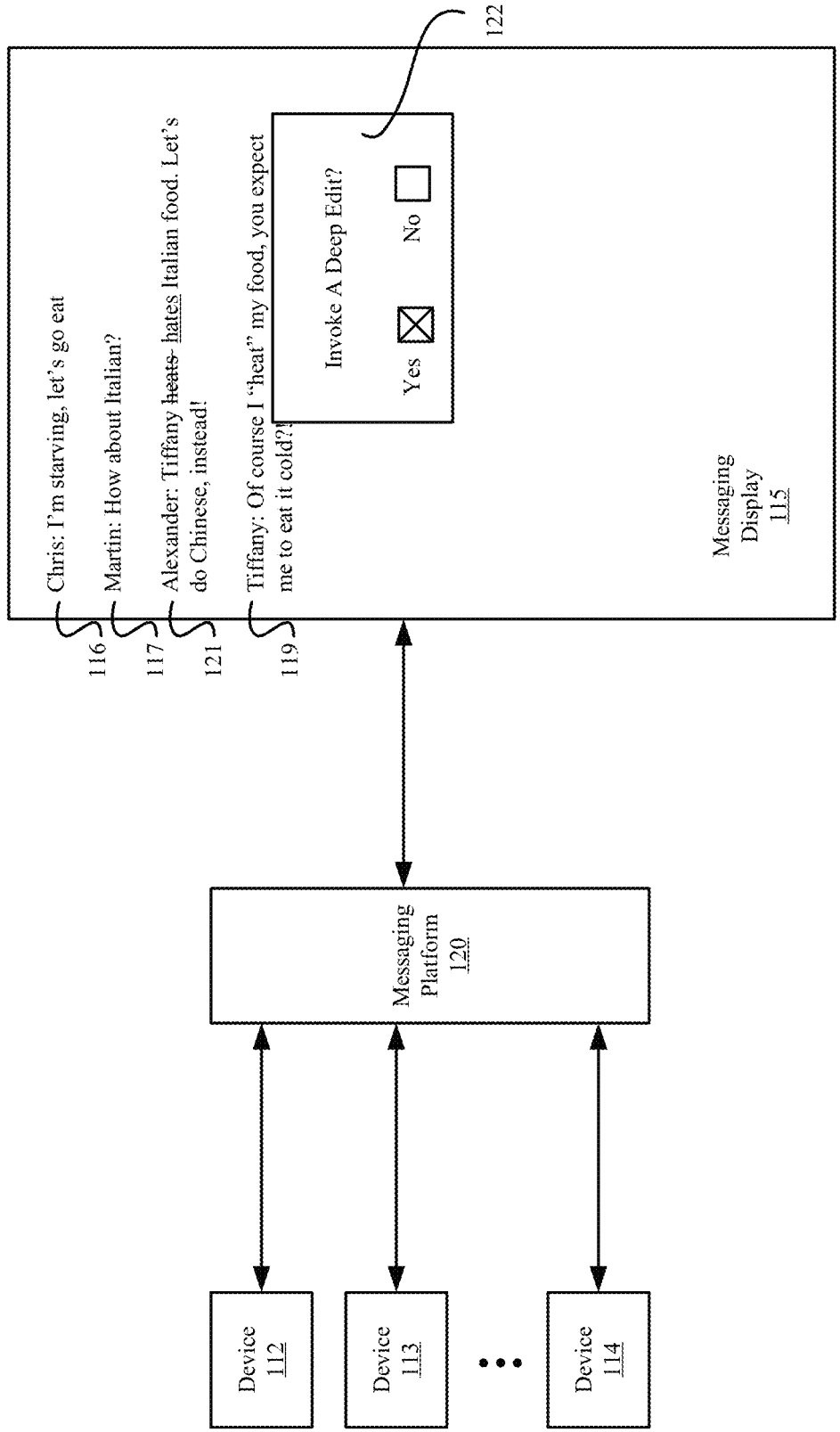

Referring now to FIG. 1C, the participant may choose to invoke a deep edit option in order to identify subsequent chat messages that are being impacted (e.g., rendered nonsensical, inaccurate, etc., due to modifications being made to a prior chat message). Once the subsequent chat messages that are being impacted are identified the messaging platform 120 may modify the subsequent chat messages if changes to the subsequent chat messages can be done safely and/or participants may be notified. In some embodiments, notification may be sent/displayed to the participants that one or more subsequent chat message is nonsensical or unclear or inaccurate due to modification being made to a prior chat message if changes to subsequent chat message(s) cannot be made safely.

Figure 1D:
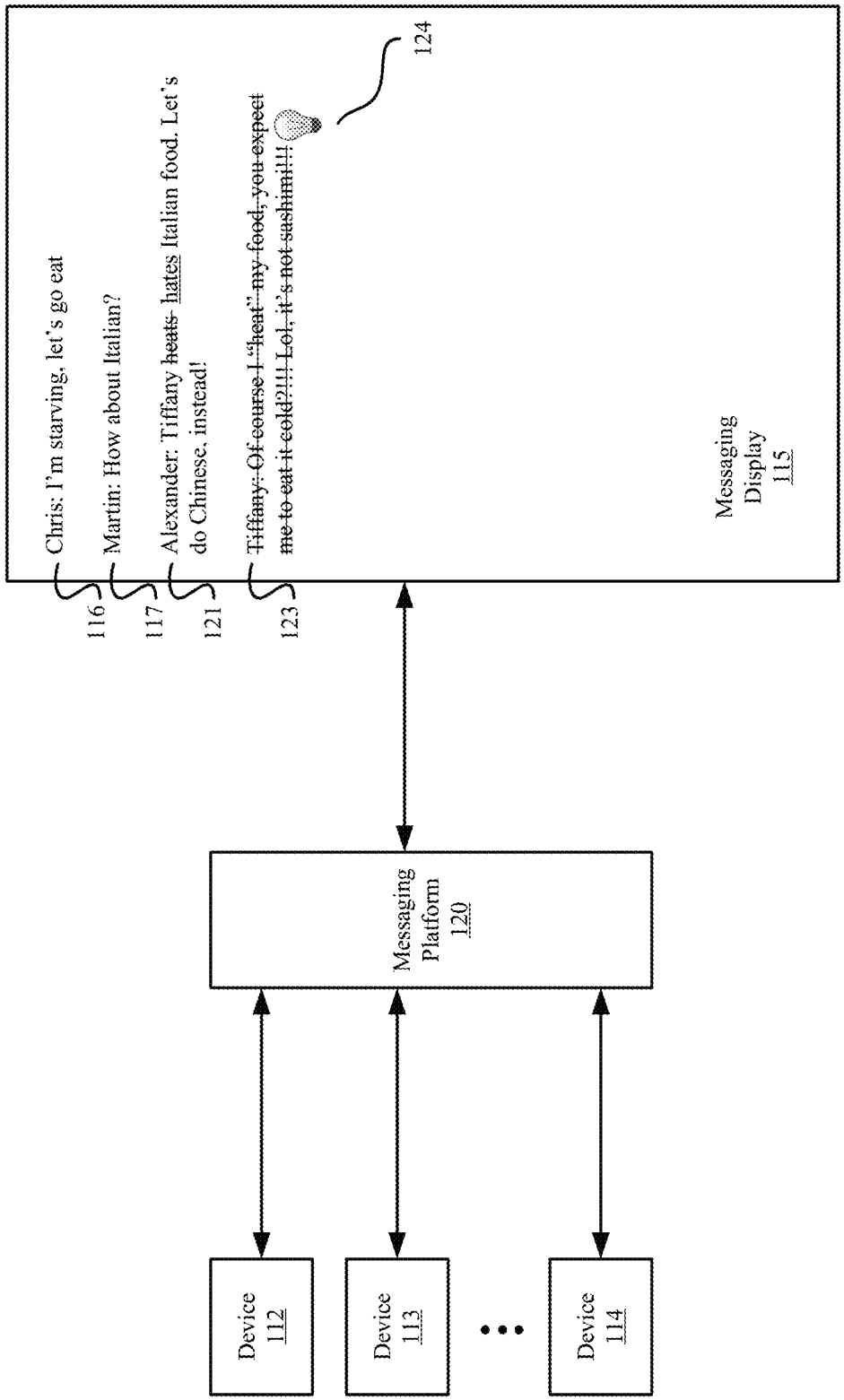

In some nonlimiting examples, as shown in FIG. 1D, a subsequent chat message 119 that is nonsensical, in light of the chat message 121 modification, is deleted, as shown by chat message 123. It is appreciated that chat message 123 is shown for illustration purposes but in some embodiments no chat message is displayed because it is deleted or it may be shown as deleted using strikethroughs or another method. According to some nonlimiting examples, a notification 124 may also be displayed to notify one or more participants of the changes to a prior chat message and subsequent changes to one or more subsequent chat messages. For example, when a cursor is hovered on the notification 124, the notification 124 may display that the prior chat message 118 was modified to form the modified chat message 121 rendering chat message 119 nonsensical and that is the reason why the chat message 119 is deleted to form a deleted chat message 123.

Figure 1E:
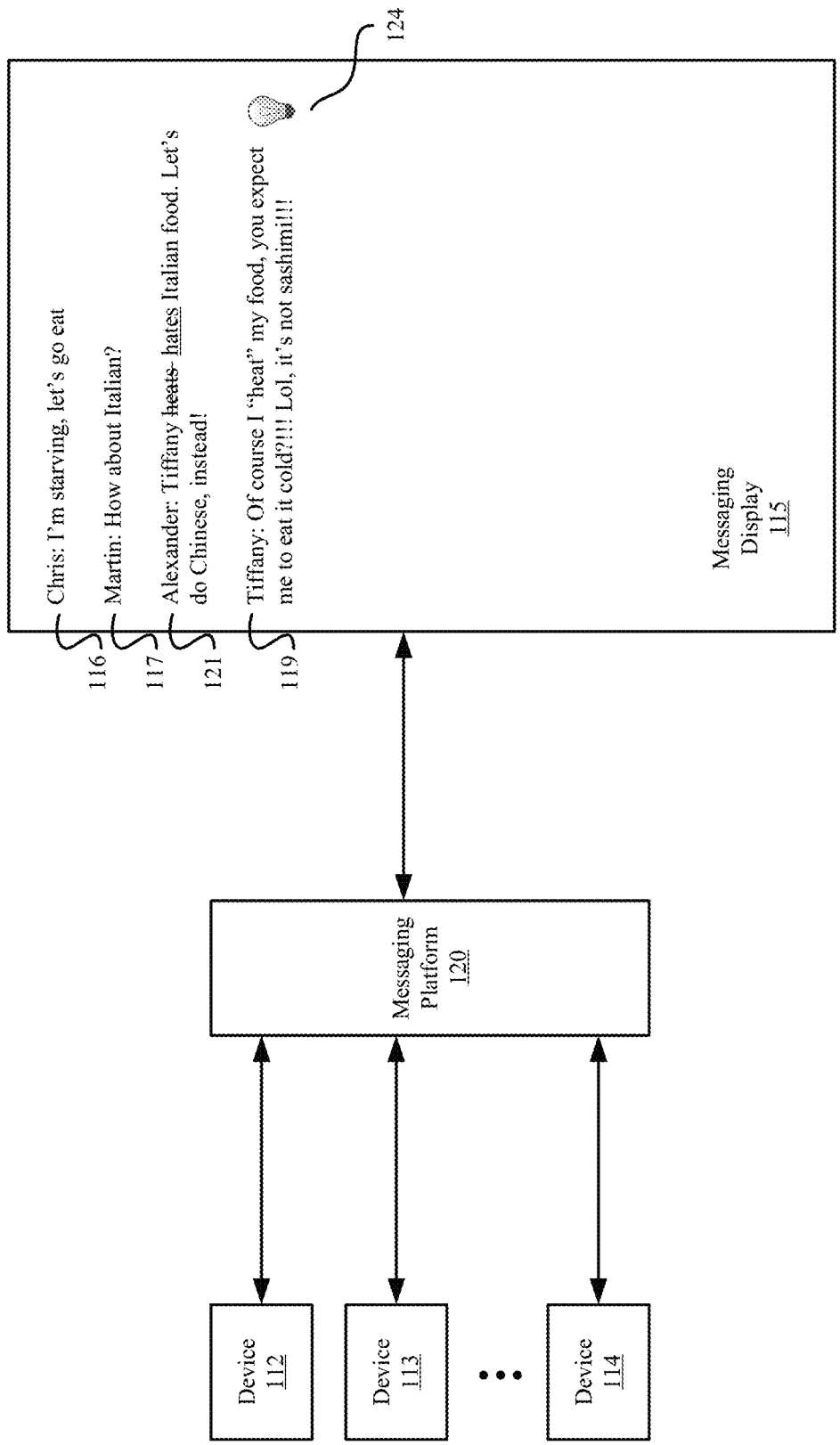

In some nonlimiting examples, as shown in FIG. 1E, the processor within the messaging platform 120 may determine that the subsequent chat message 119 cannot be modified safely and that it should not be deleted. However, the processor determines that notification 124 to participants is desired in order to flag the chat message 119 as being nonsensical or inaccurate in light of the modified chat message 121. It is appreciated that the notification 124 may be within the chat environment, however, the notification may take any form, e.g., email being sent, audio output, a log file memorializing the changes, etc.

Figure 1F:
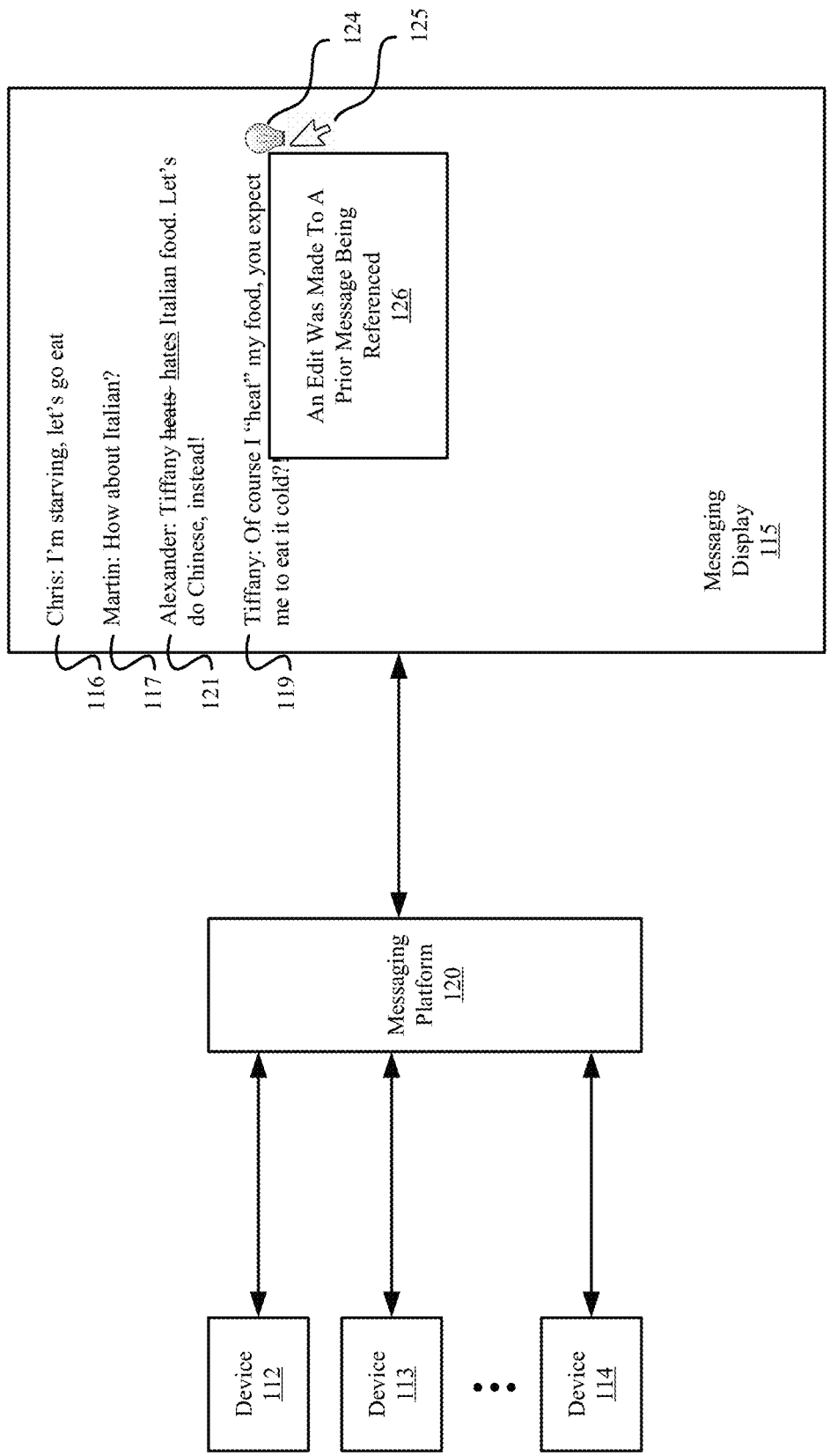
Figure 1G:
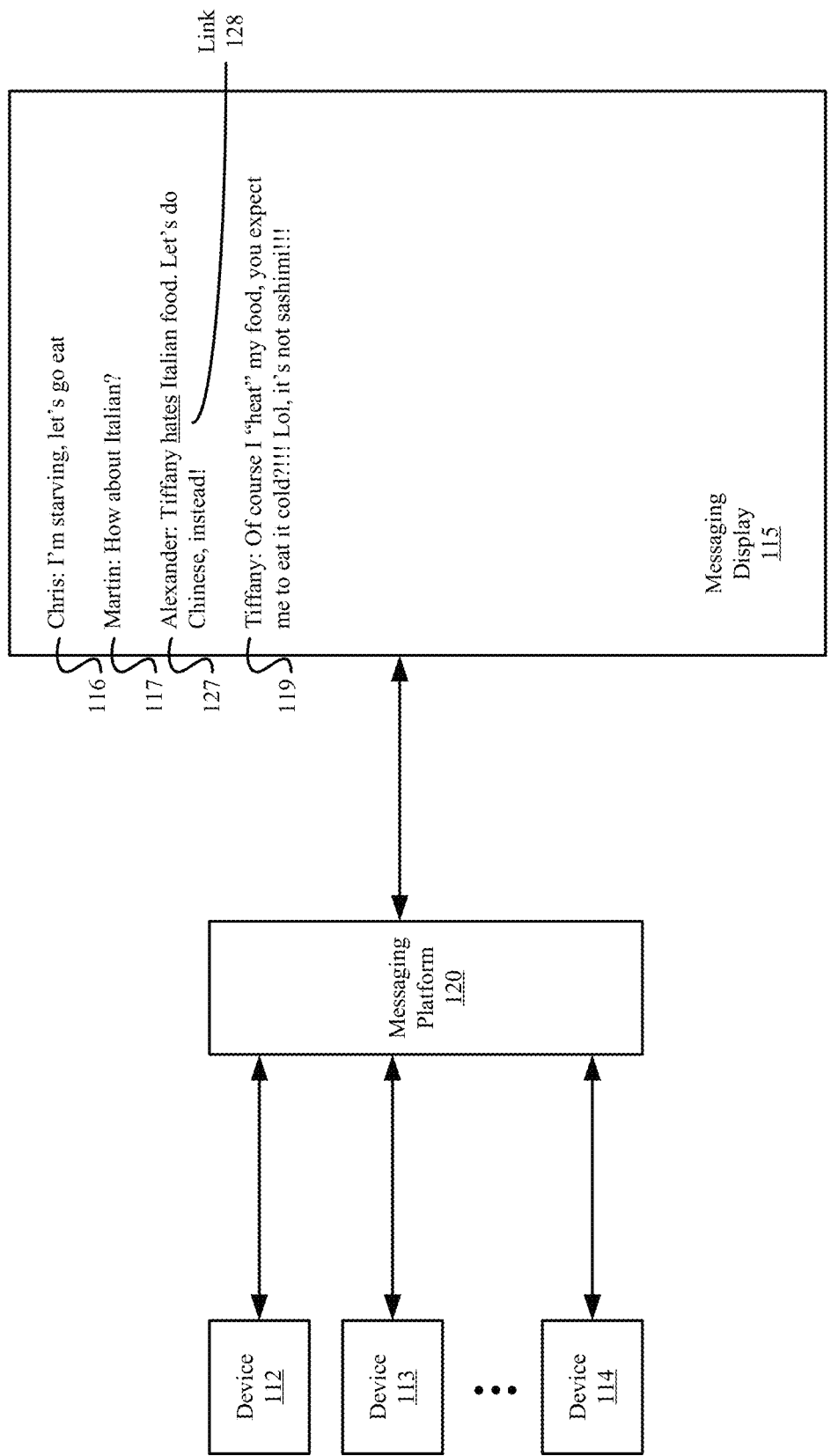

In FIG. 1F, a cursor 125 is hovered around the notification 124 of FIG. 1E, causing the GUI 126 to be displayed indicating that an edit was made to a prior chat message, e.g., chat message 118. In some examples, the GUI 126 may also identify the chat messages that are impacted by a modification to a prior chat message. It is appreciated that in some embodiments, shown in FIG. 1G, the changes to a prior chat message 118 that forms a modified chat message 127 may be reflected as a hyperlink 128. Accordingly, when desired the link 128 may be activated and the changes that were made to the prior chat message 118 to form the modified chat message 127 may be displayed.

Figure 2A:
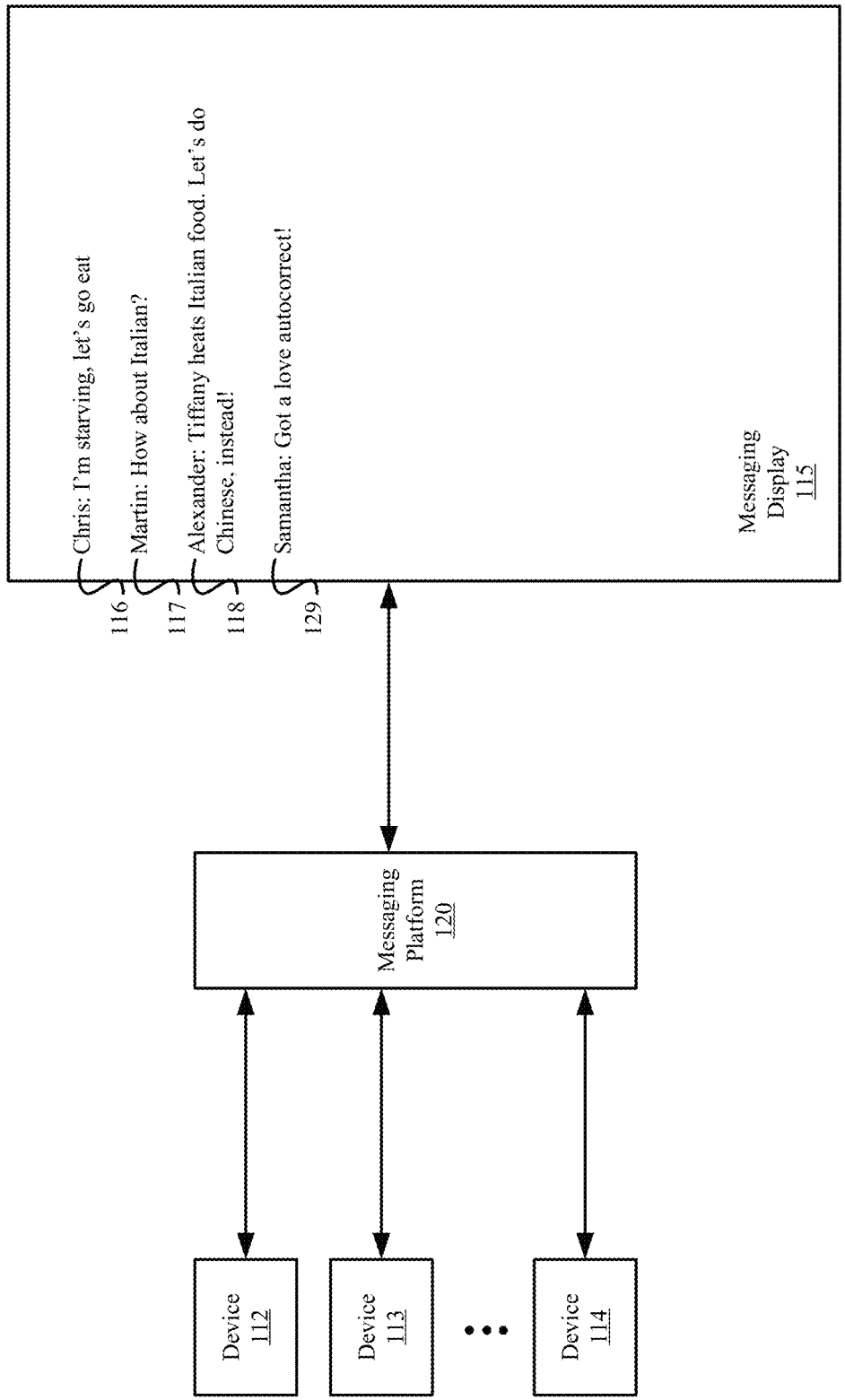
FIGS. 2A-2G is a diagram of another example system and a GUI for a chat communication environment according to some embodiments.
Figure 2B:
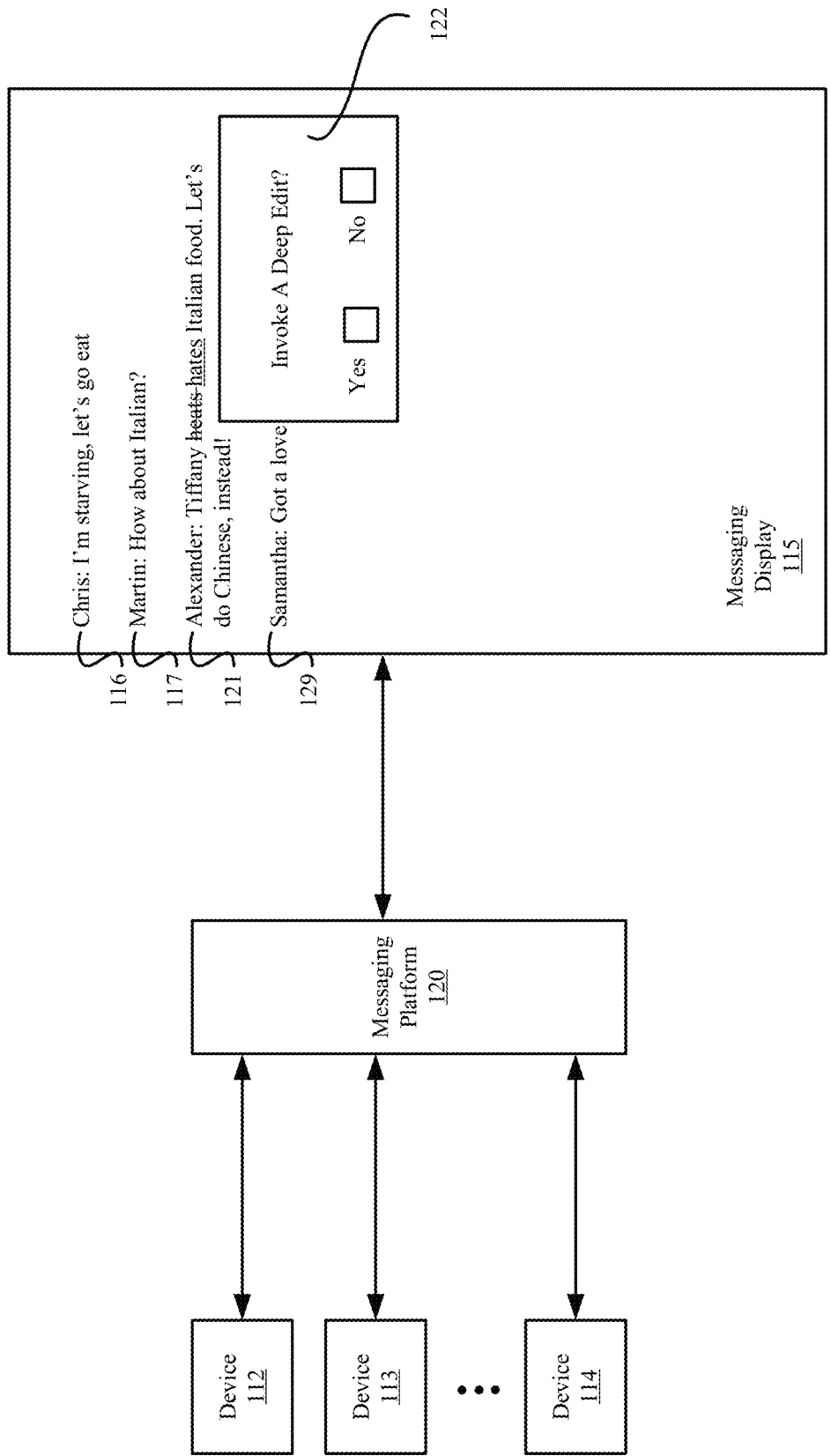
Figure 2C:
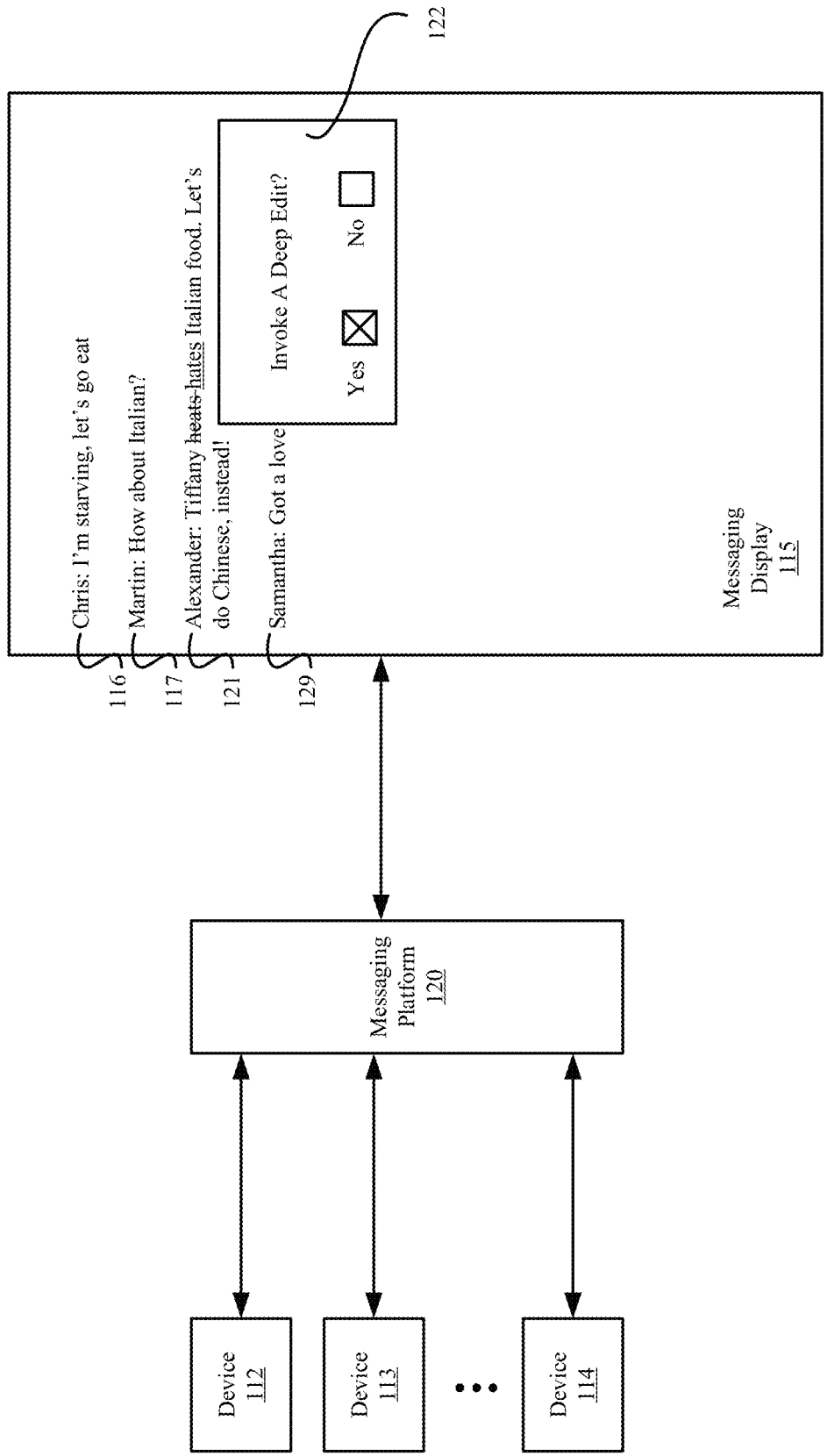

FIGS. 2A-2G are diagrams of another example system and a GUI for a chat communication environment according to some embodiments. FIG. 2A is similar to that of FIG. 1A, however, in this nonlimiting example, the dependency of a subsequent message 129 on a prior chat message 118 is determined not by quotation of a prior chat message, but rather by processing the context. In this example, in response to the chat message 118, Samantha posts a chat message 129 stating "Got a love autocorrect!". In FIG. 2B, similar to FIG. 1B, a participant in the chat messaging group attends to modify a prior chat message 121 in order to correct "heats" to "hates". Similar to above, the processor of the messaging platform 120 or a processor within a device of the participant that is modifying the chat message may render the GUI 122 inquiring whether a deep edit is desired. The participant making changes to the chat message 121 may select to invoke a deep edit, as shown in FIG. 2C. As such, the processor (whether belonging to the messaging platform 120 or a device of a participant) processes the chat messages to identify dependencies between a prior chat message being modified or that has been modified and a subsequent chat message.

Figure 2D:
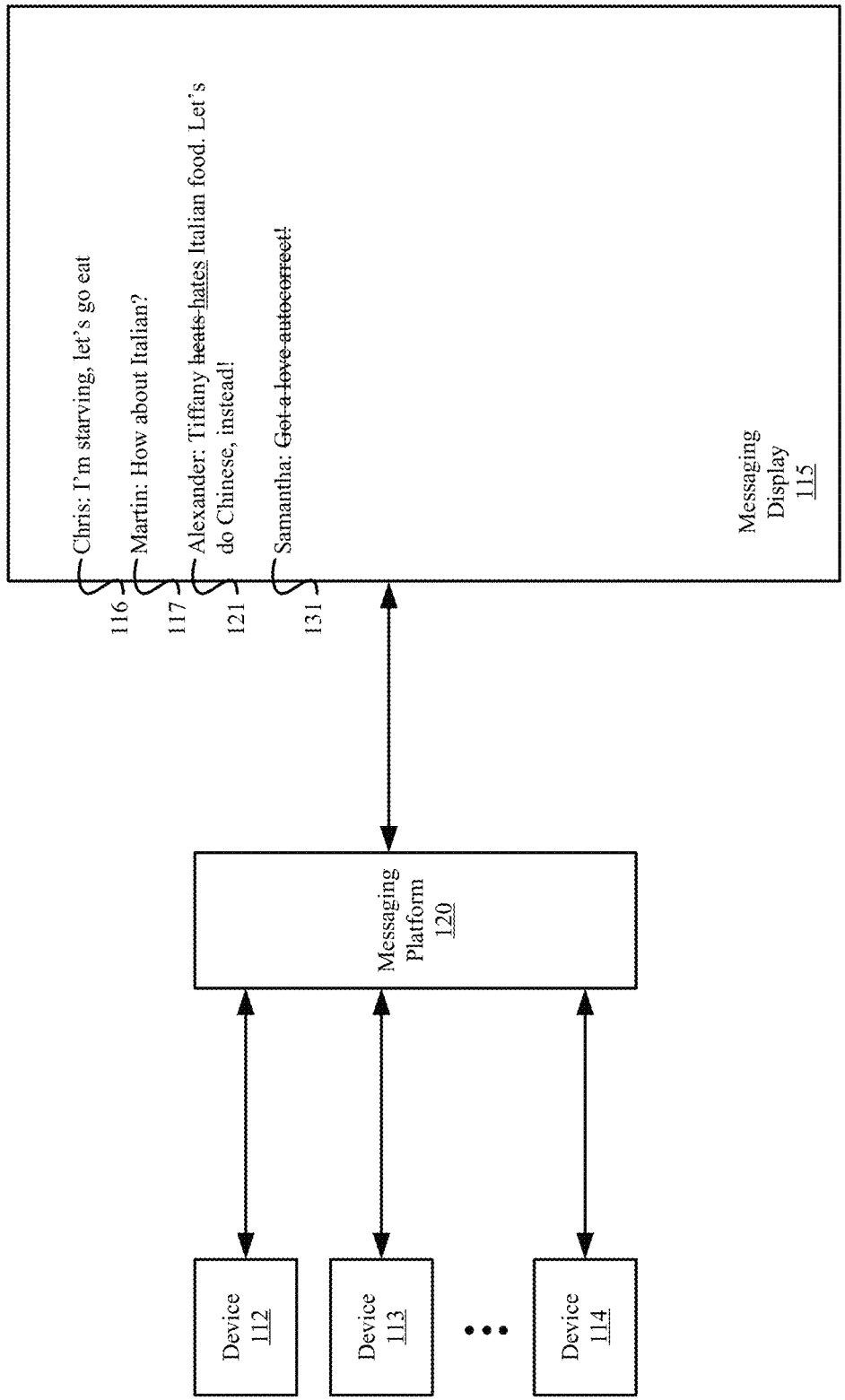
Figure 2E:
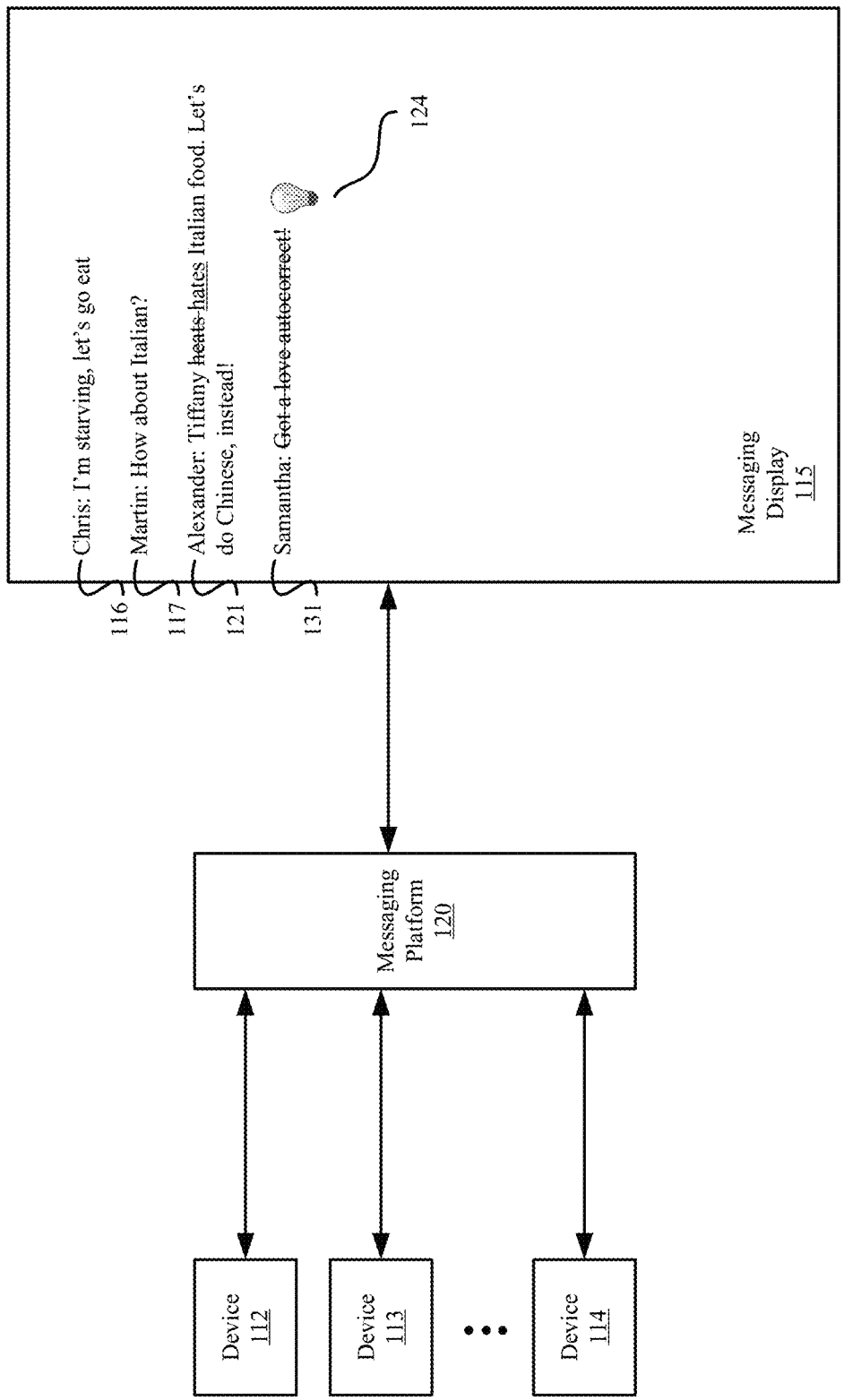
Figure 2F:
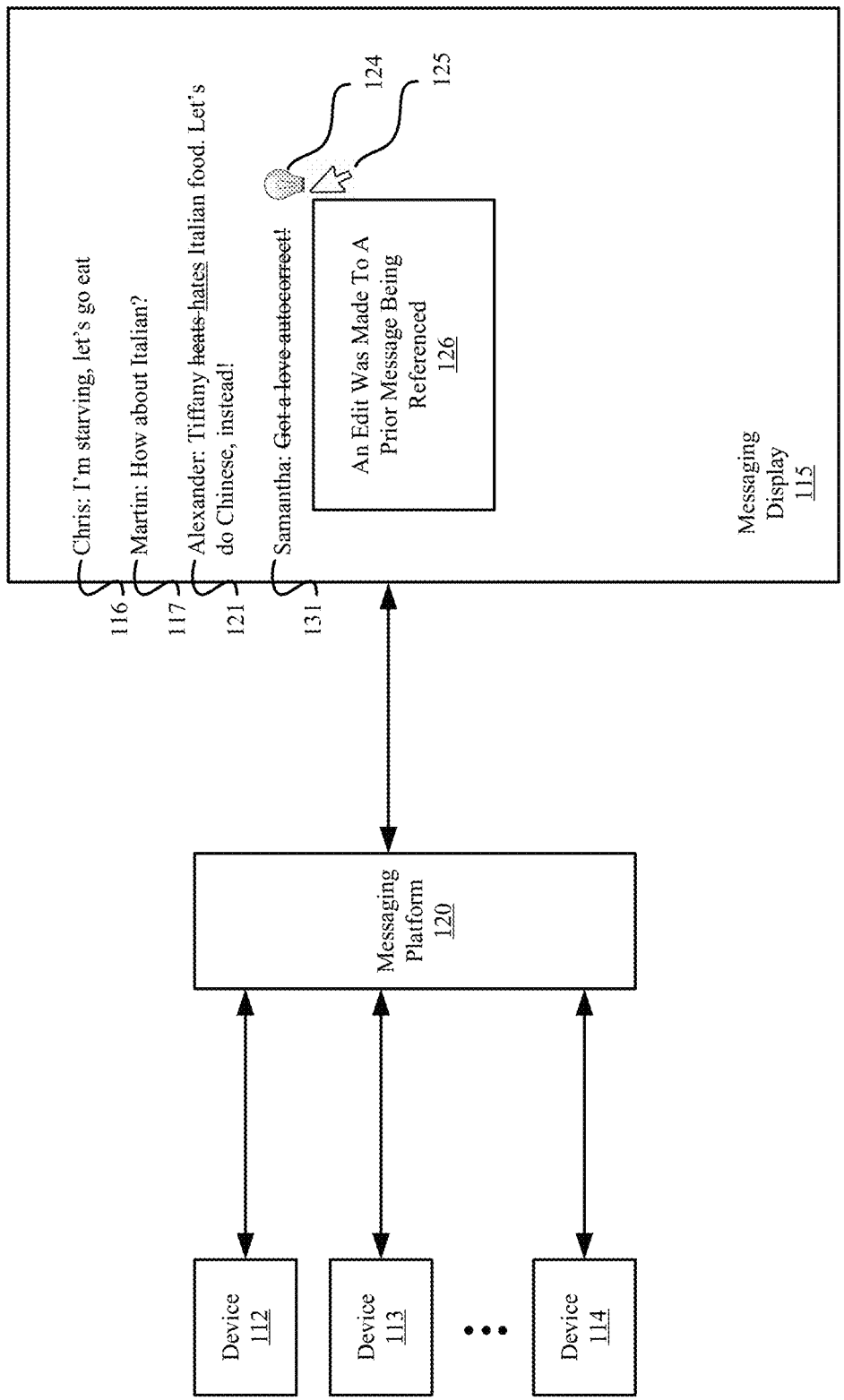
Figure 2G:
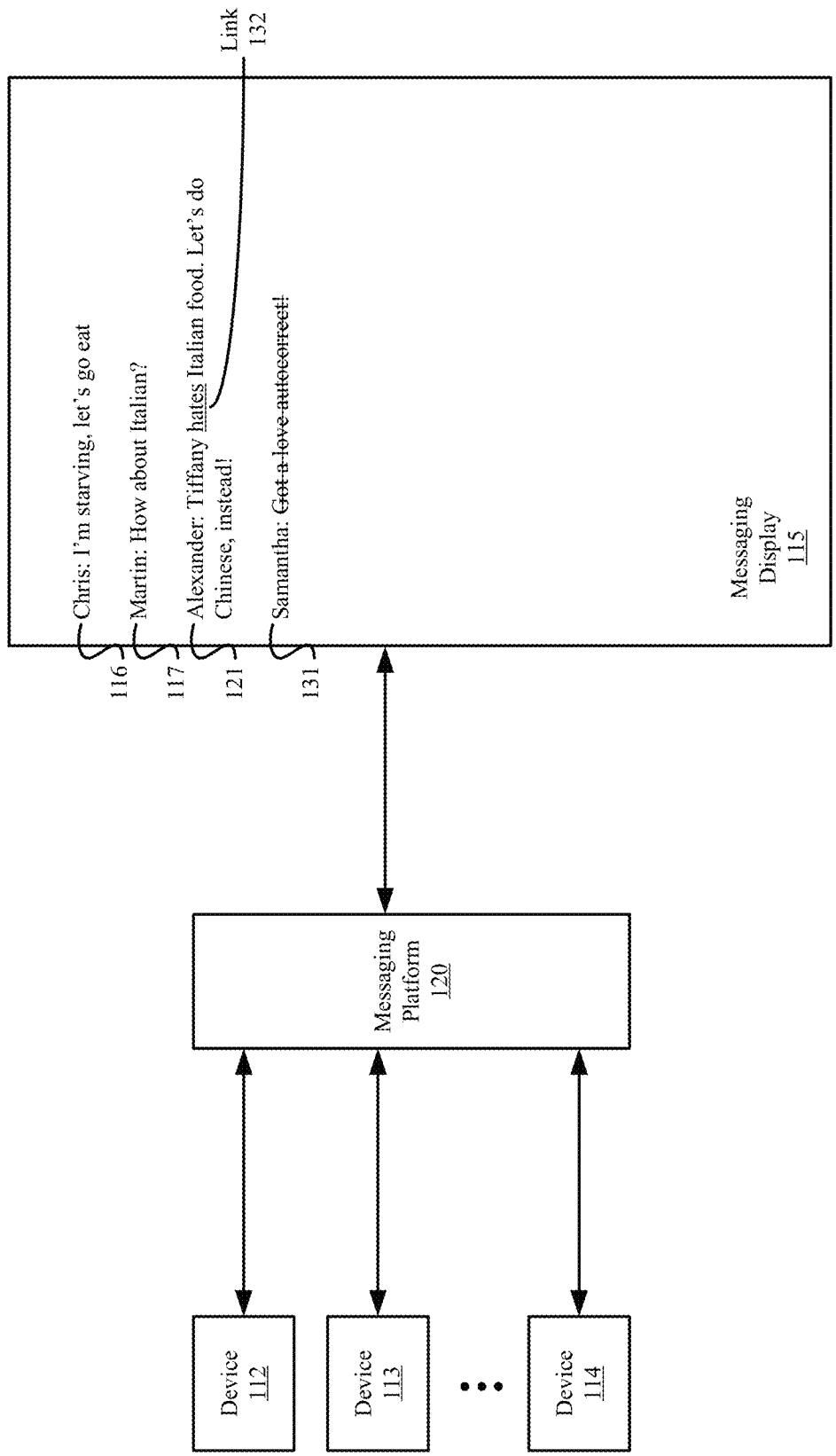

In some nonlimiting examples, a natural language processing (NLP) may be used to process the chat messages. In some embodiments, NLP may include a table of words that might have a different meaning by changing one or two letters within the word. As such, NLP can be used to identify inaccuracies in a prior posted message automatically without intervention by a participant of the chat messages. In this nonlimiting example, NLP may determine that the chat message 129 was a reference to the prior chat message 118 that was subsequently modified to form the modified chat message 121. Accordingly, in some nonlimiting examples, the processor may determine that modification (in this example deletion) of a subsequent chat message that depends on a prior chat message that is modified is needed and that it can safely be made otherwise the subsequent chat message would be nonsensical and/or inaccurate. In this example, the messaging platform 120 deletes the chat message 129 to form a modified chat message 131, as illustrated in FIG. 2D. It is appreciated that the deletion of the chat message 129 is shown by strikethroughs for illustrative purposes and should not be construed as limiting the scope of the embodiments. For example, the chat message 129 may be deleted by not displaying anything in its spot anymore. In some nonlimiting examples, a notification 124 may be displayed in close proximity to the subsequent chat message that is modified (in this example deleted or strikethrough) based on the modified prior chat message 121, as shown in FIG. 2E. FIG. 2F is similar to that of FIG. 1F, where hovering a cursor 125 close to the notification 124 displays the GUI 126 that indicates that an edit was made to a prior message being referenced. FIG. 2G is similar to that of FIG. 1G where the newly inserted word and/or letters forms a link 132 into the prior chat message 118 that forms the basis for the modified chat message 121. As discussed above, the link 132 when activated can display further information regarding the changes to the prior chat message and/or subsequent chat messages that are being impacted and are modified (if it can be done safely) or are kept unmodified (if changes cannot be made safely).

Figure 3A:
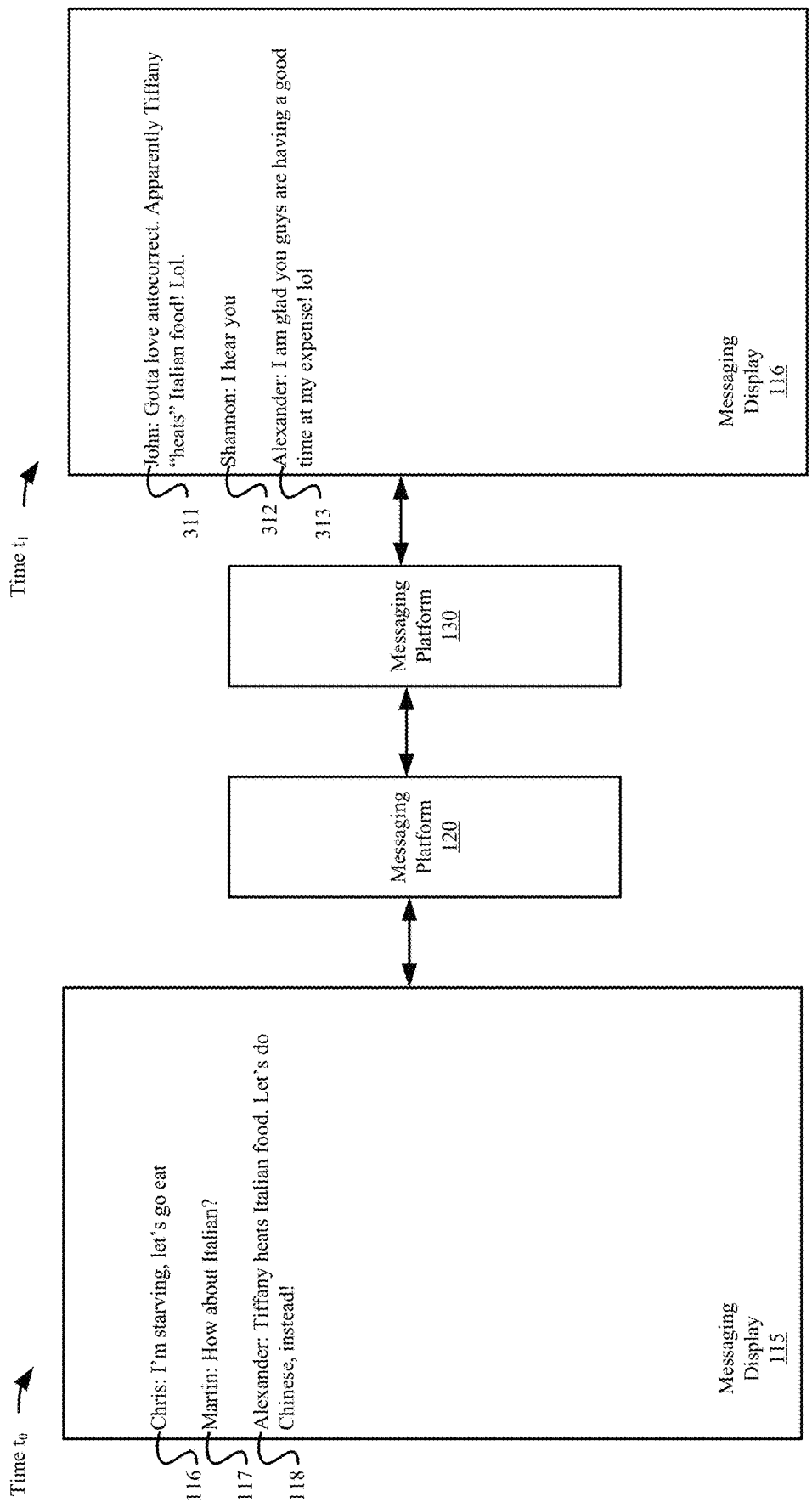
FIGS. 3A-3G is a diagram of an example system and a GUI for multiple chat communication environments according to some embodiments.

FIGS. 3A-3G is a diagram of an example system and a GUI for multiple chat communication environments according to some embodiments. In FIG. 3A, the messaging platform 120 facilitates exchange of chat messages between participants (similar to FIG. 1A but the devices and the participants are not shown for clarity purposes). In this nonlimiting example, the chat messages 116-118 have been posted similar to that of FIG. 1A, at time to. In this nonlimiting example, the messaging platform 120 is in communication with another messaging platform 130. In other words, the messaging platform 120 and the messaging platform 130 that facilitate exchange of chat messages are in different systems (i.e., ecosystems or networks). It is appreciated the participants of the chat messaging environment for messaging platform 120 and 130 may or may not be the same, e.g., one messaging platform may be from RingCentral® while another may be from WhatsApp. In this example, subsequent to time to, at time ti, the messaging platform 130 facilitates exchange of chat messages between participants (devices and users connected to messaging platform 120 and messaging platform 130 are not shown to not obscure the Figure but are present). For example, participant John may post a chat message 311 indicating "Gotta love autocorrect. Apparently Tiffany "heats" Italian food! lol." while Shannon posts a chat message 312 "I hear you" and Alexander, who was also part of the messaging platform 120, posts a chat message 313 to indicate that "I am glad you guys are having a good time at my expense! lol". In this example, the chat messages associated with the messaging platform 130 not only quote some aspect of the prior chat message (i.e., "heats") but also reference the context by discussing "autocorrect" and also referencing "having a good time at my expense". In other words, the chat message(s) in the messaging platform 130 depend on one or more of a prior chat message from a different messaging platform 120. Accordingly, similar to above, if a prior chat message is modified the subsequent chat messages (whether within the same platform or a different platform) may become nonsensical or inaccurate.

Figure 3B:
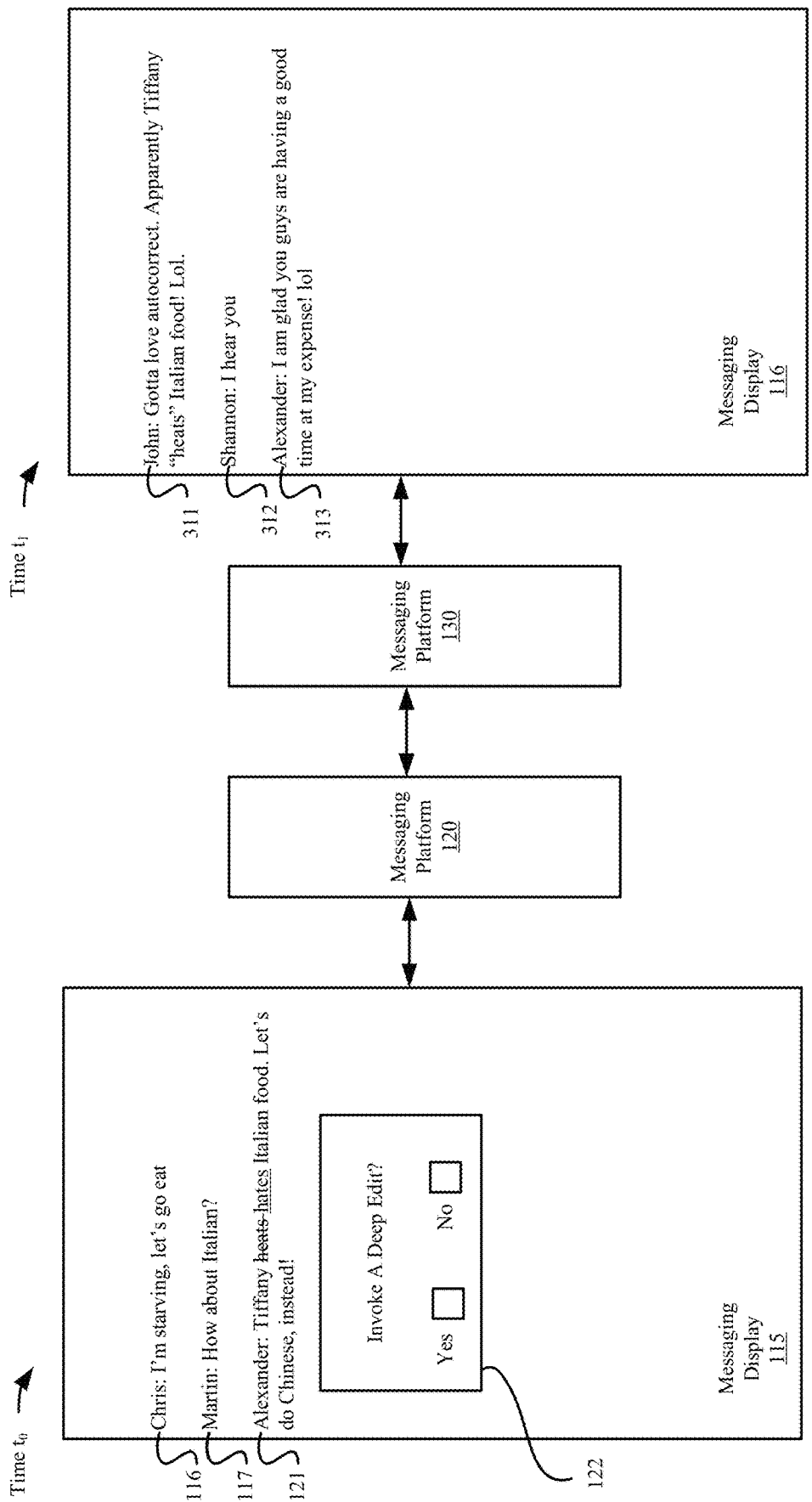
Figure 3C:
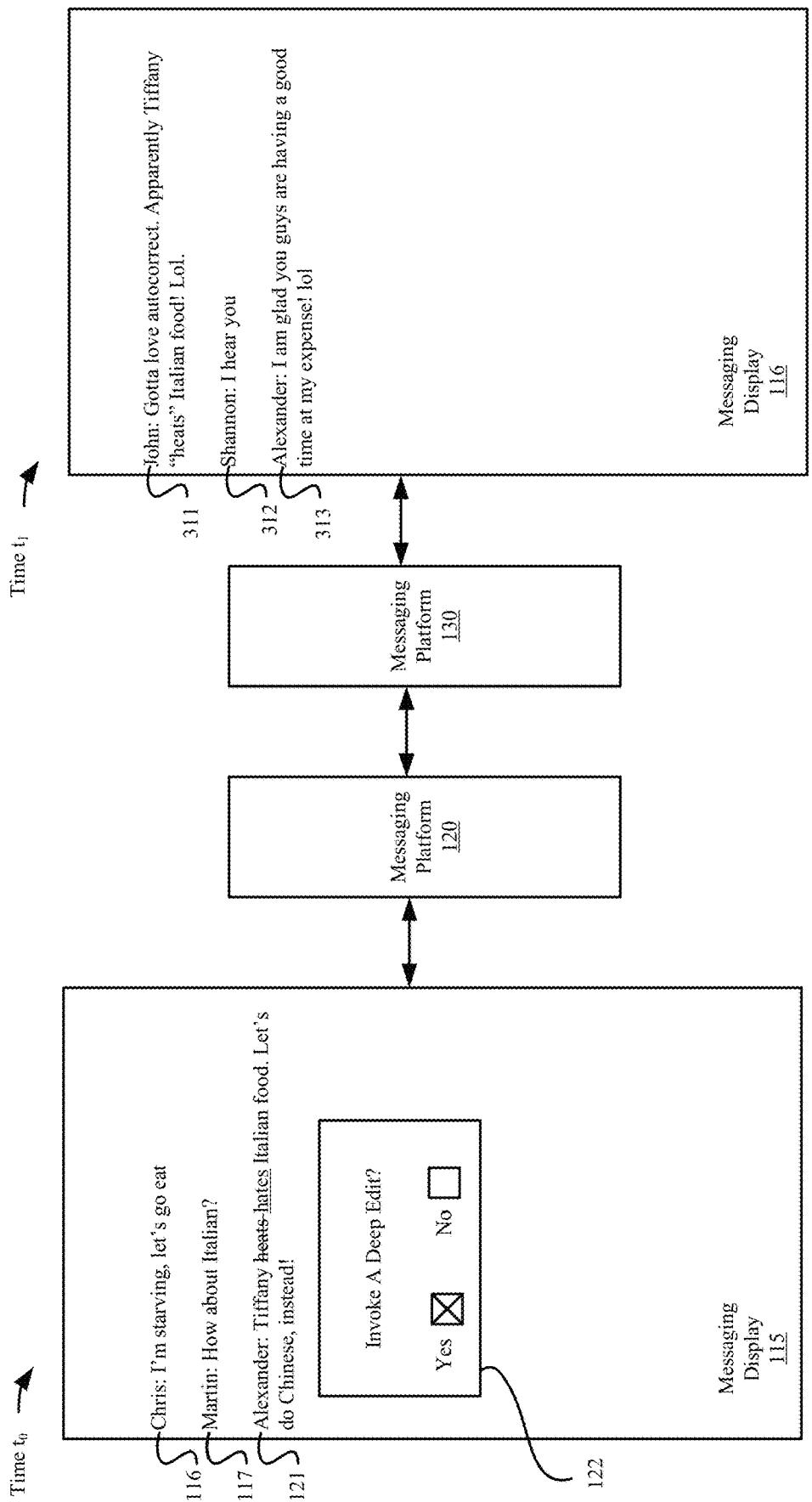
Figure 3D:
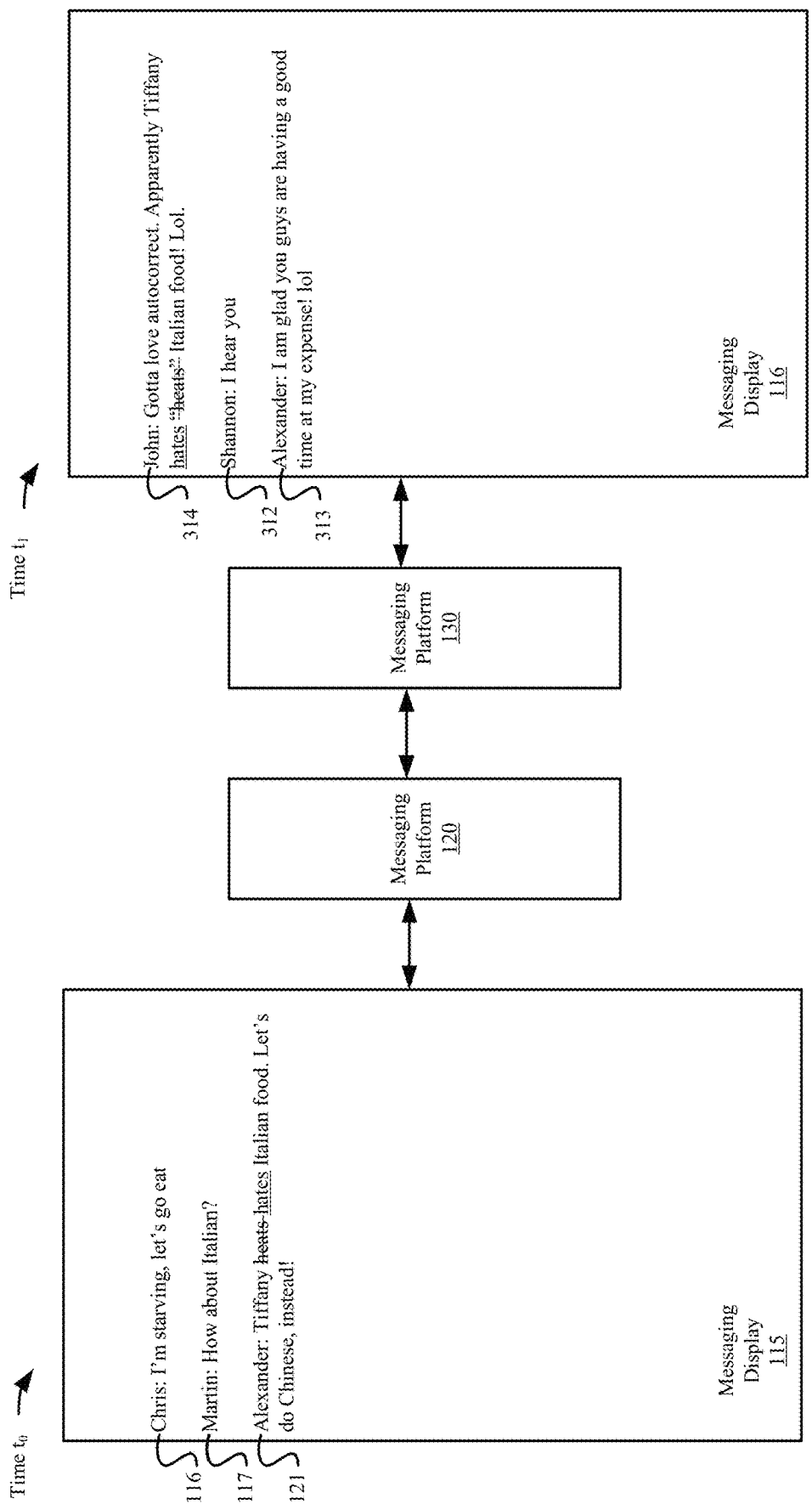

Similar to above, in FIG. 3B, a participant (e.g., Alexander, Martin, Chris, or a different participant) within the messaging platform 120 may notice a typographical error in the chat message 118 and may attend to modify the chat message to replace "heats" with "hates" to form a modified chat message 121. In response to the change being made, the processor may display the GUI 122, similar to before, to ask whether a deep edit should be invoked. In FIG. 3C, deep edit may be invoked. Accordingly, the processor associated with the messaging platform 120 and/or messaging platform 130 may process the posted chat messages to identify dependencies between the subsequent posted chat messages and the prior chat message that is being modified, as discussed above. The processing to identify the dependencies may identify the chat messages 311-313 as being dependent on the chat message being modified because they either quote or reference an aspect of the prior chat message that is being modified. In FIG. 3D, the messaging platform 120 and/or the messaging platform 130, may determine that the changes as reflected in the modified chat message 121 can be safely propagated to some or all of the chat messages associated with the messaging platform 130 to prevent subsequent chat messages from becoming nonsensical or inaccurate. For example, the changes can safely be made to chat message 311 by replacing "heats" with "hates" and to show what has been added as underlined and what is being deleted as strikethroughs to form the modified chat message 314. In contrast, the processor may determine that no further changes are needed for the chat messages 312 and 313. As illustrated, not only the changes to correct inaccuracies and mistakes in a prior posted message are made, but further changes can be made automatically to subsequent posted chat messages in such a way to preserve the sensical aspect of the chat messages.

Figure 3E:
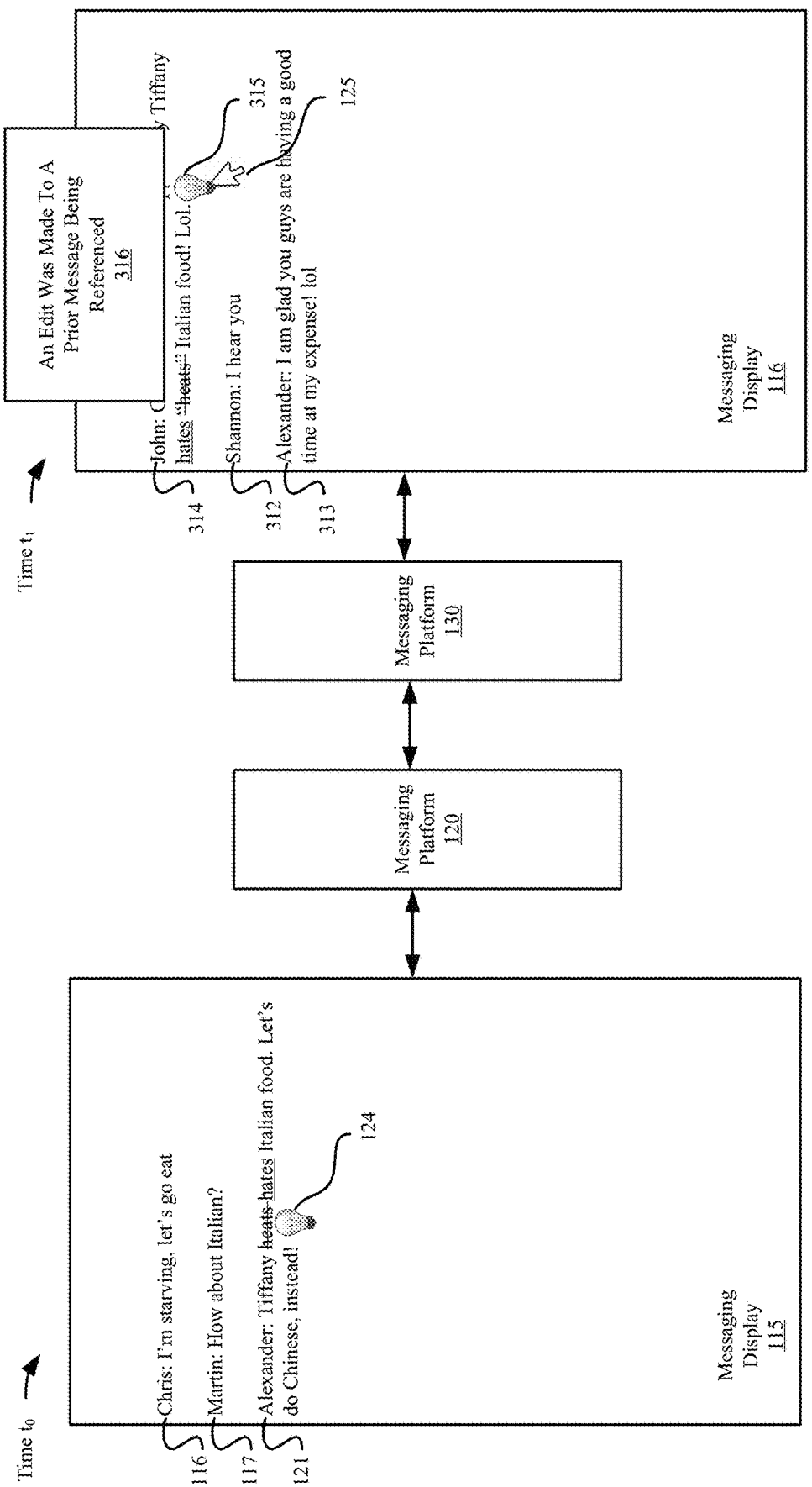
Figure 3F:
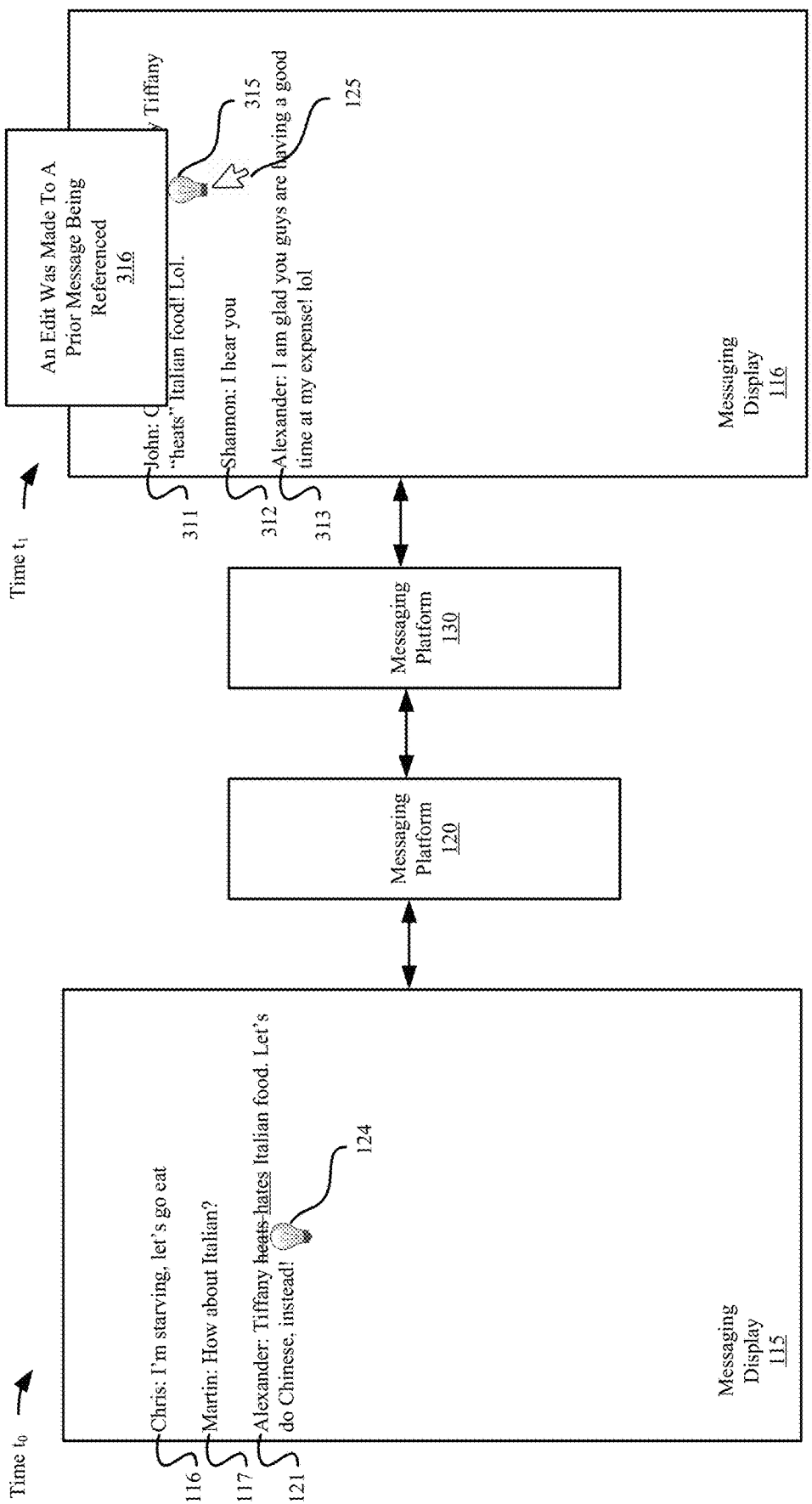
Figure 3G:
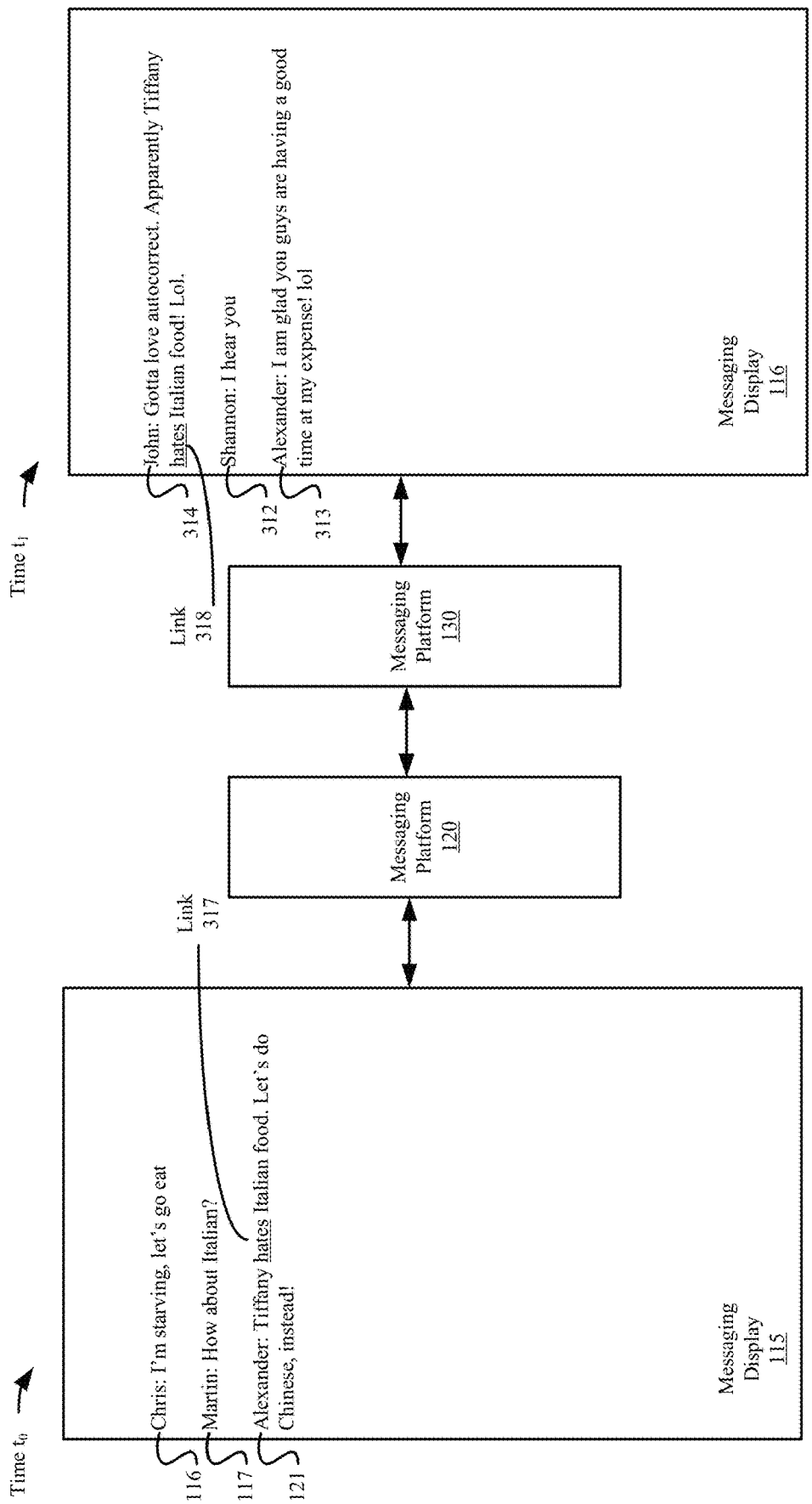

Referring now to FIG. 3E, notifications 124 and 315 may be displayed respectively to notify the participants. For example, notification 315 icon may display a GUI 316 that displays a notification to a participant within the messaging platform 130 when the mouse 125 hovers around the notification 315 icon. The GUI 316 may display a notification that an edit was made to a prior message being referenced. It is appreciated that the content of the GUI 316 may be as detailed as one would wish or brief as desired. For example, the content of GUI 316 may notify the participant what chat message was changed that may have triggered further changes to subsequent chat messages. In contrast, in FIG. 3F, the system has determined that changes cannot safely be made and as such no changes are made to the chat message 311 but instead a notification is made via the GUI 316 that an edit was made to a prior message being referenced. In other words, the system determines that the changes cannot safely be propagated to subsequent chat messages and as such a notification is displayed instead. Referring now to FIG. 3G, the notification is made via links associated with the changes that are made. In this nonlimiting example, the modified message 121 includes a link 317 for the word "hates" that replaced the original word "heats" and as such when the link 317 is invoked changes may be displayed, as desired. Similarly, the modified chat message 314 includes a link 318 for the word "hates" that replaced the original word "heats" and as such when the link 318 is invoked changes may be displayed.

Figure 4A:
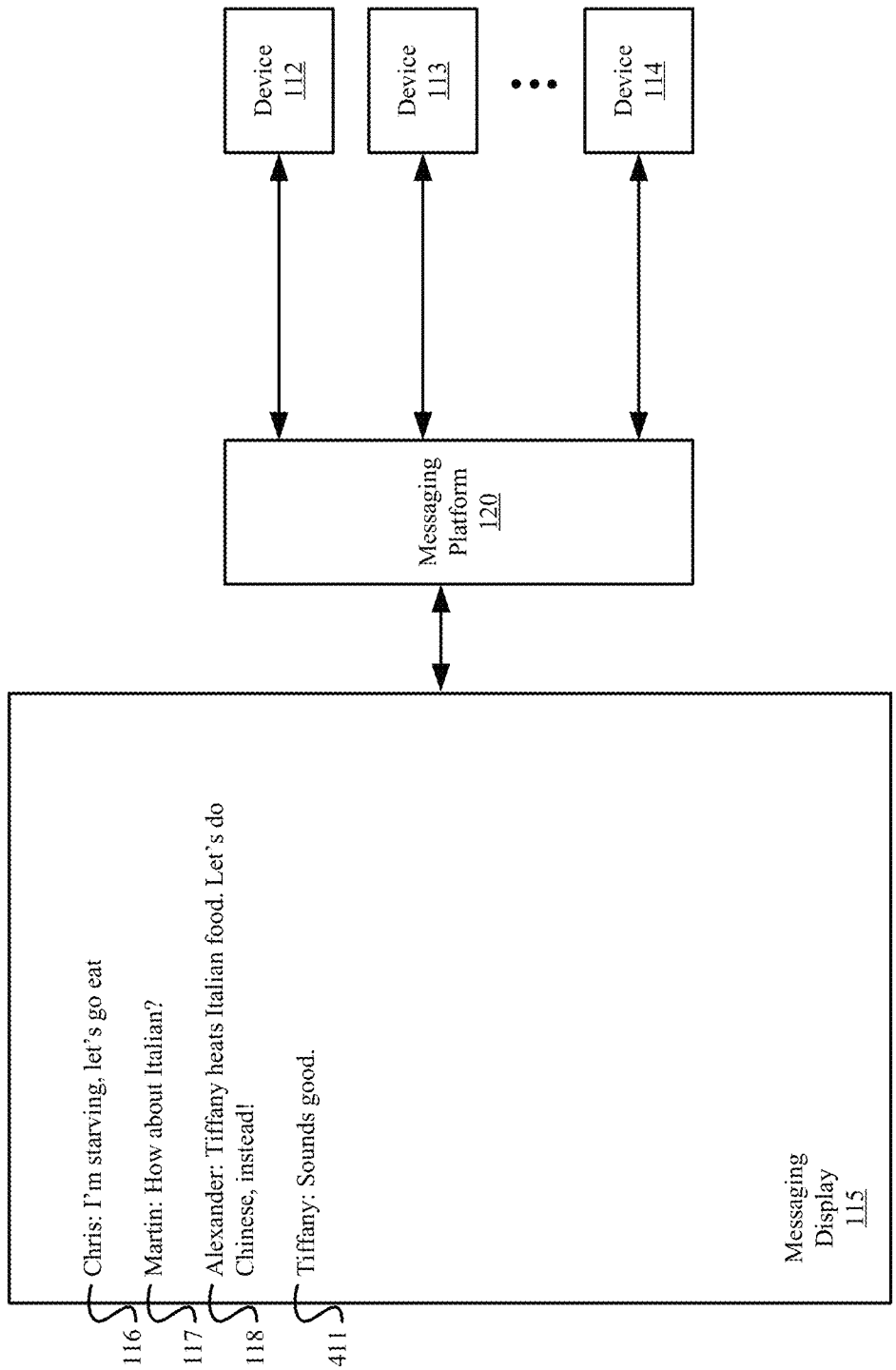
FIGS. 4A-4C is a diagram of yet another example system and a GUI for a chat communication environment according to some embodiments.
Figure 4B:
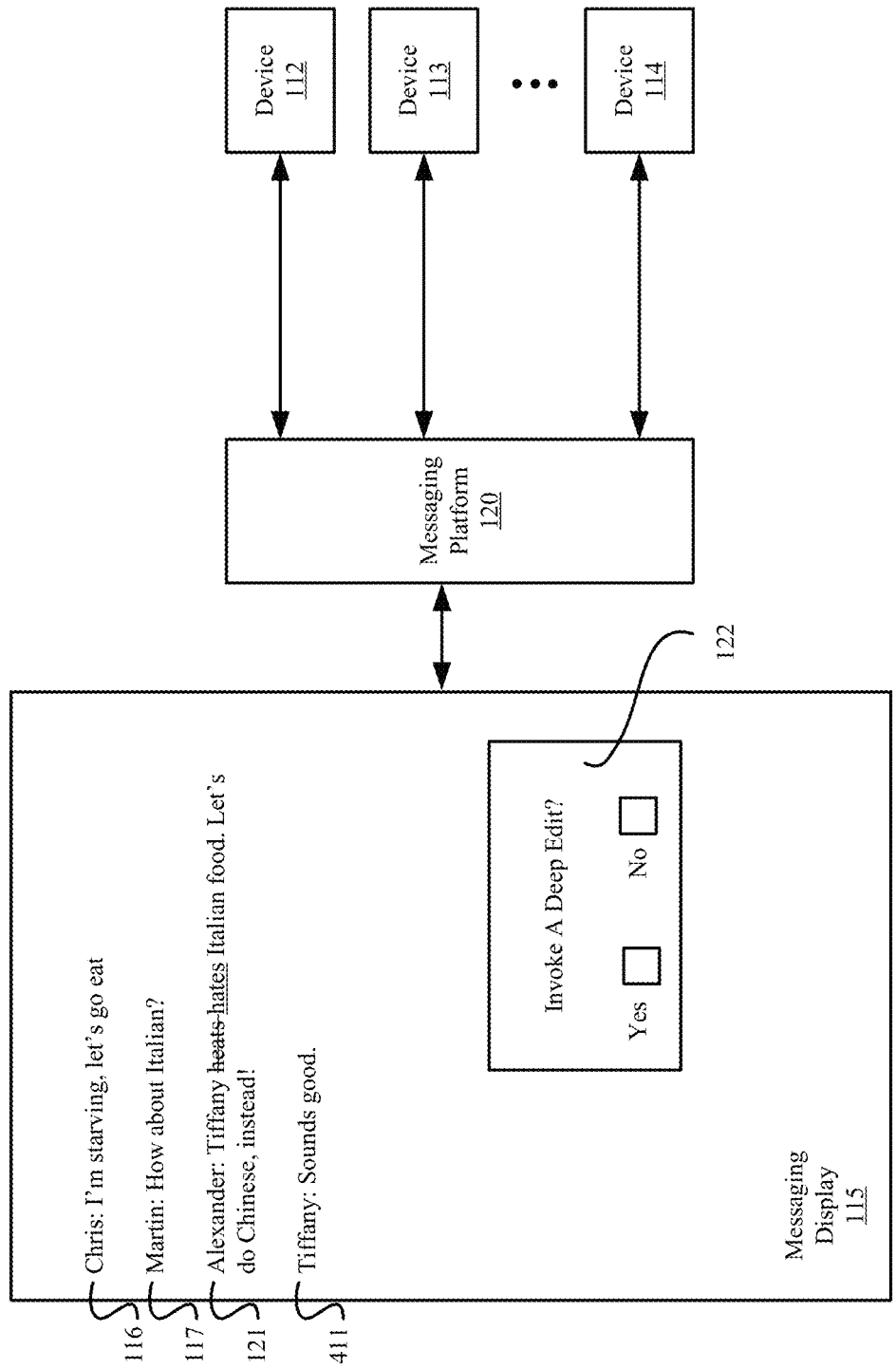
Figure 4C:
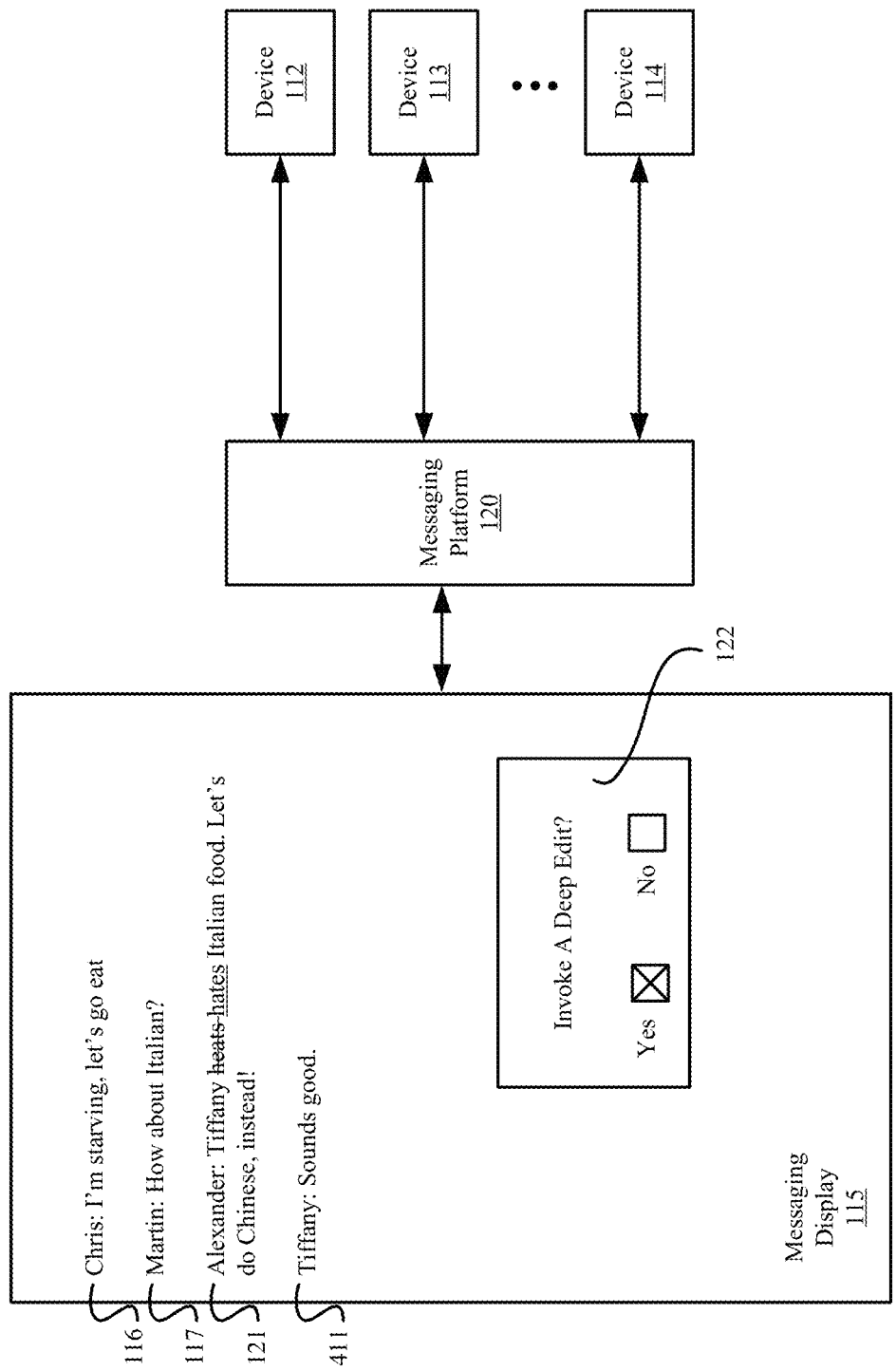

FIGS. 4A-4C is a diagram of yet another example system and a GUI for a chat communication environment according to some embodiments. FIG. 4A is similar to that of FIG. 1A, except that after the chat message 118 is posted, participant Tiffany posts a chat message 411 indicating "Sounds good." Referring now to FIG. 4B, one of the participants may edit the chat message 118 to correct the word "heats" to "hates" and to form a modified chat message 121. In response, the system may display a GUI 122, as described above, to inquire whether a deep edit should be performed. In FIG. 4C, the system determines that there are no subsequent chat messages that depend on a prior chat message that is modified because no subsequent chat messages are quoted, shared, copied, or referenced. In this nonlimiting example, participant Tiffany merely responds by posting the chat message 411 "Sounds good." In other words, in this nonlimiting example, the changes to a prior posted chat message does not impact any subsequent chat messages. As such, the system determines that the changes to the chat message 118 can be done to form the modified chat message 121 and that no further actions should be taken because subsequent chat messages would not be nonsensical or inaccurate in light of the changes being made.

FIGS. 5A-5D is a diagram of an example system and a GUI for a chat communication environment with a notification functionality according to some embodiments. In some embodiments, a notification may be displayed to the originator of the posted chat message if a change is being made. For example, in FIG. 5A, a GUI 516 may be displayed to Alexander on a messaging display 515 of a device associated with Alexander that an edit to the chat message was made and whether to accept or deny it. It is appreciated that the GUI 516 may be rendered regardless of whether the changes are being made by the author of the original chat message or whether it is being made by a different participant.

Figure 5A:
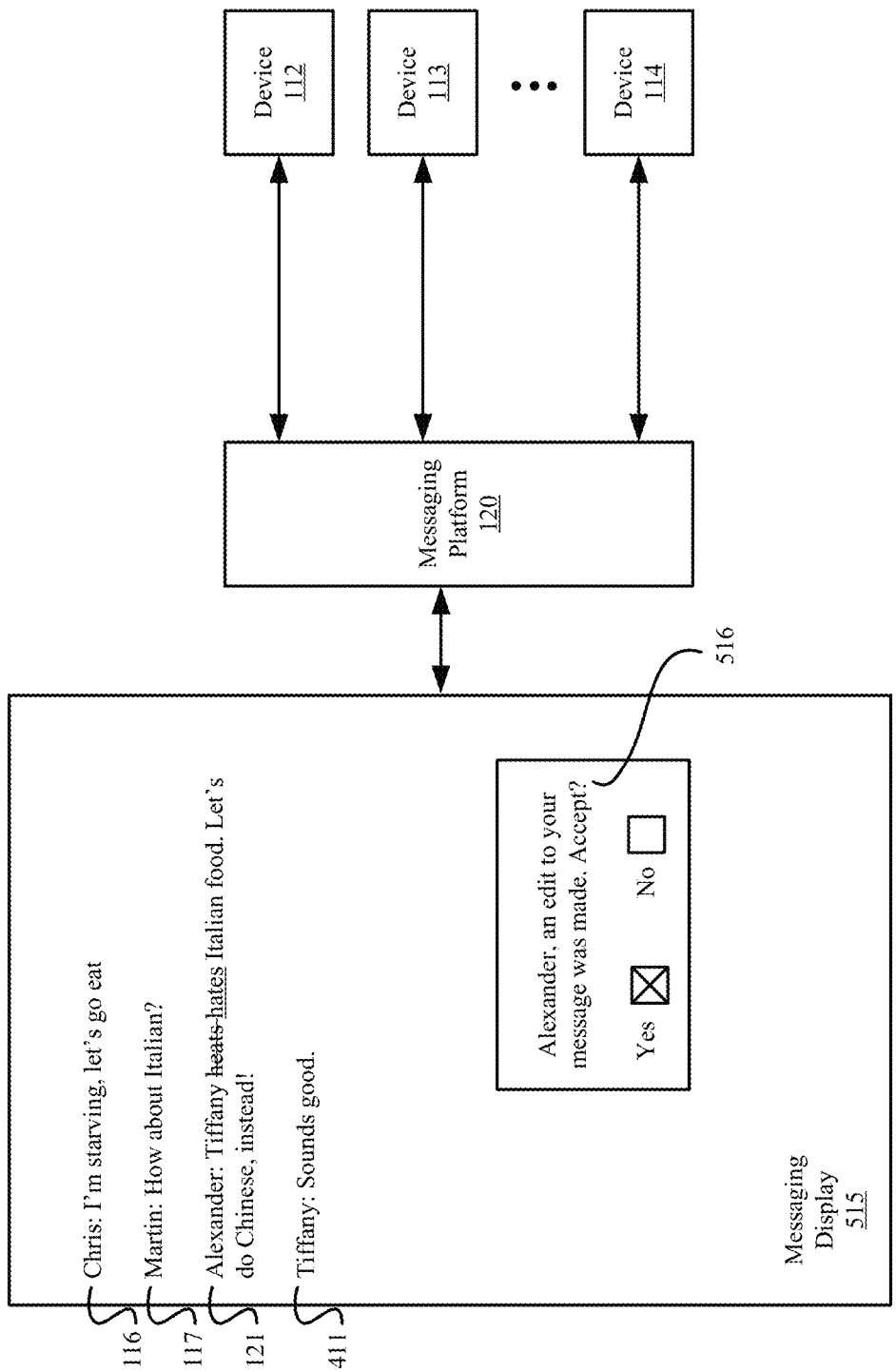
FIGS. 5A-5D is a diagram of an example system and a GUI for a chat communication environment with a notification functionality according to some embodiments.
Figure 5B:
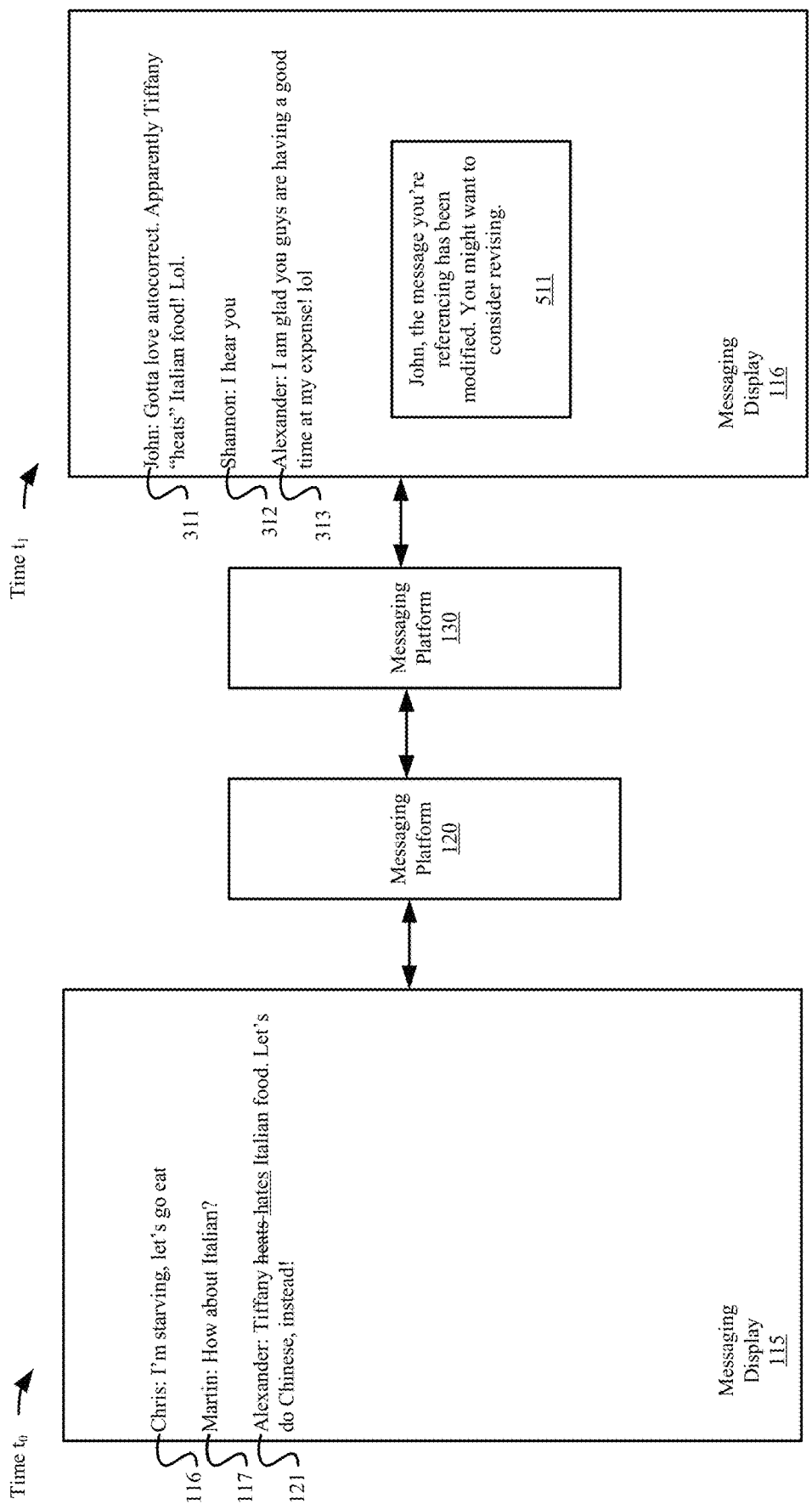
Figure 5C:
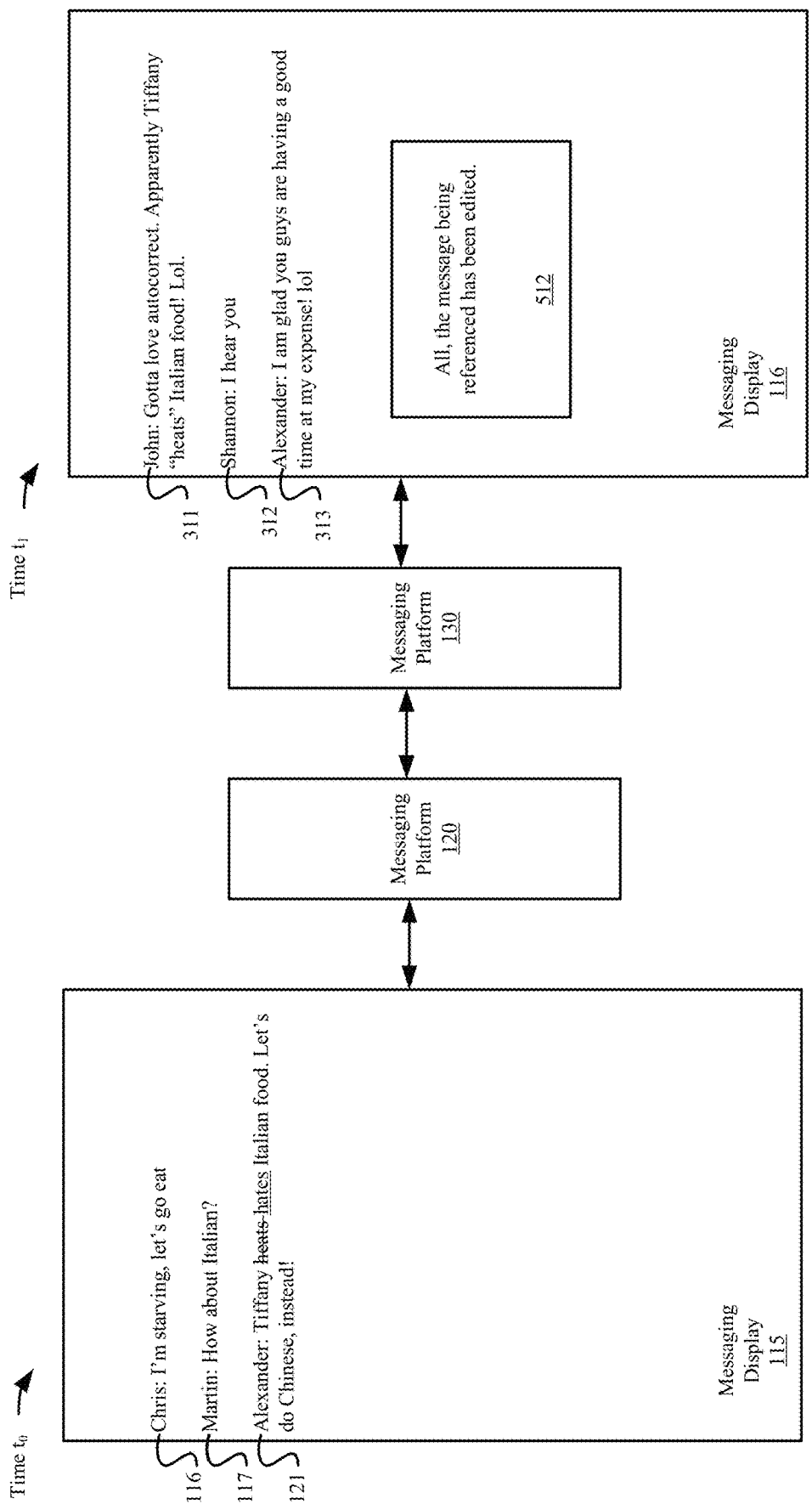
Figure 5D:
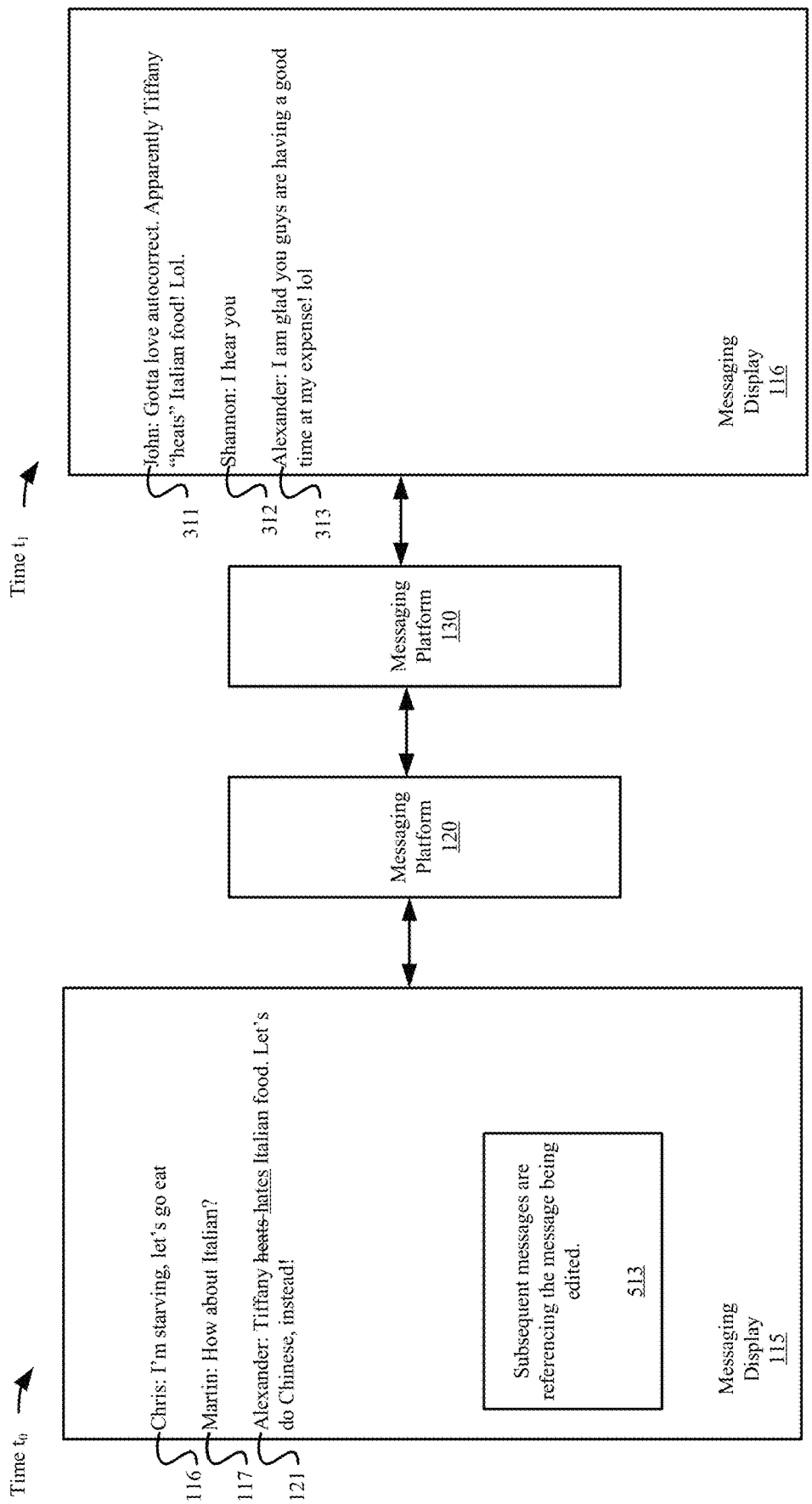

Referring now to FIG. 5B, the system has determined that the chat message 311 has dependencies on a prior chat message, as described above, by quoting and by referencing a prior chat message 118. However, in this nonlimiting example, a GUI 511 may be displayed to a participant John when the prior chat message 118 is modified and forms the modified chat message 121. The GUI 511 may be informational to alert the participant (i.e., author of the posted chat message) that the posted chat message 311 may be nonsensical, inappropriate, or inaccurate in light of the modification to the prior message being referenced. In this embodiment, changes to the chat message 311 is left to the discretion of the author whereas in other embodiments, the system may propagate the changes if it can be done safely. In some embodiments, the system will engage in sentiment analysis to evaluate whether the changes should be propagated based on the sentiments of the originator and/or the participants. In yet other examples, the system may display a GUI 512 to all participants that the posted chat message 311 references a prior chat message 118 that has now been modified as chat message 121 and, as such, chat message 311 may not be sensical or accurate, and the system may leave the rest to participants' judgement, as illustrated in FIG. 5C. In contrast, in FIG. 5D a GUI 513 may be rendered to the participant modifying the chat message 118 to form the modified chat message 121 to notify the participant making the change that subsequent messages are referencing the message being edited.

It is appreciated that the embodiments are described with respect to posted chat messages. However, it is appreciated that the embodiments are equally applicable to audio exchanges where the audio is transcribed into text, forming the chat messages. It is further appreciated that the changes to the chat messages have been described in the context of underlining and strikethrough for illustrative purposes and not intended to limit the scope of the embodiments. For example, different colors may be used to show the changes and different types of notifications may be used, e.g., a link, a GUI, an email, etc.

It is appreciated that the messaging platform processing the chat messages for dependencies may process the messages that are subsequent to a given chat message being modified in order to reduce the amount of processing. Moreover, it is appreciated that the processing may be performed for participants or a subset of participants within a given group/team that are communicating the chat messages in order to reduce the amount of processing. In other words, the processing may be performed for participants that have access to the posted chat messages. It is also appreciated that the processing to identify dependencies may also search for references to individuals that have posted a chat message that is being modified.

It is appreciated that references to a prior message that is being modified may be identified by processing subsequent chat messages and understanding the context of the chat messages for illustrative purposes and should not be construed as limiting the embodiments. For example, reaction, e.g., emoji, like, thumbs up/down, etc., to a prior chat message can be an indication of references to a prior chat message. It is appreciated that if a prior chat message is liked, the prior chat message may not be liked as much if changes are made to it or it may even be embarrassing to the participant that liked the message in light of the changes (i.e., in light of the new form).

It is appreciated that in some embodiments, the messaging platform may determine that changes can safely be propagated to subsequent chat messages if the modification is a typo, grammatical, change of capitalization, etc., and that the changes leave the underlying meaning and the substance of the chat message unchanged and if the message is not referenced, quoted, copied, or shared by others.

Figure 6A:
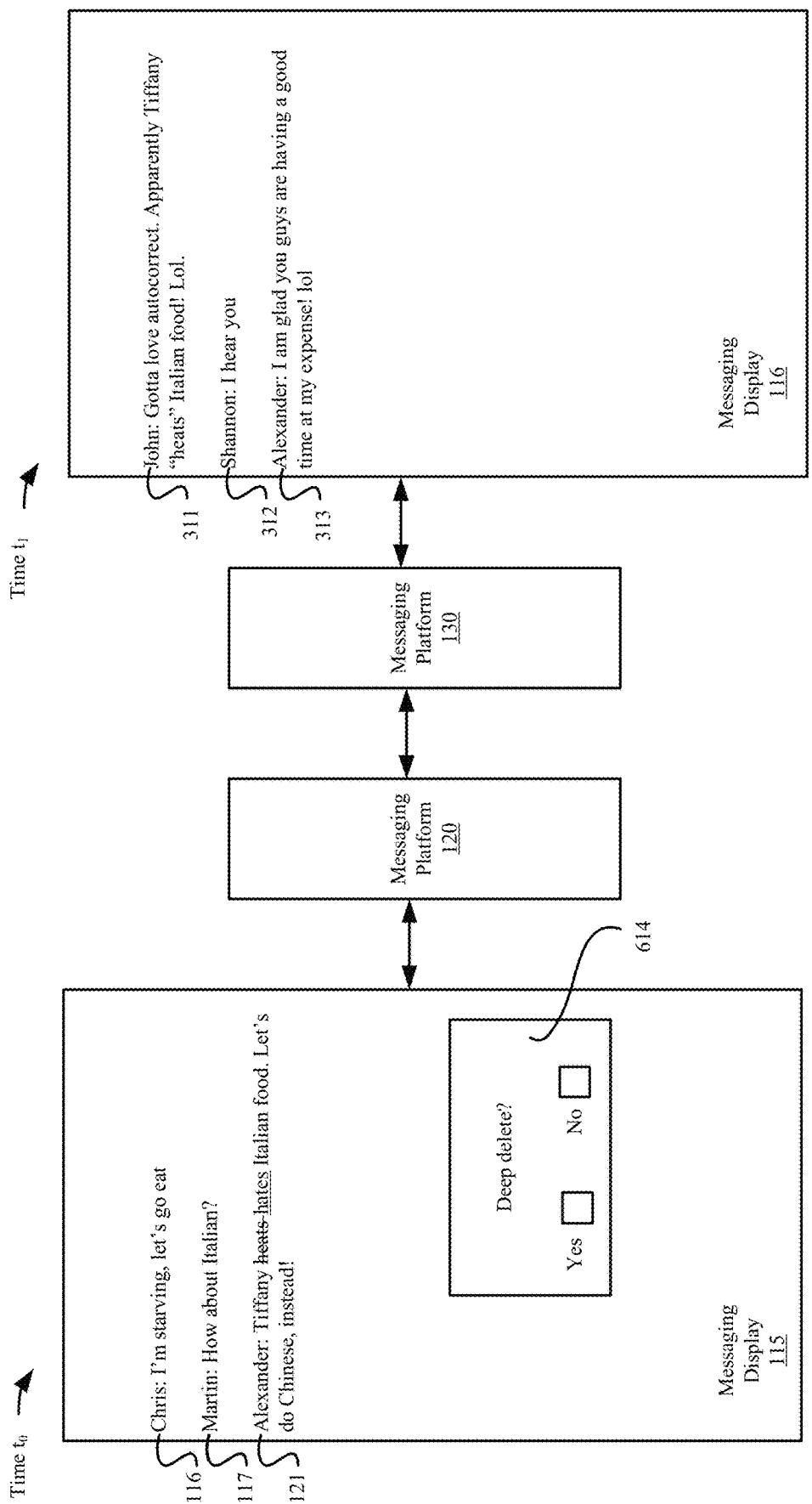
FIGS. 6A-6B is a diagram of an example system and a GUI for a chat communication environment with a deep delete functionality according to some embodiments.
Figure 6B:
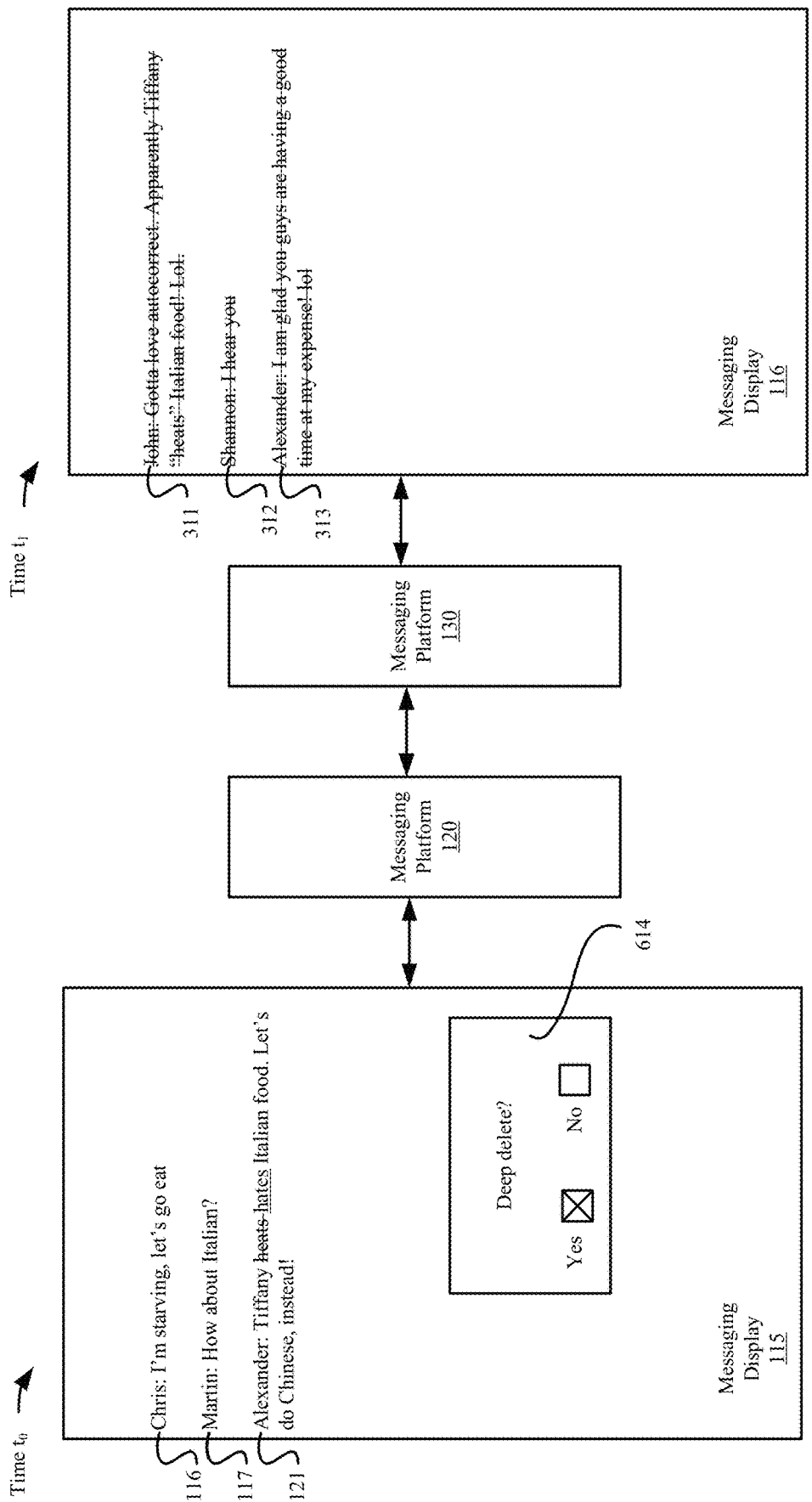

FIGS. 6A-6B is a diagram of an example system and a GUI for a chat communication environment with a deep delete functionality according to some embodiments. FIG. 6A is similar to that of FIG. 3B, except that, in this embodiment, when a participant attempts to modify the chat message 118, a GUI 614 is generated. In this nonlimiting example, the system has determined that all subsequent chat messages 311-313 have dependencies on the modified chat message 121. As such, the system may determine that a "deep delete" may be a more appropriate course of action. Deep delete may delete subsequent chat messages that are completely dependent on the modified chat message 121. If a deep delete is selected, as shown in FIG. 6B, then the subsequent chat messages 311-313 that depend on the modified chat message 121 by quoting, referencing, etc., are deleted, as shown by strikethrough. It is appreciated that the deletion is illustrated by strikethrough for illustrative purposes and should not be construed as limiting the scope of the embodiments. For example, the deep delete selection may simply remove the chat messages 311-313 altogether.

Figure 7:
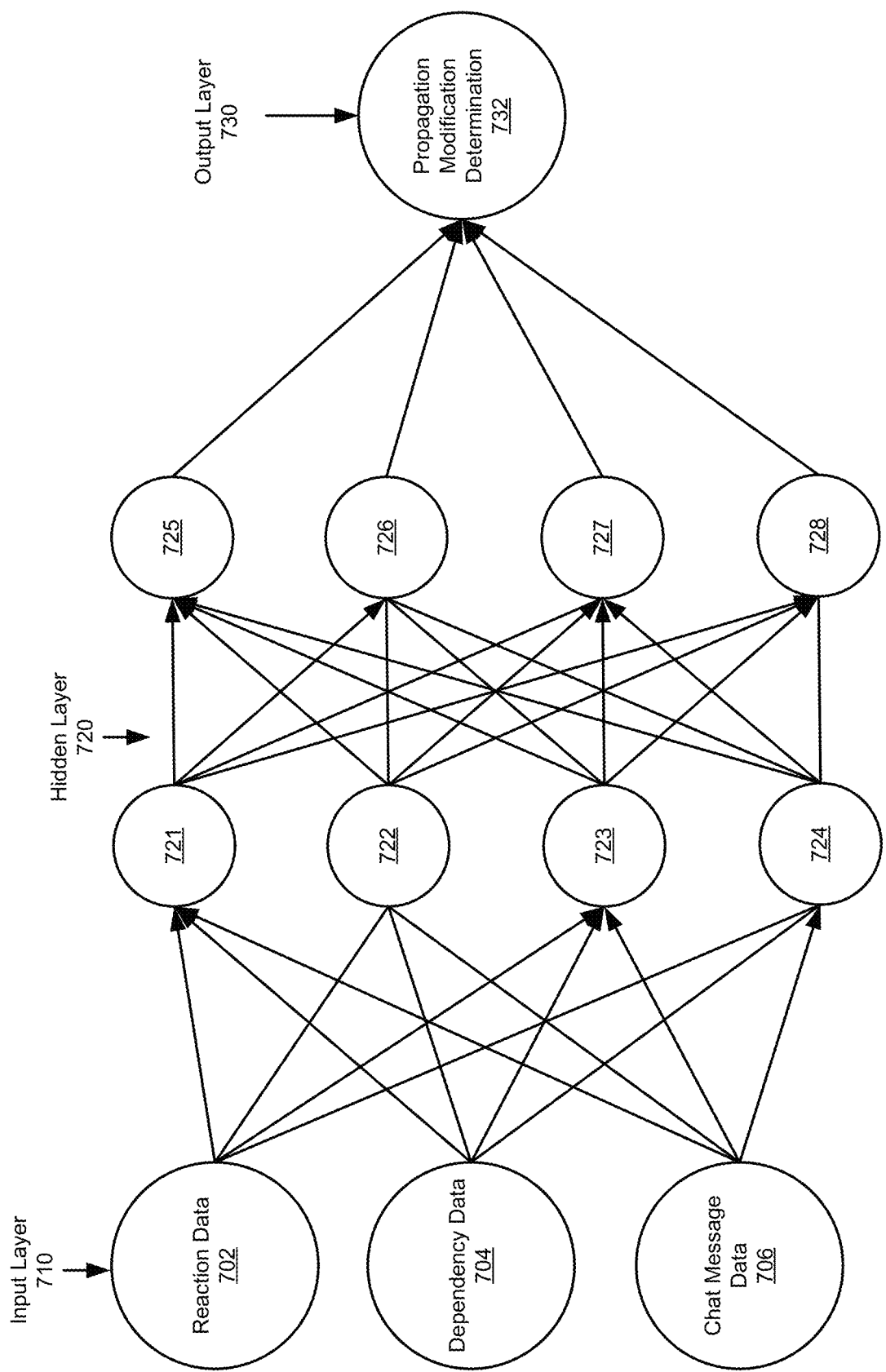
FIG. 7 is a relational node diagram depicting an example of a neural network for determining whether modification to a prior chat message should be propagated to subsequent chat messages according to some embodiments.

FIG. 7 is a relational node diagram depicting an example of a neural network for determining whether modification to a prior chat message should be propagated to subsequent chat messages according to some embodiments. In an example embodiment, the neural network 700 utilizes an input layer 710, one or more hidden layers 720, and an output layer 730 to train the machine learning algorithm(s) or model to identify whether modification to a prior chat message can safely be propagated to subsequent chat messages. In some embodiments, where the safety of propagation of modification to a prior chat message to subsequent chat messages have already been confirmed, supervised learning is used such that known input data, a weighted matrix, and known output data are used to gradually adjust the model to accurately compute the already known output. Once the model is trained, field data is applied as input to the model and a predicted output is generated. In other embodiments, where the safe propagation of modification to a prior chat message to subsequent chat message has not yet been confirmed, unstructured learning is used such that a model attempts to reconstruct known input data over time in order to learn. FIG. 7 is described as a structured learning model for depiction purposes and is not intended to be limiting.

Training of the neural network 700 using one or more training input matrices, a weight matrix, and one or more known outputs is initiated by one or more computers associated with the online conferencing system. In an embodiment, a server may run known input data through a deep neural network in an attempt to compute a particular known output. For example, a server uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server computer then re-computes another output from the deep neural network with the input training matrix and the adjusted weight matrix. This process continues until the computer output matches the corresponding known output. The server computer then repeats this process for each training input dataset until a fully trained model is generated.

In the example of FIG. 7, the input layer 710 includes a reaction data 702 that includes participant's reaction to a chat message and/or to modification thereto. The dependency data 704 includes whether a prior chat message has been shared, referenced, quoted, copied, etc., in a subsequent chat message. The input layer 710 may further include chat message data 706 within messaging platforms that are being analyzed and processed. Any type of input data can be used to train the model.

In an embodiment, reaction data 702 is used as one type of input data to train the model, which is described above. In some embodiments, dependency data 704 are also used as another type of input data to train the model, as described above. Moreover, in some embodiments, chat message data

706 within the messaging platforms are also used as another type of input data to train the model, as described above.

In the embodiment of FIG. 7, hidden layers 720 represent various computational nodes 721, 722, 723, 724, 725, 726, 727, 728. The lines between each node 721, 722, 723, 724, 725, 726, 727, 728 represent weighted relationships based on the weight matrix. As discussed above, the weight of each line is adjusted overtime as the model is trained. While the embodiment of FIG. 7 features two hidden layers 720, the number of hidden layers is not intended to be limiting. For example, one hidden layer, three hidden layers, ten hidden layers, or any other number of hidden layers may be used for a standard or deep neural network. The example of FIG. 7 also features an output layer 730 where a determination that a change from a prior chat message can safely be made 732 is the known output. As discussed above, in this structured model, the determination whether modification can safely be propagated 732 is used as a target output for continuously adjusting the weighted relationships of the model. When the model successfully outputs the determination 732, then the model has been trained and may be used to process live or field data.

Once the neural network 700 of FIG. 7 is trained, the trained model will accept field data at the input layer 710. In some embodiments, the field data is live data that is accumulated in real time. In other embodiments, the field data may be current data that has been saved in an associated database. The trained model is applied to the field data in order to predict whether it is safe to propagate changes from a prior chat message to subsequent chat messages at the output layer 730. Based on the determination, the system can decide whether to make the changes and/or to render GUI for notification purposes, etc., as described above. Moreover, a trained model can be modified over time as more data is processed and accumulated over time.

Figure 8:
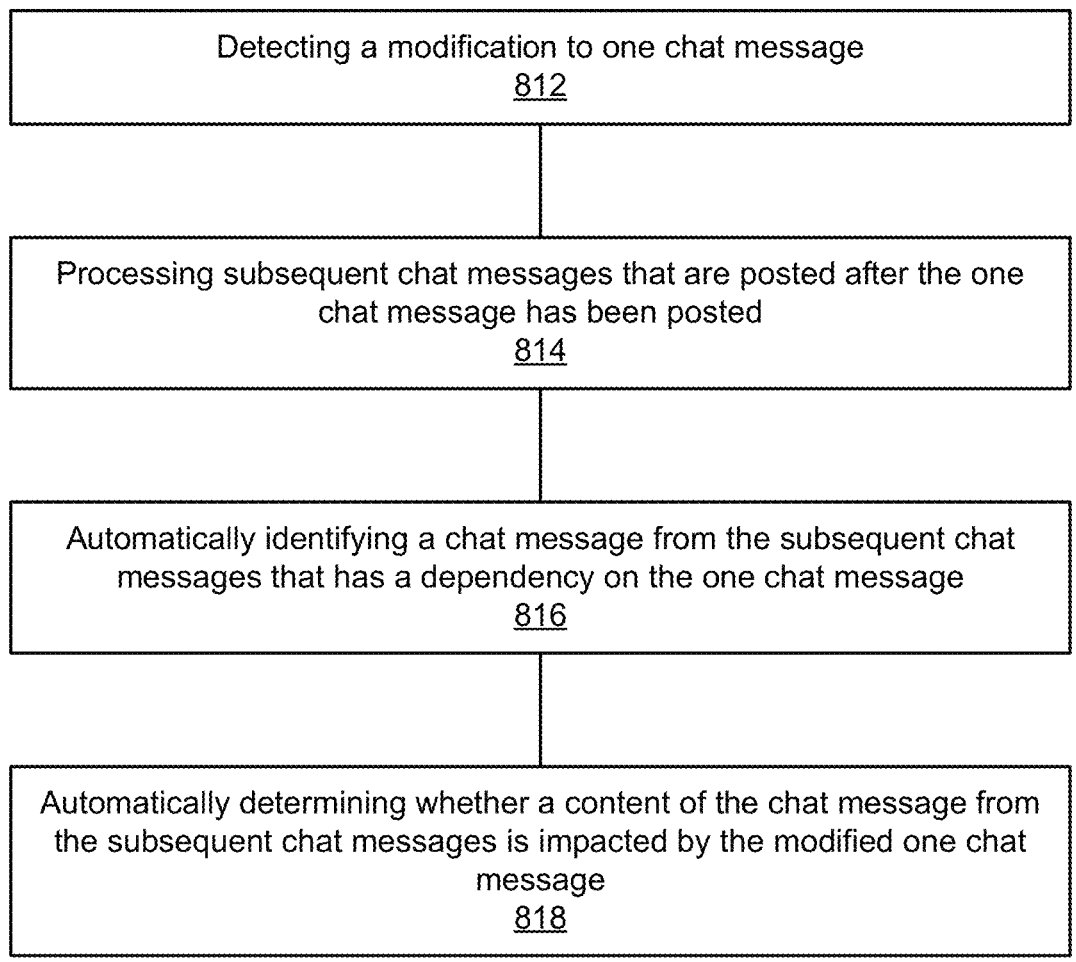
FIG. 8 is a flow chart illustrating an example of method flow for identifying dependencies between subsequent chat messages and a prior message being modified and whether the changes from the prior message can be safely propagated to subsequent chat messages according to some embodiments.

FIG. 8 is a flow chart illustrating an example of method flow for identifying dependencies between subsequent chat messages and a prior message being modified and whether the changes from the prior message can be safely propagated to subsequent chat messages according to some embodiments. In some embodiments, the exchange of chat messages is monitored, as described in FIGS. 1A-7. The chat messages are being exchanged within a messaging platform. At step 812, a modification to one chat message is detected, as described above in FIGS. 1A-7. The modification may form a modified one chat message. At step 814, subsequent chat messages that are posted after the one chat message has been posted are processed, as described in FIGS. 1A-7. It is appreciated that a subset of the subsequent chat messages may be in a different messaging platform than the one chat message. At step 816, a chat message from the subsequent chat messages is automatically identified that has a dependency on the one chat message, as described in FIGS. 1A-7. At step 818, it is automatically determined whether a content of the chat message from the subsequent chat messages is impacted by the modified one chat message, as described in FIGS. 1A-7.

It is appreciated that the embodiments are described with respect to a messaging platform and a chat environment for illustrative purposes and should not be construed as limiting the scope of the embodiments. For example, a similar approach may be taken for an integrated collaboration tool, e.g., platform that provides video/audio conferencing and chat messaging capabilities, etc.

Collaborative Online Environment

The disclosed embodiments may be used in an integrated collaboration tool. For example, the collaborative online environment may allow for users to associate tasks, events, files, links, and the like with chat groups. Additionally, embodiments of the present disclosure may allow users to create teams having a plurality of users and associate tasks, events, files, links, and the like with teams. In some embodiments, users may also convert an email thread to one or more chat groups and/or convert a chat conversation to an email thread, which may simplify real-time collaboration. Herein, an email thread may refer to one or more email messages.

According to an embodiment of the present disclosure, a processor may create a chat group based on one or more emails in an email thread. For example, the processor may receive an email thread having at least one email. In certain aspects, the email thread may be one email with quoted text from previous emails. In other aspects, the email thread may be a plurality of emails. In such aspects, at least some of the emails within the plurality may be connected by a common subject and/or recipients. Similarly, at least some of the emails may be unrelated either by subject or by recipients.

In certain aspects, a user may send the email thread to the processor via file upload. For example, the user may save the email thread as one or more .msg files, and then the processor may receive the .msg files either directly from one or more storage devices (e.g., via Integrated Drive Electronics (IDE), Serial AT Attachment (SATA), Small Computer System Interface (SCSI), Serial SCSI, Universal System Bus (USB), or the like) or over one or more networks (e.g., the Internet, Local Area Network (LAN), Wi-Fi, 4G, or the like).

In other aspects, a user may send the email thread to the processor by sending an authorization for the processor to retrieve the email thread from an email host. For example, a user may send to the processor a username and password for accessing the email host and an indication of which emails on the email host are to be included in the email thread. The processor may then retrieve the emails from the email host using the authorization. The processor and the email host may reside on one or more servers together and/or on one or more different servers.

According to an aspect of the present disclosure, the processor may receive a request to generate a chat conversation. For example, the user may use one or more buttons on a GUI to submit this request. By way of further example, the user may submit the request concurrently with the email thread. Similar to the email thread, the processor may receive the request directly or may receive it over one or more networks.

In certain aspects, a user may send the email thread to the processor by forwarding an email comprising the email thread to a dedicated email address or by sending an email to the dedicated email address with the email thread attached. In such aspects, the email host configured to receive email addressed to the dedicated email address may be further configured to send the forwarded email thread (or the attached email thread) and the request to generate a chat conversation to the processor. In this case, the processor and the email host may reside on one or more servers together and/or on one or more different servers, and the processor may receive the email thread and the request directly or may receive it over one or more networks.

According to an aspect of the present disclosure, the processor may determine a plurality of recipients from the email thread. For example, the processor may determine the recipients by extracting email addresses from the "To", "From", carbon copy ("CC"), and/or blind carbon copy ("BCC") fields within one or more emails in the email thread. By way of further example, the processor may parse text within one or more emails in the thread (whether quoted text or body text) to determine one or more recipients. The processor may parse the text directly for one or more email addresses and/or may parse the text for context clues. For example, the processor may parse the text for names (or partial names or nicknames or the like) that are included in a contact list maintained by the user. Such a contact list may allow the processor to map the parsed names to email addresses associated with the parsed names.

According to an aspect of the present disclosure, the processor may initiate a chat conversation based on the plurality of recipients. For example, the processor may activate a synchronous conferencing protocol or an asynchronous conferencing protocol. The processor may automatically add one or more of the recipients to the chat conversation. Alternatively, the processor may automatically notify one or more of the recipients of the chat conversation and request a response. For example, the processor may automatically add the user to the chat conversation and then send an invite to the remaining recipients asking them to join the chat conversation. In this example, the remaining recipients may either accept the invite and be added to the chat conversation or reject the invite and not be added to the chat conversation. For example, a recipient may use one or more buttons on a GUI to accept or reject the invite.

According to another embodiment of the present disclosure, a processor may receive an email thread having at least one email, receive a request to generate a chat conversation, determine a plurality of recipients from the email thread, and create a chat conversation based on the plurality of recipients, as described above. In some examples, the system may use machine learning to parse the text and determine which recipients to include or exclude in the chat conversation. For example, the email thread may contain correspondence between the recipients indicating that recipients A, B, and D should continue the discussion in chat, whereas recipient C should be excluded from the chat.

According to an aspect of the present disclosure, the processor may populate initial content of the chat conversation based on at least a portion of content from the email thread. For example, the processor may parse the email thread for text, files, and/or links. The processor may identify text sent from one recipient to at least one other recipient within the email thread and pre-populate the chat conversation with a chat comprising the identified text from the one recipient to the other recipients. The processor may also identify files and/or links sent from one recipient to at least one other recipient within the email thread and pre-populate the chat conversation with a chat message having the identified file(s) as attached and/or the identified link(s) as hyperlinks.

According to another embodiment of the present disclosure, a processor may automatically convert one or more emails to one or more chat conversations. For example, the processor may receive an email thread having at least one email, receive a request to convert the email thread to a chat conversation, and determine a plurality of recipients from the email thread, as described above.

According to an aspect of the present disclosure, the processor may parse the email thread to determine one or more conversation flows. For example, the processor may determine a temporal flow within the email thread by ranking the emails within the thread based on timestamps indicating when the emails were sent and/or timestamps indicating when the emails were received. The timestamps may be directly extracted from quoted text in the emails within the thread or from metadata of the emails within the thread.

The timestamps may also be extracted from context clues based on text within the emails. For example, text within the emails may refer back to previous portions of the conversation or may state that a follow-up will be forthcoming. The processor may map these context clues to particular emails or to quoted text within one or more emails and then construct a conversation timeline based on the context clues and the mapping. The timeline may comprise one line or may be multi-lined. For example, if the email thread split into two sub-groups of recipients with concurrent emails exchanged within the sub-groups, the processor may construct a fork within the timeline representing a split in the temporal flow. The fork may represent a divide between a main timeline and a tributary timeline.

In certain aspects, the processor may determine a logical flow within the email thread based on conversation dynamics. For example, context clues within the emails may indicate if a particular email or particular piece of quoted text is related to one or more subjects. The one or more subjects may be from a pre-populated list or may be derived on-the-fly by the processor. Based on this subject categorization, the processor may construct a conversation map of the logical flow within the email thread. The map may comprise one thread or may be multi-threaded. For example, if a side conversation ensues within an email thread, the processor may construct a fork within the map representing a split in the logical flow. The fork may represent a divide between a main map and a tributary map.

Any of the above algorithms for determining a temporal flow or a logical flow may be enhanced with machine learning. For example, the processor may be seeded with a learning library or construct a learning library on-the-fly which then allows for the algorithm (and/or the library) to be updated each time it is used. Other machine learning approaches are also possible, for example, neural networks, Bayesian networks, deep learning, or the like. In some examples, the system may use machine learning to rank the confidence of each temporal flow or logical flow based on training from a learning library. In further examples, the machine learning algorithm may incorporate input from the users associated with a temporal flow or logical flow to add temporal flows or logical flows that users rank as accurate to the learning library.

According to an aspect of the present disclosure, the processor may generate one or more chat conversations based on the plurality of recipients and the one or more conversation flows. For example, the processor may activate a synchronous conferencing protocol or an asynchronous conferencing protocol. The processor may automatically add one or more of the recipients to the chat conversation. Alternatively, the processor may automatically notify one or more of the recipients of the chat conversation and request a response. For example, the processor may automatically add the user to the chat conversation and then send an invite to the remaining recipients asking them to join the chat conversation. In this example, the remaining recipients may either accept the invite and be added to the chat conversation or reject the invite and not be added to the chat conversation. For example, a recipient may use one or more buttons on a GUI to accept or reject the invite.

Furthermore, the processor may pre-populate the chat conversation based on the one or more conversation flows. For example, the processor may generate chat messages between recipients that contain portions of the email thread in an order determined by the conversation flows. For example, if the conversation flow is temporal, the order may follow the constructed conversation timeline. Similarly, if the conversation flow is logical, the order may follow the constructed conversation map.

In cases where the conversation timeline or the conversation map contains a fork, the processor may construct two chat conversations, one associated with the main timeline or map and one associated with the tributary timeline or map. If the timeline or map contains a plurality of forks, the processor may repeat this process for some or all of the forks.

In certain aspects, a conversation associated with a tributary timeline or map may include the same recipients as the conversation associated with the main timeline or map. In other aspects, a conversation associated with a tributary timeline or map may include a sub-group of the recipients of the conversation associated with the main timeline or map. In still other aspects, some or all of the recipients of a conversation associated with a tributary timeline or map may differ from the recipients of the conversation associated with the main timeline or map.

The processor may also pre-populate the conversation associated with the main timeline or map with one or more files and/or one or more links in accordance with the description above. The processor may similarly pre-populate a conversation associated with a tributary timeline or map with one or more files and/or one or more links in accordance with the description above. In such embodiments, the processor may identify a location in a conversation timeline or in a conversation map for the one or more files or links in order to determine a location within the main conversation or a tributary conversation to place the file(s) and/or link(s).

According to another embodiment of the present disclosure, a processor may automatically convert a chat conversation to an email thread. For example, the processor may receive at least one chat conversation. As described above, the processor may receive one or more files (e.g., .msg files) having the chat conversation(s) either directly from one or more storage devices or over one of more networks. Alternatively or concurrently, the processor may receive an authorization for the processor to retrieve the chat conversation(s) from one or more servers in a chat network. For example, a user may send to the processor a username and password for accessing the server(s) and an indication of which chat messages on the server(s) are to be included in the chat conversation(s). The processor may then retrieve the chat messages from the servers using the authorization. The processor may reside on one or more of the servers in the chat network and/or may reside on one or more different servers.

According to an aspect of the present disclosure, the processor may receive a request to convert the chat conversation to an email thread. For example, the user may use one or more buttons on a GUI to submit this request. By way of further example, the user may submit the request concurrently with the chat conversation(s). Similar to the chat conversation(s), the processor may receive the request directly or may receive it over one or more networks According to an aspect of the present disclosure, the processor may determine a plurality of recipients from the chat conversation. For example, the processor may determine the recipients by extracting email addresses directly from the chat conversation(s). By way of further example, the processor may extract usernames directly from the chat conversation(s) and then map the extracted usernames to email addresses associated with the usernames. It is appreciated that the processor may be configured to identify handler or username of each user in other collaborative platform such that dependency between a prior chat message being modified and a subsequent chat message can be determined. In some embodiments, one messaging platform may be a RingCentral® platform and another messaging platform may be a WhatsApp platform and the handler of the participants active in one platform is determined in the other platform to identify any dependency between the chat messages, as described above.

By way of further example, the processor may parse text within the chat conversation(s) to determine one or more recipients. The processor may parse the text directly for one or more email addresses and/or may parse the text for context clues. For example, the processor may parse the text for names (or partial names or nicknames or the like) that are included in a contact list maintained by the user or in a shared contact list maintained by the organization to which the user belongs. Such a contact list may allow the processor to map the parsed names to email addresses associated with the parsed names. Similarly, parsing the text within the chat conversation(s) enables the system track changes to one or more word(s), letter(s), symbol(s), etc. (generally referred to as content), reaction thereto, and further for performing further processing to identify any dependency between the chat messages in order to determine whether changes to a prior chat message can safely be propagated to subsequent chat messages and whether any notification should be rendered, as described above.

According to an aspect of the present disclosure, the processor may parse the chat conversation(s) into an email thread. For example, as described above, the processor may determine a temporal flow or a logical flow for the chat conversation(s) and construct a conversation timeline or conversation map therefrom. Based on this timeline or map, the processor may generate a plurality of emails between the determined recipients. For example, the processor may generate an email from a first recipient to a second recipient with a third and fourth recipient list on the CC line. In this example, the generated email may include text, files, and/or links from the chat conversation(s).

By way of further example, the plurality of emails may include one or more initial emails and include replies thereto or forwards thereof. The plurality of emails may further include replies to replies, forwards of replies, replies to forwards, forwards of forwards, or the like. In certain aspects, replies and forwards may include all of the same recipients as emails to which the replies and forwards are related or may include different recipients. In certain aspects, a reply or a forward may shift some recipients from a CC line to a BCC line or vice versa, from a CC line to the To line or vice versa, from a BCC line to the To line or vice versa, or the like.

For example, the processor may determine whether to place a recipient on a CC line, a BCC line, or a To line based on how active the recipient was in the chat conversation(s), based on context clues within the chat conversation(s), or the like. In certain aspects, the processor may receive input from the user indicating whether a recipient should be placed on a CC line, a BCC line, or a To line. The processor may also use a combination of automatic determination and user input in order to place a recipient on a CC line, a BCC line, or a To line.

According to an aspect of the present disclosure, the processor may transmit the email thread to an email host. For example, the processor may forward the email thread having at least one email to the email host for direct placement in the email accounts of the recipients. In another example, the processor may transmit the emails comprising the thread to the email host for delivery. In this way, the processor may recreate the chat conversation(s) by having emails sent between the recipients that mimic the chat messages that were sent between the recipients. The processor may use a combination of forwarding the email thread and transmitting the emails for delivery in order to recreate or reconstruct the chat conversation(s).

According to another embodiment of the present disclosure, a processor may authenticate a user before executing requests from the user, as described both above and below. For example, a processor may receive an identifier from a user. In certain aspects, the identifier may comprise a known identity, e.g., a username, an email address, or the like. The identifier may further comprise an authenticator, for example, a password, a PIN, biometric data, or the like.

The processor may receive the identifier using one or more graphical user interfaces (GUIs). For example, the processor may use GUI 3000 of FIG. 30, described below.

According to an aspect of the present disclosure, the processor may compare the identifier to a database of known identifiers. For example, the processor may confirm that a username and password match a known username and password in the database. In certain aspects, the processor may hash or otherwise encrypt some or all of the identifier and compare the encrypted identifier to a databased of known encrypted identifiers. For example, the processor may hash a received password and then confirm that a username and the hashed password match a known username and a known hashed password in the database.

According to an aspect of the present disclosure, the processor may control access to the collaboration service based on the comparison. For example, if the identifier does not match a known identifier, the processor may refuse to accept data and/or requests from the user. Similarly, if the identifier matches a known identifier, the processor may then accept data from the user and/or execute requests received from the user.

In some embodiments, a processor may confirm that a user is not a spam program or other automated entity before executing requests from the user, as described both above and below. For example, if a processor receives an email (or other data) or request from a user, the processor may generate a response having a unique confirmation code. For example, the confirmation code may be a one-time passcode or other unique code. By way of further example, the processor may generate a response having a unique CAPTCHA.

According to an aspect of the present disclosure, the processor may send the response having the confirmation code to the user. For example, the processor may transmit an email having the confirmation code to the user (e.g., via an email host) or may transmit a Short Message Service (SMS) message, a Multimedia Messaging Service (MMS) message, or the like having the confirmation code to a device associated with the user (e.g., a smartphone). By way of further example, the processor may present the confirmation code directly to the user—for example, if the confirmation code is a CAPTCHA, the processor may transmit the CAPTCHA (e.g., to a web browser) for display on a screen associated with the user (e.g., on a laptop or desktop computer).

According to an aspect of the present disclosure, the processor may receive a code from the user. For example, the processor may receive an email or text message (SMS message, MMS message, etc.) from the user having a code. By way of further example, the processor may use a text box within a GUI to receive the code from the user.

According to an aspect of the present disclosure, the processor may compare the code from the user to the confirmation code. In certain aspects, the processor may hash or otherwise encrypt some or all of the code from the user and compare the encrypted code to the encrypted confirmation code. For example, the processor may hash the code received from the user and then confirm that it matches the hashed confirmation code.

According to an aspect of the present disclosure, the processor may control access to the collaboration service based on the comparison. For example, if the coder received from the user does not match the confirmation code, the processor may refuse to accept data and/or requests from the user. Similarly, if the code received from the user matches the confirmation code, the processor may then accept data from the user and/or execute requests received from the user.

According to another embodiment of the present disclosure, a processor may automatically invite a user to join a collaboration service. For example, the processor may determine that a particular contact does not have an account with the collaboration service. The processor may make this determination using a database of known users. For example, if the processor receives an email address or a phone number that does not appear in the database, the processor may determine that the contact associated with the email address or phone number does not have an account. Similarly, if the processor receives a username that does not appear in the database, the processor may determine that the contact associated with the username does not have an account. In certain aspects, the processor may hash or otherwise encrypt some or all of the email address, username, or the like and compare the encrypted code to a database of known users. For example, the processor may hash the received email address and then determine whether the hashed email address appears in the database of known users.

According to an aspect of the present disclosure, the processor may generate a message addressed to the contact and having a link to register for the collaboration service. For example, the processor may generate an email addressed to the contact that includes a link to register for (that is, create an account with) the collaboration service in the subject and/or body of the email. An example of an email having a link to register is depicted in GUI 3200 of FIG. 32.

Similarly, the processor may generate a text message (e.g., SMS message, MMS message, etc.) addressed to the contact that includes a link to register for the collaboration service. An example of a text message having a link to register is depicted in GUI 3300 of FIG. 33. In other examples, the processor may call the contact and playback an audio message to ask or encourage the contact to sign up with the collaboration service. In some examples, the processor may periodically follow up with the contact by sending one or more reminders in different message formats (e.g., email, SMS message, MMS message, etc. or combination thereof) at various time intervals until the contact has completed the registration with the collaboration service.

According to an aspect of the present disclosure, the processor may transmit the message to the contact. The mechanism of transmittal may depend on the format of the message. For example, if the message is an email, the processor may transmit the email to an email host for delivery to the inbox associated with the contact. By way of further example, if the message is a text message, the processor may transmit the email to an SMS host for delivery to a phone associated with the contact.

According to another embodiment of the present disclosure, a processor may create a collaborative team. For example, the processor may receive at least one potential team member. The processor may receive the at least one potential team member using one or more graphical user interfaces (GUIs). For example, a user may submit the potential team member(s) with GUI 3400 of FIG. 34, described below.

In certain aspects, the user may receive a list of contacts associated with the user from the processor. For example, a user may receive the list of contacts with GUI 3500 of FIG. 35, described below. The user may then select at least one contact from the list as the at least one potential team member. The processor may thus receive the selection and extract the at least one potential team member from the contact list.

According to an aspect of the present disclosure, the processor may receive a request to create a team. For example, the user may submit the request with GUI 3400 of FIG. 34, GUI 3600 of FIG. 36, or a combination thereof. In response to the request, the processor may create the team. After creation, a team may be visible to the user (and/or to team members within the team) via one or more GUIs, e.g., GUI 3700 of FIG. 37 or GUI 3900 of FIG. 39.

According to an aspect of the present disclosure, the processor may receive a request to add the at least one potential team member to the team. By being added to a team, a potential team member becomes a team member. Accordingly, the added team member may be visible (to the user, the team member, and/or to other team members within the team) on a list of team members included in the team via one or more GUIs, e.g., GUI 4000 of FIG. 40. In other aspects, the added team member may have limited visibility (i.e., masked with respect to others), or be invisible or hidden to other team members. For example, if a potential team member was listed in a BCC field of an email message used to create the team, the added team member may have limited visibility within the team.

In yet another aspect, the added team member may be incognito, such that the added member is shown as a participant, but the identity of the added user has been anonymized. For example, the incognito member may act as a fly-on-the-wall, a referee, an auditor, or the like whose presence is known by other team members yet the added member's identity has become hidden.

According to an aspect of the present disclosure, the processor may set permissions for members of the team. For example, the processor may set permissions such that some team members are allowed to add and/or remove team members while other team members are not. Similarly, the processor may set permissions such that some team members are allowed to add certain kinds of content to the team (e.g., files, links, notes, events, tasks, etc.) while other team members are not. These permissions may be based on default settings, options received from a user initiating creation of the team or from other team members, or the like.

The formation of a team may allow for exchanging of group messages within the team. For example, GUI 4100 of FIG. 41, GUI 4200 of FIG. 42, and GUI 4300 of FIG. 43 depict example GUIs for exchanging messages within a team. Moreover, team members may react to messages exchanged within the group. For example, GUI 4400 of FIG. 44 and GUI 4500 of FIG. 45 depict example GUIs for reacting to messages within a team.

Figure 51:
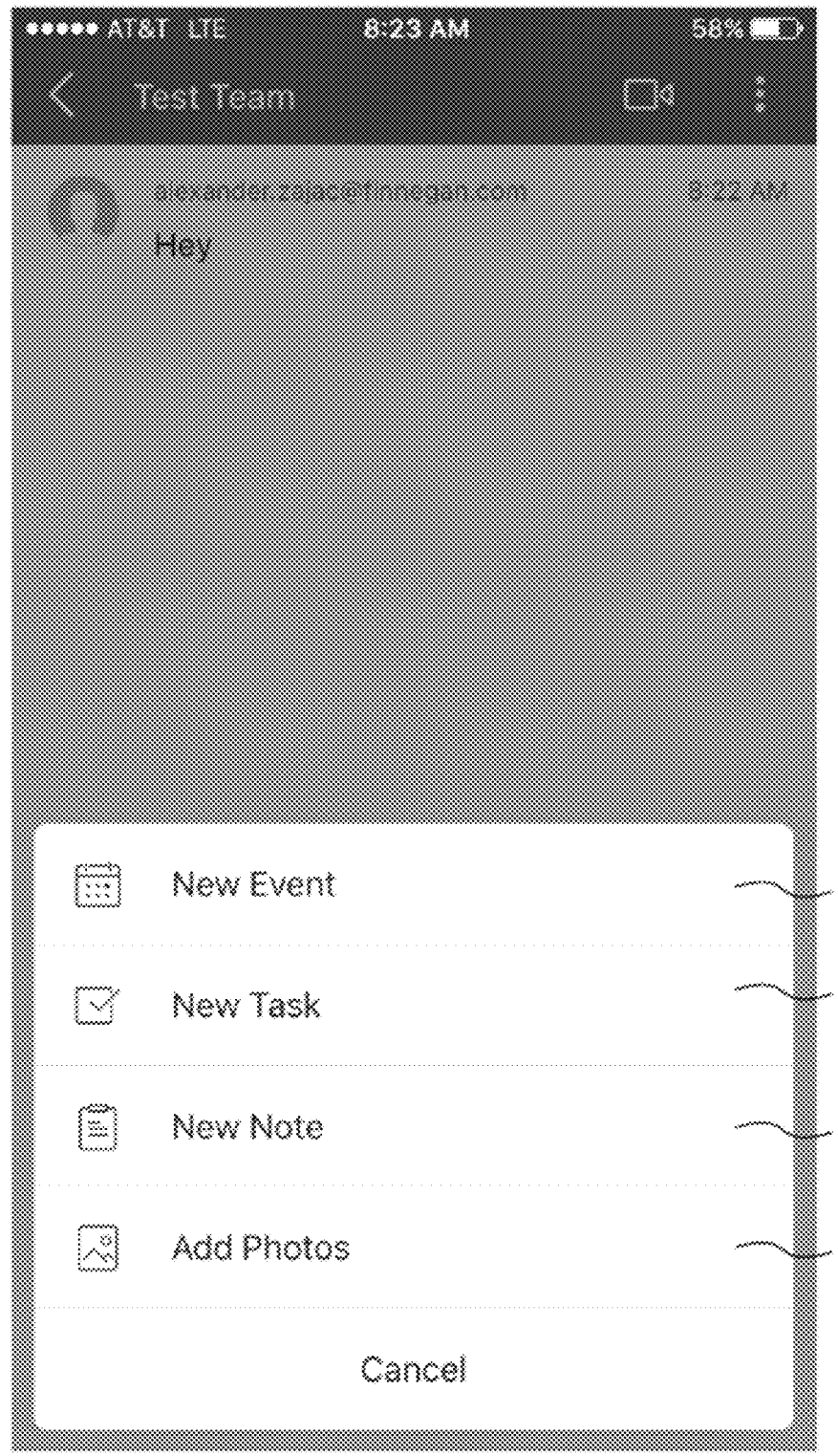
FIG. 51 is an example graphical user interface (GUI) for receiving a request to add an event, task, note, and/or file, according to yet another example embodiment of the present disclosure.

Furthermore, the formation of a team may allow for tasks and events to be created and distributed to team members. For example, GUI 4600 of FIG. 46 and GUI 4700 of FIG. 47 depict example GUIs for creating tasks within a team and events within a team, respectively. GUI 5100 of FIG. 51 depicts an additional example GUI for creating tasks or events within a team. GUI 4800 of FIG. 48 further depicts an example GUI for displaying events created within a team.

Furthermore, the formation of a team may allow for notes to be created and distributed to and/or collaboratively edited by team members. For example, GUI 4100 of FIG. 49 and GUI 5100 of FIG. 51 depict example GUIs for creating notes within a team. Moreover, the formation of a team may allow for files and links to be exchanged within a team. For example, GUI 5000 of FIG. 50 and GUI 5100 of FIG. 51 depict example GUIs for exchanging files upon selection within a team.

According to another embodiment of the present disclosure, a processor may alter a collaborative team. For example, the processor may receive at least one contact from a user. The contact may be associated with an already-created team or may be unassociated with a team. The processor may receive the contact using one or more graphical user interfaces (GUIs). For example, a user may submit the team member(s) with GUI 5200 of FIG. 52, described below.

In certain aspects, the user may receive a list of members within the team from the processor. For example, a user may receive the list of members with GUI 4000 of FIG. 40, described below. The user may then select at least one member from the list as the at least one contact. The processor may thus receive the selection and extract the at least one contact from the member list.

Similarly, the user may receive a list of contacts associated with the user from the processor. For example, a user may receive the list of contacts with GUI 3500 of FIG. 35, described below. The user may then select at least one contact from the list as the at least one contact. The processor may thus receive the selection and extract the at least contact from the contact list.

According to an aspect of the present disclosure, the processor may receive a request to alter the team from the user. For example, the user may submit the request with GUI 4000 of FIG. 40, GUI 5200 of FIG. 52, or a combination thereof.

According to an aspect of the present disclosure, the processor may verify the user has permission to alter the collaborative team. For example, if the user does not have permission to add members to the team, the processor may reject a request to add a member from the user. Similarly, if the user does not have permission to remove members from the team, the processor may reject a request to remove a member from the user.

In response to the request, the processor may alter the team based on the at least one team member and the request. For example, if the user sends a request to add the at least one contact to the team, the processor may add the contact(s) as team members. Afterward, the new member(s) may be visible (to the user, the added team member, and/or to other team members within the team) via one or more GUIs, e.g., GUI 4000 of FIG. 40. By way of further example, if the user sends a request to remove the at least one contact from the team (in this example, the at least one contact is a member within the team), the processor may remove the contact(s) as team members.

According to another embodiment of the present disclosure, a processor may create a note. A note may be associated with a single user, with a conversation (that is, a group of messages) between users, or with a team having a plurality of team members (also referred to as users).

The processor is adapted to receive and process text content. The processor may receive the text content using one or more graphical user interfaces (GUIs) (for example, by using a text box within the GUI(s)). For example, a user may input the text content via a keyboard or other input device, which then appears on GUI 5300 of FIG. 53, described below, before it is sent to the processor.

According to an aspect of the present disclosure, the processor may receive a title. The processor may receive the title using one or more graphical user interfaces (GUIs) (for example, by using a text box within the GUI(s)). For example, the user may send the title to the processor with GUI 5300 of FIG. 53, described below.

According to an aspect of the present disclosure, the processor may receive a request to add a note. For example, the user may submit the request with GUI 4900 of FIG. 49, GUI 5100 of FIG. 51, GUI 5300 of FIG. 53, or a combination thereof.

In response to the request, the processor may create the note based on the text content and the title. Afterward, the note may be visible to the user (or to team members within the team or to other users within the conversation) via one or more GUIs, e.g., GUI 4900 of FIG. 49.

According to another embodiment of the present disclosure, a processor may create a task or event. As used herein, an "event" refers to a title or name associated with an occurrence date (e.g., "Team Meeting" scheduled to occur on May 31, 2016), and a "task" refers to a title or name associated with a due date (e.g., "Legal Memo" due on Jun. 6, 2017). A task or event may be associated with a single user, with a conversation (that is, a group of messages) between users, or with a team having a plurality of team members (also referred to as users).

According to an aspect of the present disclosure, the processor may receive a date. The processor may receive the date using one or more graphical user interfaces (GUIs) (for example, by using a text box and/or an interactive calendar within the GUI(s)). For example, the user may send the title to the processor with GUI 5400 of FIG. 54, GUI 5500 of FIG. 55, GUI 5600 of FIG. 56, or a combination thereof.

According to an aspect of the present disclosure, the processor may receive a title. The processor may receive the title using one or more graphical user interfaces (GUIs) (for example, by using a text box within the GUI(s)). For example, the user may send the title to the processor with GUI 5400 of FIG. 54, GUI 5600 of FIG. 56, or a combination thereof.

According to an aspect of the present disclosure, the processor may receive a request to add a task or event. For example, the user may submit the request with GUI 4700 of FIG. 47, GUI 4800 of FIG. 48, GUI 5400 of FIG. 54, GUI 5600 of FIG. 56, or a combination thereof.

In response to the request, the processor may create the task or event based on the date and the title. Afterward, the task or event may be visible to the user (or to team members within the team or to other users within the conversation) via one or more GUIs, e.g., GUI 4700 of FIG. 47 or GUI 4800 of FIG. 48. Additionally or alternatively, the task or event may be visible to the user in a list format (e.g., via GUI 7300 of FIG. 73) and/or in a graphical format (e.g., via GUI 7500 of FIG. 75 or GUI 7600 of FIG. 76).

According to another embodiment of the present disclosure, a processor may automatically facilitate file uploads in a chat conversation. An uploaded file may be associated with a conversation (that is, a group of messages) between users or with a team having a plurality of team members (also referred to as users).

According to an aspect of the present disclosure, the processor may receive a chat message within a chat conversation. In certain aspects, the chat message may be addressed to one recipient or to a plurality of recipients. In other aspects, the chat message may be sent within a team (in which all or some of the team members comprise the recipients of the chat message).

According to an aspect of the present disclosure, the processor may automatically detect that the chat message includes at least one file. For example, the processor may determine that the chat message includes a photo along with text (as depicted in GUI 6200 of FIG. 62). Although the file comprises a single photo in this example, the chat message may include a plurality of files, either all of the same type (e.g., audio, photo, video, pdf, etc.) or of different types.

According to an aspect of the present disclosure, the processor may add the at least one file to a repository associated with the chat conversation (or with the team). After being added, the at least one file may be visible to the recipients within the conversation or to team members within the team via one or more GUIs, e.g., GUI 5000 of FIG. 50.

Alternatively, the user may send a file directly to the processor with a request to add the file to the repository. For example, the user may send the file and the request via one or more GUIs, e.g., GUI 5900 of FIG. 59.

According to another embodiment of the present disclosure, a processor may automatically collate links in a chat conversation. A link may be a hyperlink to (or text containing) a domain (such as "www.ringcentral.com") or a directory or a document (such as www.ringcentral.com/teams/overview.html).

According to an aspect of the present disclosure, the processor may receive a chat message within a chat conversation. In certain aspects, the chat message may be addressed to one recipient or to a plurality of recipients. In other aspects, the chat message may be sent within a team (in which all or some of the team members comprise the recipients of the chat message).

According to an aspect of the present disclosure, the processor may automatically detect that the chat message includes at least one link. For example, the processor may determine that text included in the chat message contains one or more links. The processor may make this determination using predetermined context clues (such as the text containing the character sequences "www."; ".com"; ".org"; ".html"; or the like) and/or employ a URL pattern matcher regular expression. Alternatively or concurrently, the processor may integrate one or more machine learning techniques with the determination such that the determination algorithm is modified each time it is used. For example, the processor may update a learning library each time the determination is made.

According to an aspect of the present disclosure, the processor may add the at least one link to a repository associated with the chat conversation (or with the team). After being added, the at least one link may be visible to the recipients within the conversation or to team members within the team via one or more GUIs.

Alternatively, the user may send a link directly to the processor with a request to add the link to the repository.

According to another embodiment of the present disclosure, a processor may facilitate messaging between users. For example, the processor may receive at least one recipient. The processor may receive the at least one recipient using one or more graphical user interfaces (GUIs). For example, a user may submit the recipient(s) using GUI 5700 of FIG. 57, described below.

In certain aspects, the user may receive a list of contacts associated with the user from the processor. For example, a user may receive the list of contacts with GUI 3500 of FIG. 35, described below. The user may then select at least one contact from the list as the at least one recipient. The processor may thus receive the selection and extract the at least one recipient from the contact list.

According to an aspect of the present disclosure, the processor may receive content from the user. As used herein, the term "content" may refer to text content (e.g., ASCII text, Unicode text, etc.), audio/video content (e.g., in the form of a video file, a photo file, an audio file, or the like), or the like. The processor may receive the content using one or more graphical user interfaces (GUIs) (for example, by using a text box within the GUI(s) and/or by using an upload dialog within the GUI(s)). For example, the user may send the title to the processor with GUI 5800 of FIG. 58, described below.

According to an aspect of the present disclosure, the processor may generate a message addressed to the at least one recipient and having the content. For example, if the content comprises a combination of text and a file, the processor may bundle the file with the text into a single message addressed to the at least one recipient. On the other hand, if the content comprises text over a threshold length, the processor may divide the text into a plurality of messages addressed to the at least one recipient.

According to an aspect of the present disclosure, the processor may transmit the message to the at least one recipient. For example, the at least one recipient may receive a notification of the incoming message via one or more user interface devices associated with the recipient. In certain aspects, the user may send a request to the processor to transmit the message; in this case, the processor may transmit the message in response to the request. For example, a user may submit the request using GUI 5700 of FIG. 57 or GUI 5800 of FIG. 58, described below.

According to another embodiment of the present disclosure, a processor may facilitate reactions to messages between users. For example, the processor may receive a selection of at least one message. The at least one message may have a plurality of recipients. The processor may receive the selection using one or more graphical user interfaces (GUIs). For example, a user may submit the selection using GUI 6000 of FIG. 60, described below.

In certain aspects, the user may receive a list of chat conversations (comprised of messages) from the processor. For example, a user may receive the list of conversations with GUI 3800 of FIG. 38, described below. The user may then select a conversation from the list, thereby selecting the messages therein as the at least one message. The processor may thus receive the selection and extract the at least one message from the selected conversation.

According to an aspect of the present disclosure, the processor may receive a request to react to the selection. In certain aspects, the processor may receive the selection separately from the request. In other aspects, the processor may receive the selection concurrently with the request. For example, GUI 6000 of FIG. 60 and GUI 4500 of FIG. 45 depict example GUIs in which a user submits a selection and a request concurrently.

According to an aspect of the present disclosure, the processor may record the reaction in response to the request. For example, the processor may record the reaction on a remote server and/or on a user interface device associated with the user. Based on the recordation, the processor may display the reaction with the selection to the user. For example, GUI 4300 of FIG. 43 depicts an example GUI in which the reaction is displayed to the user. In certain aspects, the reaction may also be transmitted for display to one or more of the plurality of recipients.

According to another embodiment of the present disclosure, a processor may alter a status of a conversation or a message. For example, the processor may receive a selection of at least one conversation or at least one message. The processor may receive the selection using one or more graphical user interfaces (GUIs). For example, a user may submit the selection using GUI 6400 of FIG. 64 or GUI 6800 of FIG. 68, described below.

In certain aspects, the user may receive a list of chat conversations (comprised of messages) from the processor. For example, a user may receive the list of conversations with GUI 3800 of FIG. 38, described below. The user may then select a conversation from the list, thereby selecting the messages therein as the at least one message. The processor may thus receive the selection and extract the at least one message from the selected conversation.

Figure 71:
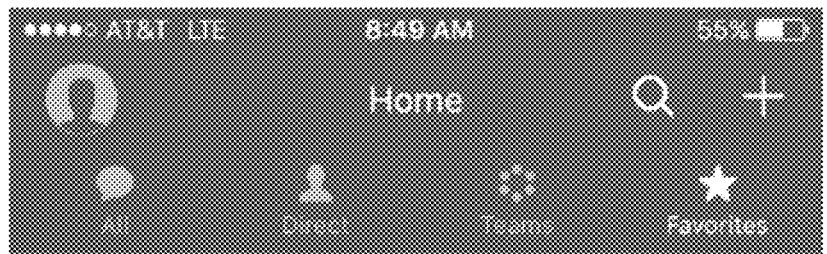
FIG. 71 is yet another example graphical user interface (GUI) for receiving a request to alter a status of a conversation, according to yet another example embodiment of the present disclosure.
Figure 71:
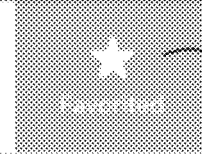
Figure 71:

According to an aspect of the present disclosure, the processor may receive a request to alter a status of the selection. In certain aspects, the processor may receive the selection separately from the request. For example, GUI 6600 of FIG. 66, GUI 6800 of FIG. 68, GUI 6900 of FIG. 69, and GUI 7100 of FIG. 71 depict example GUIs in which a user submits a selection and a request separately. In other aspects, the processor may receive the selection concurrently with the request.

Figure 67:
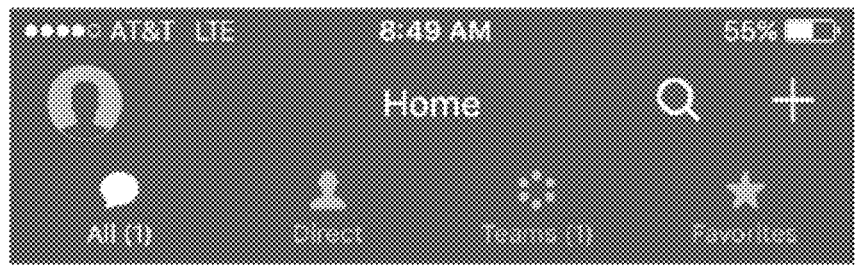
FIG. 67 is an example graphical user interface (GUI) for displaying one or more messages associated with a team having an altered status, according to yet another example embodiment of the present disclosure.
Figure 67:
Figure 67:
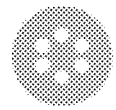
Figure 67:
Figure 67:
Figure 67:
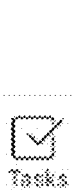
Figure 67:
Figure 67:

According to an aspect of the present disclosure, the processor may record the altered status in response to the request. For example, the processor may record the reaction on a remote server and/or on a user interface device associated with the user. Based on the recordation, the processor may display the altered status with the selection to the user. For example, GUI 6700 of FIG. 67 depicts an example GUI in which the altered status is displayed to the user.

According to another embodiment of the present disclosure, a processor may display events and tasks in a graphical format. For example, the processor may receive at least one event or task. The at least one event or task may be retrieved from a storage device operably connected to the processor and/or over a computer network.

According to an aspect of the present disclosure, the processor may automatically extract at least one date, at least one time, and at least one title from the received events or tasks. For example, the received events or tasks may be stored in one or more known data models with associated serialization formats. Such models include serialized data from which the at least one date, the at least one time, and the at least one title may be extracted.

By way of further example, the at least one event or task may include some or all of this information as metadata or other demarcated locations within a data file. By extracting the at least one date, the at least one time, and the at least one title from the metadata, the processor may achieve compatibility with calendaring and/or events scheduling features of other systems.

Alternatively or concurrently, the processor may extract some or all of this information by searching for predetermined formats within the data. For example, the processor may search for possible date formats, including, e.g., "XX/XX"; "XX/XX/XX"; "XX/XX/XXXX"; "X/X"; "X/X/XX"; "X/X/XXXX"; "X/XX/XX"; "X/XX/XXXX"; "XX/

X/XX"; "XX/X/XXXX"; and the like. By way of further example, the processor may search for possible time formats, including, e.g., "X:XX"; "XX:XX"; "X:XX [AM/FM]"; "XX:XX [AM/FM]"; and the like.

Alternatively or concurrently, the processor may integrate one or more machine learning techniques with the searching such that the searching algorithm is modified each time it is used. For example, the processor may update a learning library each time for which a date and/or a time is searched. By searching the data directly, the processor may achieve compatibility with calendaring and/or events scheduling features of other systems. Moreover, the processor may extract the at least one date, the at least one time, and the at least one title from informal data (such as an email or other message) that is not stored in a known data model for events and/or tasks.

According to an aspect of the present disclosure, the processor may generate a graphical display including the extracted dates, times, and titles. For example, the processor may generate a graphical display like the GUIs 7500, 7600 depicted in FIG. 75, FIG. 76, or a combination thereof.

According to an aspect of the present disclosure, the processor may transmit the graphical display to a user device. For example, a user device (also termed a "user interface device") may comprise, for example, a smartphone, a tablet, a laptop computer, a desktop computer, or the like.

According to another embodiment of the present disclosure, a processor may convert a chat conversation to an audio or video conference. For example, the processor may receive a selection of at least one chat message. The at least one chat message may have a plurality of recipients. The processor may receive the selection using one or more graphical user interfaces (GUIs).

According to an aspect of the present disclosure, the processor may receive a request to initiate an audio or video conference. In certain aspects, the processor may receive the selection separately from the request. In other aspects, the processor may receive the selection concurrently with the request. For example, a user may submit the selection concurrently with the request using GUI 4200 of FIG. 42, described below.

According to an aspect of the present disclosure, the processor may initiate an audio or video conference in response to the request. After initiation, the processor may notify the plurality of recipients of the initiation.

For example, initiating a conference may comprise activating a synchronous conferencing protocol or an asynchronous conferencing protocol. In activating the protocol, the processor may automatically add some or all of the plurality of recipients to the conference and then send a notification to the added recipients. Alternatively, the notification sent to some or all of the plurality of recipients may include a request for a response. For example, the notification may allow a recipient to either accept and be added to the conference or to reject and not be added to the conference. For example, a recipient may use one or more buttons on a GUI to accept or reject the invite.

Figure 9:
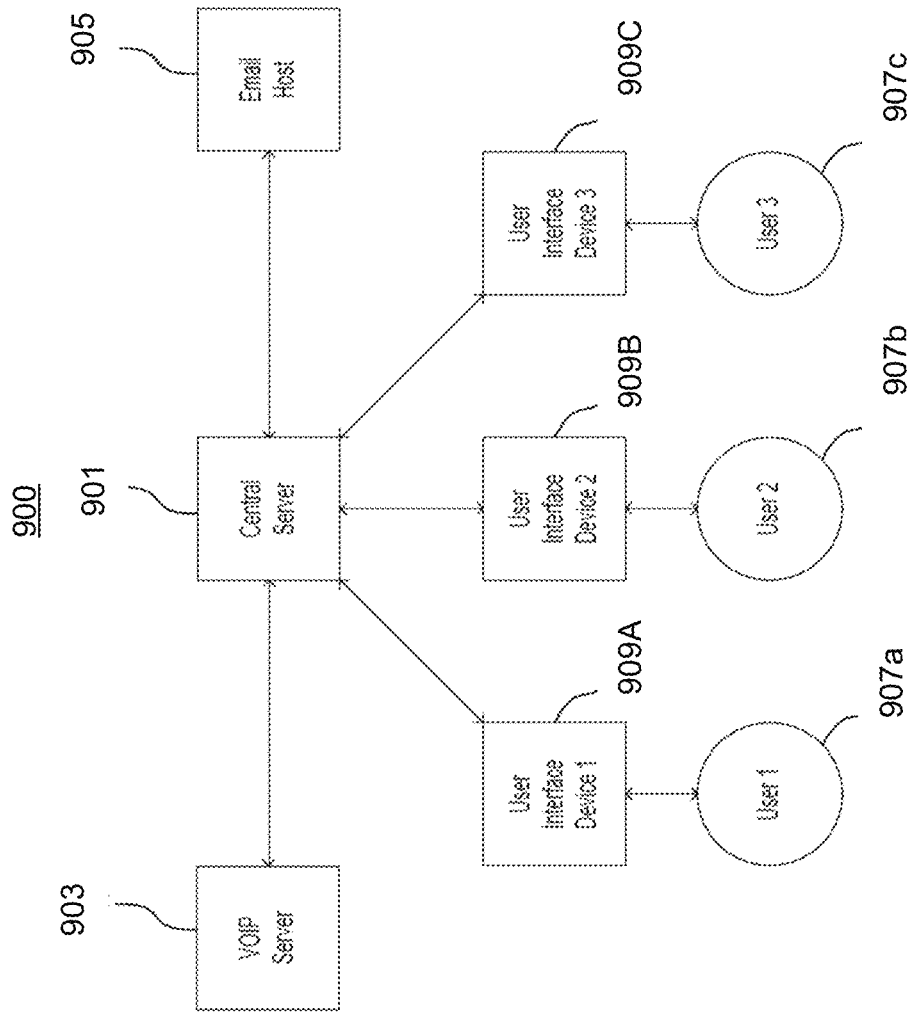
FIG. 9 is a diagram of an example system for collaboration, according to an example embodiment of the present disclosure.

Turning now to FIG. 9, there is shown a diagram of example system 900 for collaboration. As depicted in FIG. 9, system 900 may include a central server 901. Central server 901 may comprise collaboration server 8001 of FIG. 80 or any other appropriate general or specialized computer. Although depicted as a single server in FIG. 9, central server 901 may comprise a plurality of servers. The plurality of servers may be housed within one server farm or distributed across a plurality of server farms.

Central server 901 may be operably connected to one or more VoIP servers (e.g., server 903) and to one or more email hosts (e.g., host 905). In some embodiments, VoIP server 903 and/or email host 905 may comprise one or more servers. For example, one or more of the servers comprising VoIP server 903 and/or email host 905 may be one or more of the same servers comprising central server 901. In certain aspects, one or more of the servers comprising VoIP server 903 and/or email host 905 may be housed within one or more of the same server farms as central server 901 or may be distributed across one or more different server farms.

As depicted in FIG. 9, system 900 further includes a plurality of users, e.g., user 907a, user 907b, and user 907c. Although FIG. 9 depicts system 900 as having three users, one skilled in the art would understand that system 900 may have any number of users.

As further depicted in FIG. 9, each user within system 900 is operably connected to the system via at least one user interface device. For example, user 907a is connected via user interface device 909a, user 907b is connected via user interface device 109b, and user 907c is connected via user interface device 909c. A user interface device may comprise, for example, a smartphone, a tablet, a laptop computer, a desktop computer, a gaming console, or the like. Although not depicted in FIG. 9, one or more users may also be separately operably connected to VoIP server 903 and/or email host 905 via the same and/or a different user interface device.

Central server 901 may perform one or more of the disclosed methods to facilitate collaboration between two or more users of system 900. For example, central server 901 may allow for messaging between one or more users of system 900; converting of one or more emails from a user of system 900 to a chat conversation using email host 905; converting of a chat conversation between users of system 900 to an audio or video conference using VoIP server 903; and other methods of facilitating collaboration consistent with the disclosed embodiments. It is appreciated that audio may similarly be converted into textual data (i.e. transcribed) and imported into a messaging platform as chat messages.

Figure 10:
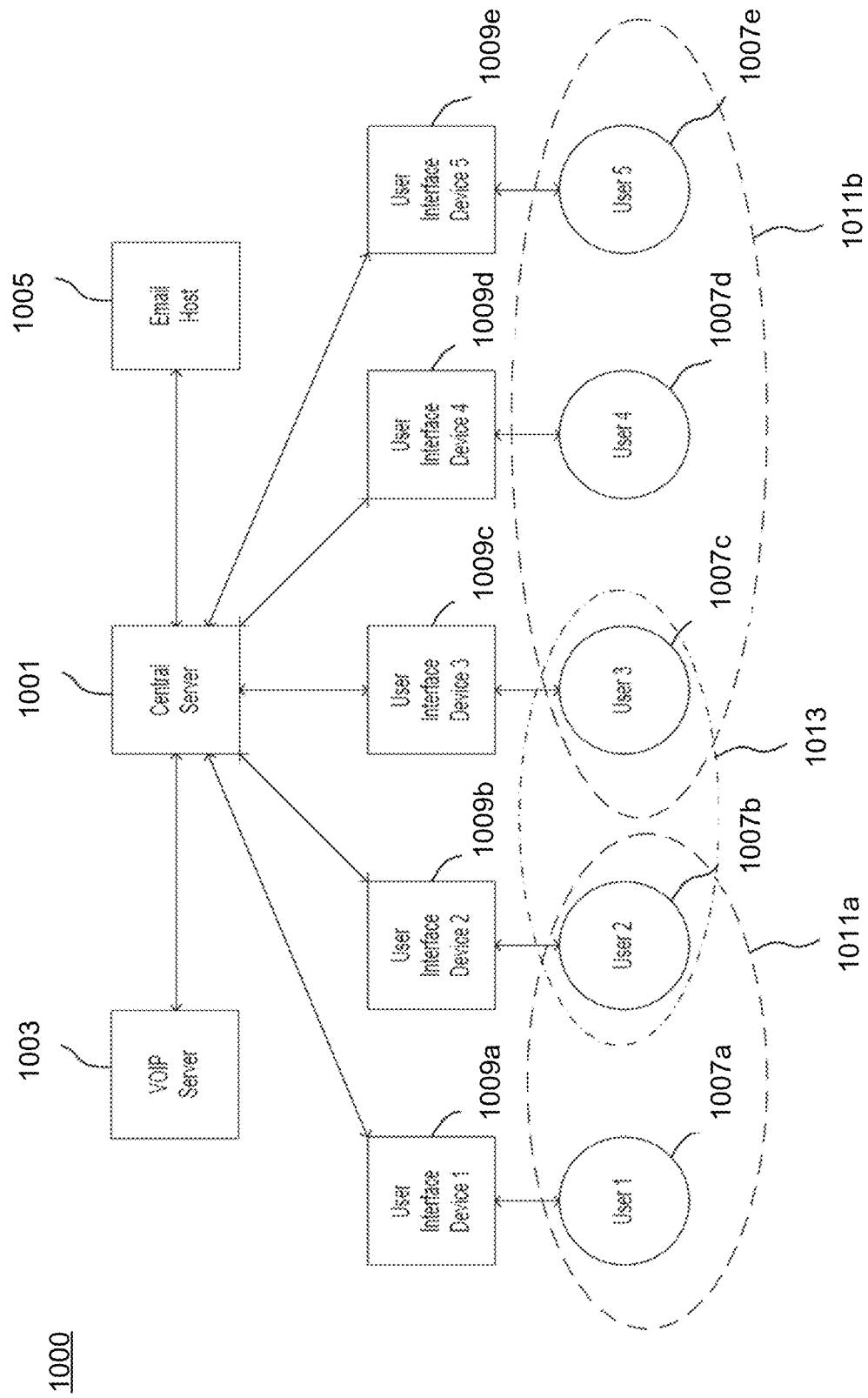
FIG. 10 is a diagram of another example system for collaboration, according to another example embodiment of the present disclosure.

FIG. 10 shows a diagram of example system 1000 for collaboration. As depicted in FIG. 10, system 1000 may include. The descriptions of central server 1001, VoIP server 1003, and email host 1005 are the same as those of central server 901, VoIP server 903, and email host 905 of FIG. 9 and will not be repeated here.

As depicted in FIG. 10, system 1000 includes user 1007a, user 1007b, user 1007c, user 1007d, and user 1007e. Although FIG. 10 depicts system 1000 as having five users, one skilled in the art would understand that system 1000 may have any number of users.

Similarly to FIG. 9, each user depicted in FIG. 10 is operably connected to the system via at least one user interface device. For example, user 1007a is connected via user interface device 1009a, user 1007b is connected via user interface device 1009b, user 1007c is connected via user interface device 1009c, user 1007d is connected via user interface device 1009d, and user 1007e is connected via user interface device 1009e. A user interface device may comprise, for example, a smartphone, a tablet, a laptop computer, a desktop computer, or the like. Although not depicted in FIG. 10, one or more users may also be separately operably connected to VoIP server 1003 and/or email host 1005 via the same and/or a different user interface device.

As depicted in FIG. 10, one or more users may belong to one or more organizations, e.g., organization 1011a or organization 1011b. As used herein, "organization" may refer to a legally cognizable grouping (for example, an organization may comprise a business or corporations and its employees may be the users therein) or an artificial grouping (for example, an organization may comprise a neighborhood and the residences thereof may comprise users within the organization).

In some embodiments, one or more users may subscribe to a service that permits access to central server 901 for collaboration functions. The subscription may be required for all collaboration functions or may be required for only a subset of "premium" collaboration functions. In other embodiments, an organization may subscribe to the service on behalf of its users. For example, a business or corporation may subscribe to the service for some or all of its employees, granting the relevant employees access to whatever collaboration functions require a subscription.

As further depicted in FIG. 10, central server 1001 may allow for one or more users to organize into teams, e.g., team 1013. As depicted in FIG. 10, team 1013 includes users from different groups or organizations. Users may also belong to more than one team simultaneously. In other embodiments, however, a team may comprise users from only one organization. Organizing into teams may allow for more seamless collaboration between users who are members of a team, for example, by allowing for integration of group chat conversations within the team with repositories for files and/or links, by allowing for automatic invitation of all team members to all tasks and events associated with the team, and the like.

As with system 900, system 1000 may perform one or more of the disclosed methods to facilitate collaboration between two or more users of system 1000 or between members of a team (e.g., team 1013). For example, central server 1002 may allow for messaging between one or more users (or within a team) of system 1000; converting of one or more emails from a user (or from a team member) of system 1000 to a group chat conversation (or to a team chat conversation) using email host 1005; converting of a chat conversation between users (or within a team) of system 1000 to an audio or video conference using VoIP server 1003; and other methods of facilitating collaboration consistent with the disclosed embodiments.

Figure 11:
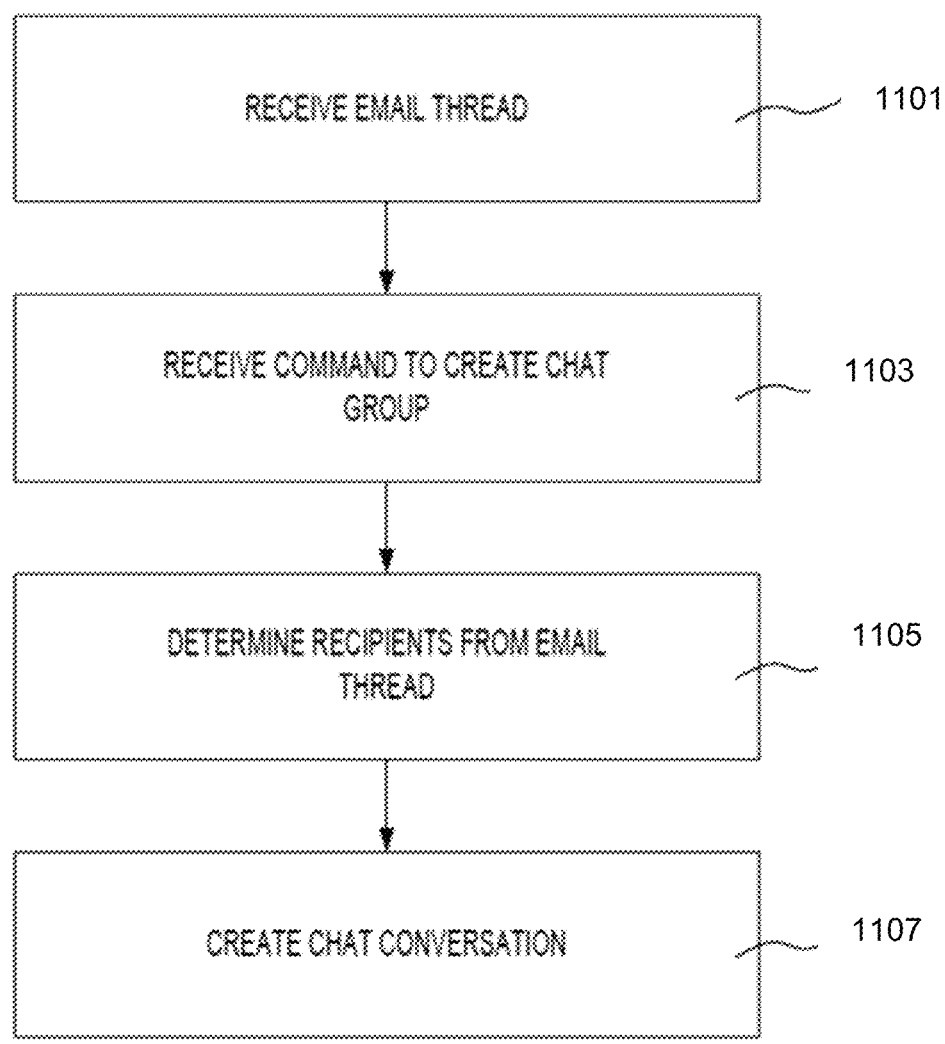
FIG. 11 is a flowchart of an example method for creating a chat group based on one or more emails, according to an example embodiment of the present disclosure.

FIG. 11 shows a flowchart of example method 1100 for creating a chat group based on one or more emails. Method 1100 may be implemented using a general-purpose computer including a processor, e.g., collaboration server 8001 of FIG. 80. Alternatively, a special-purpose computer may be built for implementing method 1100 using suitable logic elements.

At step 1101, the processor receives an email thread having at least one email. For example, the email thread may be one email with quoted text from previous emails or may be a plurality of emails, at least some of which may contain quoted text. If the email thread is a plurality of emails, at least some of the emails within the plurality may be connected by a common subject and/or recipients or may be unrelated either by subject or by recipients.

Receiving an email thread may include receiving the thread via file upload. For example, the processor may receive the email thread as one or more .msg files. Alternatively or concurrently, receiving an email thread may include receiving an authorization to retrieve the email thread from an email host and retrieving the emails from the email host using the authorization.

At step 1103, the processor receives a request to create a chat group. In some embodiments, step 1101 and step 1103 may be performed concurrently. For example, the processor may receive the email thread together with the request.

In one example, the processor may receive a forwarded email comprising or containing the email thread from a dedicated email address configured to receive emails for conversion to a chat group. In such an example, receiving the request may include determining that the email thread was received from the dedicated email address and implying the request based on the determination.

At step 1105, the processor determines one or more recipients from the email thread. For example, the processor may determine the recipients by extracting email addresses from the To, From, CC, and/or BCC fields within the email thread. By way of further example, the processor may parse text within the email thread (whether quoted text or body text) to determine the one or more recipients. In such an example, the processor may parse the text directly for one or more email addresses and/or may parse the text for context clues. For example, the processor may parse the text for names (or partial names or nicknames or the like) that are included in a contact list that the processor may use to map the parsed names to email addresses associated with the parsed names.

At step 1107, the processor creates a chat conversation. For example, the processor may activate a synchronous conferencing protocol or an asynchronous conferencing protocol. In certain aspects, the processor may automatically add one or more of the determined recipients to the chat conversation. Alternatively or concurrently, the processor may automatically notify one or more of the determined recipients about the created chat conversation and request a response. In response, a recipient may either accept the invite and be added to the chat conversation or reject the invite and not be added to the chat conversation.

Method 1100 may further include additional steps. For example, method 1100 may include pre-populating the chat conversation based on content of the email thread. In such an example, the processor may extract at least a portion of the body text from one or more emails in the thread and generate one or more chat messages between the determined recipients containing the extracted portion(s) of the email thread.

By way of further example, method 1100 may further include authenticating a user before steps 1101, 1103, and/or 1105 using any appropriate authentication method (e.g., sending a confirmation link, such as a URL, to the user).

Figure 12:
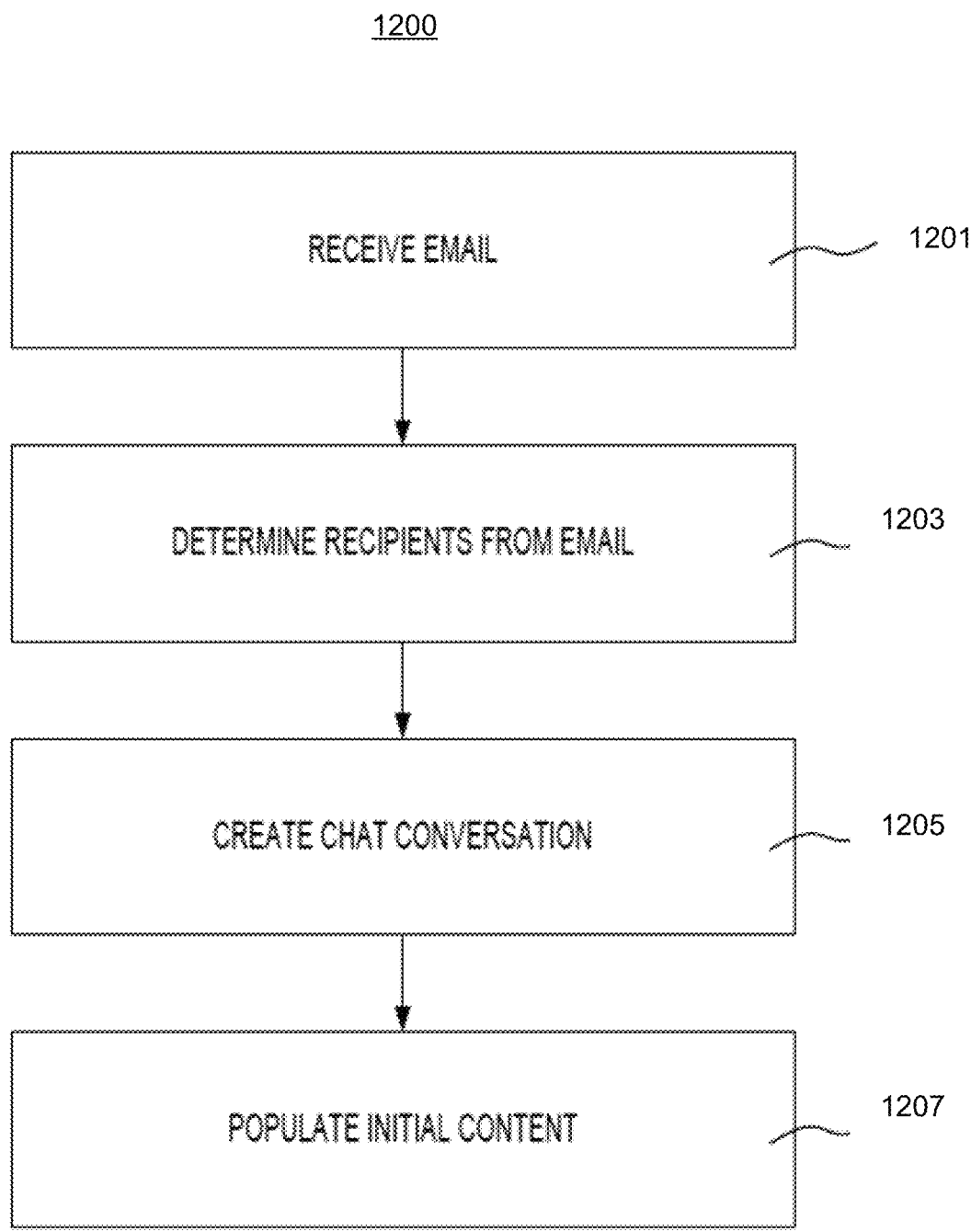
FIG. 12 is a flowchart of an example method for creating a chat conversation based on one or more emails, according to another example embodiment of the present disclosure.

FIG. 12 shows a flowchart of example method 1200 for creating a chat conversation based on one or more emails. Method 1200 may be implemented using a general-purpose computer including a processor, e.g., collaboration server 8001 of FIG. 80. Alternatively, a special-purpose computer may be built for implementing method 1200 using suitable logic elements.

At step 1201, the processor receives an email. For example, the processor may receive an email comprising an email thread included in quoted text within the email or containing an email thread included in a file attachment (e.g., an attachment comprising one or more .msg files). In some embodiments, the email may be received from a dedicated email address configured to receive emails for conversion to a chat group. In other embodiments, the email may be received via a file upload.

At step 1203, the processor determines one or more recipients from the email. For example, the processor may determine the recipients by extracting email addresses from the To, From, CC, and/or BCC fields within the email (and/or within the quoted text of the email). By way of further example, the processor may parse text within the email (whether quoted text or body text) to determine the one or more recipients. In such an example, the processor may parse the text directly for one or more email addresses and/or may parse the text for context clues. For example, the processor may parse the text for names (or partial names or nicknames or the like) that are included in a contact list that the processor may use to map the parsed names to email addresses associated with the parsed names.

At step 1205, the processor creates a chat conversation. For example, the processor may activate a synchronous conferencing protocol or an asynchronous conferencing protocol. In certain aspects, the processor may automatically add one or more of the determined recipients to the chat conversation. Alternatively or concurrently, the processor may automatically notify one or more of the determined recipients about the created chat conversation and request a response. In response, a recipient may either accept the invite and be added to the chat conversation or reject the invite and not be added to the chat conversation.

At step 1207, the processor populates initial content of the chat conversation. For example, method 1200 may include pre-populating the chat conversation based on content of the email thread. In such an example, the processor may extract at least a portion of the body text from one or more emails in the thread and generate one or more chat messages between the determined recipients containing the extracted portion(s) of the email thread.

Method 1200 may include additional steps. For example, method 1200 may further include authenticating a user before steps 1201 and/or 1203 using any appropriate authentication method (e.g., sending a confirmation link, such as a URL, to the user).

Figure 13:
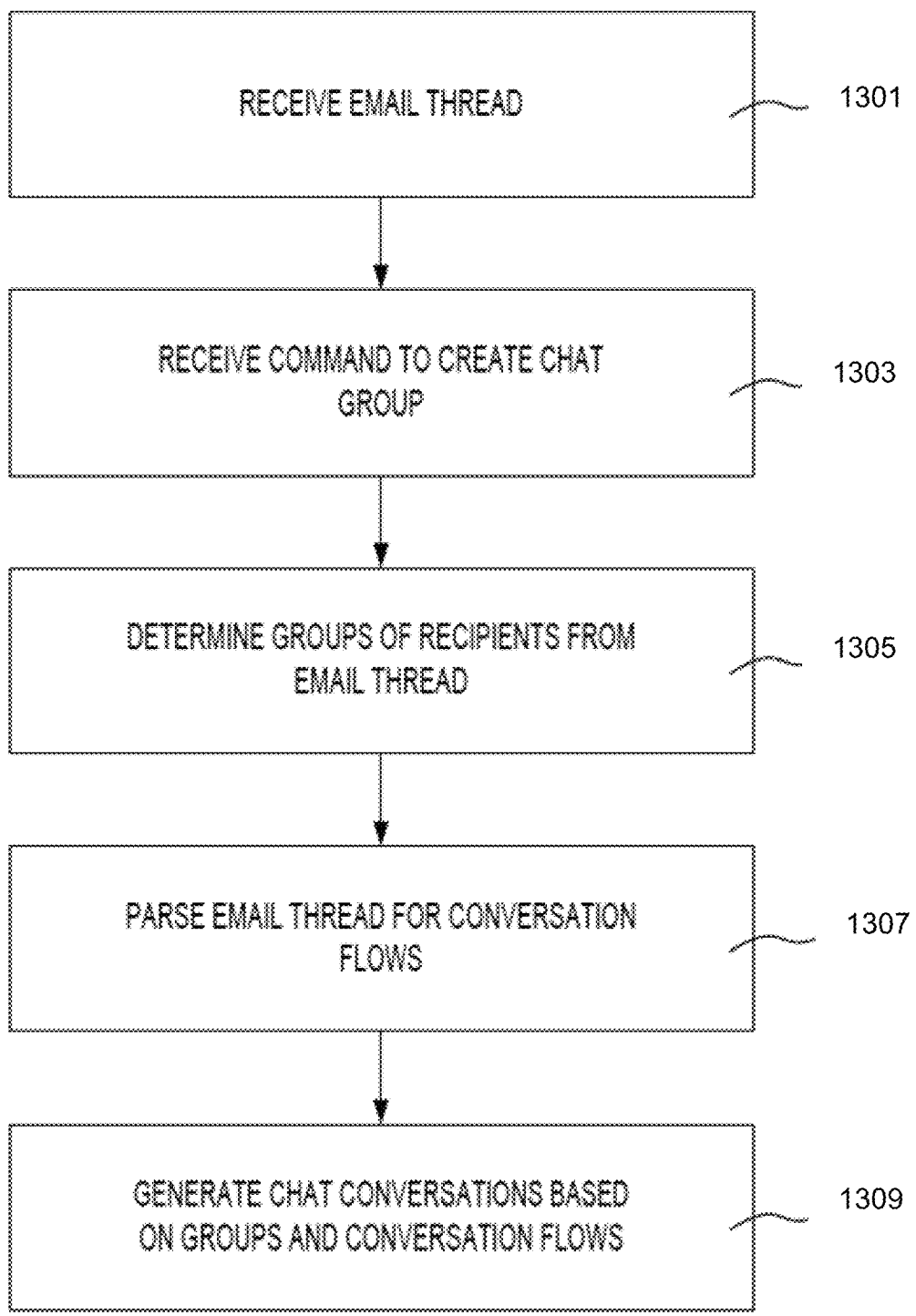
FIG. 13 is a flowchart of an example method for automatically converting one or more emails to one or more chat conversations, according to yet another example embodiment of the present disclosure.

FIG. 13 shows a flowchart of example method 1300 for automatically converting one or more emails to one or more chat conversations. Method 1300 may be implemented using a general-purpose computer including a processor, e.g., collaboration server 8001 of FIG. 80. Alternatively, a special-purpose computer may be built for implementing method 1300 using suitable logic elements.

At step 1301, the processor receives an email thread having at least one email. For example, the email thread may be one email with quoted text from previous emails or may be a plurality of emails, at least some of which may contain quoted text. If the email thread is a plurality of emails, at least some of the emails within the plurality may be connected by a common subject and/or recipients or may be unrelated either by subject or by recipients.

Receiving an email thread may include receiving the thread via file upload. For example, the processor may receive the email thread as one or more .msg files. Alternatively or concurrently, receiving an email thread may include receiving an authorization to retrieve the email thread from an email host and retrieving the emails from the email host using the authorization.

At step 1303, the processor receives a request to create a chat group. In some embodiments, step 1301 and step 1303 may be performed concurrently. For example, the processor may receive the email thread together with the request.

In one example, the processor may receive a forwarded email comprising or containing the email thread from a dedicated email address configured to receive emails for conversion to a chat group. In such an example, receiving the request may include determining that the email thread was received from the dedicated email address and implying the request based on the determination.

At step 1305, the processor determines one or more groups of recipients from the email thread. For example, the processor may determine the groups of recipients by extracting email addresses from the To, From, CC, and/or BCC fields within the email (and/or within the quoted text of the email) and grouping the email addresses accordingly (e.g., the addresses in CC and/or BCC fields may comprise one group, the addresses in "To" and/or "From" fields may comprise another group, etc.). By way of further example, the processor may parse text within the email (whether quoted text or body text) to determine the groups of recipients. In such an example, the processor may parse the text directly for one or more email addresses and/or may parse the text for context clues. For example, the processor may parse the text for names (or partial names or nicknames or the like) that are included in a contact list that the processor may use to map the parsed names to email addresses associated with the parsed names. The processor may further use context clues to assist with grouping. For example, the processor may group the addresses based on the frequency with which the addresses and/or associated names appear in the text.

At step 1307, the processor parses the email thread to determine one or more conversation flows. For example, the processor may determine a temporal flow within the email thread by ranking the emails within the thread based on timestamps indicating when the emails were sent and/or timestamps indicating when the emails were received. This information may be directly extracted from quoted text in the emails within the thread or from metadata of the emails within the thread. Alternatively or concurrently, this information may be extracted from context clues based on text within the emails. For example, text within the emails may refer back to previous portions of the conversation or may state that a follow-up will be forthcoming. The processor may map these context clues to particular emails or to quoted text within one or more emails and then construct a conversation timeline based on the context clues and the mapping. The timeline may comprise one line or may be multi-lined. For example, if the email thread split into two sub-groups of recipients with concurrent emails exchanged within the sub-groups, the processor may construct a fork within the timeline representing a split in the temporal flow. The fork may represent a divide between a main timeline and a tributary timeline, and, in some embodiments, the sub-groups may correspond to the determined groups from step 1305.

By way of further example, the processor may determine a logical flow within the email thread based on conversation dynamics. For example, context clues within the emails may indicate if a particular email or particular piece of quoted text is related to one or more subjects. The one or more subjects may be from a pre-populated list or may be derived on-the-fly by the processor. Based on this subject categorization, the processor may construct a conversation map of the logical flow within the email thread. The map may comprise one thread or may be multi-threaded. For example, if a side conversation ensues within an email thread, the processor may construct a fork within the map representing a split in the logical flow. The fork may represent a divide between a main map and a tributary map, and, in some embodiments, sub-groups of recipients in one or more tributary maps may correspond to the determined groups from step 1305.

Any of the above algorithms for determining a temporal flow or a logical flow may be enhanced with machine learning. For example, the processor may be seeded with a learning library or construct a learning library on-the-fly which then allows for the algorithm (and/or the library) to be updated each time it is used. Other machine learning approaches are also possible, for example, neural networks, Bayesian networks, deep learning, or the like.

At step 1309, the processor generates one or more chat conversations based on the determined group(s) and the determined conversation flow(s). For example, the processor may activate a synchronous conferencing protocol or an asynchronous conferencing protocol. The processor may automatically add one or more of the recipients of a group to an associated chat conversation. Alternatively, the processor may automatically notify one or more of the recipients of the chat conversation and request a response, as described above.

In cases where the conversation timeline or the conversation map contains a fork, the processor may generate two chat conversations, one associated with the main timeline or map and one associated with the tributary timeline or map. If the timeline or map contains a plurality of forks, the processor may repeat this process for some or all of the forks. In certain aspects, a chat conversation associated with a tributary timeline or map may include the same recipients as the conversation associated with the main timeline or map. In other aspects, a chat conversation associated with a tributary timeline or map may include a sub-group of the recipients of the conversation associated with the main timeline or map. In still other aspects, some or all of the recipients of a chat conversation associated with a tributary timeline or map may differ from the recipients of the chat conversation associated with the main timeline or map.

Furthermore, the processor may pre-populate the chat conversation(s) based on the one or more conversation flows. For example, the processor may generate chat messages between recipients that contain portions of the email thread in an order determined by the conversation flows. For example, if the conversation flow is temporal, the order may follow the constructed conversation timeline. Similarly, if the conversation flow is logical, the order may follow the constructed conversation map. The pre-populated chat messages may be generated within a chat conversation associated with a main or particular tributary timeline or map, depending on the location of the corresponding portion of the email thread within the timeline or map.

Method 1300 may further include additional steps. For example, method 1300 may further include authenticating a user before steps 1301, 1303, and/or 1305 using any appropriate authentication method (e.g., sending a confirmation link, such as a URL, to the user).

Figure 14:
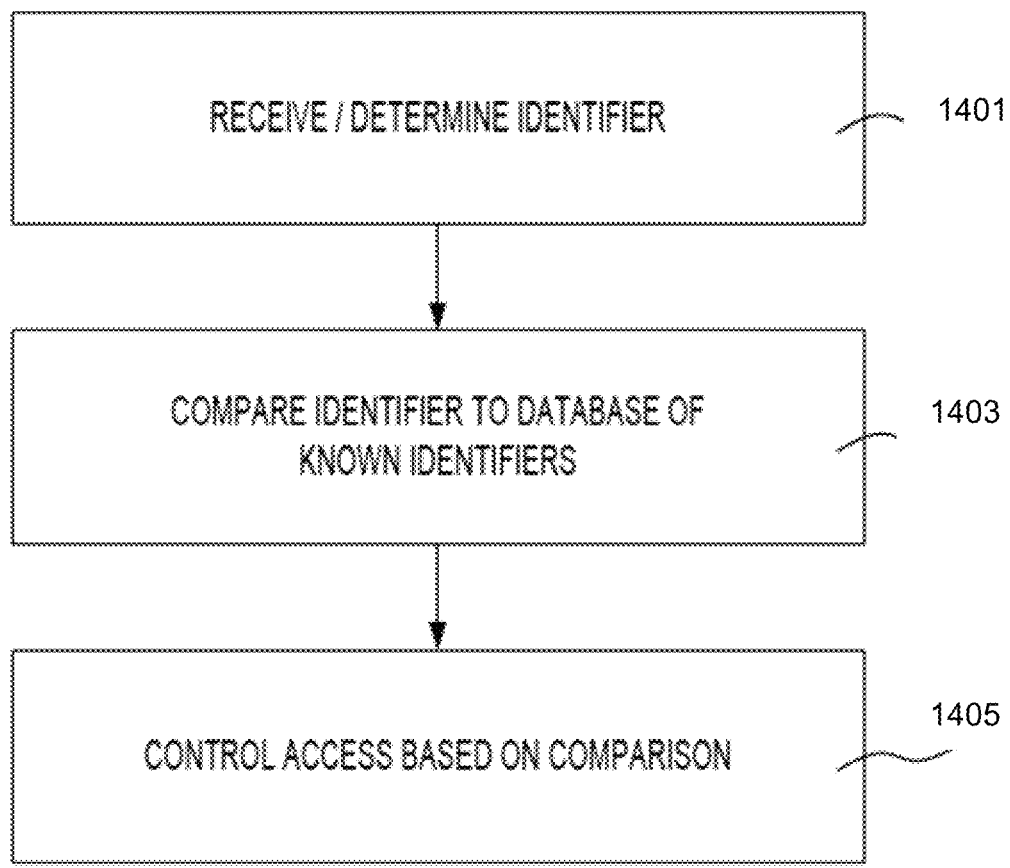
FIG. 14 is a flowchart of an example method for authenticating a user of a collaboration service, according to yet another example embodiment of the present disclosure.

FIG. 14 shows a flowchart of example method 1400 for authenticating a user of a collaboration service. Method 1400 may be implemented using a general-purpose computer including a processor, e.g., collaboration server 8001 of FIG. 80. Alternatively, a special-purpose computer may be built for implementing method 600 using suitable logic elements.

At step 1401, the processor receives an identifier from and/or determines an identifier associated with a user. For example, in embodiments where the processor receives the identifier, the identifier may comprise a known identity, e.g., a username, an email address, or the like, or an authenticator, e.g., a password, a PIN, biometric data, or the like. On the other hand, in embodiments where the processor determines the identifier, the identifier may comprise a machine identifier, e.g., an IP address, a computer name, or the like.

According to an aspect of the present disclosure, the processor may control access to the collaboration service based on the comparison. For example, if the identifier does not match a known identifier, the processor may refuse to accept data and/or requests from the user. Similarly, if the identifier matches a known identifier, the processor may then accept data from the user and/or execute requests received from the user At step 1403, the processor compares the identifier to a database of known identifiers. For example, the processor may confirm that an IP address matches a known IP address in the database. In certain aspects, the processor may hash or otherwise encrypt some or all of the identifier and compare the encrypted identifier to a database of known encrypted identifiers. For example, the processor may hash a received PIN and then confirm that the hashed PIN matches a known hashed PIN in the database.

At step 1405, the processor controls access to the collaboration service based on the comparison. For example, if the identifier does not match a known identifier, the processor may refuse to accept data and/or requests from the user. Similarly, if the identifier matches a known identifier, the processor may then accept data from the user and/or execute requests received from the user. In some embodiments, authentication may be required for only a subset of "premium" collaboration functions. For example, in such embodiments, the processor may only accept subsets of data and/or subsets of requests from the user unless the identifier matches a known identifier. Alternatively or concurrently, the database of known identifiers may also indicate whether the associated user is permitted to access the "premium" functions.

Figure 15:
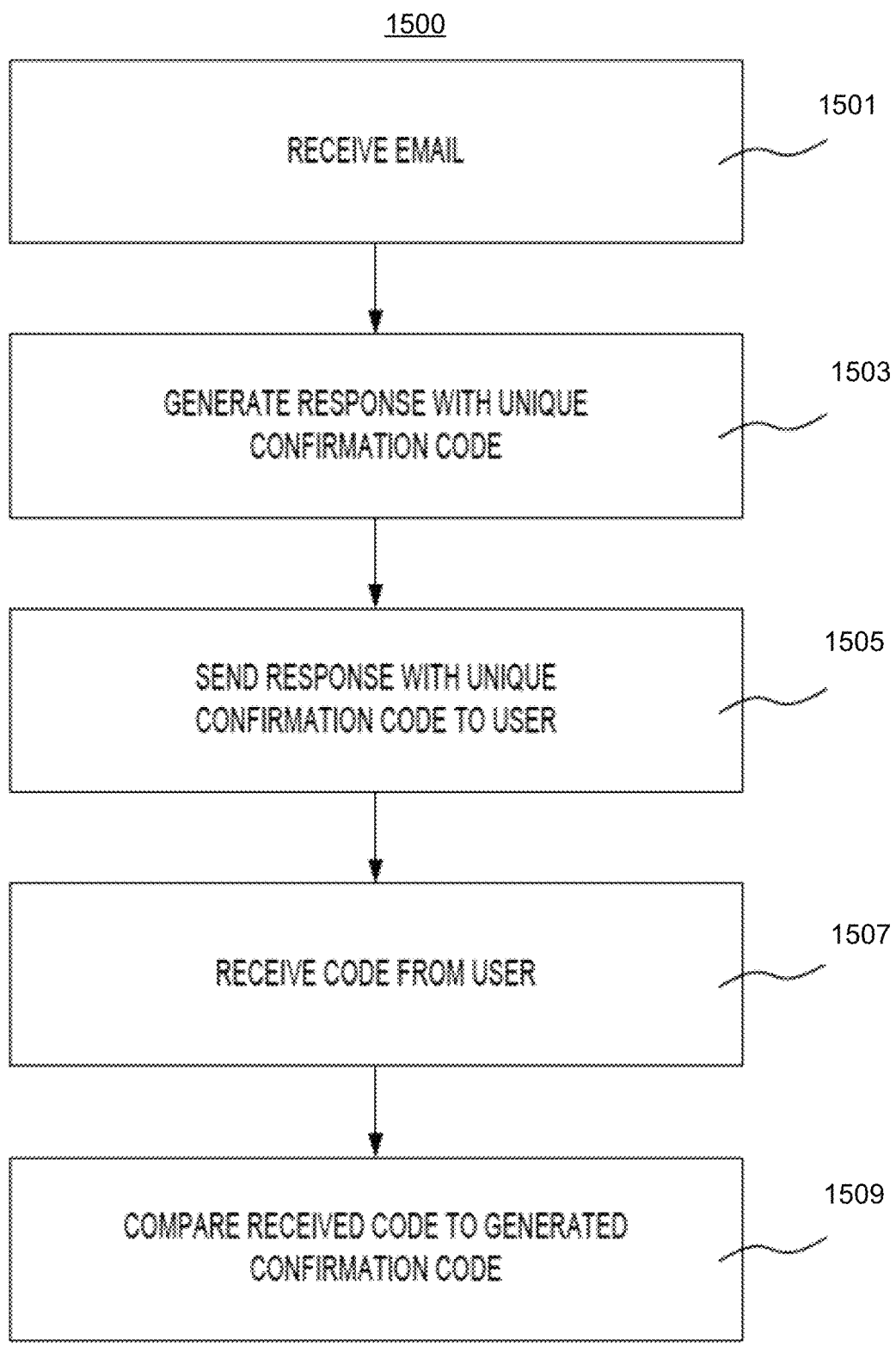
FIG. 15 is a flowchart of another example method for authenticating a user of a collaboration service, according to yet another example embodiment of the present disclosure.

FIG. 15 shows a flowchart of example method 1500 for authenticating a user of a collaboration service. Method 1500 may be implemented using a general-purpose computer including a processor, e.g., collaboration server 8001 of FIG. 80. Alternatively, a special-purpose computer may be built for implementing method 700 using suitable logic elements. Method 1500 may be implemented independently of or in combination with method 1400 of FIG. 14.

At step 1501, the processor receives an email from a user. For example, the email may comprise an email thread for converting to a chat conversation.

At step 1503, the processor generates a response having a unique confirmation code. For example, the confirmation code may be a one-time passcode or other unique code. By way of further example, the processor may generate a response having a unique CAPTCHA.

At step 1505, the processor sends the response having the unique confirmation code to the user. For example, the processor may transmit an email having the confirmation code to the user (e.g., via an email host) or may transmit a Short Message Service (SMS) message, a Multimedia Messaging Service (MMS) message, or the like having the confirmation code to a device associated with the user (e.g., a smartphone). By way of further example, the processor may present the confirmation code directly to the user—for example, if the confirmation code is a CAPTCHA, the processor may transmit the CAPTCHA (e.g., to a web browser) for display on a screen associated with the user (e.g., on a laptop or desktop computer).

At step 1507, the processor receives a code from the user. For example, the processor may receive an email or text message (SMS message, MMS message, etc.) from the user having a code. By way of further example, the processor may use a text box within a GUI to receive the code from the user.

At step 1509, the processor compares the received code to the unique confirmation code. In some embodiments, the processor may hash or otherwise encrypt some or all of the code received from the user and compare the encrypted code to the encrypted unique confirmation code. For example, the processor may hash the code received from the user and then confirm that it matches the hashed unique confirmation code.

Method 1500 may further include additional steps. For example, method 1500 may further include controlling access to the collaboration service based on the comparison. For example, if the received code does not match the unique confirmation code, the processor may refuse to accept data and/or requests from the user. Similarly, if the received code matches the unique confirmation code, the processor may then accept data from the user and/or execute requests received from the user. In some embodiments, authentication may be required for only a subset of "premium" collaboration functions. For example, in such embodiments, the processor may only accept subsets of data and/or subsets of requests from the user unless the received code matches the unique confirmation code.

Figure 16:
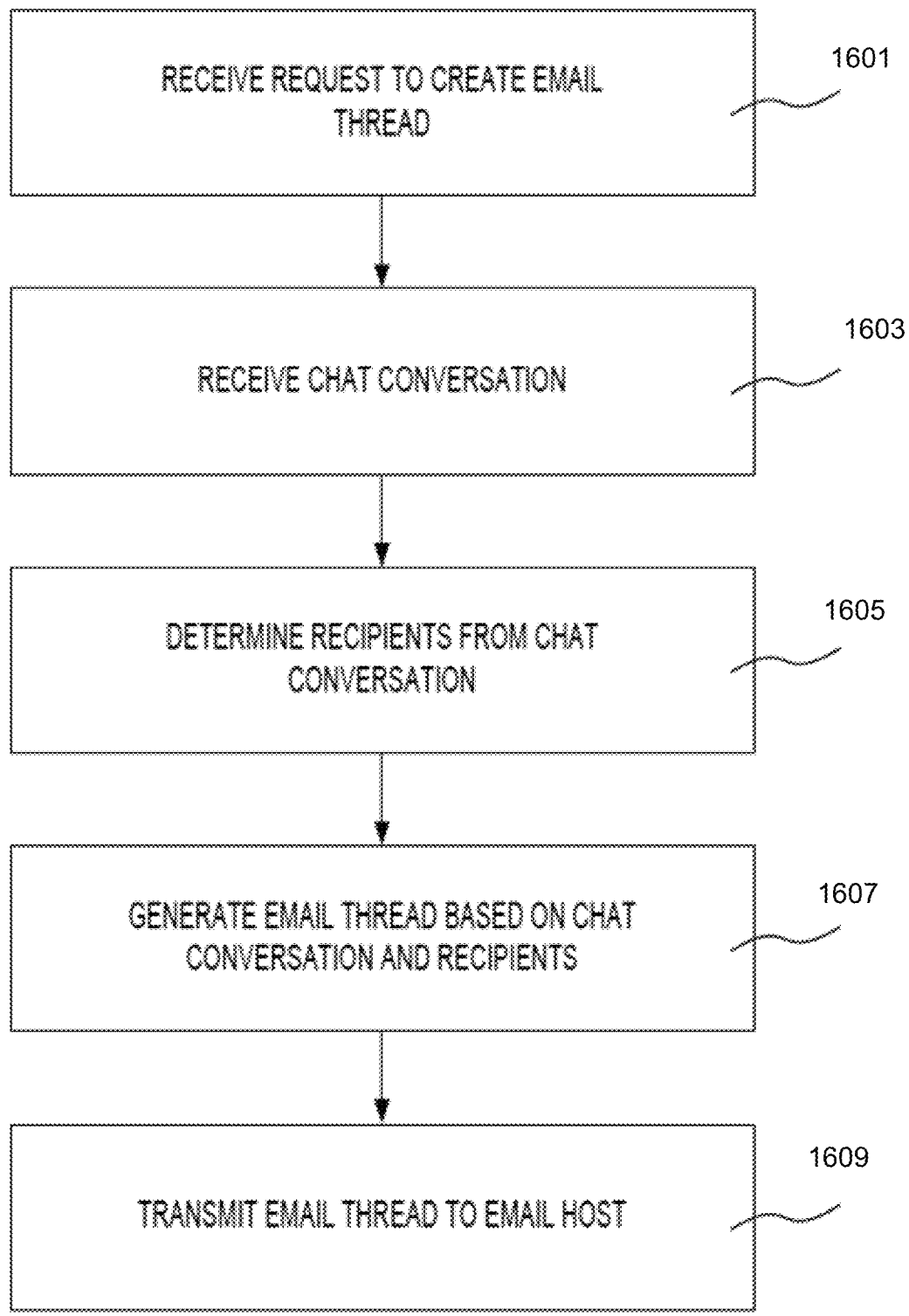
FIG. 16 is a flowchart of an example method for automatically converting a chat conversation to an email thread, according to yet another example embodiment of the present disclosure.

FIG. 16 shows a flowchart of example method 1600 for automatically converting a chat conversation to an email thread. Method 1600 may be implemented using a general-purpose computer including a processor, e.g., collaboration server 8001 of FIG. 80. Alternatively, a special-purpose computer may be built for implementing method 1600 using suitable logic elements.

At step 1601, the processor receives a request to create an email thread. At step 1603, the processor receives a chat conversation. For example, the processor may receive one or more files (e.g., .msg files) having the chat conversation either directly from one or more storage devices or over one of more networks. Alternatively or concurrently, the processor may receive an authorization to retrieve the chat conversation from one or more servers in a chat network and then retrieve the chat messages from the servers using the authorization.

In some embodiments, step 1601 and step 1603 may be performed concurrently. For example, the processor may receive the chat conversation together with the request.

At step 1605, the processor determines one or more recipients from the chat conversation. For example, the processor may determine the recipients by extracting email addresses directly from the chat conversation. By way of further example, the processor may extract usernames directly from the chat conversation and then map the extracted usernames to email addresses associated with the usernames.

By way of further example, the processor may parse text within the chat conversation to determine the one or more recipients. The processor may parse the text directly for one or more email addresses and/or may parse the text for context clues. For example, the processor may parse the text for names (or partial names or nicknames or the like) that are included in a contact list maintained by the user. Such a contact list may allow the processor to map the parsed names to email addressed associated with the parsed names. Alternatively or concurrently, the processor may send a request to, for example, a VoIP server or other chat server, to receive a list of participants, match names of the participants, and provide the processor (and/or an email host) with a list of email addresses.

At step 1607, the processor generates an email thread based on the chat conversation. For example, as described above with respect to method 1300, the processor may determine a temporal flow or a logical flow for the chat conversation and construct a conversation timeline or conversation map therefrom. Based on this timeline or map, the processor may generate a plurality of emails between the determined recipients. For example, the processor may generate an email from a first recipient to a second recipient with a third and fourth recipient list on the CC line. In this example, the generated email may include text, files, and/or links from the chat conversation.

By way of further example, the plurality of emails may include one or more initial emails and include replies thereto or forwards thereof. The plurality of emails may further include replies to replies, forwards of replies, replies to forwards, forwards of forwards, or the like. In certain aspects, replies and forwards may include all of the same recipients as emails to which the replies and forwards are related or may include different recipients. In certain aspects, a reply or a forward may shift some recipients from a CC field to a BCC field or vice versa, from a CC field to the To field or vice versa, from a BCC field to the To field or vice versa, or the like.

For example, the processor may determine whether to place a recipient on a CC field, a BCC field, or a To field based on how active the recipient was in the chat conversation(s), based on context clues within the chat conversation(s), or the like. In some examples, a user that sent a number of chat messages over a first threshold may be included on a To field, a user that sent a number of chat messages under the first threshold but over a lower, second threshold may be included on a CC field, and a user that sent a number of messages under the second threshold may be included on a BCC field. In certain aspects, the processor may receive input from the user indicating whether a recipient should be placed on a CC field, a BCC field, or a To field. The processor may also use a combination of automatic determination and user input in order to place a recipient on a CC field, a BCC field, or a To field.

At step 1609, the processor transmits the generated email thread to an email host. For example, the processor may forward at least a portion of the email thread to the email host for direct placement in the email accounts of at least one of the recipients. In another example, the processor may transmit at least a portion of the email thread to the email host for delivery. In such an example, the processor may recreate the chat conversation by having emails sent between the recipients that mimic the chat messages between the recipients. The processor may use a combination of forwarding the email thread and transmitting the emails for delivery in order to recreate the chat conversation.

Method 800 may further include additional steps. For example, method 1600 may further include authenticating a user before steps 1601, 1603, and/or 1605. For example, authenticating a user may include at least one of method 1400 or method 1500, described above, a combination thereof, or any other appropriate authentication method (e.g., sending a confirmation link, such as a URL, to the user).

Figure 17:
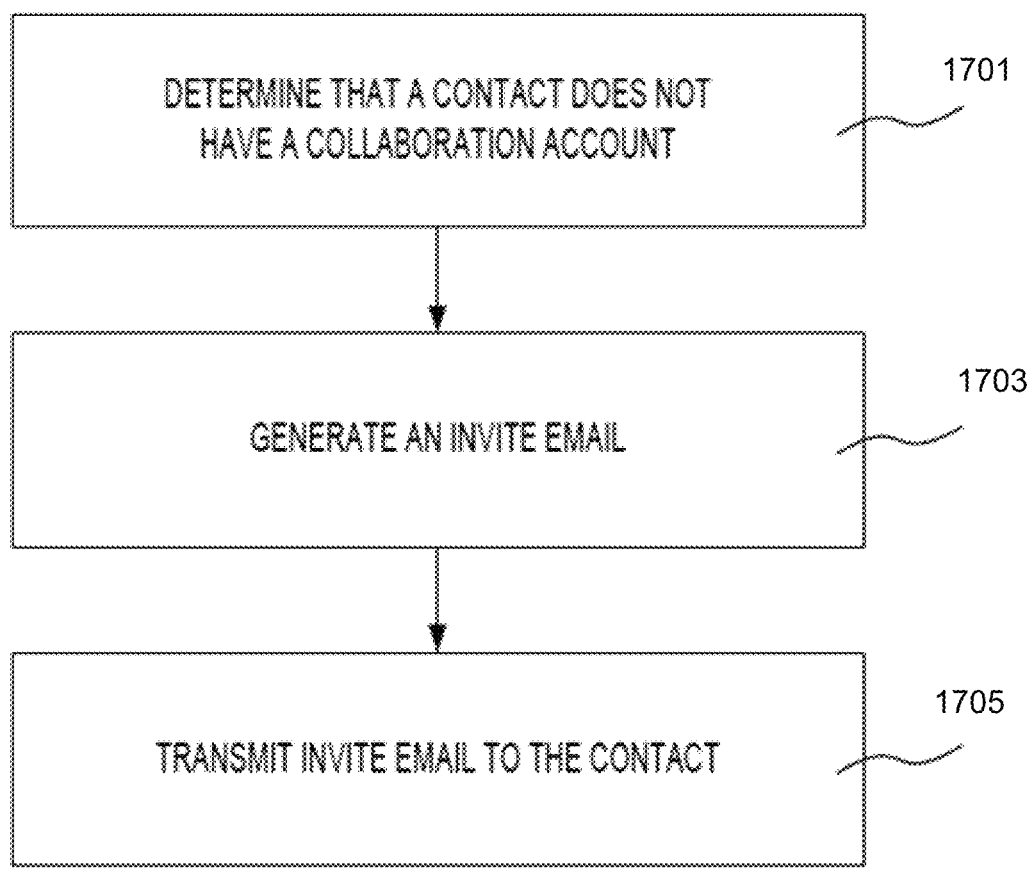
FIG. 17 is a flowchart of an example method for automatically inviting a user to join a collaboration service, according to yet another example embodiment of the present disclosure.

FIG. 17 shows a flowchart of example method 1700 for automatically inviting a user to join a collaboration service. Method 1700 may be implemented using a general-purpose computer including a processor, e.g., collaboration server 8001 of FIG. 80. Alternatively, a special-purpose computer may be built for implementing method 1700 using suitable logic elements.

At step 1701, the processor determines that a contact does not have an account with the collaboration service. The processor may make this determination using a database of known users. For example, if the processor receives an email address or a phone number that does not appear in the database, the processor may determine that the contact associated with the email address or phone number does not have an account. Similarly, if the processor receives a username that does not appear in the database, the processor may determine that the contact associated with the username does not have an account. In certain aspects, the processor may hash or otherwise encrypt some or all of the email address, username, or the like and compare the encrypted code to a database of known users. For example, the processor may hash the received email address and then determine whether the hashed email address appears in the database of known users.

In some embodiments, the processor may receive the contact directly from a user. For example, the user may send the contact to the processor with a request to invite the contact to join the collaboration service. In other embodiments, the processor may make the determination after the user sends the contact to the processor for adding to a chat conversation, to a team, or the like.

At step 1703, the processor generates an invite email. For example, an invite email may comprise an email addressed to the contact that includes a link to register for (that is, create an account with) the collaboration service in the subject and/or body of the email. An example of an email having a link to register is depicted in GUI 3200 of FIG. 32.

Alternatively or concurrently at step 1703, the processor may generate a different kind of invite message, e.g., a text message (e.g., SMS message, MMS message, etc.). The invite message may be addressed to the contact and include a link to register for the collaboration service. An example of a text message having a link to register is depicted in GUI 3500 of FIG. 35.

In some embodiments, the link may send the contact to a pre-registered account. For example, if the user sends the link to the contact, the processor may determine demographic information (e.g., name, email, or the like) from the user and create an account associated with the contact based on the demographic information. In such an example, the contact need not re-enter any demographic information in order to register because the contact has already been pre-registered by the processor.

At step 1705, the processor transmits the invite email to the contact. For example, the processor may transmit the email to an email host for delivery to the inbox associated with the contact. Other methods of transmission may be used if the kind of invite message is different. For example, if the message is a text message, the processor may transmit the email to an SMS host for delivery to a phone associated with the contact.

Method 900 may further include additional steps. For example, method 1700 may further include authenticating a user before steps 1701 and/or 1703. For example, authenticating a user may include at least one of method 1400 or method 1500, described above, a combination thereof, or any other appropriate authentication method (e.g., sending a confirmation link, such as a URL, to the user).

Figure 18:
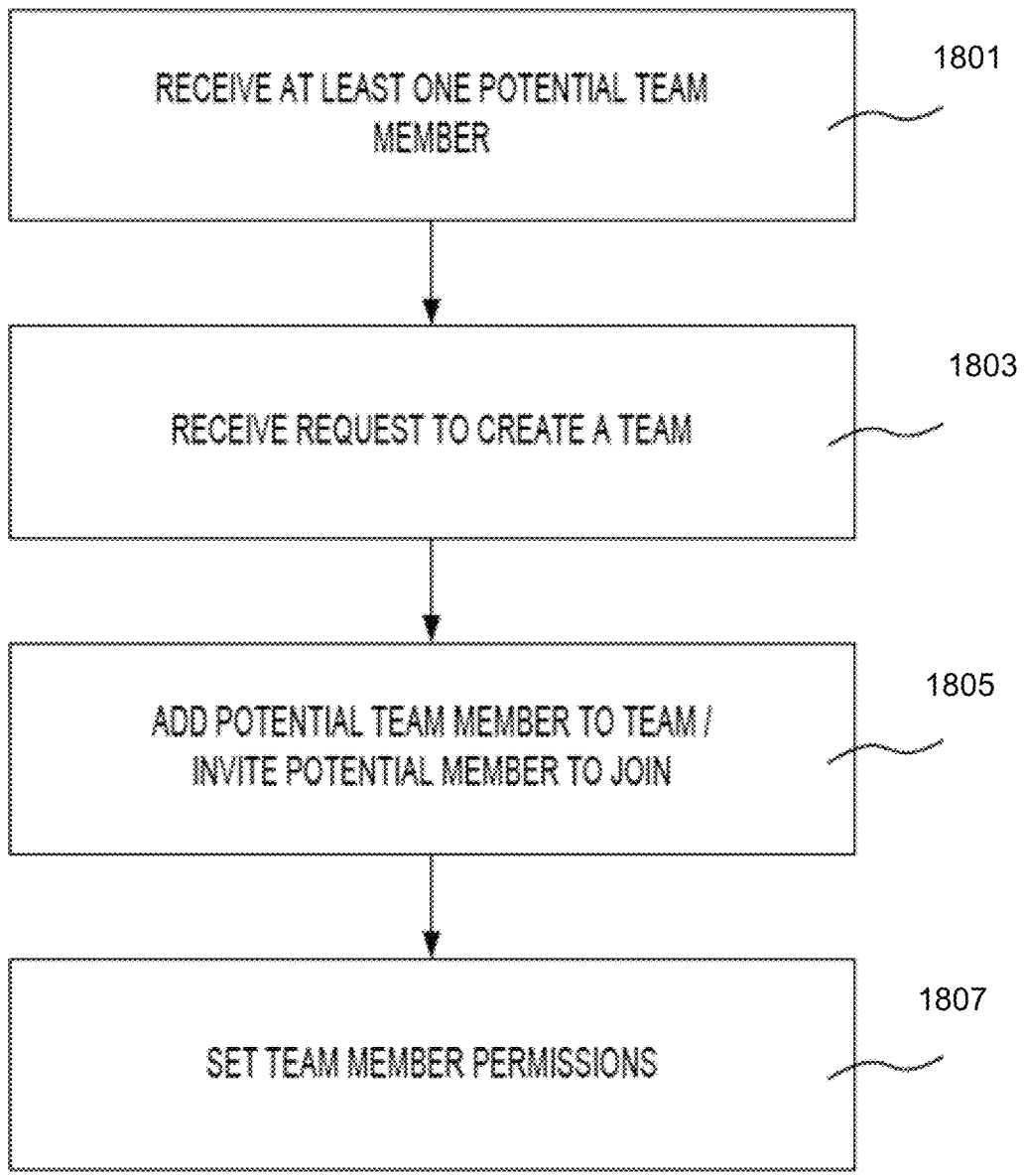
FIG. 18 is a flowchart of an example method for creating a collaborative team, according to yet another example embodiment of the present disclosure.

FIG. 18 shows a flowchart of example method 1800 for creating a collaborative team. Method 1800 may be implemented using a general-purpose computer including a processor, e.g., collaboration server 8001 of FIG. 80. Alternatively, a special-purpose computer may be built for implementing method 1800 using suitable logic elements.

At step 1801, the processor receives at least one identifier of a potential team member. For example, the processor may receive the at least one identifier of a potential team member from a user. In some embodiments, the processor may send the user a list of contacts associated with the user. The user may then select at least one contact from the list as the at least one potential team member, and the processor may extract the identifier of the at least one potential team member from the contact list.

At step 1803, the processor receives a request to create a team. In some embodiments, the processor also receives a request to add the at least one potential team member to the team. The two requests may comprise the same request. For example, the user may select one or more potential team members and then submit the potential team members with a request to create a team with the potential team members using a single button.

At step 1805, the processor adds the at least one potential team member to team and/or invites the at least one potential team member to join. By being added to a team, the at least one potential team member becomes a team member. Accordingly, the processor may make the added team member visible to the user, to the added team member, and/or to other team members within the team. Alternatively, the processor may invite the at least one potential team member using method 1700 of FIG. 17 or any other appropriate method of invitation.

At step 1807, the processor sets team member permissions. For example, the processor may set permissions such that some team members are allowed to add and/or remove team members while other team members are not. Similarly, the processor may set permissions such that some team members are allowed to add certain kinds of content to the team (e.g., files, links, notes, events, tasks, etc.) while other team members are not. These permissions may be based on default settings, options received from a user initiating creation of the team or from other team members, or the like.

Method 1800 may further include additional steps. For example, method 1000 may further include authenticating a user before steps 1801, 1803, and/or 1805 using any appropriate authentication method (e.g., sending a confirmation link, such as a URL, to the user).

Figure 19:
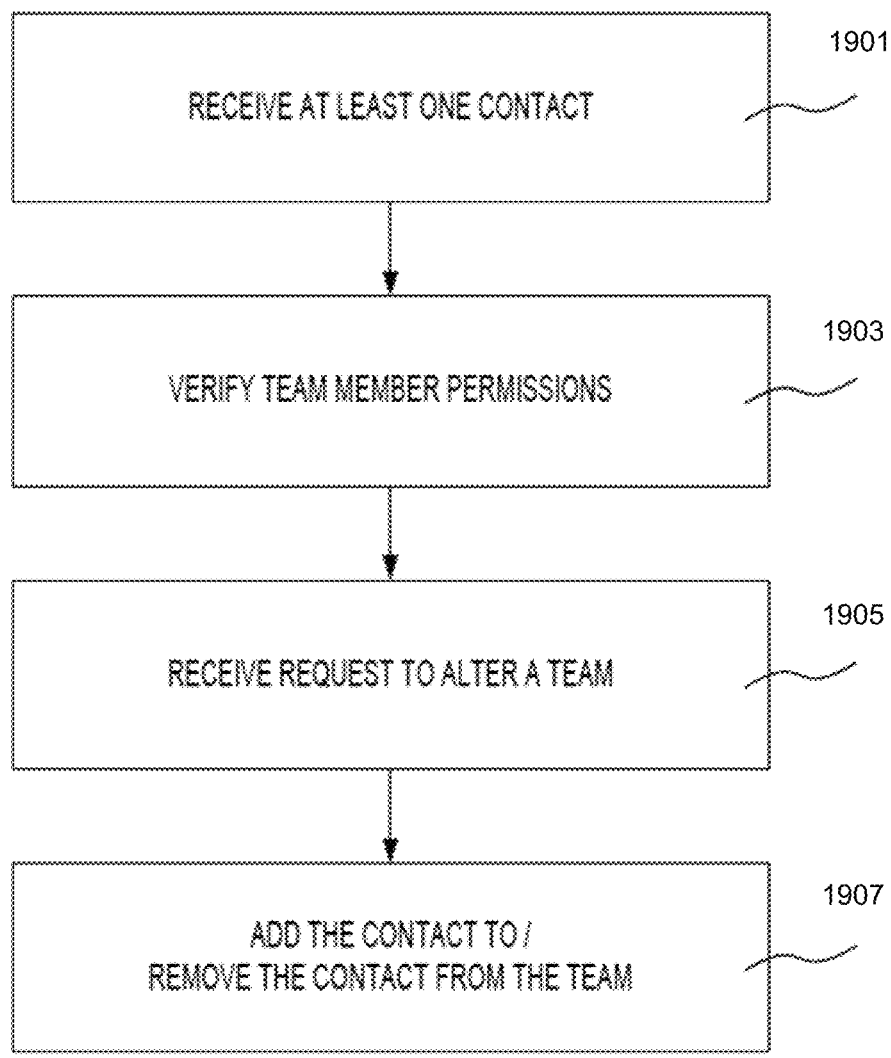
FIG. 19 is a flowchart of an example method for altering a collaborative team, according to yet another example embodiment of the present disclosure.

FIG. 19 shows a flowchart of example method 1900 for altering a collaborative team. Method 1900 may be implemented using a general-purpose computer including a processor, e.g., collaboration server 8001 of FIG. 80. Alternatively, a special-purpose computer may be built for implementing method 1900 using suitable logic elements.

At step 1901, the processor receives at least one contact from a user. For example, the contact may be associated with an already-created team or may be unassociated with a team. In some embodiments, the processor may send the user a list of contacts associated with the user. The user may then select a contact from the list as the contact, and the processor may extract the contact from the contact list. For example, the user may see a contacts list on a GUI and then select a contact using one or more buttons on the GUI.

At step 1903, the processor verifies team permissions associated with the user. Permissions may refer to what requests and data the processor accepts from the user and what requests and data the processor rejects from the user. For example, if the user does not have permission to send requests, the processor may reject requests from the user. Similarly, if the user does not have permission to send certain requests, the processor may reject requests from the user for which the user does not have permission.

At step 1905, the processor receives a request to alter the team associated with the user and/or the at least one contact. For example, the processor may receive a request to add the contact to team, a request to remove the contact from the team, a request to alter one or more team member permissions, etc.

At step 1907, the processor alters the team in accordance with the request. For example, if the user sends a request to add the contact to the team, the processor may add the contact as a team member. Afterward, the new member may be visible to the user, the added team member, and/or to other team members within the team. By way of further example, if the user sends a request to remove the contact from the team, the processor may remove the contact as a team member.

Method 1900 may further include additional steps. For example, method 1100 may further include authenticating a user before step 1901. For example, authenticating a user may be through any appropriate authentication method (e.g., sending a confirmation link, such as a URL, to the user).

Figure 20:
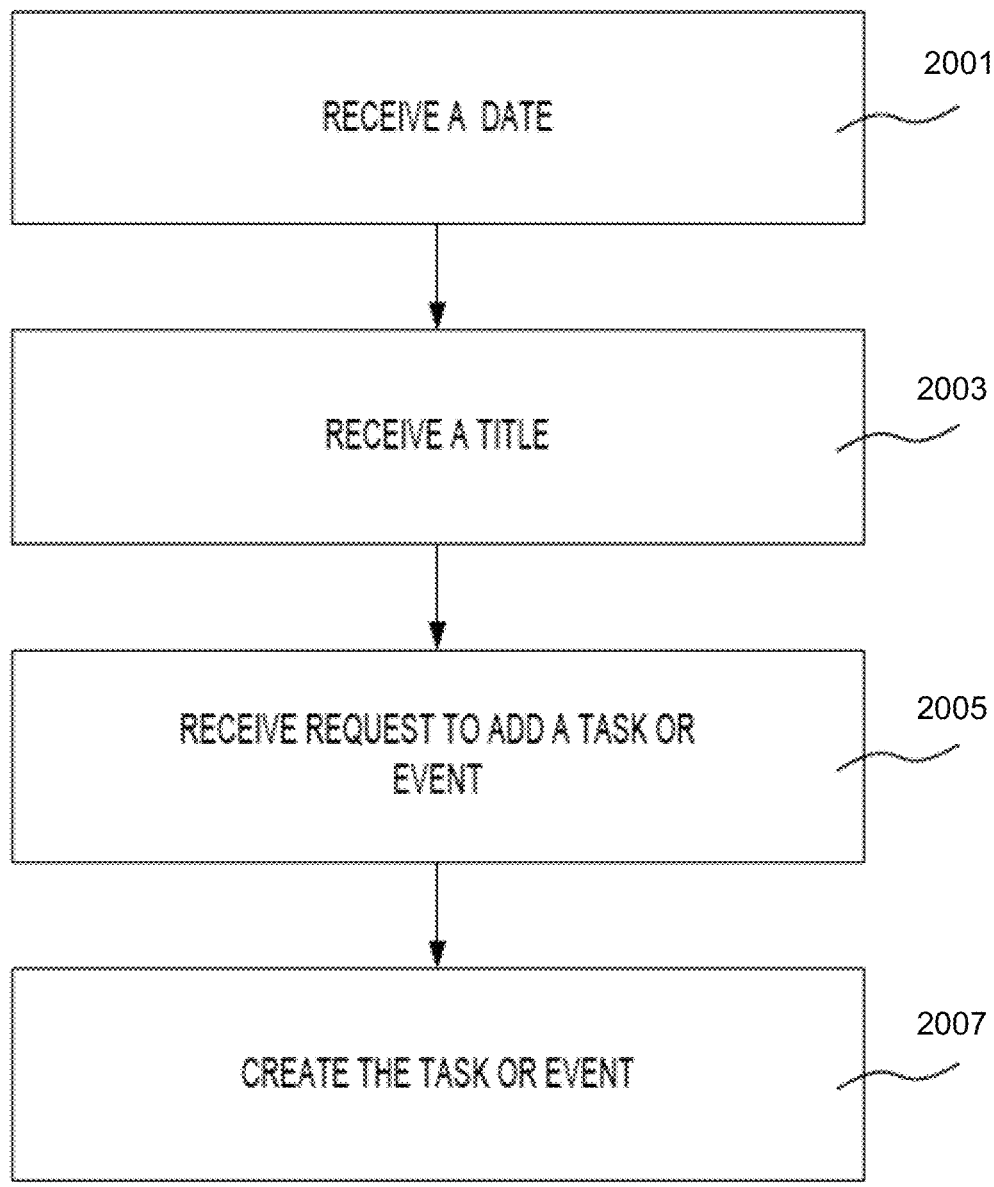
FIG. 20 is a flowchart of an example method for creating a task or event, according to yet another example embodiment of the present disclosure.

FIG. 20 shows a flowchart of example method 2000 for creating a task or event. Method 1200 may be implemented using a general-purpose computer including a processor, e.g., collaboration server 8001 of FIG. 80. Alternatively, a special-purpose computer may be built for implementing method 2000 using suitable logic elements.

At step 2001, the processor receives a date. For example, the processor may receive data stored in one or more known data models with associated serialization formats. Such models may include serialized data from which the processor may extract the date. By way of further example, the processor may receive metadata or data having demarcated locations. In such an example, the processor may extract the date from the metadata or demarcated locations. By way of further example, the processor may extract the date by searching for predetermined formats within received text data. For example, the received date may comprise text in a particular format, e.g., "XX/XX"; "XX/XX/XX"; "XX/XX/XXXX"; "X/X"; "X/X/XX"; "X/X/XXXX"; "X/XX/XX"; "X/XX/XXXX"; "XX/X/XX"; "XX/X/XXXX"; or the like.

At step 2003, the processor receives a title. For example, the received title may comprise text.

At step 2005, the processor receives a request to add a task or event. At step 2007, the processor creates the task or event based on at least the received date and the received title. Afterward, the task or event may be visible to the user, to team members within a team, and/or to other users within a conversation.

Method 2000 may further include additional steps. For example, method 2000 may further include authenticating a user. For example, authenticating a user may be through any appropriate authentication method (e.g., sending a confirmation link, such as a URL, to the user).

By way of further example, method 2000 may further include receive a start time and/or an end time. For example, the processor may receive data stored in one or more known data models with associated serialization formats. Such models may include serialized data from which the processor may extract the time(s). By way of further example, the processor may receive metadata or data having demarcated locations. In such an example, the processor may extract the time(s) from the metadata or demarcated locations. By way of further example, the processor may extract the time(s) by searching for predetermined formats within received text data. For example, the received time may comprise text in a particular format, e.g., "X:XX"; "XX:XX"; "X:XX [AM/PM]"; "XX:XX [AM/PM]"; or the like. In such examples, the created task or request may also be based on the received start time and/or the received end time.

In some examples, the processor may receive one or more participants from the user to add as participants for the task or event. In such an example, the processor may then invite the one or more participants, for example, using an email message, a chat message, an SMS message, or the like.

By way of further example, the processor may receive a request to assign a task to one or more team members. In such an example, the processor may then notify the assigned team members, for example, using an email message, a chat message, an SMS message, or the like. In certain aspects, a task may be reassigned from some team member(s) to other team member(s). In these aspects, the processor may notify both the formerly assigned team members and the newly assigned team members of the reassignment.

Figure 21:
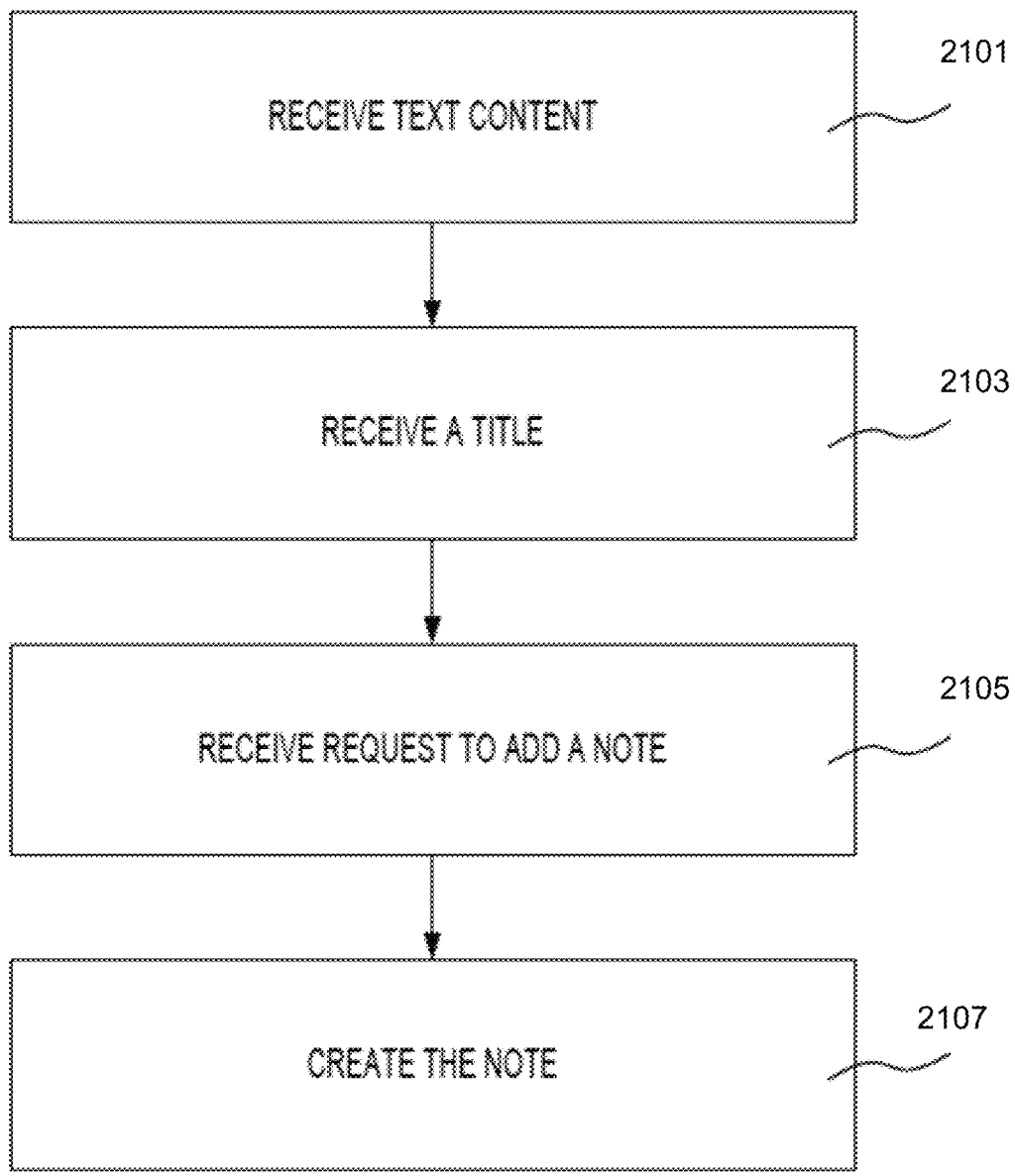
FIG. 21 is a flowchart of an example method for creating a note, according to yet another example embodiment of the present disclosure.

FIG. 21 shows a flowchart of example method 2100 for creating a note. Method 2100 may be implemented using a general-purpose computer including a processor, e.g., collaboration server 8001 of FIG. 80. Alternatively, a special-purpose computer may be built for implementing method 1300 using suitable logic elements.

At step 2101, the processor receives text content. Alternatively or concurrently, the processor may receive images, links, or other data.

At step 2103, the processor receives a title. For example, the received title may comprise text.

At step 2105, the processor receives a request to create a note. At step 1307, the processor creates the note based on at least the received text content and the received title. Afterward, the note may be visible to the user, to team members within a team, and/or to other users within a conversation Method 2100 may further include additional steps. For example, method 2100 may further include authenticating a user through any appropriate authentication method (e.g., sending a confirmation link, such as a URL, to the user).

Figure 22:
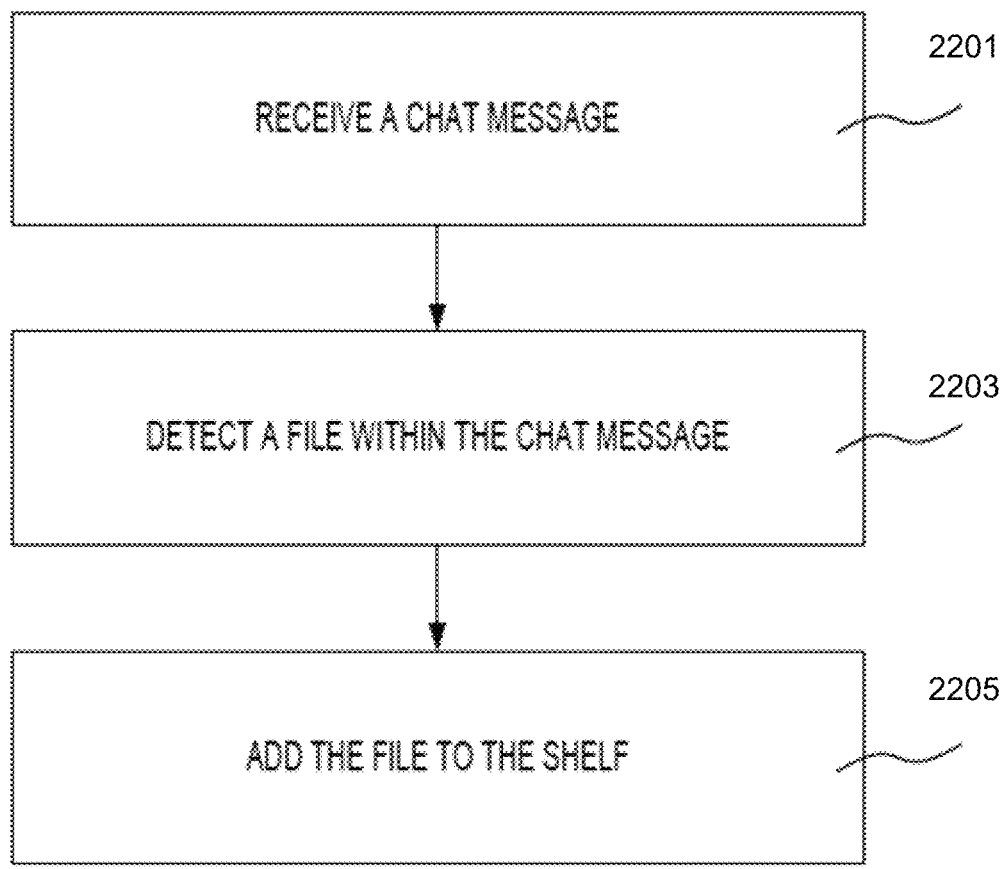
FIG. 22 is a flowchart of an example method for automatically facilitating file uploads in a chat conversation, according to yet another example embodiment of the present disclosure.

FIG. 22 shows a flowchart of example method 2200 for automatically facilitating file uploads in a chat conversation. Method 2200 may be implemented using a general-purpose computer including a processor, e.g., collaboration server 8001 of FIG. 80. Alternatively, a special-purpose computer may be built for implementing method 2200 using suitable logic elements.

At step 2201, the processor receives a chat message. At step 2203, the processor automatically detects that the chat message includes at least one file. For example, the processor may determine that the chat message includes a photo along with text (as depicted in GUI 6200 of FIG. 62). Although the file comprises a single photo in this example, the chat message may include a plurality of files, either all of the same type (e.g., audio, photo, video, pdf, etc.) or of different types.

At step 2205, the processor adds the at least one file to a repository (also termed "the shelf"). In some examples, the shelf may be represented as a GUI element that allows a user to place items onto the shelf that are then accessible through the same GUI element. The repository may be associated with a chat conversation including the received chat message or with a team including the received chat message. After being added, the at least one file may be visible to the recipients within the conversation or to team members within the team.

Method 2200 may further include additional steps. For example, method 2200 may further include authenticating a user using any appropriate authentication method (e.g., sending a confirmation link, such as a URL, to the user).

By way of further example, in lieu of steps 2201 and 2203, the processor may instead receive a file with a request to add the file to the repository.

Figure 23:
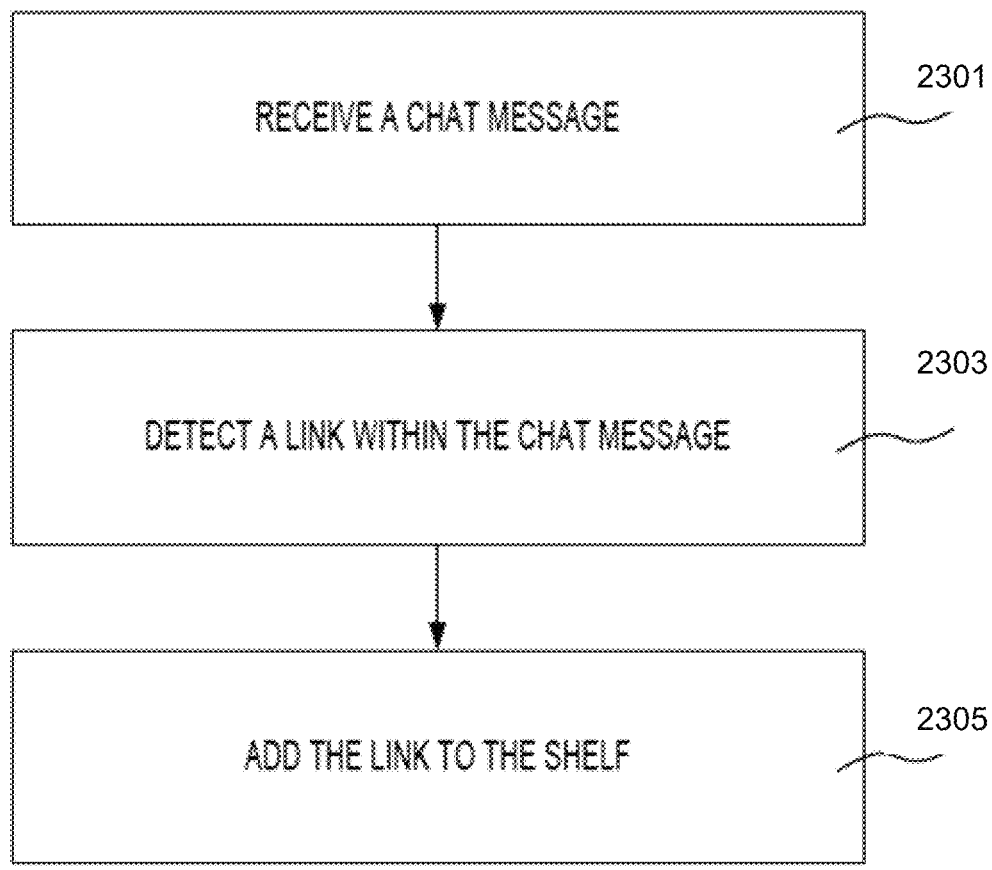
FIG. 23 is a flowchart of an example method for automatically collating links in a chat conversation, according to yet another example embodiment of the present disclosure.

FIG. 23 shows a flowchart of example method 2300 for automatically collating links in a chat conversation. Method 2300 may be implemented using a general-purpose computer including a processor, e.g., collaboration server 8001 of FIG. 80. Alternatively, a special-purpose computer may be built for implementing method 2300 using suitable logic elements.

At step 2301, the processor receives a chat message. At step 2303, the processor automatically detects that the chat message includes at least one link. For example, the processor may determine that text included in the chat message contains one or more links. The processor may make this determination using predetermined context clues (such as the text containing the character sequences "www."; ".com"; ".org"; ".html"; or the like) and/or employ a URL pattern matcher regular expression. Alternatively or concurrently, the processor may integrate one or more machine learning techniques with the determination such that the determination algorithm is modified each time it is used. For example, the processor may update a learning library each time the determination is made.

At step 2305, the processor adds the at least one link to a repository (also termed "the shelf"). The repository may be associated with a chat conversation including the received chat message or with a team including the received chat message. After being added, the at least one link may be visible to the recipients within the conversation or to team members within the team.

Method 2300 may further include additional steps. For example, method 1500 may further include authenticating a user through any appropriate authentication method (e.g., sending a confirmation link, such as a URL, to the user).

By way of further example, in lieu of steps 2301 and 2303, the processor may instead receive a link with a request to add the link to the repository.

Figure 24:
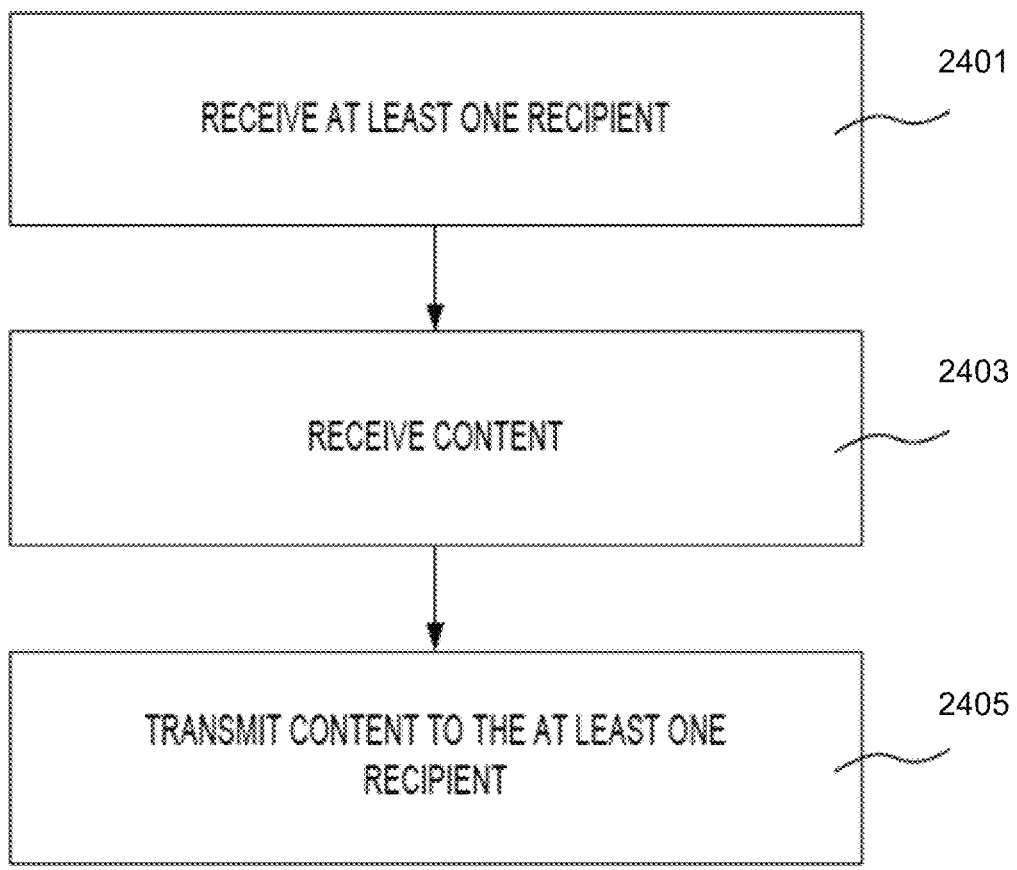
FIG. 24 is a flowchart of an example method for facilitating messaging between users, according to yet another example embodiment of the present disclosure.

FIG. 24 shows a flowchart of example method 2400 for facilitating messaging between users. Method 1600 may be implemented using a general-purpose computer including a processor, e.g., collaboration server 8001 of FIG. 80. Alternatively, a special-purpose computer may be built for implementing method 2400 using suitable logic elements.

At step 2401, the processor receives at least one recipient from a user. In some embodiments, the processor may send the user a list of contacts associated with the user. The user may then select at least one contact from the list as the at least one recipient, and the processor may extract the at least one recipient from the contact list.

At step 2403, the processor receives content from the user. For example, the processor may receive text content (e.g., ASCII text, Unicode text, etc.), audio/video content (e.g., in the form of a video file, a photo file, an audio file, or the like), or the like.

At step 2405, the processor transmits a message addressed to the at least one recipient and having the content. For example, if the content comprises a combination of text and a file, the processor may bundle the file with the text into a single message addressed to the at least one recipient. On the other hand, if the content comprises text over a threshold length, the processor may divide the text into a plurality of messages addressed to the at least one recipient. For example, a threshold length may comprise a certain number of characters, such as 10 characters, 20 characters, etc.

Method 1600 may further include additional steps. For example, method 2400 may further include authenticating a user using any appropriate authentication method (e.g., sending a confirmation link, such as a URL, to the user).

Figure 25:
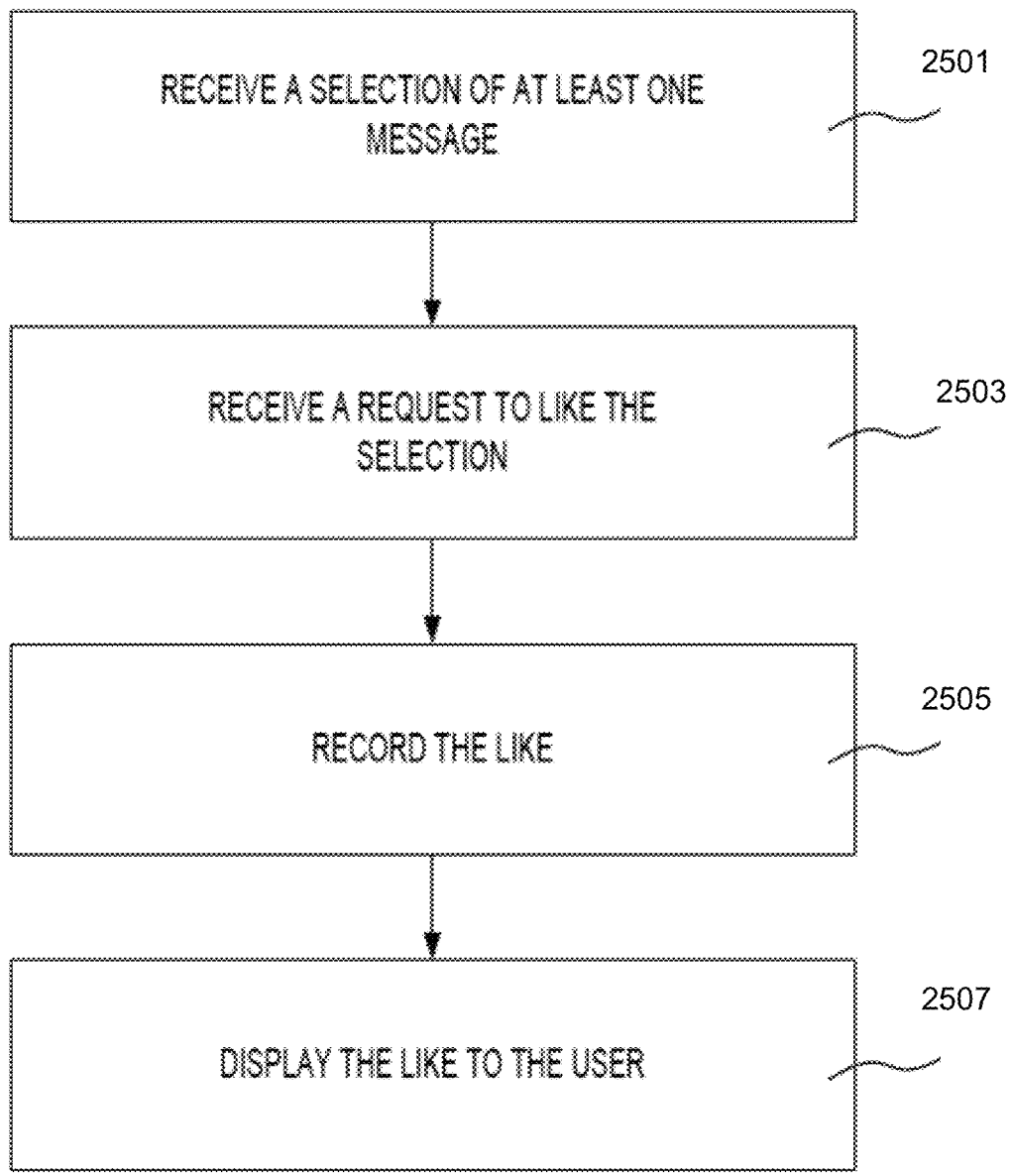
FIG. 25 is a flowchart of an example method for facilitating reactions to messages between users, according to yet another example embodiment of the present disclosure.

FIG. 25 shows a flowchart of example method 2500 for facilitating reactions to messages between users. Method 2500 may be implemented using a general-purpose computer including a processor, e.g., collaboration server 8001 of FIG. 80. Alternatively, a special-purpose computer may be built for implementing method 2500 using suitable logic elements.

At step 2501, the processor receives a selection of at least one message. The at least one message may have a plurality of recipients. In some embodiments, the user may receive a list of chat conversations (comprised of messages) from the processor. The user may then select a conversation from the list, thereby selecting the messages therein as the at least one message. The processor may thus receive the selection and extract the at least one message from the selected conversation.

At step 2503, the processor receives a request to react to the selection. For example, the processor may receive a request to "like" the selection. In certain aspects, the processor may receive the selection separately from the request. In other aspects, the processor may receive the selection concurrently with the request.

At step 2505, the processor records the reaction. For example, the processor may record the reaction on a remote server and/or on a user interface device associated with the user. Thus, in some embodiments, the reaction may be visible only to the user while, in other embodiments, the reactions may be visible to other users.

At step 2507, the processor displays the reaction with the selection to the user. In certain aspects, the reaction may also be transmitted for display to one or more of the plurality of recipients.

Method 2500 may further include additional steps. For example, method 2500 may further include authenticating a user using any appropriate authentication method (e.g., sending a confirmation link, such as a URL, to the user). It is appreciated that the reaction may be used in analyzing dependencies between prior posted message and subsequent messages and/or reaction where the prior message has been modified.

Figure 26:
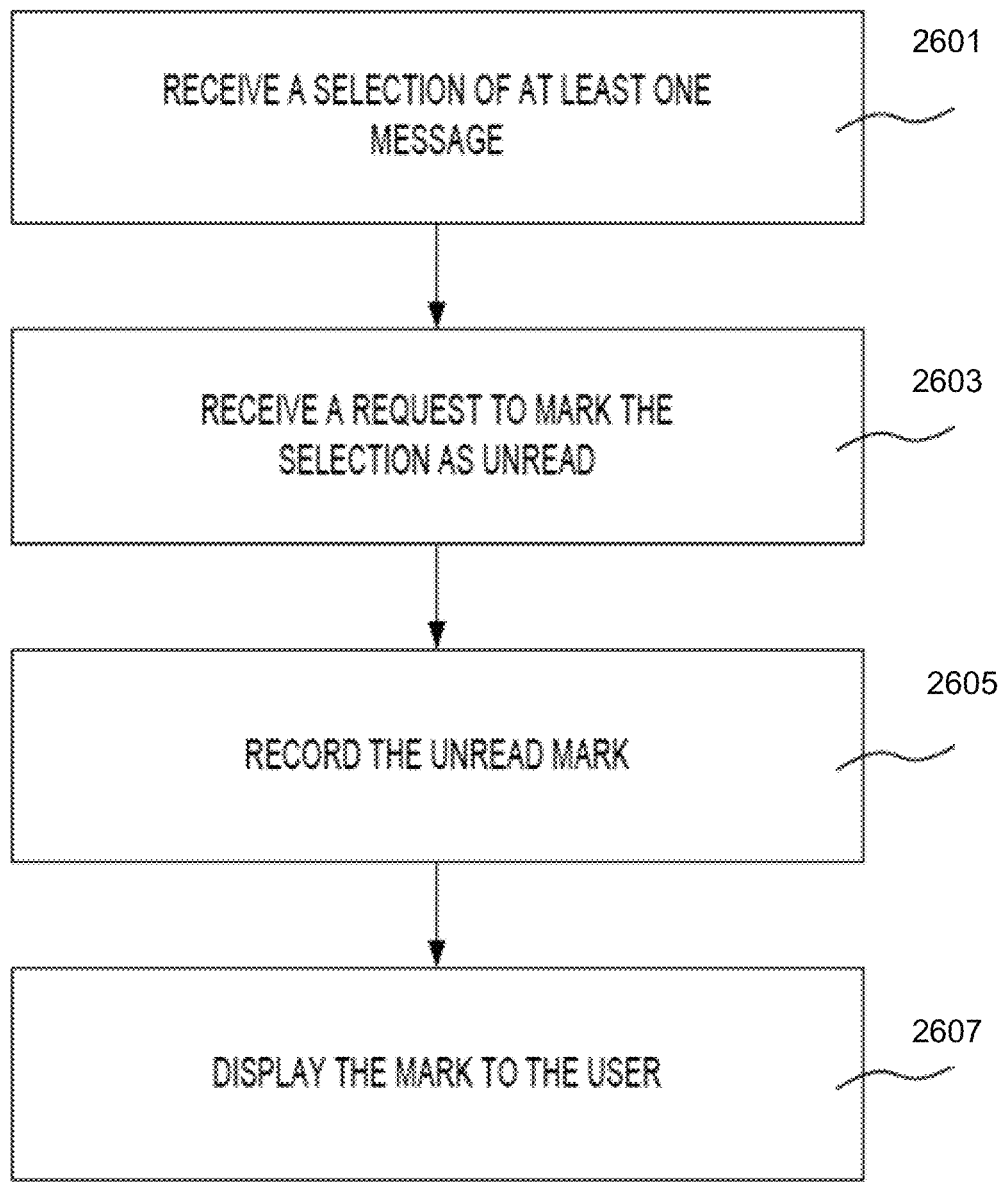
FIG. 26 is a flowchart of an example method for changing a status of a message, according to yet another example embodiment of the present disclosure.

FIG. 26 shows a flowchart of example method 2600 for changing a status of a message. Method 2600 may be implemented using a general-purpose computer including a processor, e.g., collaboration server 8001 of FIG. 80. Alternatively, a special-purpose computer may be built for implementing method 2600 using suitable logic elements.

At step 2601, the processor receives a selection of at least one message. The at least one message may have a plurality of recipients. In some embodiments, the user may receive a list of chat conversations (comprised of messages) from the processor. The user may then select a conversation from the list, thereby selecting the messages therein as the at least one message. The processor may thus receive the selection and extract the at least one message from the selected conversation.

At step 2603, the processor receives a request to mark the selection as "read" (or as "unread"). In certain aspects, the processor may receive the selection separately from the request. In other aspects, the processor may receive the selection concurrently with the request.

At step 2605, the processor records the read mark. For example, the processor may record the mark on a remote server and/or on a user interface device associated with the user.

At step 2607, the processor displays the mark with the selection to the user. In certain aspects, the mark may also be transmitted for display to one or more of the plurality of recipients.

Method 2600 may further include additional steps. For example, method 2600 may further include authenticating a user using any appropriate authentication method (e.g., sending a confirmation link, such as a URL, to the user).

Figure 27:
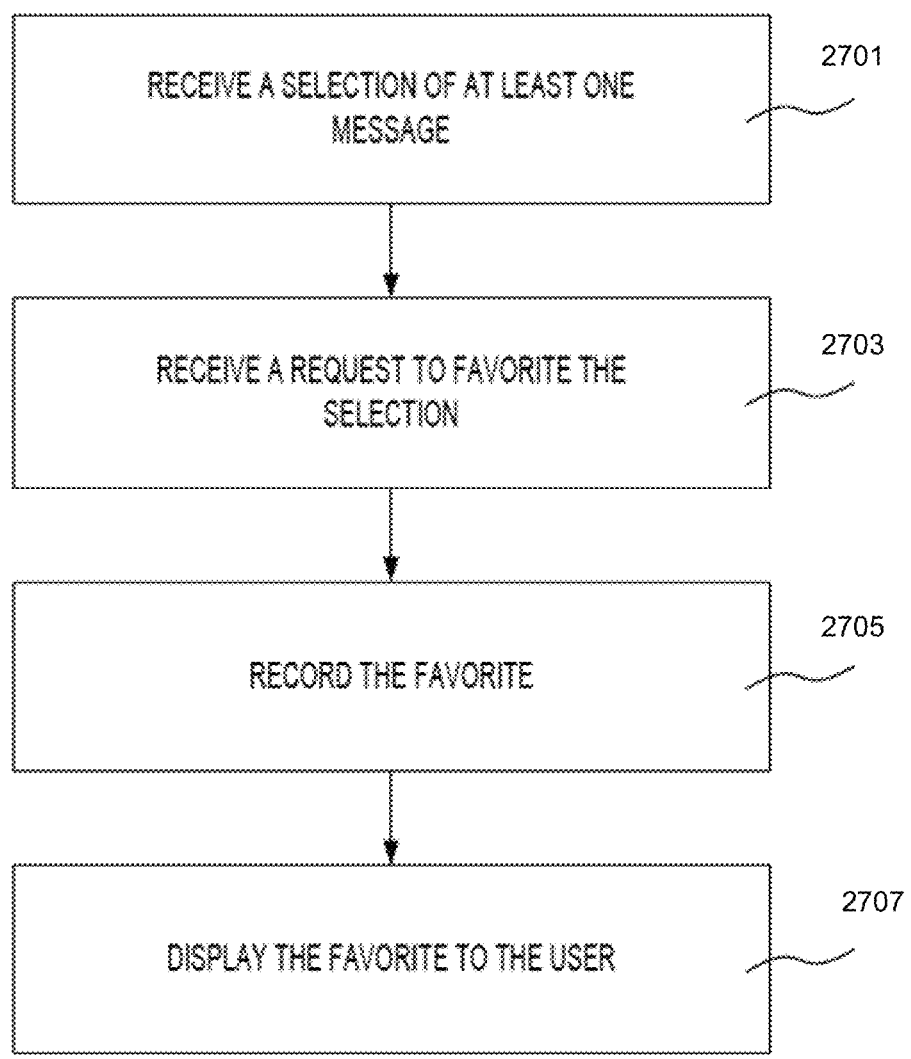
FIG. 27 is a flowchart of another example method for changing a status of a message, according to yet another example embodiment of the present disclosure.

FIG. 27 shows a flowchart of example method 2700 for changing a status of a message. Method 2700 may be implemented using a general-purpose computer including a processor, e.g., collaboration server 8001 of FIG. 80. Alternatively, a special-purpose computer may be built for implementing method 2700 using suitable logic elements.

At step 2701, the processor receives a selection of at least one message. The at least one message may have a plurality of recipients. In some embodiments, the user may receive a list of chat conversations (comprised of messages) from the processor. The user may then select a conversation from the list, thereby selecting the messages therein as the at least one message. The processor may thus receive the selection and extract the at least one message from the selected conversation.

At step 2703, the processor receives a request to favorite (or unfavorite) the selection. In certain aspects, the processor may receive the selection separately from the request. In other aspects, the processor may receive the selection concurrently with the request.

At step 2705, the processor records the favorite. For example, the processor may record the favorite on a remote server and/or on a user interface device associated with the user.

At step 2707, the processor displays the favorite with the selection to the user. In certain aspects, the favorite may also be transmitted for display to one or more of the plurality of recipients.

Method 2700 may further include additional steps. For example, method 2700 may further include authenticating a user using any appropriate authentication method (e.g., sending a confirmation link, such as a URL, to the user). It is appreciated that the changed status of a message may be used in determining dependencies between a subsequent message to a prior message that has been modified and edited. As such, the dependency or lack thereof may be used in determining whether deep edit may be performed (i.e., propagating edits from a prior message to subsequent message(s)).

Figure 28:
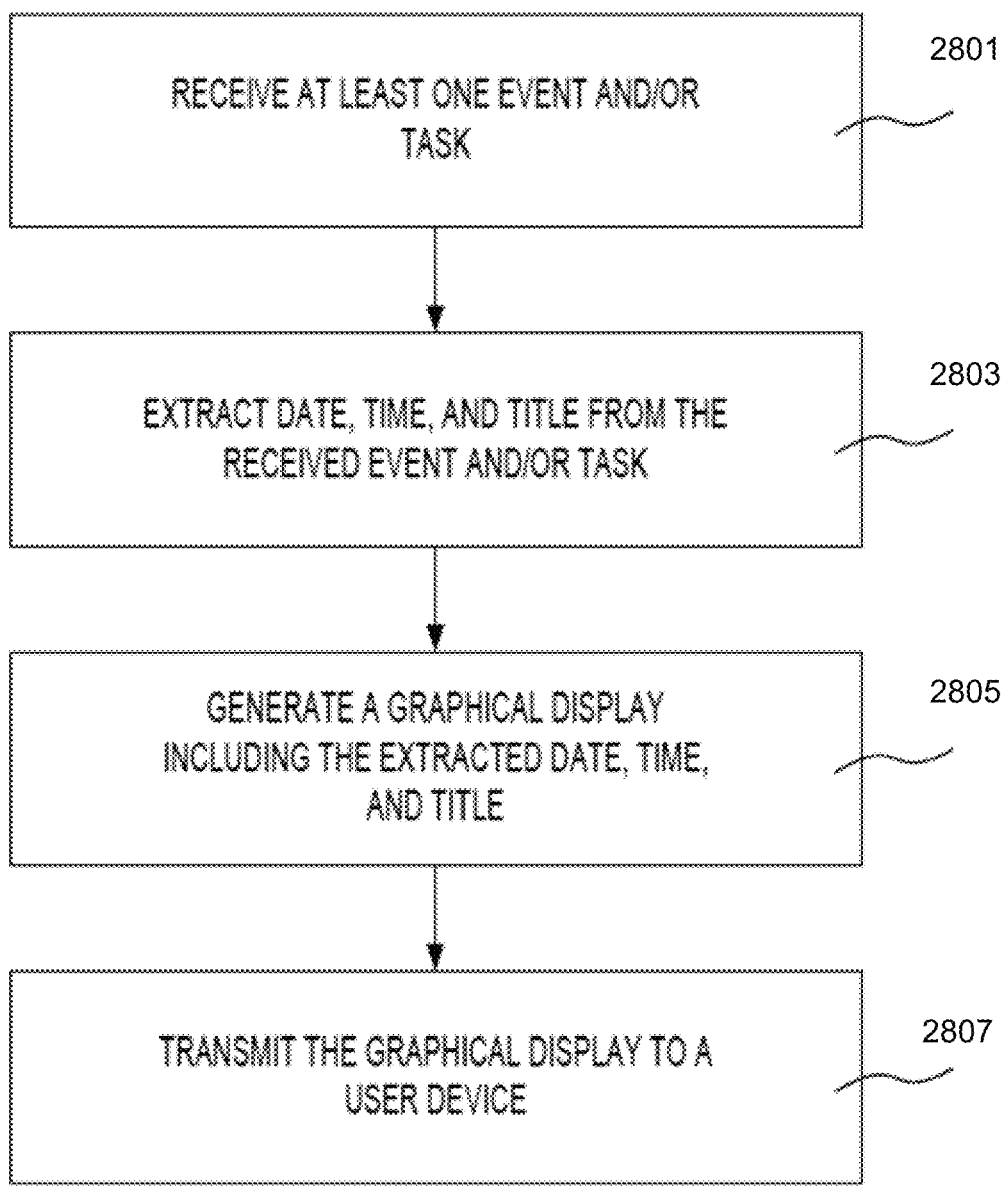
FIG. 28 is a flowchart of an example method for displaying events and tasks in a graphical format, according to yet another example embodiment of the present disclosure.

FIG. 28 shows a flowchart of example method 2800 for displaying events and tasks in a graphical format. Method 2800 may be implemented using a general-purpose computer including a processor, e.g., collaboration server 8001 of FIG. 80. Alternatively, a special-purpose computer may be built for implementing method 2800 using suitable logic elements.

At step 2801, the processor receives at least one event or task. The event or task may be retrieved from a storage device operably connected to the processor and/or over a computer network.

At step 2803, the processor may automatically extract at least one date, at least one time, and at least one title from the received events or tasks. For example, the received at least one event or task may be stored in one or more known data models with associated serialization formats. Such models may include serialized data from which the processor may extract the date. Alternatively or concurrently, the received at least one event or task may have metadata and/or demarcated locations within the data. In such an example, the processor may extract the date from the metadata or demarcated locations. Alternatively or concurrently, the received at least one event or task may comprise text data, and the processor may extract the date by searching for predetermined formats within received text data. For example, the processor may search for possible date formats, including, e.g., "XX/XX"; "XX/XX/XX"; "XX/XX/XXXX"; "X/X"; "X/X/XX"; "X/X/XXXX"; "X/XX/XX"; "X/XX/XXXX"; "XX/X/XX"; "XX/X/XXXX"; and the like.

Similarly, the received at least one event or task may be stored in one or more known data models with associated serialization formats, and such models may include serialized data from which the processor may extract the time. Alternatively or concurrently, the received at least one event or task may have metadata and/or demarcated locations within the data. In such an example, the processor may extract the time from the metadata or demarcated locations. Alternatively or concurrently, the received at least one event or task may comprise text data, and the processor may extract the time by searching for predetermined formats within received text data. For example, the processor may search for possible time formats, including, e.g., "X:XX"; "XX:XX"; "X:XX [AM/FM]"; "XX:XX [AM/FM]"; and the like.

Alternatively or concurrently, the processor may integrate one or more machine learning techniques with the searching such that the searching algorithm is modified each time it is used. For example, the processor may update a learning library each time for which a date and/or a time is searched.

At step 2805, the processor generates a graphical display including the extracted dates, times, and titles. At step 2807, the processor transmits the graphical display to a user device. For example, a user device (also termed a "user interface device") may comprise, for example, a smartphone, a tablet, a laptop computer, a desktop computer, or the like.

Method 2800 may further include additional steps. For example, method 2800 may further include authenticating a user using any appropriate authentication method (e.g., sending a confirmation link, such as a URL, to the user).

Figure 29:
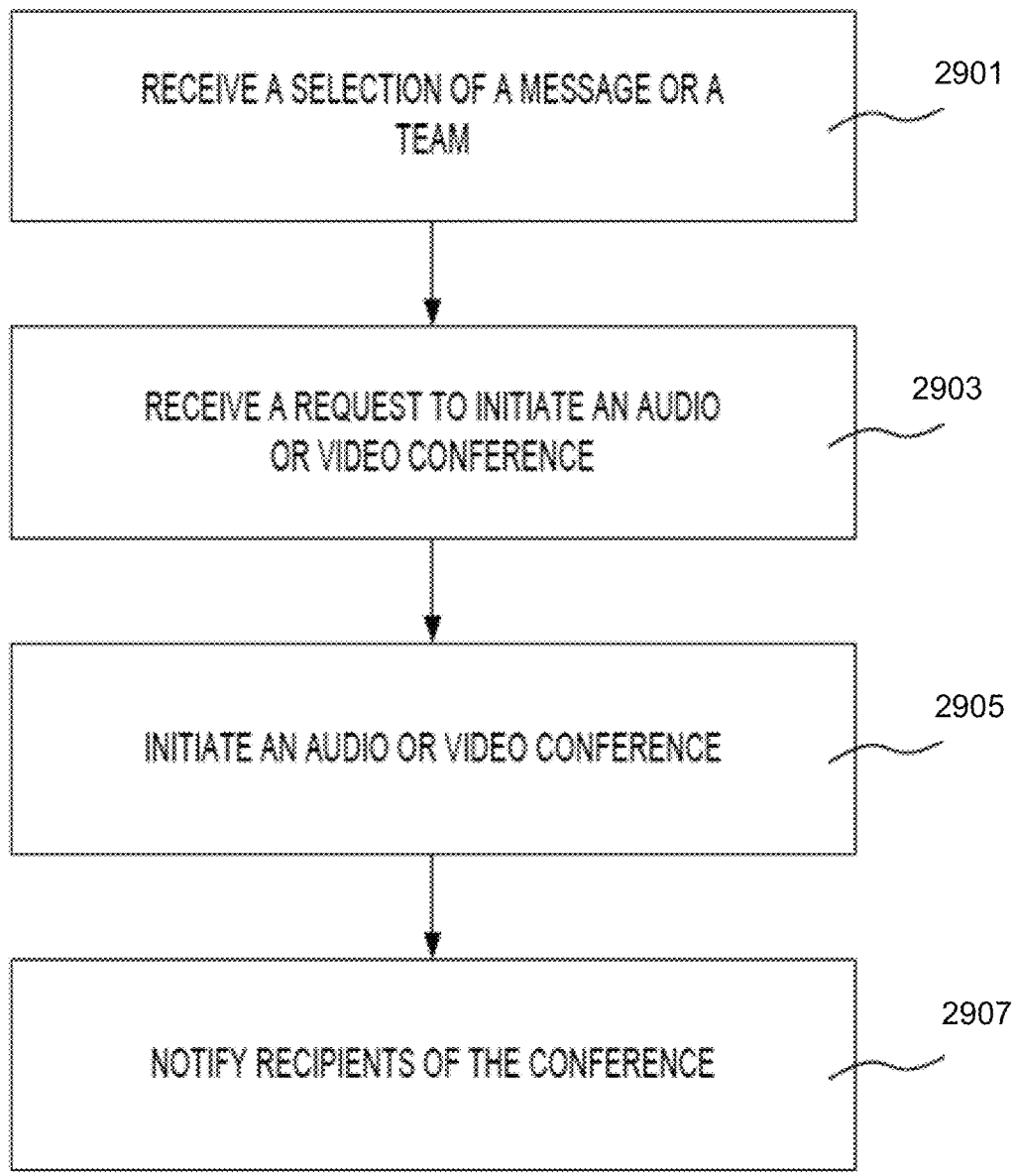
FIG. 29 is a flowchart of an example method for converting a chat conversation to an audio or video conference, according to yet another example embodiment of the present disclosure.

FIG. 29 shows a flowchart of example method 2900 for converting a chat conversation to an audio or video conference. Method 2900 may be implemented using a general-purpose computer including a processor, e.g., collaboration server 8001 of FIG. 80. Alternatively, a special-purpose computer may be built for implementing method 2900 using suitable logic elements.

At step 2901, the processor receives a selection of at least one message or of at least one team. The at least one message may have a plurality of recipients, and the at least one team may have a plurality of team members.

At step 2903, the processor receives a request to initiate an audio or video conference. In certain aspects, the processor may receive the selection separately from the request. In other aspects, the processor may receive the selection concurrently with the request.

At step 2905, the processor initiates an audio or video conference. After initiation, and at step 2907, the processor notifies the plurality of recipients or the plurality of team members of the initiation. For example, initiating a conference may comprise activating a synchronous conferencing protocol or an asynchronous conferencing protocol. In activating the protocol, the processor may automatically add some or all of the plurality of recipients or the plurality of team members to the conference and then send a notification to the added recipients/team members. Alternatively, the notification sent to some or all of the plurality of recipients or the plurality of team members may include a request for a response. For example, the notification may allow a recipient or member to either accept and be added to the conference, or to reject and not be added to the conference.

Method 2900 may include additional steps. For example, method 2900 may further include authenticating a user. For example, authenticating a user may include at least one of method 1400 or method 1500, described above, a combination thereof, or any other appropriate authentication method (e.g., sending a confirmation link, such as a URL, to the user).

Figure 30:
FIG. 30 is an example graphical user interface (GUI) for authenticating a user of a collaboration service, according to yet another example embodiment of the present disclosure.

FIG. 30 shows an example GUI 3000 for authenticating a user of a collaboration service. As depicted in FIG. 30, GUI 3000 includes a first text box 3001 for receiving a username and a second text box 3003 for receiving a password. In some embodiments, text box 3003 may mask the entered characters (for example, by replacing the entered characters with * or with •).

As further depicted in FIG. 30, GUI 3000 includes a button 3005 for receiving a request to submit the username entered in first text box 2201 and the password entered in second text box 3003. GUI 3000 may thus be used in one or more implementations of method 1400 of FIG. 14, method 1500 of FIG. 15, a combination thereof, or other appropriate authentication methods.

Figure 31:
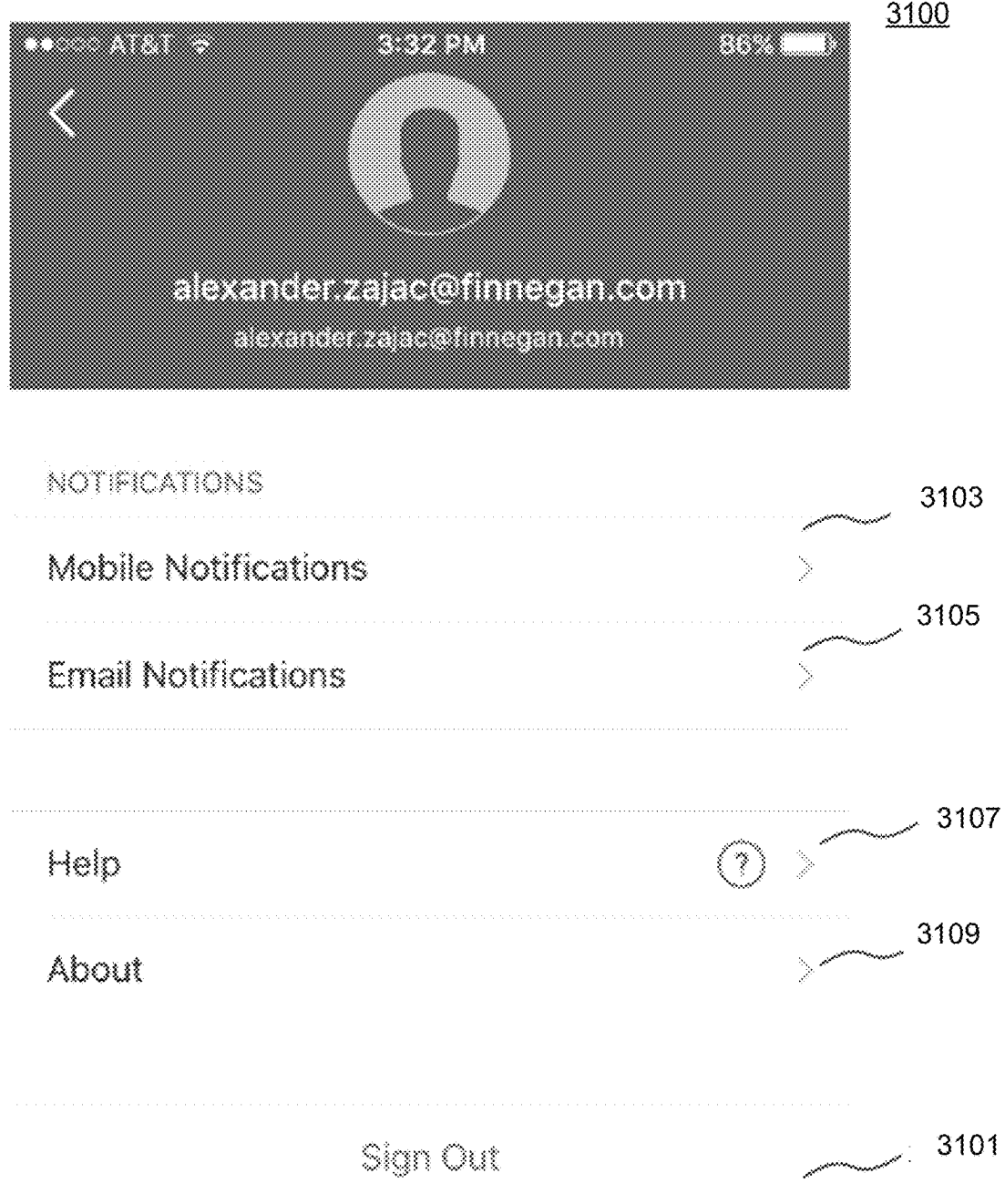
FIG. 31 is an example graphical user interface (GUI) for receiving a sign off request from a user, according to yet another example embodiment of the present disclosure.

FIG. 31 shows an example GUI 3100 for receiving a sign out request from a user. As depicted in FIG. 31, GUI 3100 includes a button 3101 for receiving a sign out request.

As further depicted in FIG. 31, GUI 3100 may also include a first drop-down box 3103 for modifying settings related to a user interface device (such as a smartphone) and/or a phone number associated with the user and a second drop-down box 3105 for modifying settings related to an email associated with the user. For example, settings related to the user interface device may include settings regarding frequency, number, etc. of notifications provided to the user via the user interface device. Furthermore, GUI 3100 may also include a help button 3107 for receiving documents related to one or more functionalities of an application including GUI 3100 and may also include an about button 3109 for receiving version information, copyright information, and the like related to an application including GUI 3100.

Figure 32:
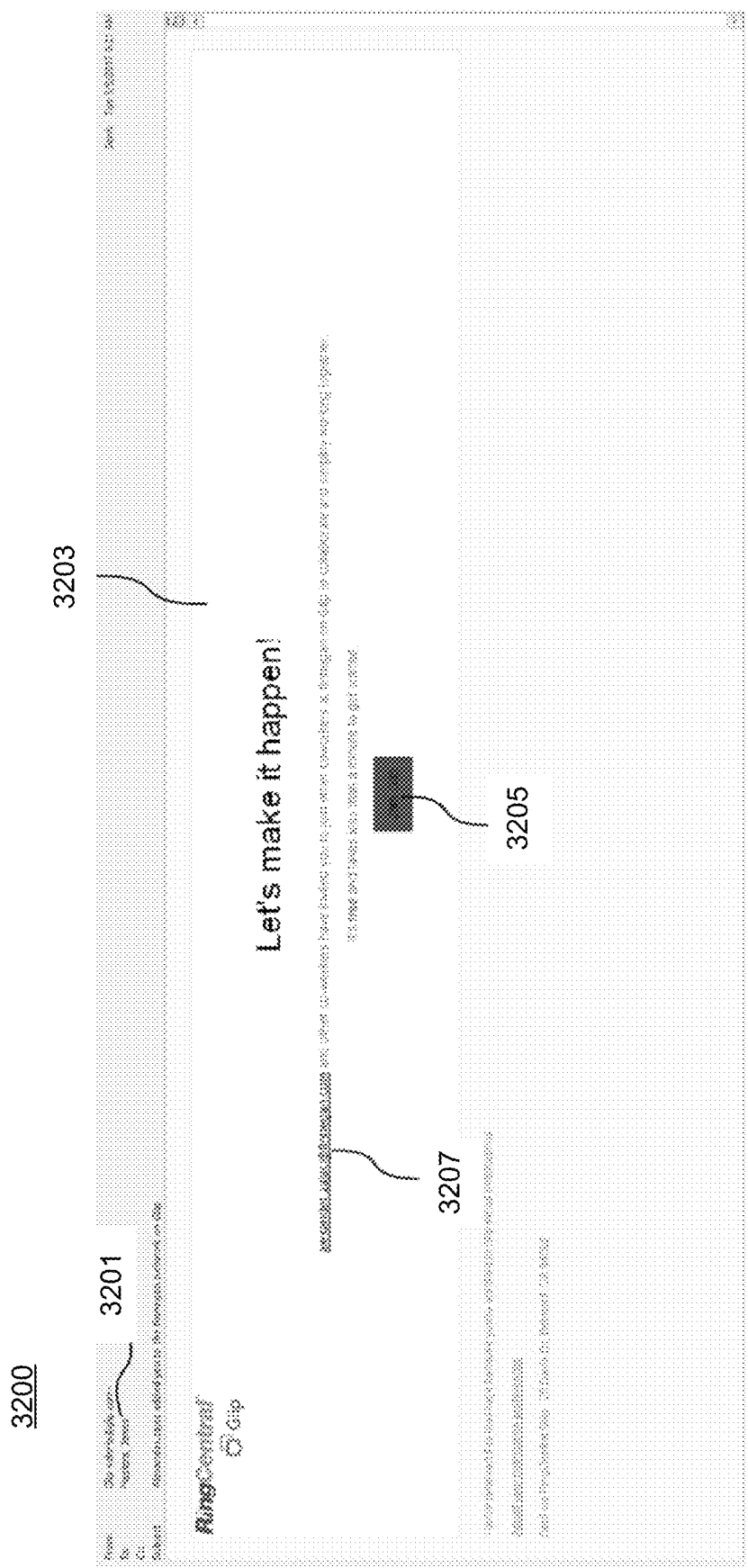
FIG. 32 is an example graphical user interface (GUI) including an example email having a link to register for a collaboration service, according to yet another example embodiment of the present disclosure.

FIG. 32 shows an example GUI 3200 including an example email having a link to register for a collaboration service. As depicted in FIG. 32, the email may be addressed to at least one contact 3201. The email may further include a body 3203 having, for example, a link 3205 to join the collaboration service and an identification of a user 3207. For example, the at least one contact may have been invited to join the collaboration service by the user.

Figure 33:
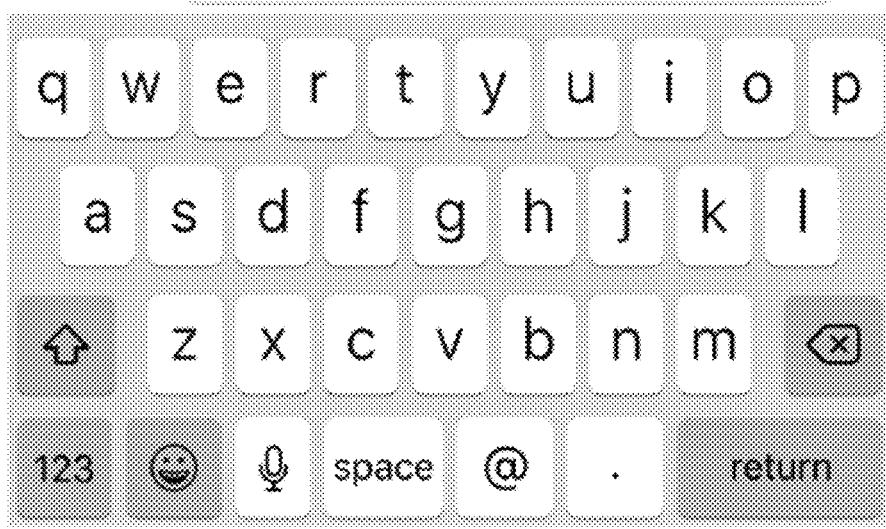
FIG. 33 is an example graphical user interface (GUI) including an example text message having a link to register for a collaboration service, according to yet another example embodiment of the present disclosure.

FIG. 33 shows an example GUI 3300 including an example text message having a link to register for a collaboration service. As depicted in FIG. 33, the text message may be addressed to at least one contact, e.g., the contact(s) indicated in "To" line 2501. As further depicted in FIG. 33, the text message may include a body 3303 having, for example, a link to join the collaboration service.

Figure 34:
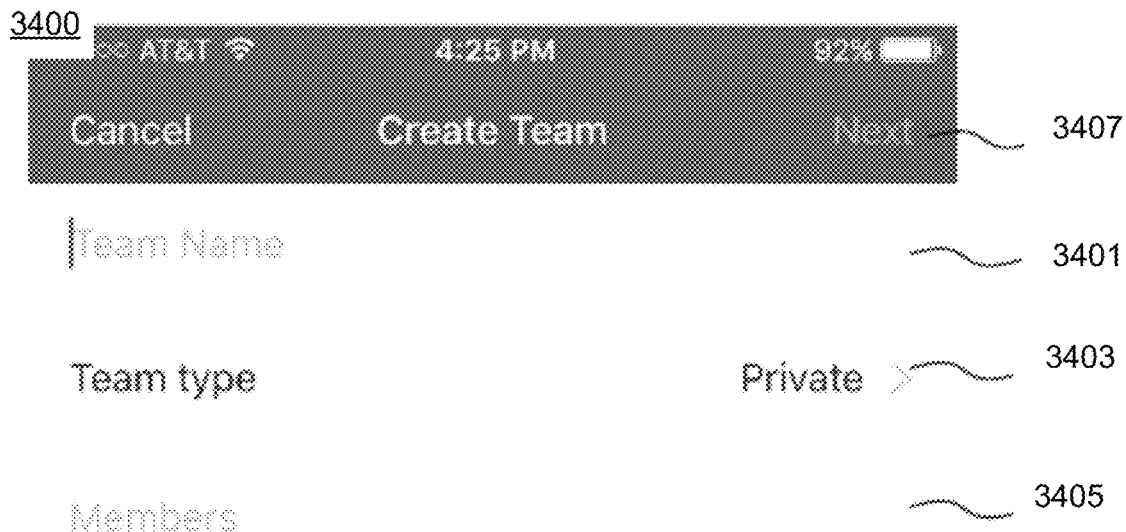
FIG. 34 is an example graphical user interface (GUI) for creating a collaborative team, according to yet another example embodiment of the present disclosure.
Figure 34:
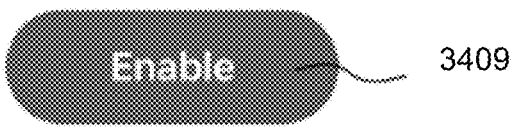
Figure 34:
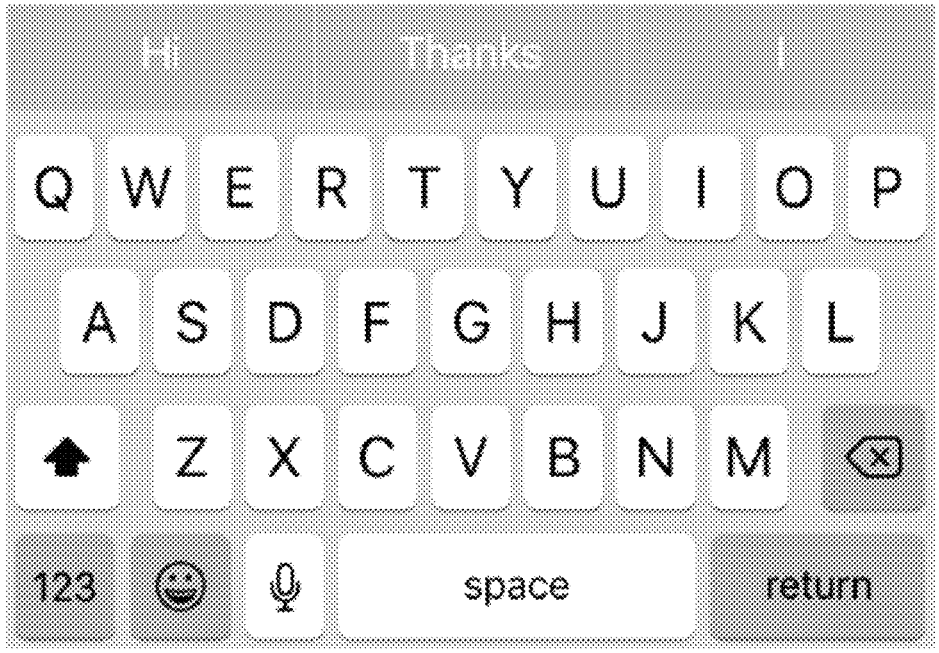

FIG. 34 shows an example GUI 3400 for creating a collaborative team. As depicted in FIG. 34, GUI 3400 may include a text box 3401 for receiving a title for the team, a drop-down box 3403 for selecting one or more settings related to the team (e.g., whether the team is private, public, etc.), and a space 3405 for receiving one or more potential team members. As further depicted in FIG. 34, GUI 3400 may include a first button 3407 for submitting a request to create the team, and a second button 3409 for receiving a contact list associated with a user of GUI 3400. For example, when clicked, second button 3409 may present the user GUI 3500 of FIG. 35 or other appropriate GUI for displaying a contacts list to the user.

Figure 35:
FIG. 35 is an example graphical user interface (GUI) including a contacts list, according to yet another example embodiment of the present disclosure.

FIG. 35 shows an example GUI 3500 including a contacts list. As depicted in FIG. 35, GUI 3500 may include a list of one or more teams (e.g., team 3501) in which a user of GUI 3500 is a team member and may further include a list of one or more contacts (e.g., contact 3503) stored in a contacts list associated with the user. GUI 3500 may also include one or more buttons (e.g., button 3505) for sending an invite (e.g., using GUI 3400 and/or GUI 3200) to a contact on the contacts list. As further depicted in FIG. 35, GUI 3500 may include a first button 3507 for submitting a request to add a contact to the contacts list.

As further depicted in FIG. 35, GUI 3500 may include a second button 3509 for implementing a search function. For example, the search function may search the contacts list. In some embodiments, when clicked, second button 3509 may present the user GUI 7200 of FIG. 72 or other appropriate GUI for implementing a search function.

Figure 36:
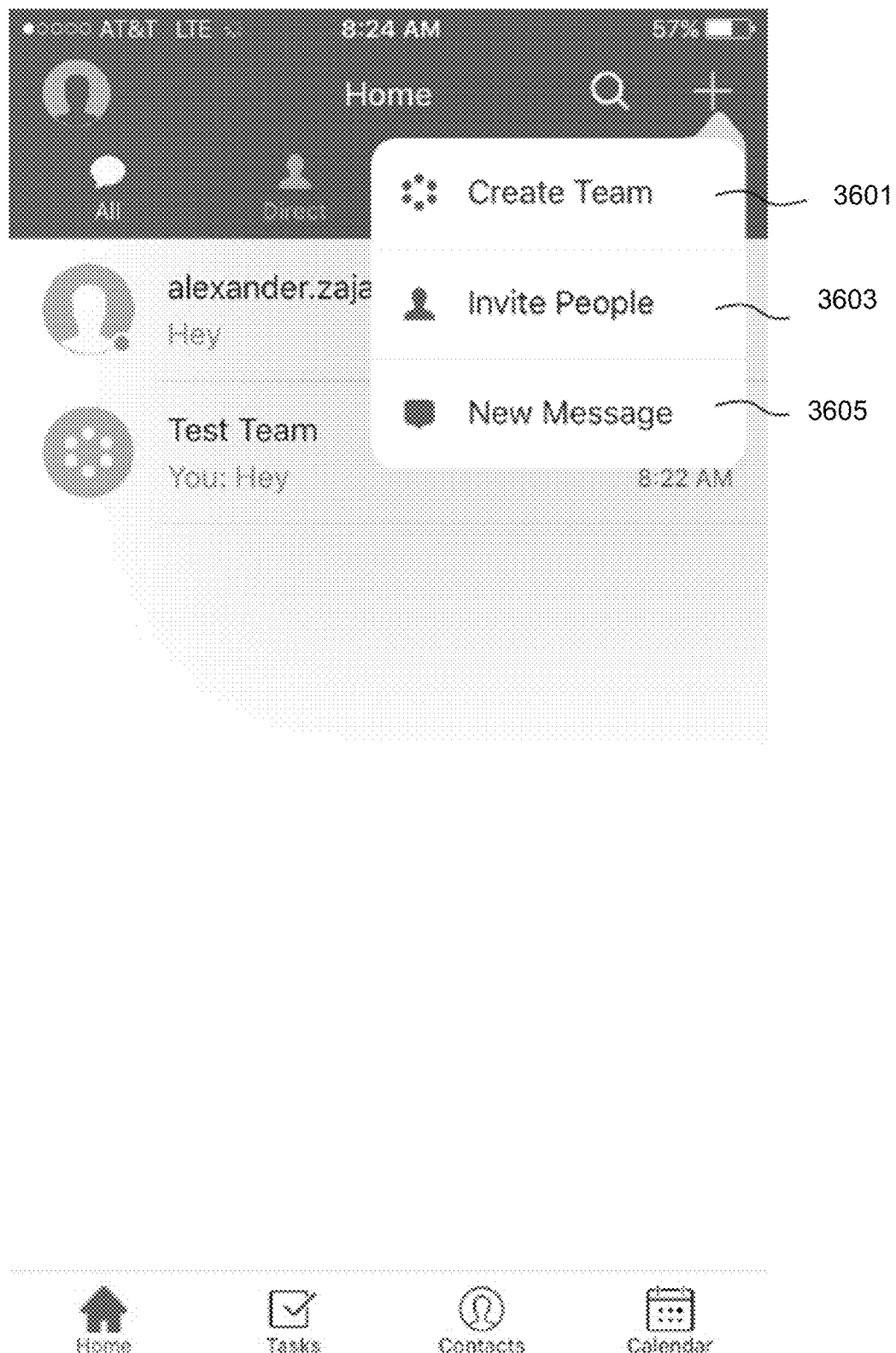
FIG. 36 is an example graphical user interface (GUI) for sending requests to create a collaborative team, message one or more recipients, or invite one or more recipients to use a collaborative service, according to yet another example embodiment of the present disclosure.

FIG. 36 shows an example GUI 3600 for sending requests to create a collaborative team, message one or more recipients, or invite one or more recipients to use a collaborative service. As depicted in FIG. 36, GUI 3600 may include a first button 3601 for receiving a request to create a team, a second button 3603 for receiving a request for sending an invite, and a third button 3605 for receiving a request to send a message.

Figure 37:
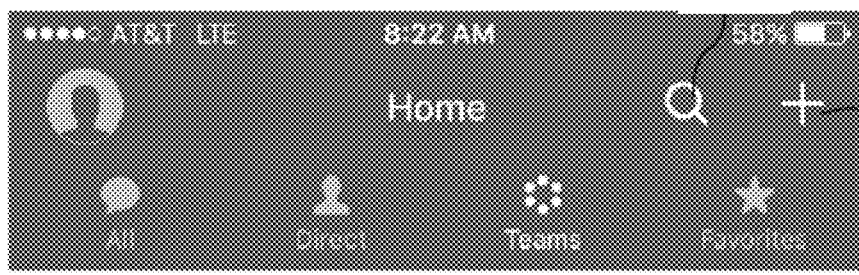
FIG. 37 is an example graphical user interface (GUI) for displaying a list of collaborative teams, according to yet another example embodiment of the present disclosure.

FIG. 37 shows an example GUI 3700 for displaying a list of collaborative teams. As depicted in FIG. 37, GUI 3700 may include a list of one or more teams (e.g., team 3701) in which a user of GUI 3700 is a team member. For example, the list may include the title of the team, the sender and content of the last-sent message within the team, and the like. As further depicted in FIG. 37, and similar to GUI 3500, GUI 3700 may include a first button 3703 for submitting a request to create a team.

As further depicted in FIG. 37, and similar to GUI 3500, GUI 3700 may include a second button 3705 for implementing a search function. For example, the search function may search the list of collaborative teams. In some embodiments, when clicked, second button 3705 may present the user GUI 7200 of FIG. 72 or other appropriate GUI for implementing a search function.

Figure 38:
FIG. 38 is an example graphical user interface (GUI) for displaying a list of chat conversations, according to yet another example embodiment of the present disclosure.
Figure 38:
Figure 38:

FIG. 38 shows an example GUI 3800 for displaying a list of chat conversations. As depicted in FIG. 38, GUI 3800 may include a list of one or more chat conversations (e.g., conversation 3801) in which a user of GUI 3800 is a recipient. For example, the list may include one or more recipients of the conversation, the sender and content of the last-sent message within the conversation, and the like. As further depicted in FIG. 38, GUI 3800 may include a first button 3803 for submitting a request to send a message.

As further depicted in FIG. 38, and similar to GUI 3500 and GUI 3700, GUI 3800 may include a second button 3805 for implementing a search function. For example, the search function may search the list of chat conversations. In some embodiments, when clicked, second button 3805 may present the user GUI 7200 of FIG. 72 or other appropriate GUI for implementing a search function.

Figure 39:
FIG. 39 is an example graphical user interface (GUI) for displaying a combined list of collaborative teams and chat conversations, according to yet another example embodiment of the present disclosure.
Figure 39:
Figure 39:
Figure 39:
Figure 39:
Figure 39:

FIG. 39 shows an example GUI 3900 for displaying a combined list of collaborative teams and chat conversations. As depicted in FIG. 39, GUI 3900 may include a combined list having one or more teams (e.g., team 3901) in which a user of GUI 3900 is a team member and one or more chat conversations (not shown) in which a user of GUI 3900 is a recipient. As further depicted in FIG. 39, and similar to GUI 3500, GUI 3700, and GUI 3800, GUI 3900 may include a first button 3903 for submitting a request to create a team and/or a request to send a message. As depicted in FIG. 39, first button 3903 may comprise a "plus" button.

As further depicted in FIG. 39, and similar to GUI 3500, GUI 3700, and GUI 3800, GUI 3900 may include a second button 3905 for implementing a search function. For example, the search function may search the combined list of teams and conversations. In some embodiments, when clicked, second button 3905 may present the user GUI 7200 of FIG. 72 or other appropriate GUI for implementing a search function.

Figure 40:
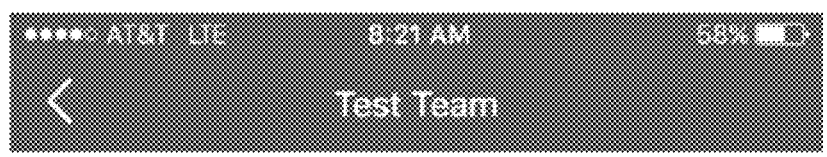
FIG. 40 is an example graphical user interface (GUI) for displaying a list of team members, according to yet another example embodiment of the present disclosure.
Figure 40:
Figure 40:
Figure 40:
Figure 40:
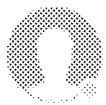

FIG. 40 shows an example GUI 4000 for displaying a list of team members within a team. As depicted in FIG. 40, GUI 4000 may include a list of one or more team members (e.g., team member 3201) in which a user of GUI 4000 is a recipient. The list may include the user of GUI 4000 as shown in FIG. 40 (team member 4003 labeled "me" is the user of GUI 4000 in the example of FIG. 40) or may exclude the user of GUI 4000 (that is, only show the other members of the team). As further depicted in FIG. 40, GUI 4000 may include a button 4005 for receiving a request to add a team member.

Figure 41:
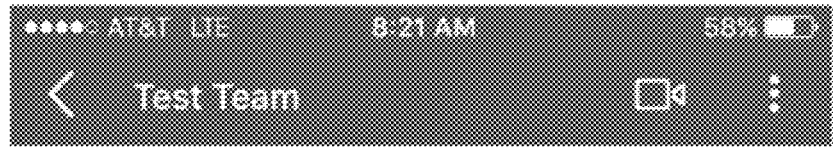
FIG. 41 is an example graphical user interface (GUI) for receiving input of a message for transmitting to a team and/or to one or more recipients, according to yet another example embodiment of the present disclosure.
Figure 41:
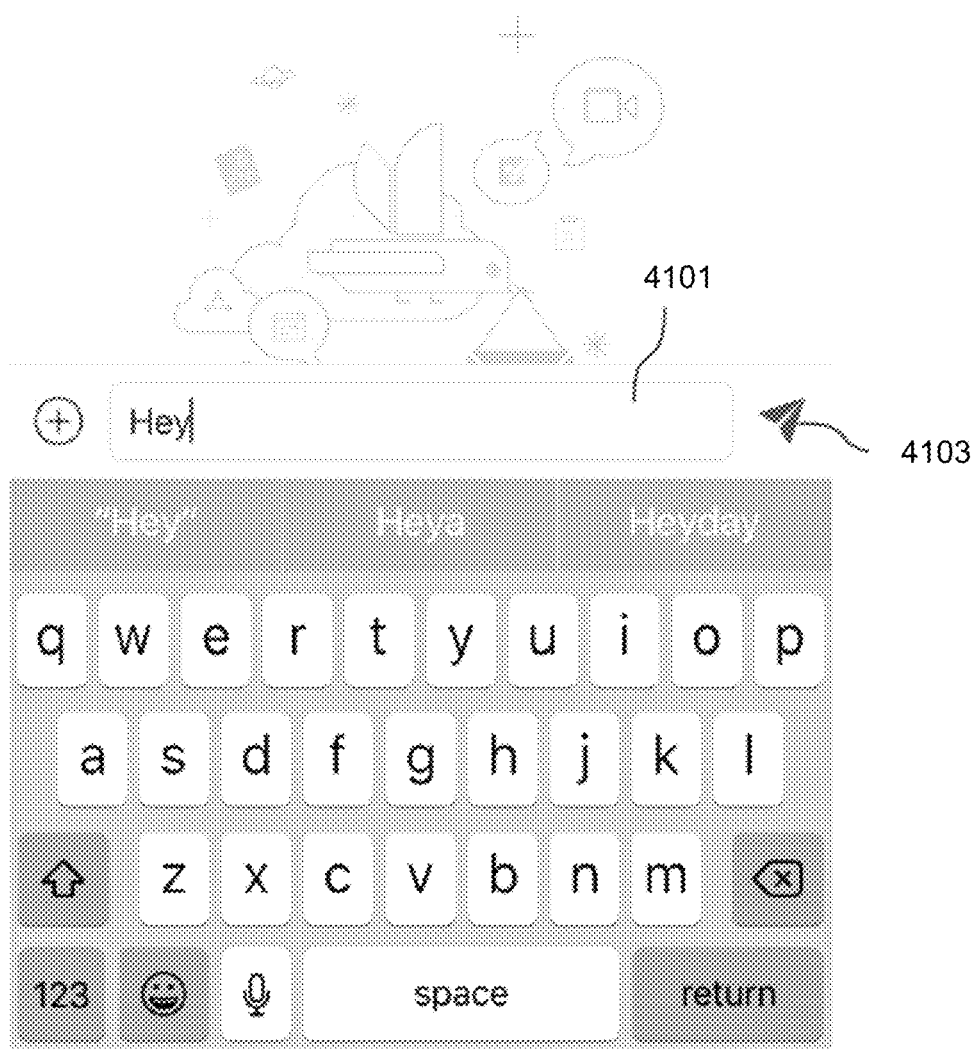

FIG. 41 shows an example GUI 4100 for receiving a message for transmitting to a team and/or to one or more recipients. As depicted in FIG. 41, GUI 4100 may include a text box 4101 for receiving text content and a button 4105 for submitting a request to send a message. In the example of FIG. 41, the message is sent to a team (i.e., to the team members within the team). However, other embodiments are possible in which the message is sent to a subset of team members within the team or to one or more individually specified recipients.

Figure 42:
FIG. 42 is an example graphical user interface (GUI) for displaying a chat conversation associated with a team and/or with one or more recipients, according to yet another example embodiment of the present disclosure.
Figure 42:
Figure 42:
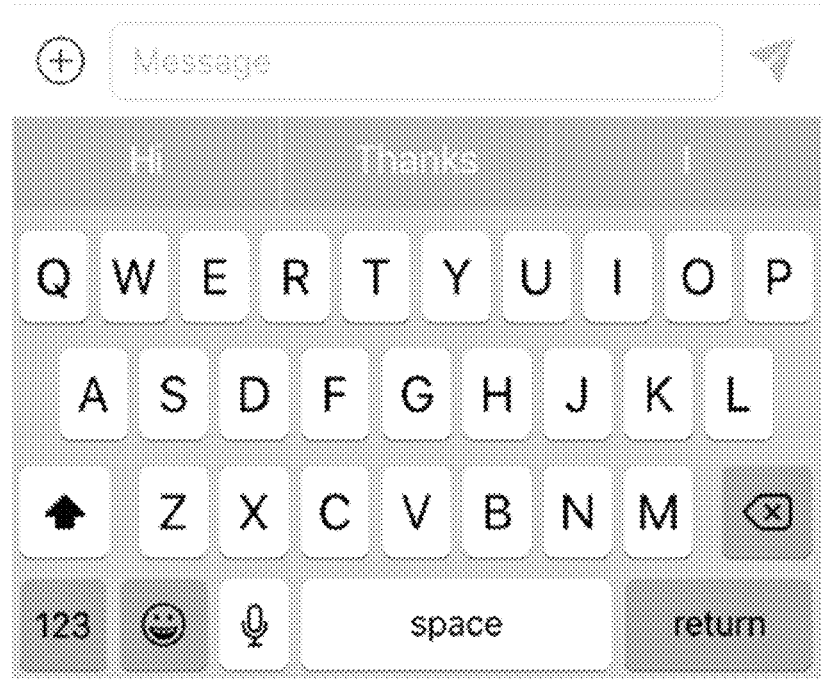
Figure 43:
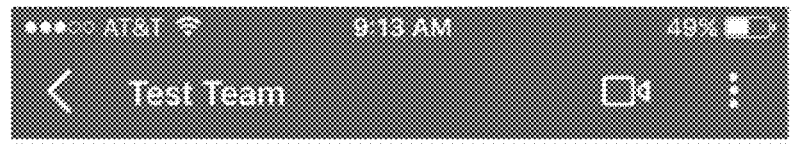
FIG. 43 is another example graphical user interface (GUI) for displaying a chat conversation associated with a team and/or with one or more recipients, according to yet another example embodiment of the present disclosure.
Figure 43:
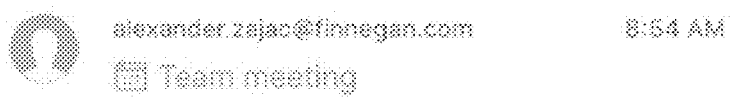
Figure 43:
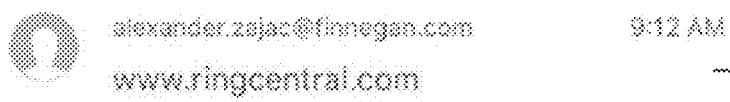
Figure 43:

FIG. 42 shows an example GUI 4200 for displaying a chat conversation associated with a team and/or with one or more recipients. As depicted in FIG. 42, GUI 4200 may include a list of one or more chat messages (e.g., message 4201) in the chat conversation associated with a team and/or with one or more recipients. For example, for each chat message, the list may include the sender of the chat message, the content of the chat message, a date and/or time of sending the chat message, a date and/or time of receiving the chat message, and the like. As further depicted in FIG. 42, GUI 4200 may include a button 4203 for receiving a request to convert the chat conversation to an audio conference and/or a video conference. This request may be used in one or more implementations of method 2900 of FIG. 29 and/or other appropriate methods.

FIG. 43 shows another example GUI 4300 for displaying a chat conversation associated with a team. As depicted in FIG. 43, GUI 4300 may include a list of one or more chat messages (e.g., message 4301*a* and message 4301*b*) in the chat conversation associated with a team. For example, for each message, the list may include the sender of the chat message, the content of the chat message, a date and/or time of sending the chat message, a date and/or time of receiving the chat message, and the like. As further depicted in FIG. 43, GUI 4300 may include tasks (not shown), events (e.g., event 4303), files (not shown), or the like in the chat conversation.

Figure 44:
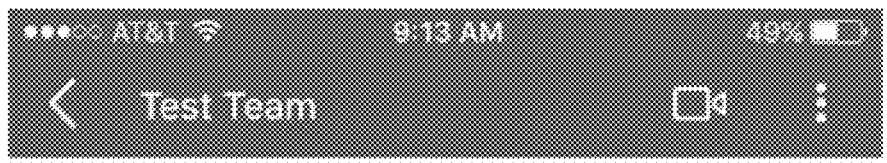
FIG. 44 is an example graphical user interface (GUI) for displaying a reaction to a message, according to yet another example embodiment of the present disclosure.
Figure 44:
Figure 44:
Figure 44:
Figure 44:
Figure 44:
Figure 45:
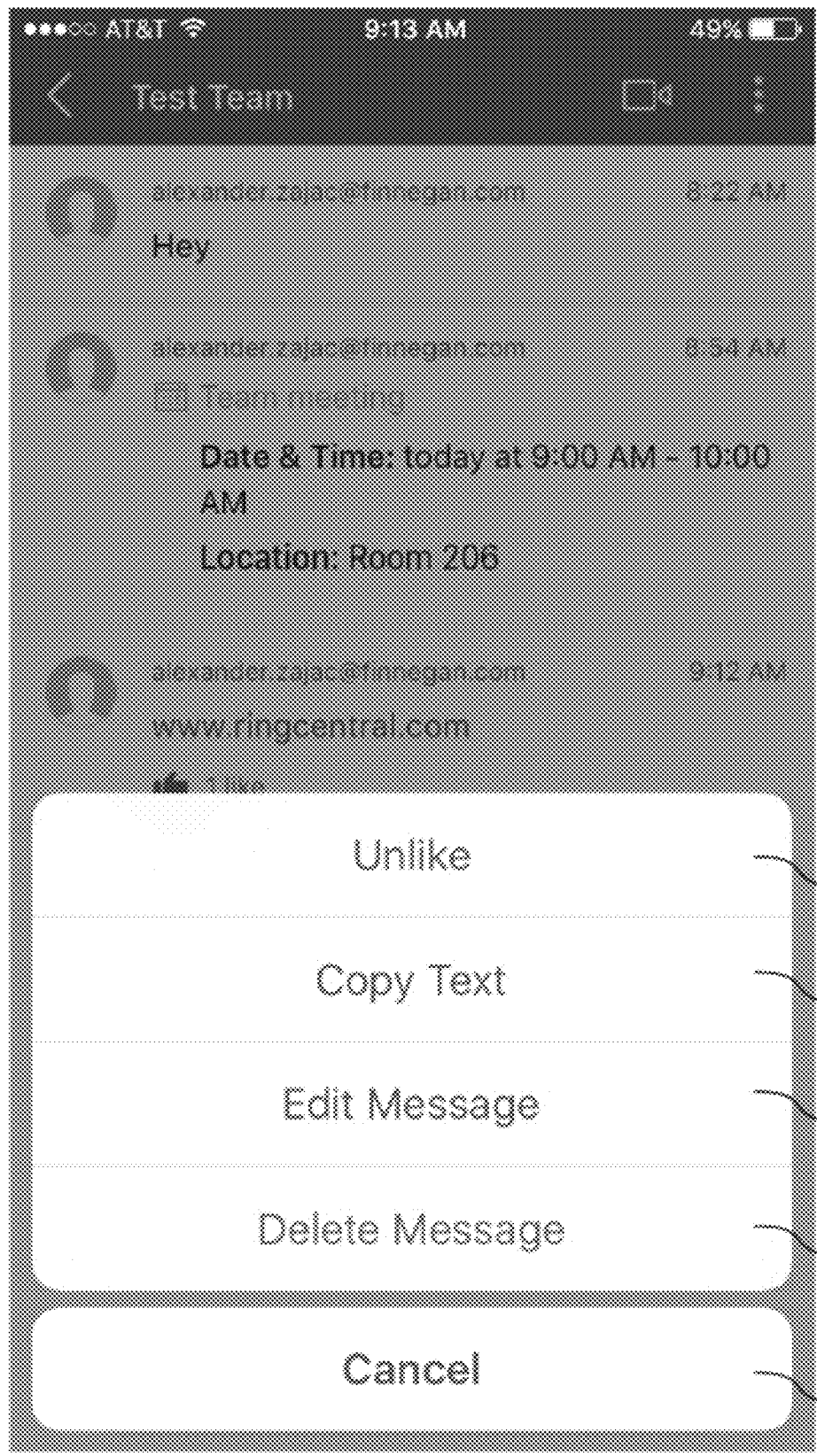
FIG. 45 is an example graphical user interface (GUI) for receiving a request to react to a message, according to yet another example embodiment of the present disclosure.

FIG. 44 shows an example GUI 4400 for displaying a reaction to a message. As depicted in FIG. 44, GUI 4400 may include a list of one or more messages (e.g., message 4401*a* and message 4401*b*) in a chat conversation associated with a team and/or associated with one or more recipients. For example, for each message, the list may include the sender of the message, the content of the message, a date and/or time of sending the message, a date and/or time of receiving the message, and the like. GUI 4400 may also include tasks (not shown), events (e.g., event 4403), files (not shown), or the like in the chat conversation. As further depicted in FIG. 44, GUI 4400 may show one or more reactions (e.g., a "like") to one or more messages in the list (e.g., message 4401*b*). Even though the example of FIG. 44 shows a reaction associated with a message, other embodiments may show reactions to tasks, events, files, or other objects included in the chat conversation.

FIG. 45 shows an example GUI 4500 for receiving a request to react to a message. In the example of FIG. 45, a message (which may be associated with a team) has been selected by a user of GUI 4500. For example, a user may have left-clicked the message, right-clicked the message, double-clicked the message, tapped the message, held down a finger or stylus on the message, or the like.

As depicted in FIG. 45, GUI 4500 may include a drop down list with options which may comprise first button 4501 for receiving a request to react to the selected message. Even though the reaction in the example of FIG. 45 comprises an "unlike," other embodiments may include other reactions (such as "like," "angry," "happy," "funny," "embarrassed," or the like). As further depicted in FIG. 45, GUI 4500 may include other buttons, such as a second button 4503 for placing the text content of the selected message on a clipboard (that is, copying the text content), a third button 4505 for editing the text content of the selected message, and/or a fourth button 4507 for deleting the selected message. A user of GUI 4500 may also deselect the selected message, e.g., by using fifth button 4509.

Figure 46:
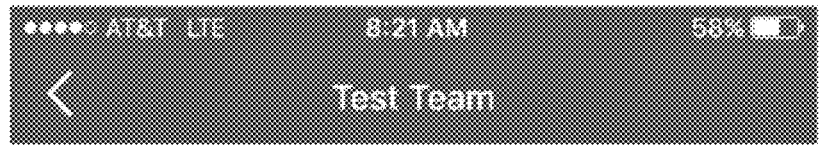
FIG. 46 is an example graphical user interface (GUI) for receiving a request to add a task associated with a team and/or with one or more recipients, according to yet another example embodiment of the present disclosure.
Figure 46:
Figure 47:
FIG. 47 is an example graphical user interface (GUI) for receiving a request to add an event associated with a team and/or with one or more recipients, according to yet another example embodiment of the present disclosure.
Figure 47:

FIG. 46 shows an example GUI 4600 for receiving a request to add a task associated with a team and/or with one or more recipients. As depicted in FIG. 46, GUI 4600 may include a button 4601 for receiving a request to add a task associated with a user of GUI 4600, associated with a team, and/or associated with one or more recipients.

FIG. 47 shows an example GUI 4700 for receiving a request to add an event associated with a team and/or with one or more recipients. As depicted in FIG. 47, GUI 4700 may include a button 4701 for receiving a request to add an event associated with a user of GUI 4700, associated with a team, and/or associated with one or more recipients.

Figure 48:
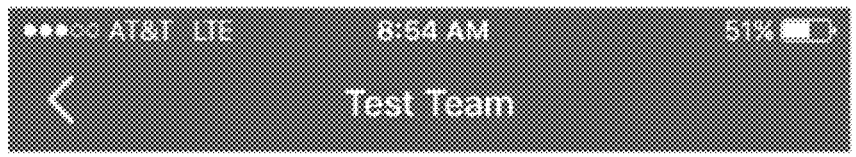
FIG. 48 is an example graphical user interface (GUI) for displaying a list of events (or tasks) associated with a team, according to yet another example embodiment of the present disclosure.
Figure 48:
Figure 48:
Figure 48:

FIG. 48 shows an example GUI 4800 for displaying a list of events (or tasks) associated with a team. As depicted in FIG. 48, GUI 4800 may include list of one or more events (e.g., event 4801) and/or tasks (not shown) associated with a team. For example, for each event, the list may include the title associated with the event, the start date and/or time of the event, the end date and/or time of the event, and the like. As further depicted in FIG. 48, GUI 4800 may include a button 4803 for receiving a request to add an event and/or a task associated with a team (e.g., a team in which a user of GUI 4800 is a team member).

Figure 49:
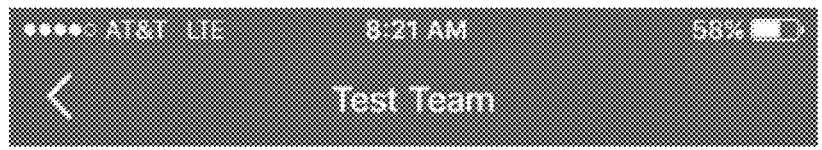
FIG. 49 is an example graphical user interface (GUI) for receiving a request to add a note associated with a team and/or with one or more recipients, according to yet another example embodiment of the present disclosure.
Figure 49:
Figure 49:

FIG. 49 shows an example GUI 4900 for receiving a request to add a note associated with a team and/or with one or more recipients. As depicted in FIG. 49, GUI 4900 may include a button 4901 for receiving a request to add a note associated with a user of GUI 4900, associated with a team, and/or associated with one or more recipients.

Figure 50:
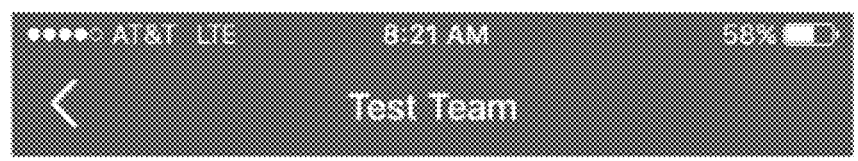
FIG. 50 is an example graphical user interface (GUI) for displaying a list of files associated with a team, according to yet another example embodiment of the present disclosure.
Figure 50:

FIG. 50 shows an example GUI 5000 for displaying a list of files associated with a team. As depicted in FIG. 50, GUI 5000 may include a list 5001 of one or more files associated with a team. (Although empty in GUI 5000, list 5001 may, in other embodiments, include one or more files.) For example, for each file, the list may include the name of the file, the size of the file, the identity of the user who shared the file, and the like. In some embodiments, GUI 5000 may further include a button (not shown) for receiving a request to add a file associated with a team (e.g., a team in which a user of GUI 5000 is a team member).

FIG. 51 shows an example GUI 5100 for receiving a request to add an event, task, note, and/or file. As depicted in FIG. 51, GUI 5100 may include a first button 5101 for receiving a request to add an event associated with a team. In some embodiments, first button 5101 may also be used to add a task associated with the team. In other embodiments, like the example depicted in FIG. 51, GUI 5100 may include a second button 5103 separate from first button 5101 for receiving a request to add a task associated with the team.

As further depicted in FIG. 51, GUI 5100 may also include a third button 5105 for receiving a request to add a note associated with the team. In addition, GUI 5100 may further include a fourth button 5107 for receiving a request to add a file associated with the team. Even though the example of FIG. 51 has a fourth button 5107 for adding a photo, other embodiments may have a fourth button 5107 for adding one or more other types of files, either in addition to or in lieu of photos.

Figure 52:
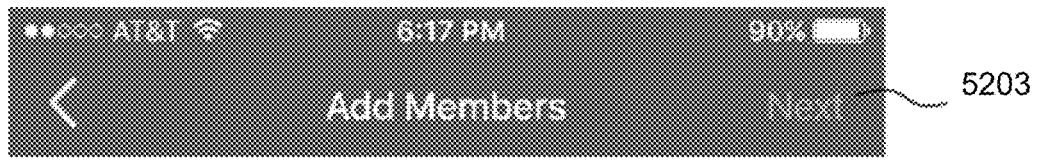
FIG. 52 is an example graphical user interface (GUI) for adding a recipient as a team member, according to yet another example embodiment of the present disclosure.
Figure 52:
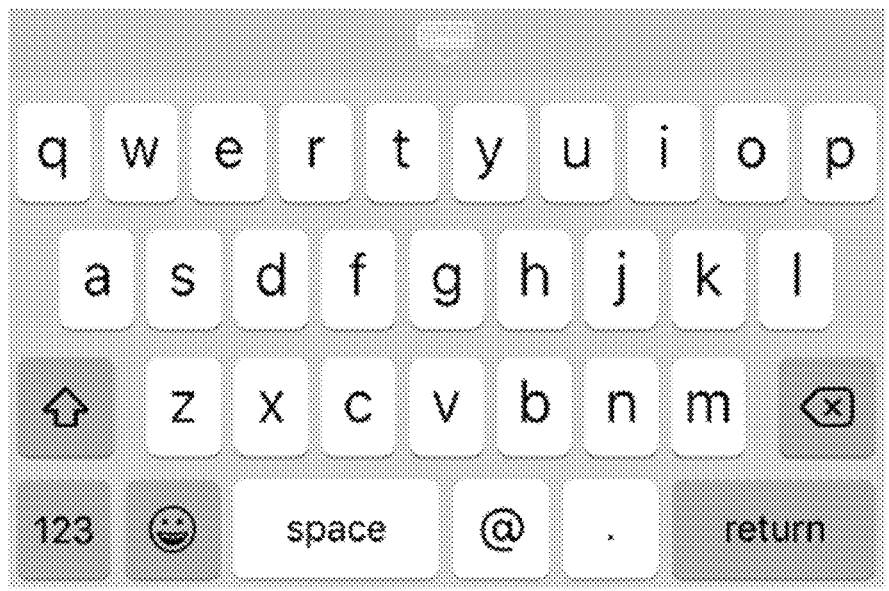

FIG. 52 shows an example GUI 5200 for adding a recipient as a team member. As depicted in FIG. 52, GUI 5200 may include a text box 5201 for receiving an identifier associated with the recipient (e.g., a name, an email address, a phone number, or the like). As further depicted in FIG. 52, GUI 5200 may include a first button 5203 for receiving a request to add the recipient to a team.

In the example of FIG. 52, GUI 5200 may also include a second button 5205 for receiving a contacts list associated with a user of GUI 5200. Accordingly, second button 5205 may, for example, result in the user being presented with GUI 35 of FIG. 35 and/or other appropriate GUI for displaying a contacts list.

Figure 53:
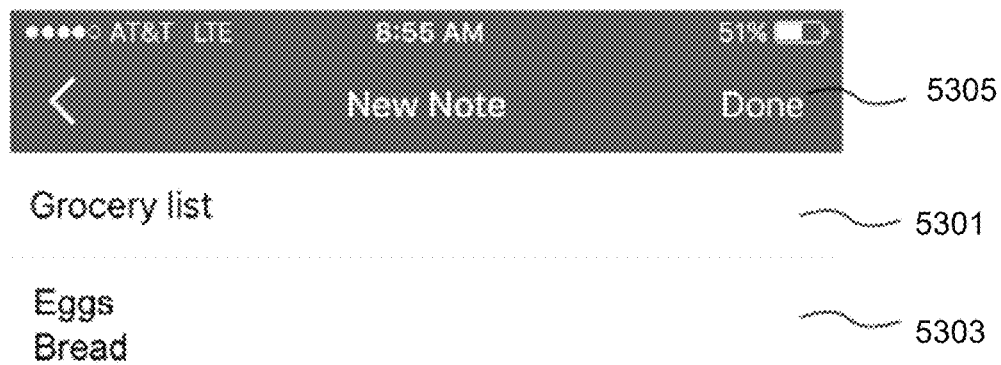
FIG. 53 is an example graphical user interface (GUI) for creating a note, according to yet another example embodiment of the present disclosure.

FIG. 53 shows an example GUI 5300 for creating a note. As depicted in FIG. 53, GUI 5300 may include a first text box 5301 for receiving a title and a second text box 5303 for receiving text content. For example, a title may generally have a length shorter than the text content. By way of further example, a title may generally lack line breaks while the text content may generally contain line breaks. In the example of FIG. 53, the title ("Grocery list") comprises a single line of text while the text content ("Eggs\nBread") contains a single line break. As further depicted in FIG. 53, GUI 5300 may include a button 5305 for receiving a request to create a note.

Figure 54:
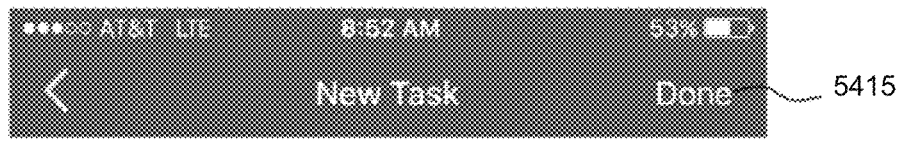
FIG. 54 is an example graphical user interface (GUI) for creating a task, according to yet another example embodiment of the present disclosure.

FIG. 54 shows an example GUI 5400 for creating a task. As depicted in FIG. 54, GUI 5400 may include a first text box 5401 for receiving a title, a second text box 5403 for receiving a start date, and a third text box 5405 for receiving an end date. At least one of second text box 5403 and third text box 5405 may automatically receive text from a date selector 5407. Although the example of FIG. 54 includes second text box 5403 and third text box 5405, other embodiments may include only one text box for receiving a single date.

As further depicted in FIG. 54, GUI 5400 may include a fourth text box 5409 for receiving a time. In some embodiments, fourth text box 5409 may automatically receive text from a time selector (not shown). GUI 5400 may also include a first drop-down box 5411 for selecting one or more repeat settings related to the task (e.g., "never," "every day," "every weekday," "every week," etc.) and may also include a second drop-down box 5413 for selecting one or more completion settings related to the task (e.g., complete when checked, complete when checked by all assignees, complete when 100% done, etc.). GUI 5400 may further include a button 5415 for receiving a request to create a task.

Figure 55:
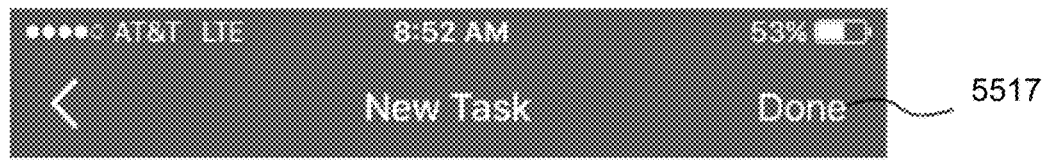
FIG. 55 is another example graphical user interface (GUI) for creating a task, according to yet another example embodiment of the present disclosure.
Figure 55:

FIG. 55 shows another example GUI 5500 for creating a task. GUI 5400 of FIG. 54 and GUI 5500 of FIG. 55 may be used in combination or separately.

As depicted in FIG. 55, and similar to GUI 5400, GUI 5500 may include a first text box 5501 for receiving a start date, a second text box 5503 for receiving an end date, and a third text box 5505 for receiving a time. In some embodiments, at least one of first text box 5501 and second text box 5503 may automatically receive text from a date selector (not shown). Similarly, third text box 5505 may automatically receive text from a time selector (not shown). Although the example of FIG. 55 includes first text box 5501 and second text box 5503, other embodiments may include only one text box for receiving a single date.

As further depicted in FIG. 55, and similar to GUI 5400, GUI 5500 may include a first drop-down box 5507 for selecting one or more repeat settings related to the task (e.g., "never," "every day," "every weekday," "every week," etc.) and may include a second drop-down box 5509 for selecting one or more completion settings related to the task (e.g., complete when checked, complete when checked by all assignees, complete when 100% done, etc.).

In some embodiments, GUI 5500 may include additional components for receiving options related to the task. For example, as depicted in FIG. 55, GUI 5500 may include a set of checkboxes 5511 for receiving a color selection related to the task, a fourth text box 5513 for receiving section information (which may comprise text) related to the task, and a fifth text box 5515 for receiving a description (which may also comprise text) related to the task. Moreover, similar to GUI 5400, GUI 5500 may further include a button 5517 for receiving a request to create a task.

Figure 56:
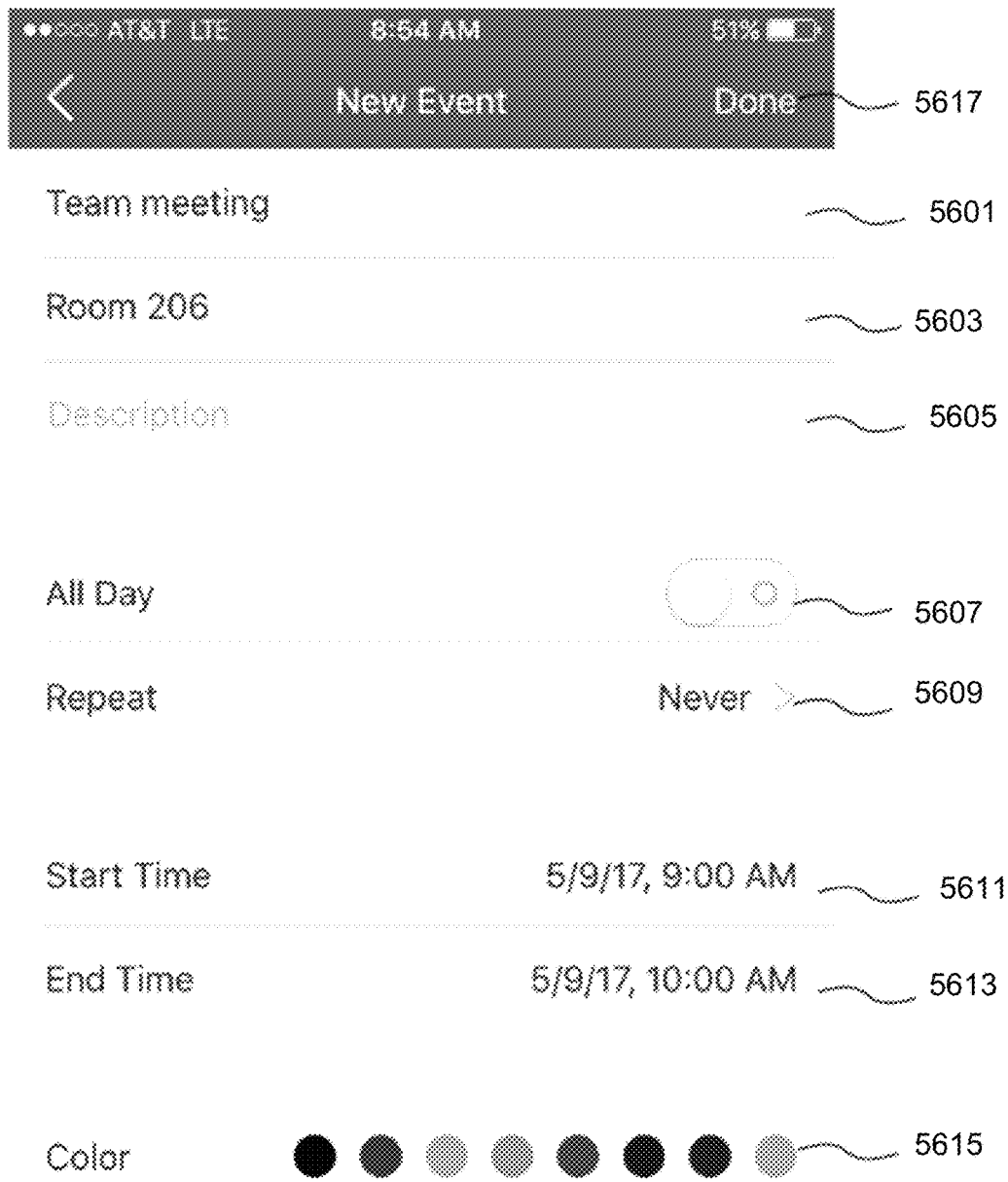
FIG. 56 is an example graphical user interface (GUI) for creating an event, according to yet another example embodiment of the present disclosure.

FIG. 56 shows an example GUI 5600 for creating an event. As depicted in FIG. 56, and similar to GUI 5400 and GUI 5500, GUI 5600 may include a first text box 5601 for receiving a title.

As further depicted in FIG. 56, GUI 5600 may include a second text box 5603 for receiving location information (which may comprise text) related to the event and a third text box 5605 for receiving a description (which may also comprise text) related to the event. In some embodiment, the received location information may be provided to a module or separate application using global position system (GPS) or other location device(s).

As further depicted in FIG. 56, GUI 5600 may include a checkbox 5607 for selecting whether the event is an all-day event or not. Moreover, similar to GUI 5400 and GUI 5500, GUI 5600 may include a first drop-down box 5609 for selecting one or more repeat settings related to the event (e.g., "never," "every day," "every weekday," "every week," etc.).

Similar to GUI 5400 and GUI 5500, GUI 5600 may further include a fourth text box 5611 for receiving a start date and/or time and a fifth text box 5613 for receiving an end date and/or time. In some embodiments, at least one of fourth text box 5611 and fifth text box 5613 may automatically receive text from a date selector (not shown). Similarly, third text box 5605 may automatically receive text from a date selector (not shown), a time selector (not shown), or a combination thereof. Although the example of FIG. 56 includes fourth text box 5611 and fifth text box 5613, other embodiments may include only one text box for receiving a single date and/or time.

As further depicted in FIG. 56, and similar to GUI 5500, GUI 5600 may include a set of checkboxes 5615 for receiving a color selection related to the event and a button 5617 for receiving a request to create an event.

Figure 57:
FIG. 57 is an example graphical user interface (GUI) for sending a message to at least one recipient, according to yet another example embodiment of the present disclosure.

FIG. 57 shows an example GUI 5700 for sending a message to at least one recipient. As depicted in FIG. 57, GUI 5700 may include a first text box 5701 for receiving an identifier associated with the at least one recipient (e.g., a name, an email address, a phone number, or the like). GUI 5700 may further include a list of one or more contacts (e.g., contact 5703) stored in a contacts list associated with a user of GUI 5700.

As further depicted in FIG. 57, GUI 5700 may include a second text box 5705 for receiving text content and a button 5707 for submitting a request to send a message. The message may include the text content from second text box 5705 and be addressed to the at least one recipient identified in first text box 5701.

Figure 58:
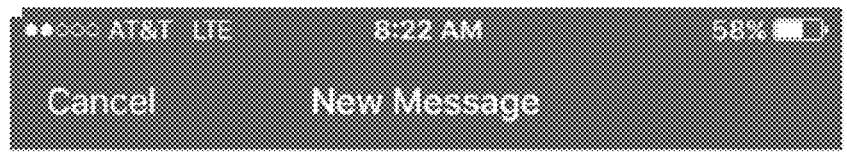
FIG. 58 is another example graphical user interface (GUI) for sending a message to at least one recipient, according to yet another example embodiment of the present disclosure.
Figure 58:
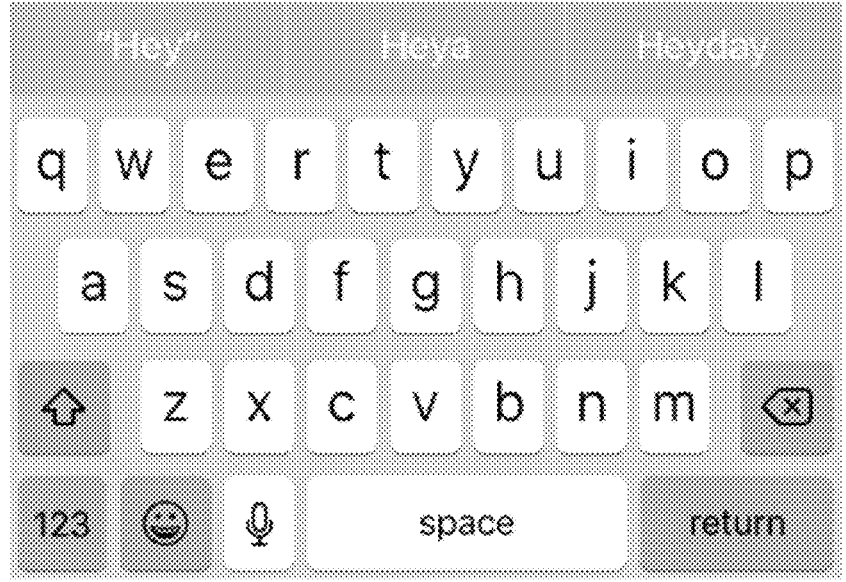

FIG. 58 shows another example GUI 5800 for sending a message to at least one recipient. As depicted in FIG. 58, and similar to GUI 5700, GUI 5800 may include a first text box 5801 for receiving an identifier associated with the at least one recipient. Although the identifier in the example of FIG. 58 is an email address, the identifier may instead be a name, a phone number, or the like.

As further depicted in FIG. 58, and similar to GUI 5700, GUI 5800 may include a second text box 5803 for receiving text content and a button 5805 for submitting a request to send a message. The message may include the text content from second text box 5803 and be addressed to the at least one recipient identified in first text box 5801.

Figure 59:
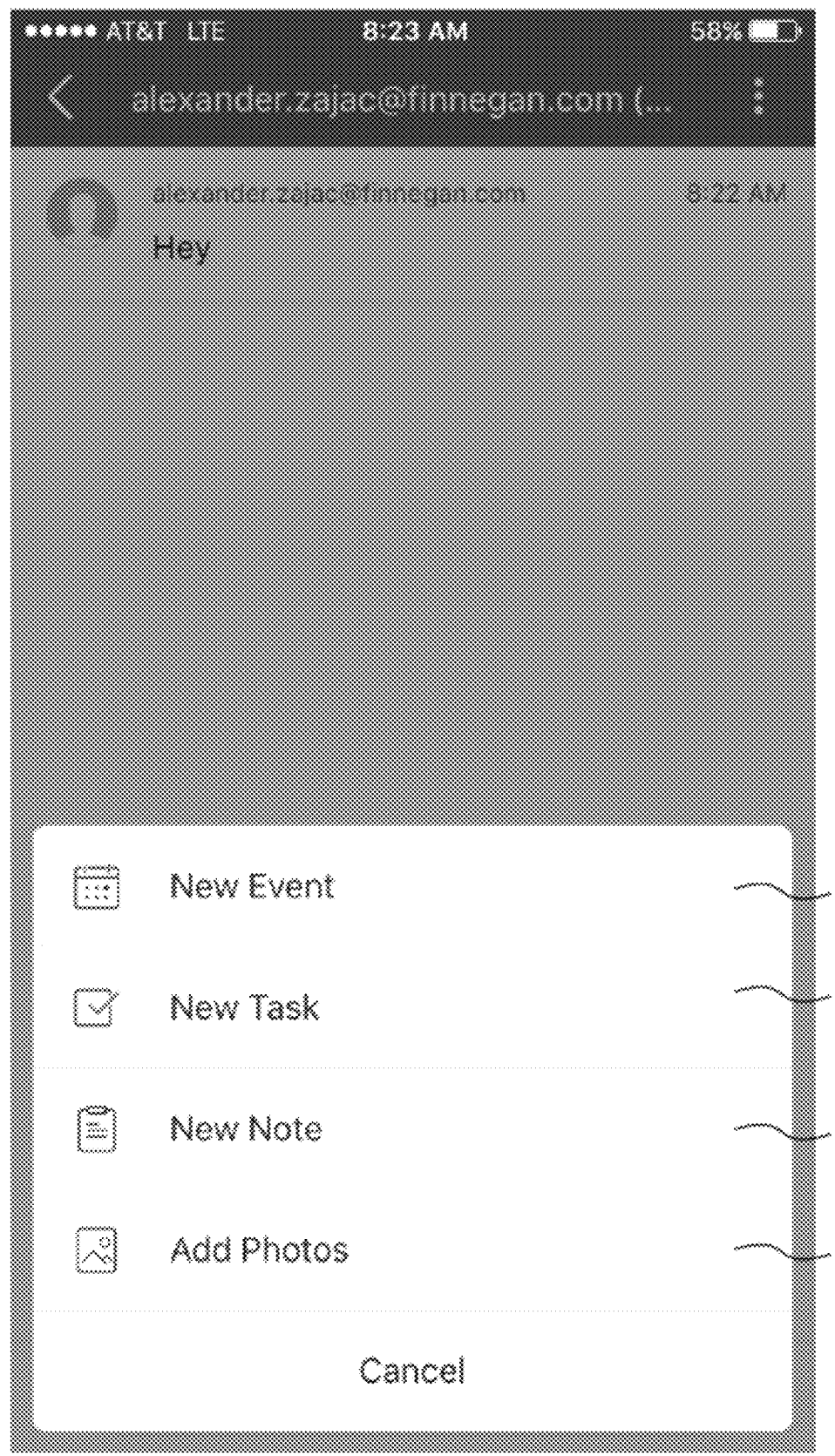
FIG. 59 is another example graphical user interface (GUI) for receiving a request to add an event, task, note, and/or file, according to yet another example embodiment of the present disclosure.

FIG. 59 shows another example GUI 5900 for receiving a request to add an event, task, note, and/or file. As depicted in FIG. 59, and similar to GUI 5100, GUI 5900 may have a first button 5901 for receiving a request to add an event associated with one or more recipients. In some embodiments, first button 5901 may also be used to add a task associated with the team. In other embodiments, like the example depicted in FIG. 59, GUI 5900 may include a second button 5903 separate from first button 5901 for receiving a command to add a task associated with the one or more recipients.

As further depicted in FIG. 59, and similar to GUI 5100, GUI 5900 may also include a third button 5905 for receiving a request to add a note associated with the one or more recipients. In addition, GUI 5900 may further include a fourth button 5907 for receiving a request to add a file associated the one or more recipients. Even though the example of FIG. 59 has a fourth button 5907 for adding a photo, other embodiments may have a fourth button 5907 for adding one or more other types of files, either in addition to or in lieu of photos.

Figure 60:
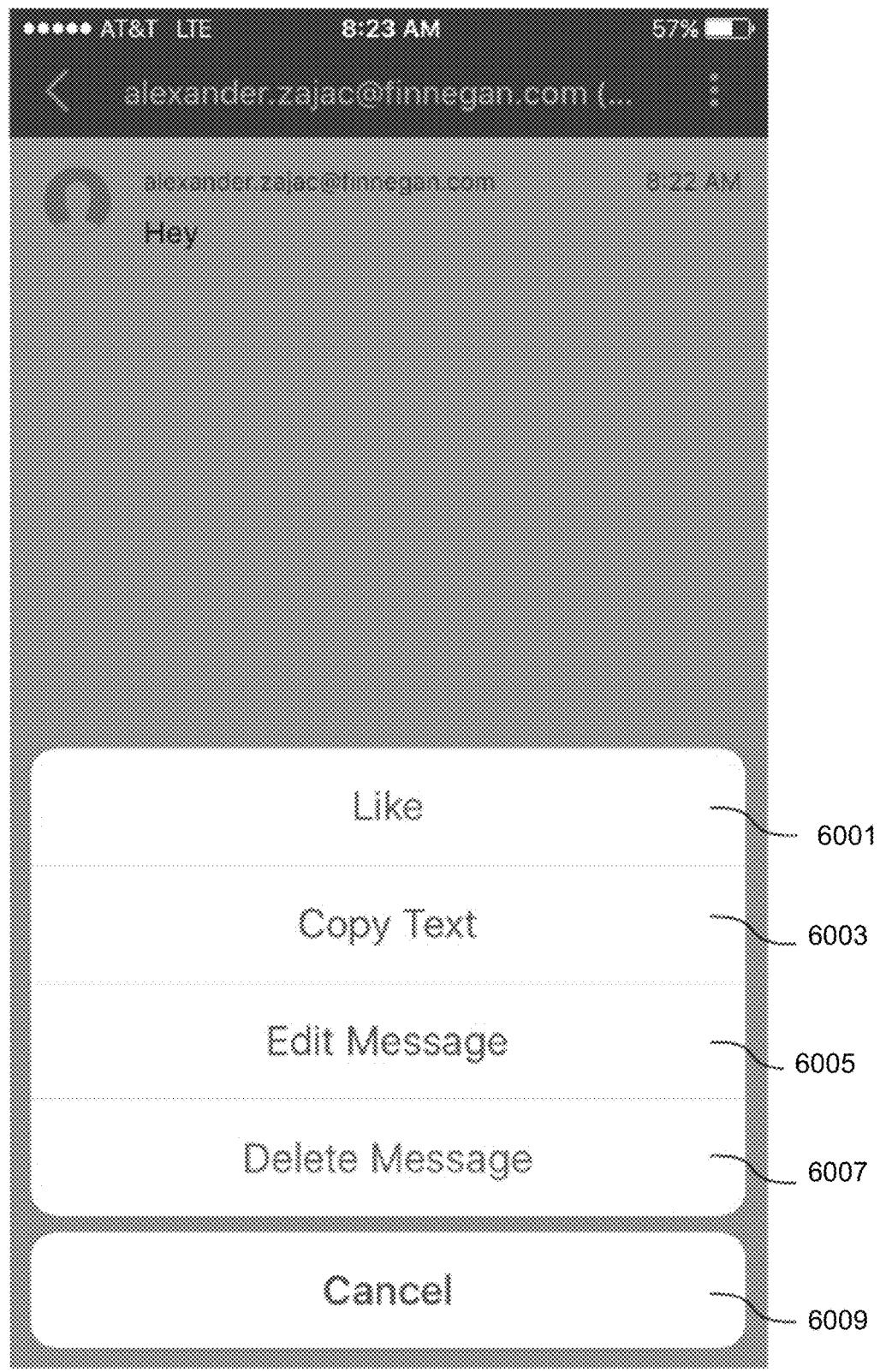
FIG. 60 is another example graphical user interface (GUI) for receiving a request to react to a message, according to yet another example embodiment of the present disclosure.

FIG. 60 shows another example GUI 6000 for receiving a request to react to a message. In the example of FIG. 60, a message (which may be associated with one or more recipients) has been selected by a user of GUI 6000. For example, a user may have left-clicked the message, right-clicked the message, double-clicked the message, tapped the message, held down a finger or stylus on the message, or the like.

As depicted in FIG. 60, and similar to GUI 4500, GUI 6000 may include a first button 6001 for receiving a request to react to the selected message. Even though the reaction in the example of FIG. 60 comprises a "like," other embodiments may include other reactions (such as "unlike," "angry," "happy," "funny," "embarrassed," or the like). As further depicted in FIG. 60, and similar to GUI 4500, GUI 6000 may include other buttons, such as a second button 6003 for placing the text content of the selected message on a clipboard (that is, copying the text content), a third button 6005 for editing the text content of the selected message, and/or a fourth button 6007 for deleting the selected message. A user of GUI 6000 may also deselect the selected message and/or close first button 6001, second button 6003, third button 6005, and fourth button 6007, e.g., by using fifth button 6009.

Figure 61:
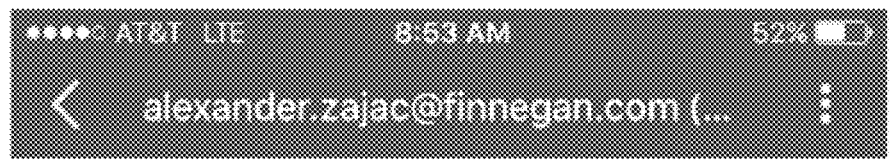
FIG. 61 is an example graphical user interface (GUI) for displaying a chat conversation having one or more recipients, according to yet another example embodiment of the present disclosure.
Figure 61:
Figure 61:
Figure 61:
Figure 61:

FIG. 61 shows an example GUI 6100 for displaying a chat conversation having one or more recipients. As depicted in FIG. 61, GUI 6100 may include one or more chat messages (e.g., message 6101) in the chat conversation. For example, for each chat message, the list may include the sender of the chat message, the content of the chat message, a date and/or time of sending the chat message, a date and/or time of receiving the chat message, and the like. As further depicted in FIG. 61, GUI 6100 may include one or more tasks (e.g., task 6103) and/or one or more events (not shown) associated with the chat conversation. For example, for each task, the list may include the title associated with the task, the due date and/or time of the task, one or more assignees associated with the task, and the like.

Figure 62:
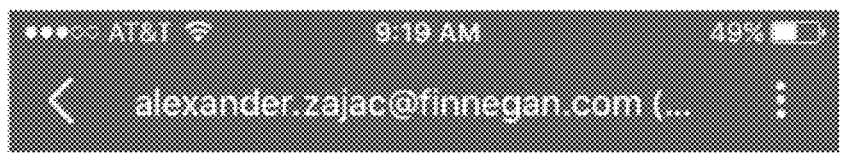
FIG. 62 is another example graphical user interface (GUI) for displaying a chat conversation having one or more recipients, according to yet another example embodiment of the present disclosure.
Figure 62:
Figure 62:
Figure 62:
Figure 62:
Figure 62:
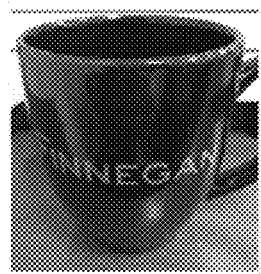
Figure 62:
Figure 62:

FIG. 62 shows another example GUI 6200 for displaying a chat conversation having one or more recipients. As depicted in FIG. 62, and similar to GUI 6100, GUI 6200 may include one or more chat messages (e.g., message 6201) in the chat conversation and may include one or more tasks (e.g., task 6203) and/or one or more events (not shown) associated with the chat conversation.

As further depicted in FIG. 62, GUI 6200 may include one or more notes (e.g., note 6205) in the chat conversation. For example, for each note, the list may include the author of the note, the title associated with the note, a sample of the text content associated with the note, and the like. A sample may comprise, for example, a subset of the text content associated with the note.

As further depicted in FIG. 62, GUI 6200 may include one or more files (e.g., file 6207) in the chat conversation. For example, for each file, the list may include the sender of the file, the name of the file, a sample of the file, and the like. In the example of GUI 6200, file 6207 comprises a photo, and the list includes a thumbnail of the photo. Other embodiments with other types of files are possible (e.g., audio, video, etc.), and the sample may vary depending on the type of file (e.g., a sample may comprise an audio clip, a video clip, a video thumbnail, etc.).

Figure 63:
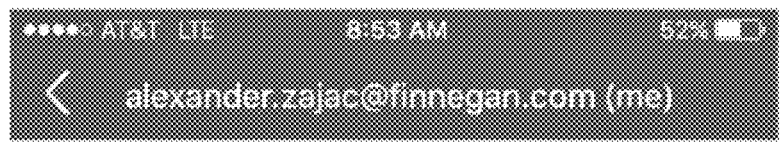
FIG. 63 is an example graphical user interface (GUI) for displaying a list of tasks (or events) associated with one or more recipients, according to yet another example embodiment of the present disclosure.
Figure 63:

FIG. 63 shows an example GUI 6300 for displaying a list of tasks (or events) associated with one or more recipients. As depicted in FIG. 63, GUI 6300 may include list of one or more tasks (e.g., task 6301) and/or events (not shown) associated with one or more recipients. For example, for each task, the list may include the title associated with the task, the due date and/or time of the task, one or more assignees associated with the task, and the like. As further depicted in FIG. 63, GUI 6300 may include a button 6303 for receiving a request to add an event and/or a task associated with the one or more recipients.

Figure 64:
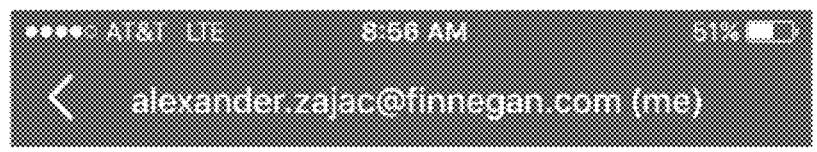
FIG. 64 is an example graphical user interface (GUI) for displaying a list of notes associated with one or more recipients, according to yet another example embodiment of the present disclosure.
Figure 64:

FIG. 64 shows an example GUI 6400 for displaying a list of notes associated with a team and/or with one or more recipients. As depicted in FIG. 64, GUI 6400 may include a list of one or more notes (e.g., note 6401) associated with a team and/or with one or more recipients. For example, for each note, the list may include the author of the note, the title associated with the note, a sample of the text content associated with the note, and the like. As further depicted in FIG. 64, GUI 6400 may include a button 6403 for receiving a request to add a note associated with the team and/or with the one or more recipients.

Figure 65:
FIG. 65 is an example graphical user interface (GUI) for displaying a list of files associated with one or more recipients, according to yet another example embodiment of the present disclosure.
Figure 65:
Figure 65:
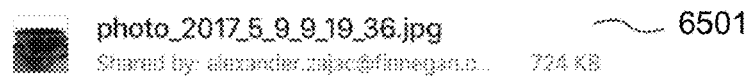

FIG. 65 shows an example GUI 6500 for displaying a list of files associated with one or more recipients. As depicted in FIG. 65, GUI 6500 may include a list of one or more files (e.g., file 6501) associated with one or more recipients. For example, for each file, the list may include the name of the file, the size of the file, the identity of the user who shared the file, a sample of the file, and the like. GUI 6500 may also include a button (not shown) for receiving a request to add a file associated with the one or more recipients.

Figure 66:
FIG. 66 is an example graphical user interface (GUI) for receiving a request to alter a status of a conversation, according to yet another example embodiment of the present disclosure.
Figure 66:
Figure 66:

FIG. 66 shows an example GUI 6600 for receiving a request to alter a status of a conversation. In the example of FIG. 66, a message 6601 (which, in the example of FIG. 66, may be associated with a team) has been selected by a user of GUI 6600. In the example of FIG. 66, a user has selected message 6601 by swiping a chat conversation or a team including message 6601 to the right. In other embodiments, a user may have swiped the conversation or team to the left, left-clicked the conversation or team, right-clicked the conversation or team, double-clicked the conversation or team, tapped the conversation or team, held down a finger or stylus on the conversation or team, or the like.

As further depicted in FIG. 66, GUI 6600 may further include a button 6603 for receiving a request to alter a status of the chat conversation or team including the selected message. In the example of FIG. 66, button 6603 receives a request to mark the chat conversation or the team including the selected message as "unread"; other embodiments are possible in which button 6603 receives a request to mark the chat conversation or team including the selected message as "new," "seen," "unseen," or the like.

FIG. 67 shows an example GUI 6700 for displaying one or more messages associated with a team having an altered status. In the example of FIG. 67, a list of chat conversations, which may be associated with a team or may be direct conversations having a plurality of recipients is shown. As further depicted in FIG. 67, a chat conversation 6701 having one or more chat messages (which, in the example of FIG. 67, may be associated with a team) has been labeled as "unread" by a user of GUI 6700. In other embodiments, conversation 6701 may have one or more other altered statuses, such as "new," "seen," "unseen," or the like.

As further depicted in FIG. 67, conversation 6701 may further include one or more indicators, e.g., indicator 6703a and indicator 6703b, indicating the altered status of conversation 6701. The example of FIG. 67 further shows the name of the team associated with message 6701 as bolded. Other indicators than those in the example of FIG. 67 are possible.

Figure 68:
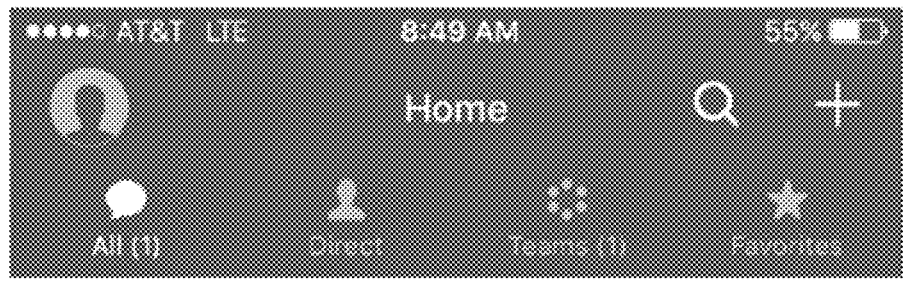
FIG. 68 is another example graphical user interface (GUI) for receiving a request to alter a status of a conversation, according to yet another example embodiment of the present disclosure.
Figure 68:
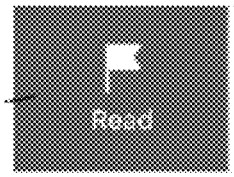
Figure 68:
Figure 68:
Figure 68:
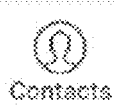
Figure 68:

FIG. 68 shows another example GUI 6800 for receiving a request to alter a status of a conversation. In the example of FIG. 68, a message 6801 (which, in the example of FIG. 68, may be associated with a team) has been selected by a user of GUI 6800. In the example of FIG. 68, a user has selected message 6801 by swiping a chat conversation or a team including message 6801 to the right. In other embodiments, a user may have swiped the conversation or team to the left, left-clicked the conversation or team, right-clicked the conversation or team, double-clicked the conversation or team, tapped the conversation or team, held down a finger or stylus on the conversation or team, or the like.

As further depicted in FIG. 68, GUI 6800 may further include a button 6803 for receiving a request to alter a status of the chat conversation or team including the selected message. In the example of FIG. 68, button 6803 receives a request to mark the chat conversation or the team including the selected message as "read"; other embodiments are possible in which button 6803 receives a request to mark the chat conversation or team including the selected message as "unread," "new," "seen," "unseen," or the like.

Figure 69:
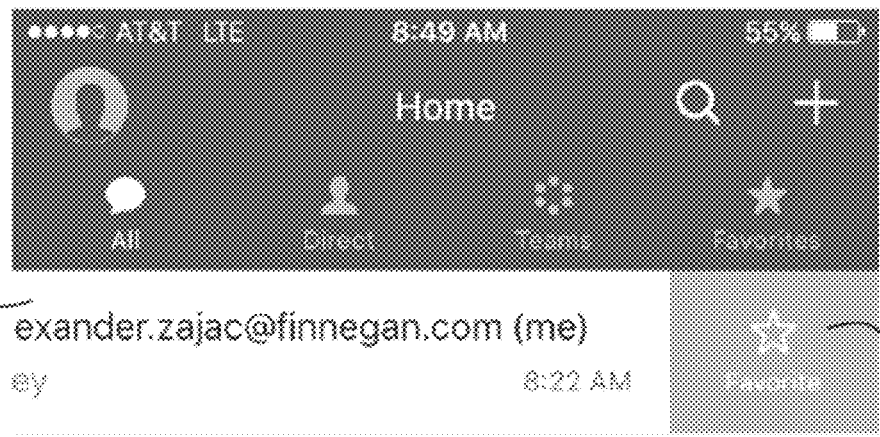
FIG. 69 is yet another example graphical user interface (GUI) for receiving a request to alter a status of a conversation, according to yet another example embodiment of the present disclosure.
Figure 69:
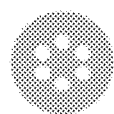
Figure 69:
Figure 69:
Figure 69:
Figure 69:

FIG. 69 shows yet another example GUI 6900 for receiving a request to alter a status of a conversation. In the example of FIG. 69, a list of chat conversations, which may be associated with a team or may be direct conversations having a plurality of recipients is shown. As further depicted in FIG. 69, a chat conversation 6901 having one or more messages (which, in the example of FIG. 69, may be associated with one or more recipients) has been selected by a user of GUI 6900. In the example of FIG. 69, a user has selected conversation 6901 by swiping conversation 6901 to the left. In other embodiments, a user may have swiped conversation 6901 to the right, left-clicked conversation 6901, right-clicked conversation 6901, double-clicked conversation 6901, tapped conversation 6901, held down a finger or stylus on conversation 6901, or the like.

As further depicted in FIG. 69, GUI 6900 may further include a button 6903 for receiving a request to alter a status of the selected conversation. In the example of FIG. 69, button 6903 receives a request to mark the selected conversation as a "favorite"; other embodiments are possible in which button 6103 receives a request to mark the selected conversation as "read," "unread," "new," "seen," "unseen," or the like.

Figure 70:
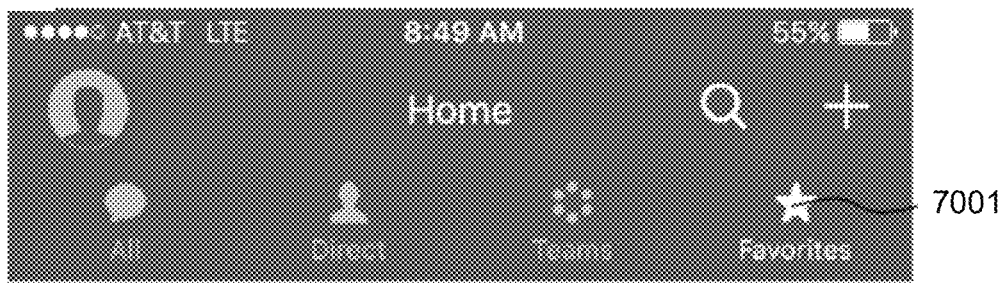
FIG. 70 is another example graphical user interface (GUI) for displaying a list of one or more messages with an altered status, according to yet another example embodiment of the present disclosure.
Figure 70:
Figure 70:
Figure 70:
Figure 70:
Figure 70:

FIG. 70 shows another example GUI 7000 for displaying a conversation with an altered status. As depicted in FIG. 70, GUI 7000 may show all conversations with a particular status 7001. In the example of FIG. 70, status 7001 is a "favorite" status. In other embodiments, status 7001 may be another status, such as "read," "unread," "new," a "liked" status, etc.

FIG. 71 shows yet another example GUI 7100 for receiving a request to alter a status of a conversation. In the example of FIG. 71, a conversation 7101 (which, in the example of FIG. 71, may be associated with one or more recipients) has been selected by a user of GUI 7100. In the example of FIG. 71, a user has selected conversation 7101 by swiping conversation 7101 to the left. In other embodiments, a user may have swiped conversation 7101 to the right, left-clicked conversation 7101, right-clicked conversation 7101, double-clicked conversation 7101, tapped conversation 7101, held down a finger or stylus on conversation 7101, or the like.

As further depicted in FIG. 71, GUI 7100 may further include a button 7103 for receiving a request to alter a status of the selected conversation. In the example of FIG. 71, button 7103 receives a request to mark the selected conversation as an "unfavorite"; other embodiments are possible in which button 7103 receives a request to mark the selected message as "favorite," "read," "unread," "new," "seen," "unseen," or the like.

Figure 72:
FIG. 72 is an example graphical user interface (GUI) for searching teams, contacts, and/or messages, according to yet another example embodiment of the present disclosure.
Figure 72:
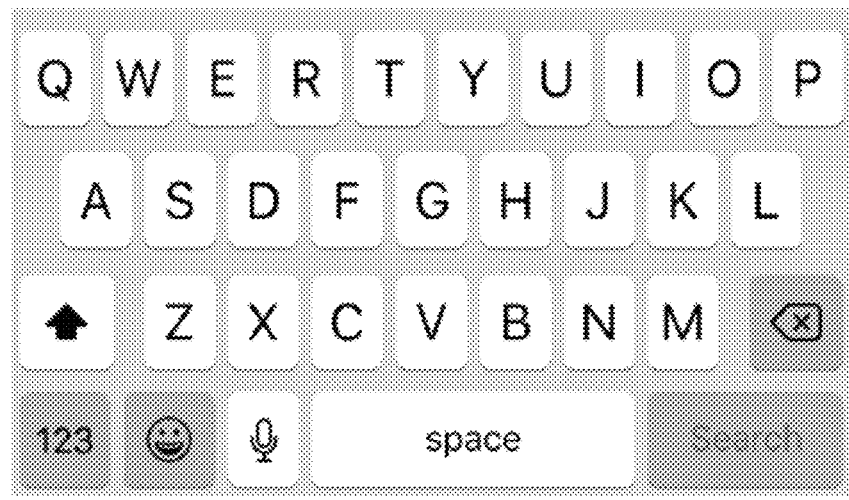

FIG. 72 shows an example GUI 7200 for searching teams, contacts, and/or messages. As depicted in FIG. 72, GUI 7200 may include a text box 7201 for receiving a search term. A search term may comprise one or more text characters which is matched against one or more text strings (e.g., a name, an email address, a phone number, text content, and the like) associated with teams (in which a user of GUI 7200 is a member), contacts (on a contacts list associated with a user of GUI 7200), and/or messages (having a user of GUI 7200 as a recipient).

As further depicted in FIG. 72, GUI 7200 may further include a results list 7203. Although empty in GUI 7200, list 7203 may, in other embodiments, include one or more teams, contacts, and/or messages having a text string that matches (at least in part) the search term.

Figure 73:
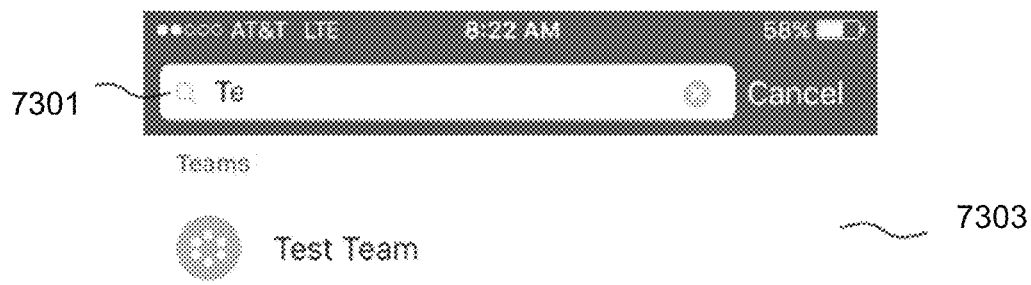
FIG. 73 is another example graphical user interface (GUI) for searching teams, contacts, and/or messages, according to yet another example embodiment of the present disclosure.
Figure 73:
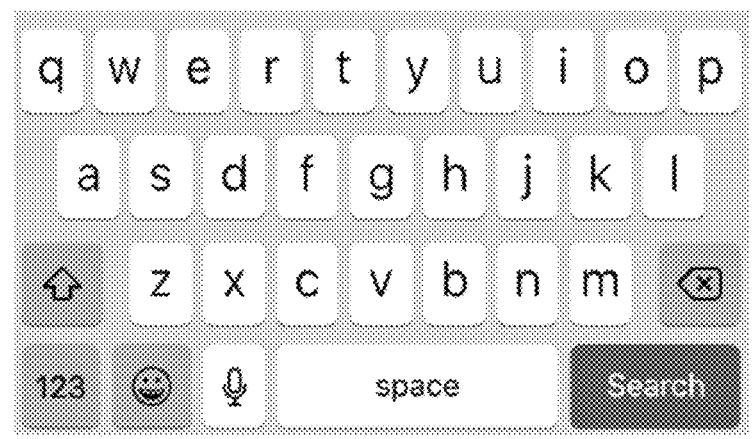

FIG. 73 shows another example GUI 7300 for searching teams, contacts, and/or messages. As depicted in FIG. 73, and similar to GUI 7300, GUI 7300 may include a text box 7301 for receiving a search term. In the example of FIG. 73, the search term is "Te". Other embodiments having different search terms are possible As further depicted in FIG. 73, and similar to GUI 7200, GUI 7300 may further include a results list 7303. In the example of FIG. 73, list 7303 includes a team having a name ("Test Team") that matches, at least in part, the search term ("Te"). In other embodiments, list 7303 may include contacts and/or messages, depending on if the implemented search function searches teams, contacts, messages, or any combination thereof.

Figure 74:
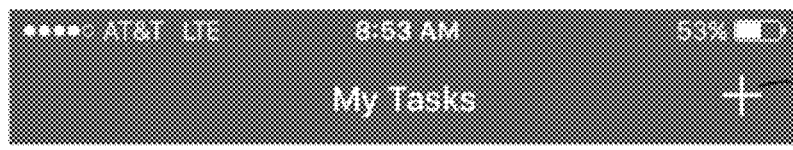
FIG. 74 is an example graphical user interface (GUI) for displaying a list of tasks (or events) associated with a user, according to yet another example embodiment of the present disclosure.
Figure 74:
Figure 74:
Figure 74:
Figure 74:
Figure 74:

FIG. 74 shows an example GUI 7400 for displaying a list of tasks (or events) associated with a user. As depicted in FIG. 74, and similar to GUI 6300, GUI 7400 may include list of one or more tasks (e.g., task 7401) and/or events (not shown) associated with a user of GUI 7400. For example, for each task, the list may include the title associated with the task, the due date and/or time of the task, one or more assignees associated with the task, and the like. Similarly, for each event, the list may include the title associated with the event, the start date and/or time of the event, the end date and/or time of the event, and the like. As further depicted in FIG. 74, and similar to GUI 6300, GUI 7400 may include a button 7403 for receiving a request to add an event and/or a task associated with the user.

Figure 75:
FIG. 75 is an example graphical user interface (GUI) for displaying tasks in a graphical format, according to yet another example embodiment of the present disclosure.

FIG. 75 shows an example GUI 7500 for displaying tasks in a graphical format. As depicted in FIG. 75, GUI 7500 may include a calendar 7501 for receiving a selection of a date or a week from a user of GUI 7500.

As further depicted in FIG. 75, and similar to GUI 6300 and GUI 7400, GUI 7500 may include list of one or more tasks (e.g., task 7503) having a due date matching the selected date or within the selected week. For example, for each task, the list may include the title associated with the task, the due date and/or time of the task, one or more assignees associated with the task, and the like. As further depicted in FIG. 67, and similar to GUI 6300 and GUI 7400, GUI 7500 may include a button 7505 for receiving a request to add a task associated with the user.

Figure 76:
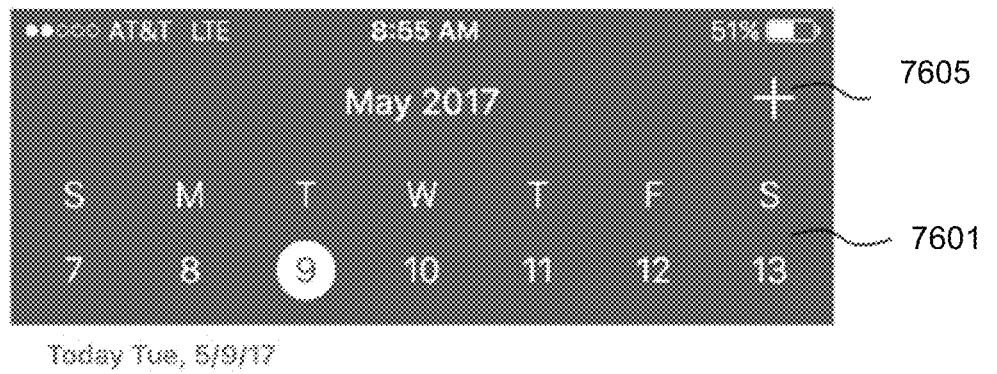
FIG. 76 is another example graphical user interface (GUI) for displaying events in a graphical format, according to yet another example embodiment of the present disclosure.

FIG. 76 shows another example GUI 7600 for displaying events in a graphical format. As depicted in FIG. 76, and similar to GUI 7500, GUI 7600 may include a calendar 7601 for receiving a selection of a date or a week from a user of GUI 7600.

As further depicted in FIG. 76, and similar to GUI 7500, GUI 7600 may include list of one or more events (e.g., event 7603) having a start date and/or end date matching the selected date or within the selected week. For example, for each event, the list may include the title associated with the event, the start date and/or time of the event, the end date and/or time of the event, and the like. As further depicted in FIG. 76, and similar to GUI 7500, GUI 7600 may include a button 7605 for receiving a request to add an event associated with the user.

Figure 77:
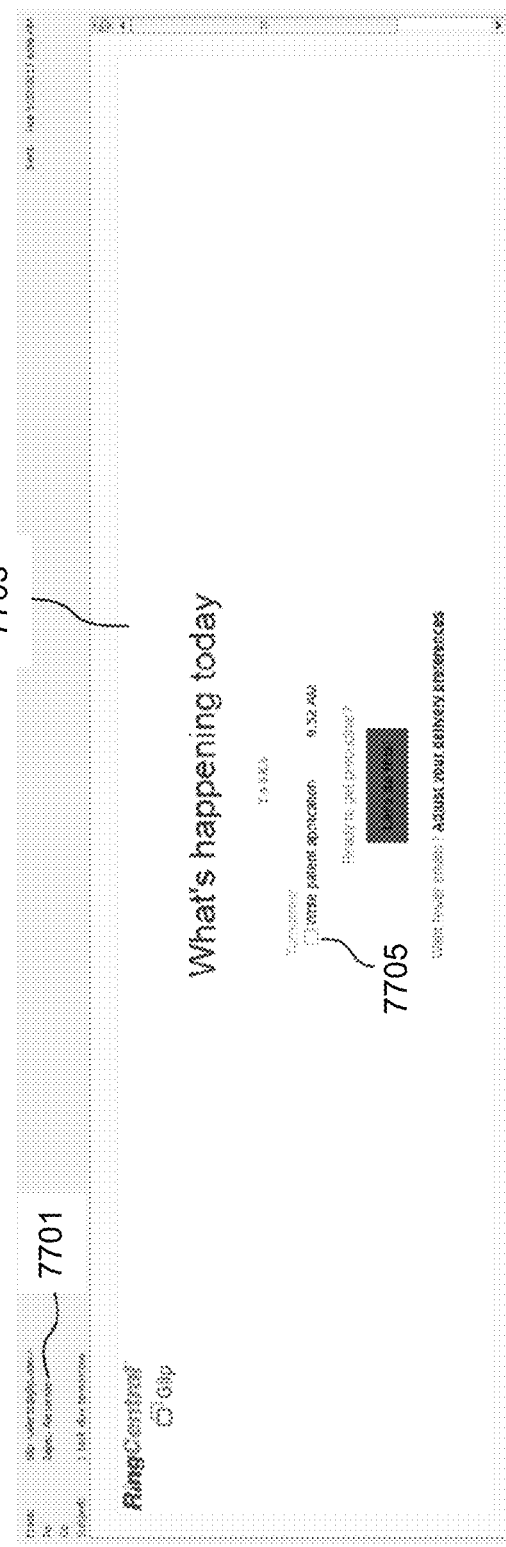
FIG. 77 is an example graphical user interface (GUI) including an example reminder email for an upcoming task (or event), according to yet another example embodiment of the present disclosure.

FIG. 77 shows an example GUI 7700 including an example reminder email for an upcoming task (or event). As depicted in FIG. 77, the email may be addressed to at least one assignee or invitee (e.g., assignee 7701). The email may further include a body 7703 having, for example, information about upcoming task 7705 (e.g., in the example of FIG. 77, task 7705 is "due tomorrow") or an upcoming event (not shown).

Figure 78:
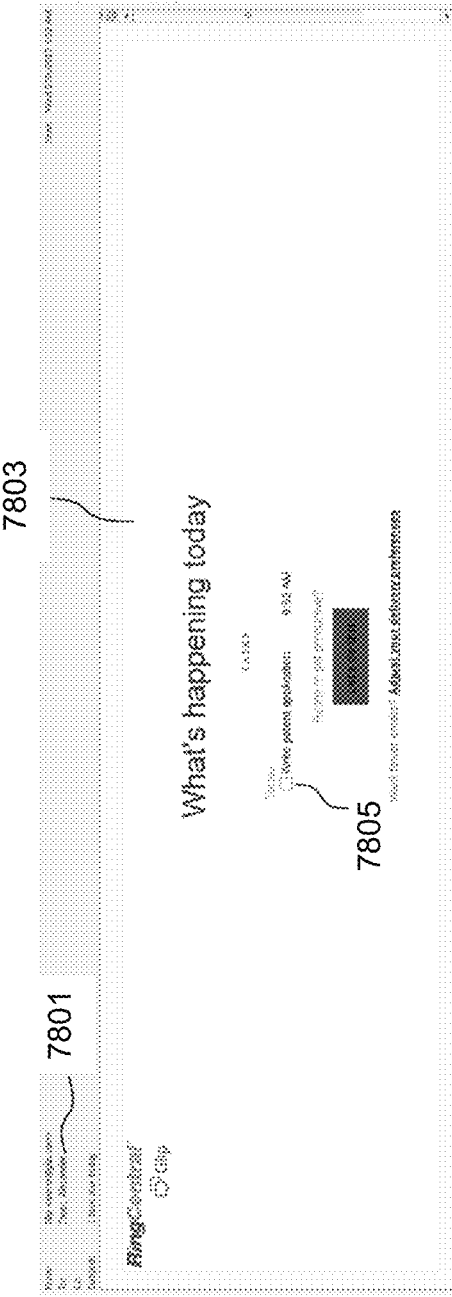
FIG. 78 is another example graphical user interface (GUI) including an example reminder email for an upcoming task (or event), according to yet another example embodiment of the present disclosure.

FIG. 78 shows another example GUI 7800 including an example reminder email for an upcoming task (or event). As depicted in FIG. 78, and similar to GUI 7700, the email may be addressed to at least one assignee or invitee (e.g., assignee 7801). The email may further include a body 7803 having, for example, information about upcoming task 7805 (e.g., in the example of FIG. 78, task 7805 is "due today") or an upcoming event (not shown).

Figure 79:
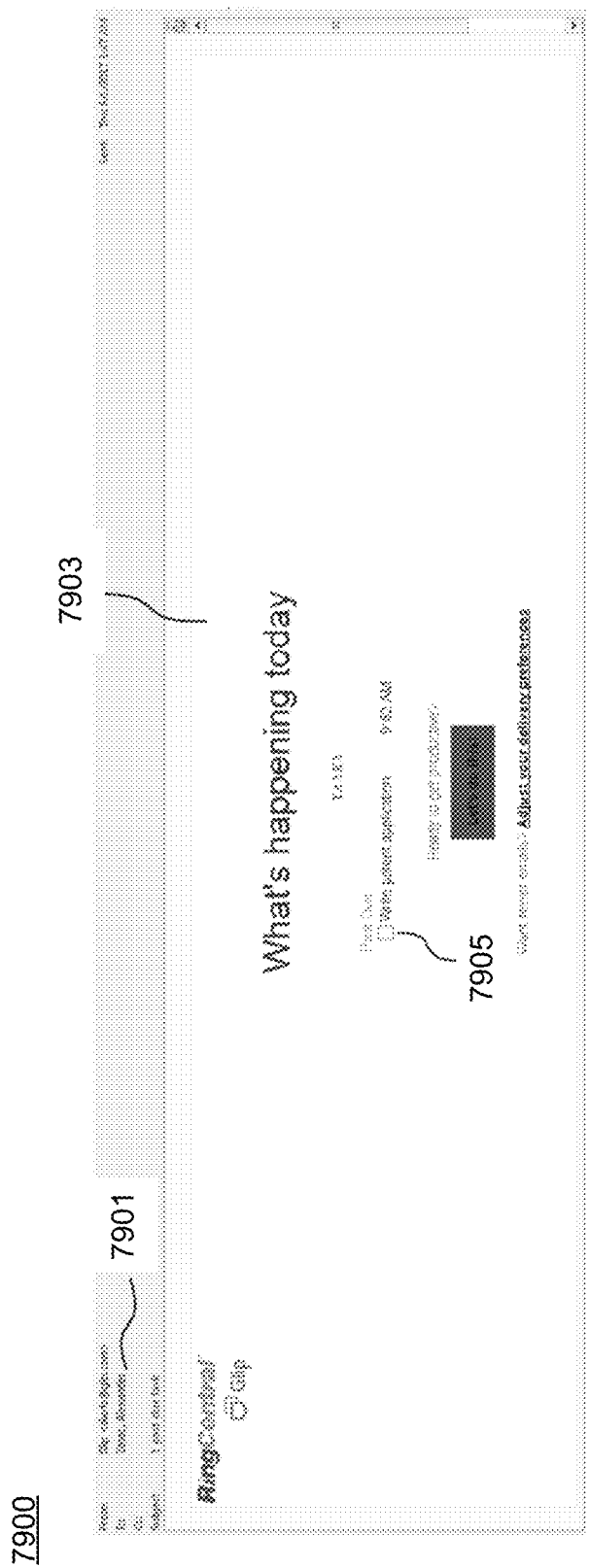
FIG. 79 is an example graphical user interface (GUI) including an example reminder email for a past due task (or event), according to yet another example embodiment of the present disclosure.

FIG. 79 shows an example GUI 7900 including an example reminder email for a past due task (or event). As depicted in FIG. 79, and similar to GUI 7700 and GUI 7800, the email may be addressed to at least one assignee or invitee (e.g., assignee 7901). The email may further include a body 7903 having, for example, information about past due task 7905 (e.g., in the example of FIG. 79, task 7905 is "past-due") or an already-occurred event (not shown).

Figure 80:
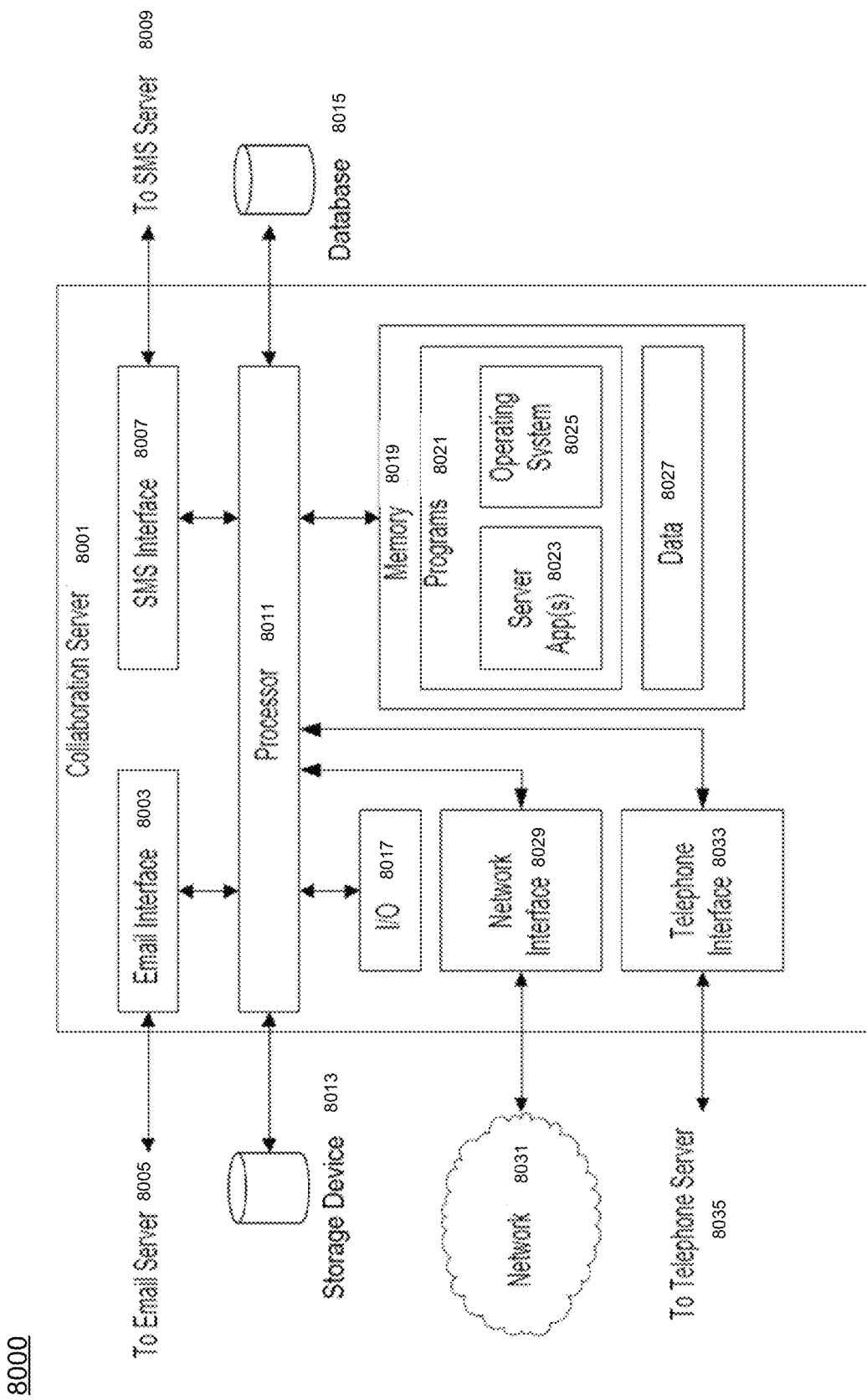
FIG. 80 is a block diagram of an example computing system with which the systems, methods, and apparatuses of the present disclosure may be implemented.

FIG. 80 is a is a block diagram that illustrates an example of computing system 8000 suitable for implementing the disclosed systems and methods. System 8000 includes a collaboration server 8001. Server 8001 may include email interface 8003 operably connected to an external email server 8005 and SMS interface 8007 operably connected to an external SMS server 8009. Although depicted as separate in FIG. 80, email server 8005 may reside on collaboration server 8001 or at least on the same server farm as server 8001. Similarly, SMS server 8009 may reside on collaboration server 8001 or at least on the same server farm as server 7201.

As depicted in FIG. 80, server 8001 may further include at least one processor, e.g., processor 8011. Processor 8011 may be operably connected to email interface 8003, SMS interface 8007, one or more databases (e.g., database 8015), one or more storage devices (e.g., storage device 8013), an input/output module 8017, memory 8019, and/or other components of server 8001. Email interface 8003, SMS interface 8007, and/or one or more processors 8011 may comprise separate components or may be integrated in one or more integrated circuits.

I/O module 8017 may be operably connected to a keyboard, mouse, touch screen controller, and/or other input controller(s) (not shown). Other input/control devices connected to I/O module 8017 may include one or more buttons, rocker switches, thumb-wheel, infrared port, USB port, and/or a pointer device such as a stylus.

Processor 8011 may also be operably connected to memory 8019. Memory 8019 may include high-speed random access memory and/or non-volatile memory, such as one or more magnetic disk storage devices, one or more optical storage devices, and/or flash memory (e.g., NAND, NOR). Memory 8019 may include one or more programs 8021.

For example, memory 8019 may store an operating system 8025, such as DRAWIN, RTXC, LINUX, iOS, UNIX, OS X, WINDOWS, or an embedded operating system such as VXWorkS. Operating system 8025 may include instructions for handling basic system services and for performing hardware dependent tasks. In some implementations, operating system 8025 may comprise a kernel (e.g., UNIX kernel).

Memory 8019 may also store one or more server applications 8023 to facilitate communicating with one or more additional devices, one or more computers and/or one or more servers. Server applications 8023 may also include instructions to execute one or more of the disclosed methods.

Memory 8019 may also store data 8027. Data 8027 may include transitory data used during instruction execution. Data 8027 may also include data recorded for long-term storage.

Each of the above identified instructions and applications may correspond to a set of instructions for performing one or more functions described above. These instructions need not be implemented as separate software programs, procedures, or modules. Memory 8019 may include additional instructions or fewer instructions. Furthermore, various functions of server 8001 may be implemented in hardware and/or in software, including in one or more signal processing and/or application specific integrated circuits.

Communication functions may be facilitated through one or more network interfaces (e.g., interface 8029). Network interface 8029 may be configured for communications over Ethernet, radio frequency, and/or optical (e.g., infrared) frequencies. The specific design and implementation of network interface 8029 depends on the communication network(s) over which server 8001 is intended to operate. For example, in some embodiments, server 8001 includes wireless/wired network interface 8029 designed to operate over a GSM network, a GPRS network, an EDGE network, a Wi-Fi or WiMax network, and a Bluetooth® network. In other embodiments, server 8001 includes wireless/wired network interface 8029 designed to operate over a TCP/IP network. Accordingly, network 8031 may be any appropriate computer network compatible with network interface 8029.

Communication functions may be further facilitated through one or more telephone interfaces (e.g., interface 8033). For example, telephone interface 8033 may be configured for communication with a telephone server 8035. Telephone server 8035 may reside on collaboration server 8001 or at least on the same server farm as server 8001.

The various components in server 8000 may be coupled by one or more communication buses or signal lines (not shown).

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A computer-implemented method for modifying online chat messages within a messaging platform, comprising:
    detecting a modification to one online chat message that forms a modified one online chat message, wherein the one online chat message is an online chat message from a plurality of online chat messages between online users within the messaging platform that facilitates online chat communication between the online users via one or more electronic devices;
    processing subsequent online chat messages that are posted after the one online chat message has been posted;
    automatically identifying an online chat message from the subsequent online chat messages that has a dependency on the one online chat message using at least one of artificial intelligence or machine learning being executed by a processor; and
    automatically determining whether a content of the online chat message from the subsequent online chat messages is impacted by the modified one online chat message.

2. The computer-implemented method as described in claim 1, further comprising determining whether changes to the online chat message from the subsequent online chat messages can be made based on the modification to the one online chat message while maintaining the online chat message from the subsequent online chat messages sensical and accurate.

3. The computer-implemented method as described in claim 2, further comprising: in response to determining that changes to the online chat message from the subsequent online chat messages can be made based on the modification to the one online chat message while maintaining the online chat message from the subsequent online chat messages sensical and accurate, modifying the online chat message from the subsequent online chat messages based on the modification to the one online chat message.

4. The computer-implemented method as described in claim 3, further comprising displaying an icon associated with the modification to the online chat message from the subsequent online chat messages, wherein the icon notifies a participant that the online chat message from the subsequent online chat messages has been modified based on the modification to the one online chat message.

5. The computer-implemented method as described in claim 3, wherein the modifying the online chat message from the subsequent online chat messages is deleting a portion of the online chat message.

6. The computer-implemented method as described in claim 1, wherein the dependency is determined based on at least one of the one online chat message being shared, referenced, copied, or quoted.

7. The computer-implemented method as described in claim 1, wherein the dependency is determined based on an originator of the one online chat message being referenced in the online chat message from the subsequent online chat messages.

8. The computer-implemented method as described in claim 1, further comprising outputting notification that the one online chat message has been modified.

9. The computer-implemented method as described in claim 1, further comprising outputting notification that the online chat message from the subsequent online chat messages is impacted by modification to the one online chat message.

10. The computer-implemented method as described in claim 1, further comprising displaying an icon associated with the modification to the one online chat message.

11. The computer-implemented method as described in claim 1, wherein the processing, the automatically identifying and the automatically determining is in response to a user selection, via a graphical user interface (GUI), to perform deep edit.

12. The computer-implemented method as described in claim 1, further comprising: deleting the online chat message from the subsequent online chat messages in response to a user selection to perform a deep delete operation.

13. The computer-implemented method as described in claim 1, wherein at least a subset of the subsequent online chat messages is posted in another messaging platform that is different from the messaging platform for the one online chat message.

14. A browser-based method, comprising:
    detecting a modification to one online chat message that forms a modified one online chat message, wherein the one online chat message is an online chat message from a plurality of online chat messages between online users within a messaging platform that facilitates online chat communication between the online users via one or more electronic devices;
    processing subsequent online chat messages that are posted after the one online chat message has been posted;
    automatically identifying an online chat message from the subsequent online chat messages that has a dependency on the one online chat message using at least one of artificial intelligence or machine learning being executed by a processor; and
    automatically determining whether a content of the online chat message from the subsequent online chat messages is impacted by the modified one online chat message.

15. The browser-based method as described in claim 14, further comprising determining whether changes to the online chat message from the subsequent online chat messages can be made based on the modification to the one online chat message while maintaining the online chat message from the subsequent online chat messages sensical and accurate.

16. The browser-based method as described in claim 15, further comprising: in response to determining that changes to the online chat message from the subsequent online chat messages can be made based on the modification to the one online chat message while maintaining the online chat message from the subsequent online chat messages sensical and accurate, modifying the online chat message from the subsequent online chat messages based on the modification to the one online chat message.

17. The browser-based method as described in claim 16, further comprising displaying an icon associated with the modification to the online chat message from the subsequent online chat messages, wherein the icon notifies a participant that online chat message from the subsequent online chat messages has been modified based on the modification to the one online chat message.

18. The browser-based method as described in claim 16, wherein the modifying the online chat message from the subsequent online chat messages is deleting a portion of the online chat message.

19. The browser-based method as described in claim 14, wherein the dependency is determined based on at least one of the one online chat message being shared, referenced, copied, or quoted.

20. The browser-based method as described in claim 14, wherein the dependency is determined based on an originator of the one online chat message being referenced in the online chat message from the subsequent online chat messages.

21. The browser-based method as described in claim 14, further comprising outputting notification that the one online chat message has been modified.

22. The browser-based method as described in claim 14, further comprising outputting notification that the online chat message from the subsequent online chat messages is impacted by modification to the one online chat message.

23. The browser-based method as described in claim 14, further comprising displaying an icon associated with the modification to the one online chat message.

24. The browser-based method as described in claim 14, wherein the processing, the automatically identifying and the automatically determining is in response to a user selection, via a graphical user interface (GUI), to perform deep edit.

25. The browser-based method as described in claim 14, further comprising: deleting the online chat message from the subsequent online chat messages in response to a user selection to perform a deep delete operation.

26. The browser-based method as described in claim 14, wherein at least a subset of the subsequent online chat messages is posted in another messaging platform that is different from the messaging platform for the one online chat message.

27. A non-transitory, computer-readable medium storing a set of instructions that, when executed by a processor, cause:
   detecting a modification to one online chat message that forms a modified one online chat message, wherein the one online chat message is an online chat message from a plurality of online chat messages between online users within a messaging platform that facilitates online chat communication between the online users via one or more electronic devices;
   processing subsequent online chat messages that are posted after the one online chat message has been posted;
   automatically identifying an online chat message from the subsequent online chat messages that has a dependency on the one online chat message using at least one of artificial intelligence or machine learning being executed by the processor; and
   automatically determining whether a content of the online chat message from the subsequent online chat messages is impacted by the modified one online chat message.

28. The non-transitory, computer-readable medium storing a set of instructions that, when executed by a processor, as described in claim 27, further comprising: in response to determining that changes to the online chat message from the subsequent online chat messages can be made based on the modification to the one online chat message while maintaining the online chat message from the subsequent online chat messages sensical and accurate, modifying the online chat message from the subsequent online chat messages based on the modification to the one online chat message.

29. The non-transitory, computer-readable medium storing a set of instructions that, when executed by a processor, as described in claim 27, wherein the dependency is determined based on at least one of the one online chat message being shared, referenced, copied, or quoted.

30. The non-transitory, computer-readable medium storing a set of instructions that, when executed by a processor, as described in claim 27, wherein at least a subset of the subsequent online chat messages is posted in another messaging platform that is different from the messaging platform for the one online chat message.

\* \* \* \* \*